United States Patent
Litinski

(10) Patent No.: US 12,271,714 B2
(45) Date of Patent: Apr. 8, 2025

(54) QUANTUM COMPUTER USING SWITCHABLE NETWORK FUSIONS

(71) Applicant: Psiquantum, Corp., Palo Alto, CA (US)

(72) Inventor: Daniel Litinski, Palo Alto, CA (US)

(73) Assignee: Psiquantum, Corp., Palo Alto, CA (US)

( * ) Notice: Subject to any disclaimer, the term of this patent is extended or adjusted under 35 U.S.C. 154(b) by 0 days.

(21) Appl. No.: 18/108,552

(22) Filed: Feb. 10, 2023

(65) Prior Publication Data

US 2024/0168906 A1   May 23, 2024

Related U.S. Application Data

(60) Provisional application No. 63/427,083, filed on Nov. 21, 2022, provisional application No. 63/308,879, filed on Feb. 10, 2022.

(51) Int. Cl.
   *G06F 8/41*   (2018.01)
   *G06F 13/40*  (2006.01)
   (Continued)

(52) U.S. Cl.
   CPC ............ *G06F 8/41* (2013.01); *G06F 13/4022* (2013.01); *G06N 10/20* (2022.01); *G06N 10/40* (2022.01);
   (Continued)

(58) Field of Classification Search
   CPC ....... G06F 8/41; G06F 13/4022; H04B 10/70; H04Q 11/0005; H04Q 2011/0043; G06N 10/40; G06N 10/20; G06N 10/70
   See application file for complete search history.

(56) References Cited

U.S. PATENT DOCUMENTS

| 7,028,275 B1 | 4/2006 | Chen et al. |
| 7,277,872 B2 | 10/2007 | Raussendorf et al. |

(Continued)

FOREIGN PATENT DOCUMENTS

| EP | 3109803 B1 | 7/2020 |
| JP | 2016504002 A | 2/2016 |

(Continued)

OTHER PUBLICATIONS

"PSIQUANTUM Webpage from Apr. 2020 Disclosing Cornell University Paper", PsiQuantum Corporation, Accessed from Internet on Apr. 20, 2021, 8 pages.

(Continued)

*Primary Examiner* — Henry Tsai
*Assistant Examiner* — Aurangzeb Hassan
(74) *Attorney, Agent, or Firm* — Kilpatrick Townsend & Stockton LLP

(57) ABSTRACT

A fault-tolerant quantum computer using topological codes such as surface codes can have an architecture that reduces the amount of idle volume generated. The architecture can include qubit modules that generate surface code patches for different qubits and a network of interconnections between different qubit modules. The interconnections can include "port" connections that selectably enable coupling of boundaries of surface code patches generated in different qubit modules and/or "quickswap" connections that selectably enable transferring the state of a surface code patch from one qubit module to another. Port and/or quickswap connections can be made between a subset of qubit modules. For instance port connections can connect a given qubit module to other qubit modules within a fixed range. Quickswap connections can provide a log-tree network of direct connections between qubit modules.

23 Claims, 106 Drawing Sheets

(51) Int. Cl.
  *G06N 10/20* (2022.01)
  *G06N 10/40* (2022.01)
  *G06N 10/70* (2022.01)
  *H04B 10/70* (2013.01)
  *H04Q 11/00* (2006.01)

(52) U.S. Cl.
  CPC ............ *G06N 10/70* (2022.01); *H04B 10/70* (2013.01); *H04Q 11/0005* (2013.01); *H04Q 2011/0043* (2013.01)

(56) References Cited

U.S. PATENT DOCUMENTS

| | | | |
|---|---|---|---|
| 7,554,080 | B2 | 6/2009 | Munro et al. |
| 9,178,154 | B2 | 11/2015 | Bunyk |
| 9,735,776 | B1 | 8/2017 | Abdo et al. |
| 9,858,531 | B1 | 1/2018 | Monroe et al. |
| 9,944,520 | B2 | 4/2018 | Ashikhmin |
| 10,592,626 | B1 * | 3/2020 | Pednault ............... G06F 30/39 |
| 10,726,353 | B2 * | 7/2020 | Ashrafi ............... G06N 10/00 |
| 11,010,145 | B1 | 5/2021 | Smith et al. |
| 11,263,076 | B2 | 3/2022 | Nickerson et al. |
| 11,892,746 | B1 * | 2/2024 | Mazed ............... G02F 1/225 |
| 11,972,321 | B2 | 4/2024 | Gunnels et al. |
| 2008/0035911 | A1 | 2/2008 | Gilbert et al. |
| 2009/0070402 | A1 | 3/2009 | Rose et al. |
| 2009/0078931 | A1 | 3/2009 | Berkley |
| 2009/0180616 | A1 | 7/2009 | Brodsky et al. |
| 2011/0175062 | A1 | 7/2011 | Farinelli et al. |
| 2012/0155870 | A1 * | 6/2012 | Harrison ............... H04B 10/70 398/45 |
| 2014/0112478 | A1 | 4/2014 | Arahira |
| 2014/0221059 | A1 | 8/2014 | Freedman et al. |
| 2014/0314101 | A1 | 10/2014 | Paik |
| 2014/0355998 | A1 | 12/2014 | Tanzilli et al. |
| 2015/0036967 | A1 | 2/2015 | Smith et al. |
| 2016/0112066 | A1 | 4/2016 | Ashikhmin |
| 2016/0267032 | A1 | 9/2016 | Rigetti et al. |
| 2016/0344414 | A1 | 11/2016 | Naaman et al. |
| 2017/0141287 | A1 | 5/2017 | Barkeshli et al. |
| 2018/0013426 | A1 | 1/2018 | Deurloo et al. |
| 2018/0046933 | A1 | 2/2018 | La Cour et al. |
| 2020/0044749 | A1 | 2/2020 | Rauschenbach et al. |
| 2020/0097848 | A1 | 3/2020 | Woerner et al. |
| 2020/0287631 | A1 | 9/2020 | Gimeno-Segovia et al. |
| 2020/0301244 | A1 | 9/2020 | Wang |
| 2020/0401927 | A1 * | 12/2020 | Nickerson ............... G06F 13/40 |
| 2021/0105135 | A1 | 4/2021 | Figueroa et al. |
| 2021/0374588 | A1 | 12/2021 | Gidney et al. |
| 2022/0172096 | A1 | 6/2022 | Rudolph |
| 2022/0224996 | A1 | 7/2022 | Nickerson et al. |
| 2022/0374378 | A1 | 11/2022 | Sivan et al. |
| 2022/0383175 | A1 | 12/2022 | Gimeno-Segovia et al. |
| 2023/0042201 | A1 | 2/2023 | Raussendorf et al. |
| 2023/0112525 | A1 | 4/2023 | Naveh et al. |
| 2023/0237359 | A1 | 7/2023 | Rogers et al. |
| 2023/0237360 | A1 | 7/2023 | Naveh et al. |
| 2023/0244973 | A1 | 8/2023 | Naveh et al. |
| 2023/0315516 | A1 * | 10/2023 | Fitzpatrick ............ G06N 10/40 718/102 |
| 2024/0168906 | A1 | 5/2024 | Litinski |
| 2024/0275495 | A1 | 8/2024 | Qiang et al. |

FOREIGN PATENT DOCUMENTS

| | | |
|---|---|---|
| JP | 2018538680 A | 12/2018 |
| WO | 2019178009 A1 | 9/2019 |
| WO | 2019183602 A1 | 9/2019 |
| WO | 2020033588 A1 | 2/2020 |
| WO | 2020056324 A1 | 3/2020 |
| WO | 2020257772 A1 | 12/2020 |
| WO | 2022159847 A1 | 7/2022 |
| WO | 2022241336 A2 | 11/2022 |

OTHER PUBLICATIONS

"Quantum Computing: Progress and Prospects", The National Academies of Sciences, Engineering, and Medicine, 2019, pp. 156-192.
U.S. Appl. No. 17/163,219, Advisory Action, filed Nov. 16, 2021, 11 pages.
U.S. Appl. No. 17/163,219, Final Office Action, filed Apr. 20, 2023, 14 pages.
U.S. Appl. No. 17/163,219, Final Office Action, filed Aug. 13, 2021, 29 pages.
U.S. Appl. No. 17/163,219, Non-Final Office Action, filed Oct. 6, 2022, 13 pages.
U.S. Appl. No. 17/163,219, Non-Final Office Action, filed Apr. 27, 2021, 15 pages.
Aharonov et al., "Fault-Tolerant Quantum Computation with Constant Error Rate", Society for Industrial and Applied Mathematics (SIAM) Journal on Computing, vol. 38, No. 4, 2008, pp. 1207-1282.
Auger et al., "Fault-Tolerant Quantum Computation with Non-Deterministic Entangling Gates", Physical Review A, vol. 97, Mar. 16, 2018, 5 pages.
Ball, "First 100-Qubit Quantum Computer Enters Crowded Race", Nature, vol. 599, Nov. 19, 2021, p. 542.
Barkeshli et al., "Modular Transformations Through Sequences of Topological Charge Projections", Physical Review B, vol. 94, Jan. 19, 2017, 21 pages.
Barrett et al., "Fault Tolerant Quantum Computation with Very High Threshold for Loss Errors", Physical Review Letters, vol. 105, No. 20, Nov. 15, 2010, 4 pages.
Bartolucci et al., "Fusion-Based Quantum Computation", Available Online at: https://arxiv.org/pdf/2101.09310.pdf, Jan. 22, 2021, pp. 1-25.
Blais et al., "Circuit Quantum Electrodynamics", Reviews of Modern Physics, vol. 93, May 19, 2021, 82 pages.
Bolt et al., "Foliated Quantum Error-Correcting Codes", Physical Review Letters, vol. 117, Aug. 12, 2016, pp. 070501-1-070501-6.
Bombin et al., "Interleaving: Modular Architectures for Fault-Tolerant Photonic Quantum Computing", Available Online at https://arxiv.org/pdf/2103.08612.pdf, Mar. 15, 2021, 22 pages.
Bombin et al., "Logical Blocks for Fault-Tolerant Topological Quantum Computation", PRX Quantum, vol. 4, No. 2, Dec. 22, 2021, 39 pages.
Bombin et al., "Quantum Measurements and Gates by Code Deformation", Journal of Physics A Mathematical and Theoretical, vol. 42, No. 9, Feb. 25, 2009, 19 pages.
Bombin, "Single-Shot Fault-Tolerant Quantum Error Correction", Physical Review X, vol. 5, Sep. 28, 2015, pp. 031043-1-031043-26.
Bombin, "Topological Order with a Twist: Ising Anyons from an Abelian Model", Physical Review Letters, vol. 105, Jul. 28, 2010, 5 pages.
Bourassa et al., "Blueprint for a Scalable Photonic Fault-Tolerant Quantum Computer", Quantum, vol. 5, Feb. 2, 2021, 38 pages.
Braunstein et al., "Quantum Information with Continuous Variables", Reviews of Modern Physics, vol. 77, Jun. 2005, 65 pages.
Braunstein et al., "Teleportation of Continuous Quantum Variables", Physical Review Letters, vol. 80, No. 4, Jan. 26, 1998, pp. 869-872.
Bravyi et al., "Quantum Codes on a Lattice with Boundary", Available Online at: https://arxiv.org/pdf/quant-ph/9811052.pdf, Nov. 20, 1998, 6 pages.
Briegel et al., "Measurement-Based Quantum Computation", Nature Physics, vol. 5, Oct. 9, 2009, 20 pages.
Brown et al., "Universal Fault-Tolerant Measurement-Based Quantum Computation", Physical Review Research, vol. 2, Aug. 25, 2020, 30 pages.
Browne et al., "Resource-Efficient Linear Optical Quantum Computation", Physical Review Letters, vol. 95, No. 1, Feb. 9, 2005, 5 pages.
Bruzewicz et al., "Trapped-Ion Quantum Computing: Progress and Challenges", Applied Physics Reviews, vol. 6, No. 2, Apr. 8, 2019, 56 pages.
Castellanos, "PsiQuantum Raises $450 Million to Build Its Quantum Computer", The Wall Street Journal, Jul. 27, 2021, 4 pages.

(56) References Cited

OTHER PUBLICATIONS

Chamberland et al., "Fault-Tolerant Quantum Computing in the Pauli or Clifford Frame with Slow Error Diagnostics", Quantum, vol. 2, Dec. 25, 2017, 11 pages.
Chao et al., "Optimization of the Surface Code Design for Majorana-Based Qubits", Quantum, vol. 4, Oct. 26, 2020, 19 pages.
Cirac et al., "Quantum Computations with Cold Trapped Ions", Physical Review Letters, vol. 74, No. 20, May 15, 1995, pp. 4091-4094.
Coecke et al., "Interacting Quantum Observables: Categorical Algebra and Diagrammatics", Oxford University, Apr. 21, 2011, 80 pages.
Das et al., "A Scalable Decoder Micro-Architecture for Fault-Tolerant Quantum Computing", Available Online at: https://arxiv.org/pdf/2001.06598.pdf, Jan. 18, 2020, 19 pages.
Dawson et al., "Noise Thresholds for Optical Quantum Computers", Physical Review Letters, vol. 96, Jan. 17, 2006, 5 pages.
Delfosse et al., "Almost-Linear Time Decoding Algorithm for Topological Codes", Available Online at: https://arxiv.org/pdf/1709.06218.pdf, Sep. 19, 2017, 10 pages.
Delfosse, "Hierarchical Decoding to Reduce Hardware Requirements for Quantum Computingg", Available Online at: https://arxiv.org/pdf/2001.11427.pdf, Jan. 30, 2020, 8 pages.
Dennis et al., "Topological Quantum Memory", Journal of Mathematical Physics, vol. 43, No. 9, Oct. 24, 2001, 39 pages.
Dyakonov, "The Case Against Quantum Computing", Institute of Electrical and Electronics Engineers Spectrum, Nov. 15, 2018, pp. 1-14.
Edmonds, "Paths, Trees, and Flowers", National Bureau of Standards and Princeton University, 1965, pp. 449-467.
Application No. EP20826691.6, Extended European Search Report, Mailed On Jun. 9, 2023, 11 pages.
Application No. EP20826691.6, Office Action, Mailed On Apr. 24, 2024, 5 pages.
Ewert et al., "3/4-Efficient Bell Measurement with Passive Linear Optics and Unentangled Ancillae", Physical Review Letters, vol. 113, No. 14, Sep. 30, 2014, pp. 1-8.
Fowler et al., "Surface Codes: Towards Practical Large-Scale Quantum Computation", Physical Review A, vol. 86, No. 3, Oct. 27, 2012, 54 pages.
Fujisaki et al., "A Practical and Scalable Decoder for Topological Quantum Error Correction with Digital Annealer", Available Online at: https://arxiv.org/pdf/2203.15304.pdf, Sep. 9, 2022, 12 pages.
Gimeno-Segovia et al., "From Three-Photon GHZ States to Universal Ballistic Quantum Computation", Physical Review Letters, vol. 115, Feb. 26, 2015, pp. 1-9.
Gimeno-Segovia et al., "Relative Multiplexing for Minimising Switching in Linear-Optical Quantum Computing", New Journal of Physics, vol. 19, Available Online at: https://iopscience.iop.org/article/10.1088/1367-2630/aa7095, Jun. 6, 2017, pp. 1-13.
Gimeno-Segovia et al., "Relative Multiplexing for Minimizing Switching in Linear-optical Quantum Computing", Available on arxiv.org, Cornell University, vol. 19, Jun. 9, 2017, pp. 1-13.
Glancy et al., "Error Analysis for Encoding a Qubit in an Oscillator", Physical Review A, vol. 73, No. 1, Jan. 19, 2006, pp. 012325-1-012325-5.
Gottesman, "A Class of Quantum Error-Correcting Codes Saturating the Quantum Hamming Bound", Physical Review A, vol. 54, No. 3, Sep. 1, 1996, pp. 1-22.
Gottesman et al., "Encoding a Qubit in an Oscillator", Physical Review A, vol. 64, No. 1, May 13, 2001, pp. 1-22.
Gottesman, "Fault-Tolerant Quantum Computation with Constant Overhead", Quantum Information & Computation, vol. 14, Nos. 15-16, Nov. 1, 2014, pp. 1-33.
Gottesman et al., "Quantum Teleportation is a Universal Computational Primitive", Available Online at: https://arxiv.org/pdf/quant-ph/9908010.pdf, Aug. 2, 1999, pp. 1-6.
Grice, "Arbitrarily Complete Bell-State Measurement Using Only Linear Optical Elements", Physical Review A, vol. 84, No. 4, Oct. 2011, pp. 042331-1-042331-6.

Hein et al., "Multiparty Entanglement in Graph States", Physical Review A, vol. 69, Jun. 9, 2004, pp. 062311-1-062311-20.
Herr et al., "A Local and Scalable Lattice Renormalization Method for Ballistic Quantum Computation", NPJ Quantum Information, vol. 4, No. 27, Jun. 21, 2018, pp. 1-8.
Herrera-Marti et al., "A Photonic Implementation for the Topological Cluster State Quantum Computer", Physical Review A, vol. 82, No. 3, May 17, 2010, pp. 1-7.
Horgan, "Will Quantum Computing Ever Live Up to Its Hype?", Scientific American, Apr. 20, 2021, 10 pages.
Horsman et al., "Surface Code Quantum Computing by Lattice Surgery", New Journal of Physics, vol. 14, Dec. 7, 2012, pp. 1-27.
Huo et al., "Learning Time-Dependent Noise to Reduce Logical Errors: Real Time Error Rate Estimation In Quantum Error Correction", New Journal of Physics, vol. 19, No. 12, Dec. 13, 2017, 11 pages.
Kane, "A Silicon-Based Nuclear Spin Quantum Computer", Nature, vol. 393, 1998, pp. 133-137.
Kastoryano et al., "Dissipative Preparation of Entanglement in Optical Cavities", Physical Review Letters, vol. 106, Feb. 28, 2011, pp. 1-4.
Kieling et al., "Percolation, Renormalization, and Quantum Computing with Non-Deterministic Gates", Physical Review Letters, vol. 99, No. 13, Jul. 20, 2007, pp. 1-5.
Kjaergaard et al., "Superconducting Qubits: Current State of Play", Annual Reviews of Condensed Matter Physics, vol. 11, Apr. 21, 2020, pp. 1-30.
Knill et al., "Efficient Linear Optics Quantum Computation", Available Online at: https://arxiv.org/pdf/quant-ph/0006088.pdf, Jun. 20, 2000, pp. 1-8.
Knill, "Fault-Tolerant Postselected Quantum Computation: Threshold Analysis", Available Online at: https://arxiv.org/pdf/quant-ph/0404104.pdf, Apr. 19, 2004, pp. 1-21.
Koch et al., "Charge Insensitive Qubit Design Derived from the Cooper Pair Box", Physical Review A, vol. 76, Sep. 26, 2007, pp. 1-21.
Kolmogorov, "Blossom V: A New Implementation of A Minimum Cost Perfect Matching Algorithm", Mathematical Programming Computation, vol. 1, No. 1, Apr. 21, 2009, pp. 1-15.
Krauter et al., "Entanglement Generated by Dissipation", International Conference on Quantum Information, Jun. 22, 2010, pp. 1-9.
Leung, "Quantum Computation by Measurements", International Journal of Quantum Information, vol. 2, No. 1, Feb. 27, 2004, pp. 1-10.
Li et al., "Resource Costs for Fault-Tolerant Linear Optical Quantum Computing", Physical Review X, vol. 5, No. 4, Apr. 22, 2015, pp. 1-13.
Litinski, "A Game of Surface Codes: Large-Scale Quantum Computing with Lattice Surgery", Quantum, vol. 3, Mar. 5, 2019, pp. 1-37.
Litinski, "Magic State Distillation: Not as Costly as You Think", Nov. 6, 2019, 22 pages.
Loss et al., "Quantum Computation with Quantum Dots", Physical Review A, vol. 57, Jan. 1, 1998, pp. 1-20.
Molmer et al., "Multi-Particle Entanglement of Hot Trapped Ions", Physical Review Letters, vol. 82, No. 9, Mar. 1, 1999, pp. 1-4.
Nayak et al., "Non-Abelian Anyons and Topological Quantum Computation", Reviews of Modern Physics, vol. 80, No. 3, Mar. 28, 2008, pp. 1-73.
Newman et al., "Generating Fault-Tolerant Cluster States from Crystal Structures", Quantum, vol. 4, Jul. 9, 2020, pp. 1-37.
Nickerson et al., "Measurement Based Fault Tolerance Beyond Foliation", PsiQuantum, Oct. 23, 2018, pp. 1-16.
Nirldrn, "Optical Quantum Computation Using Cluster States", Physical Review Letters, vol. 93, No. 4, Feb. 2, 2004, pp. 1-4.
Nielsen et al., "Quantum Computation and Quantum Information", Cambridge University Press, Available online at: www.cambridge.org/9781107002173, 2010, 6 pages.
Nielsen, "Universal Quantum Computation Using Only Projective Measurement, Quantum Memory, and Preparation of the |0> State", Physics Letters A, vol. 308, Nos. 2-3, Aug. 6, 2001, pp. 1-4.
Pant et al., "Percolation Thresholds for Photonic Quantum Computing", Nature Communications, vol. 10, Mar. 6, 2019, pp. 1-12.

(56) References Cited

OTHER PUBLICATIONS

Application No. PCT/US2020/038962, International Preliminary Report on Patentability, Mailed On Dec. 30, 2021, 9 pages.
Application No. PCT/US2020/038962, International Search Report and Written Opinion, Mailed On Oct. 13, 2020, 12 pages.
Application No. PCT/US2021/015903, International Search Report and Written Opinion, Mailed On May 18, 2021, 8 pages.
Application No. PCT/US2022/013578, International Search Report and Written Opinion, Mailed On Apr. 27, 2022, 7 pages.
Application No. PCT/US2022/070447, International Preliminary Report on Patentability, Mailed On Aug. 10, 2023, 6 pages.
Application No. PCT/US2022/070447, International Search Report and Written Opinion, Mailed On Nov. 25, 2022, 7 pages.
Politi et al., "Integrated Quantum Photonics", Institute of Electrical and Electronics Engineers Journal of Selected Topics in Quantum Electronics, vol. 15, No. 6, 2009, pp. 1-12.
Preskill, "Quantum Computing in the NISQ Era and Beyond", Quantum Journal, vol. 2, No. 79, Jul. 2018, 20 pages.
Raussendorf et al., "A Fault-Tolerant One-Way Quantum Computer", Annals of Physics, vol. 321, No. 9, Oct. 18, 2005, pp. 1-26.
Raussendorf et al., "Computational Model Underlying the One-Way Quantum Computer", Quantum Information & Computation, vol. 2, No. 6, Mar. 12, 2002, pp. 1-37.
Riesebos et al., "Pauli Frames for Quantum Computer Architectures", Proceedings of the 54th Annual Design Automation Conference, Jun. 2017, 6 pages.
Shor, "Scheme for Reducing Decoherence in Quantum Computer Memory", Physical Review A, Third Series, vol. 52, No. 4, Oct. 1995, pp. R2493-R2496.
Spitz et al., "Adaptive Weight Estimator for Quantum Error Correction in a Time-dependent Environment", Advanced Quantum Technologies, vol. 1, No. 1, Jul. 30, 2018, pp. 1-8.
Tillich et al., "Quantum LDPC Codes With Positive Rate and Minimum Distance Proportional to n 1/2", ISIT'09: Proceedings of the 2009 Institute of Electrical and Electronics Engineers International Conference on Symposium on Information Theory, vol. 60, No. 2, Jun. 2009, pp. 1-21.

Vasmer et al., "Cellular Automaton Decoders for Topological Quantum Codes with Noisy Measurements and Beyond", Scientific Reports, Nature Research, Available Online at: https://www.nature.com/articles/s41598-021-81138-2, Jan. 25, 2021, 14 pages.
Verstraete et al., "Quantum Computation, Quantum State Engineering, and Quantum Phase Transitions Driven by Dissipation", Nature Physics, vol. 5, Mar. 12, 2008, pp. 1-7.
Verstraete et al., "Renormalization Algorithms for Quantum-Many Body Systems in Two and Higher Dimensions", Available Online at: https://arxiv.org/pdf/cond-mat/0407066.pdf, Jul. 2, 2004, pp. 1-5.
Webster et al., "Fault-Tolerant Quantum Gates With Defects in Topological Stabilizer Codes", Physical Review A, vol. 102, Aug. 2020, pp. 1-28.
U.S. Appl. No. 18/108,550, Notice of Allowance, filed May 29, 2024, 8 pages.
U.S. Appl. No. 18/108,556, Non-Final Office Action, filed Sep. 6, 2024, 22 pages.
U.S. Appl. No. 18/108,561, Notice of Allowance, filed Jul. 31, 2024, 9 pages.
Adcock et al., "Programmable Four-Photon Graph States on a Silicon Chip", Nature Communications, vol. 10, No. 3528, Aug. 6, 2019, 6 pages.
Bartolucci et al., "Creation of Entangled Photonic States Using Linear Optics", Available online at: https://arxiv.org/abs/ 2106.13825, Jun. 25, 2021, 18 pages.
Bartolucci et al., "Switch Networks for Photonic Fusion-Based Quantum Computing", Quantum Physics, Available online at: https://arxiv.org/abs/2109.13760, Sep. 28, 2021, 31 pages.
Application No. JP2021-575967, Notice of Allowance, Mailed on Aug. 30, 2024, 3 pages.
Application No. PCT/US2023/012848, International Search Report and Written Opinion, Mailed on Sep. 30, 2024, 15 pages.
PCT/US2023/012848, "Invitation to Pay Additional Fees and, Where Applicable, Protest Fee", Aug. 5, 2024, 3 pages.
U.S. Appl. No. 17/555,238, Non-Final Office Action, Mailed on Dec. 20, 2024, 14 pages.
U.S. Appl. No. 18/108,556, Notice of Allowance, Mailed on Jan. 13, 2025, 16 pages.

* cited by examiner

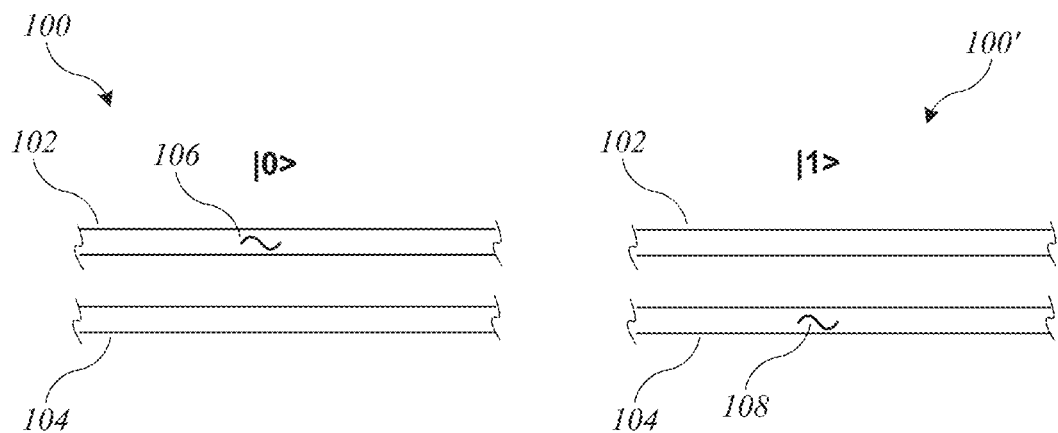
FIG. 1
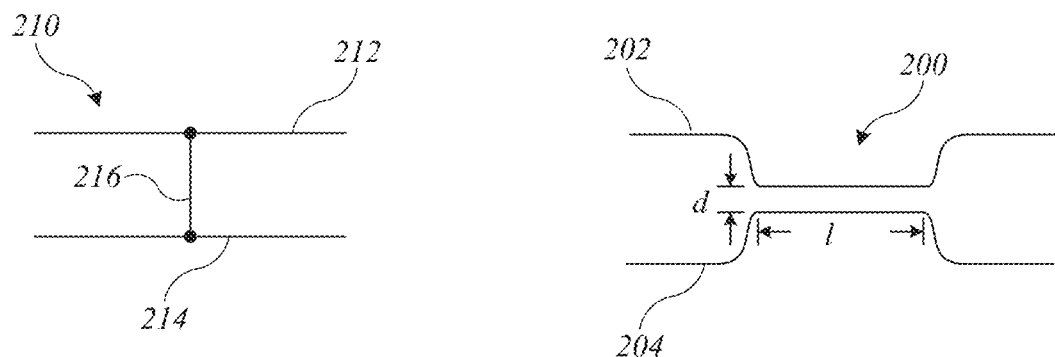
FIG. 2A
FIG. 2B plaquette: 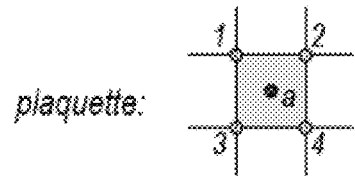
measure: $X_1X_2X_3X_4$
circuit: 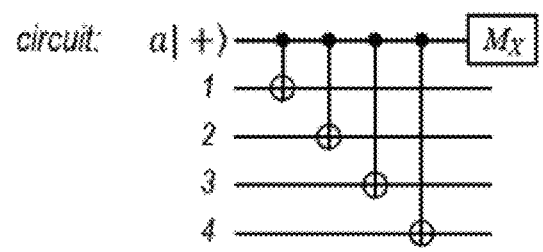
plaquette: 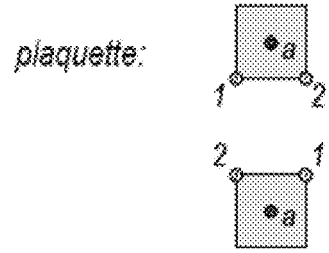
measure: $X_1X_2$
circuit: 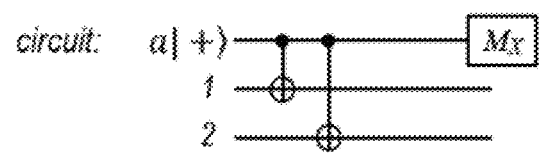
plaquette: 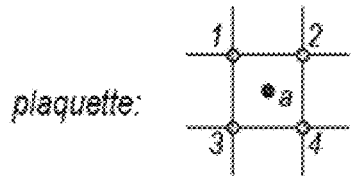
measure: $Z_1Z_2Z_3Z_4$
circuit: 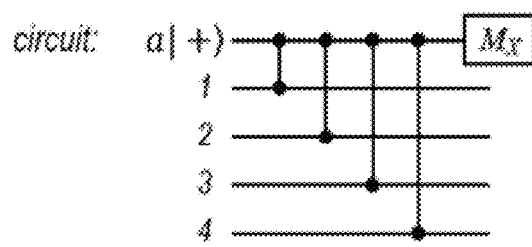
plaquette: 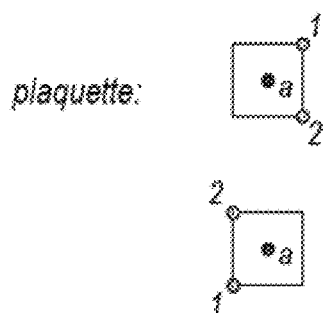
measure: $Z_1Z_2$
circuit: 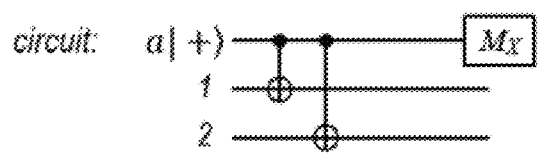
*FIG. 11F*

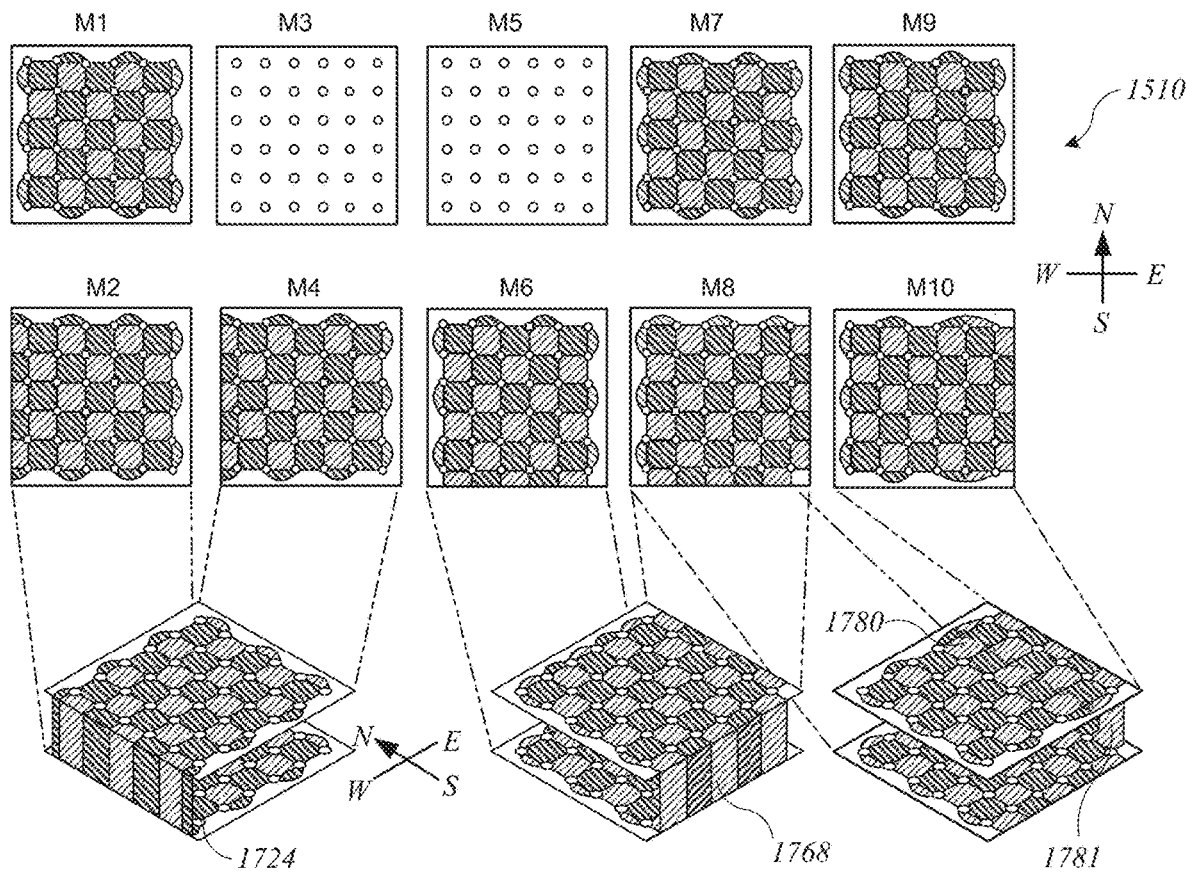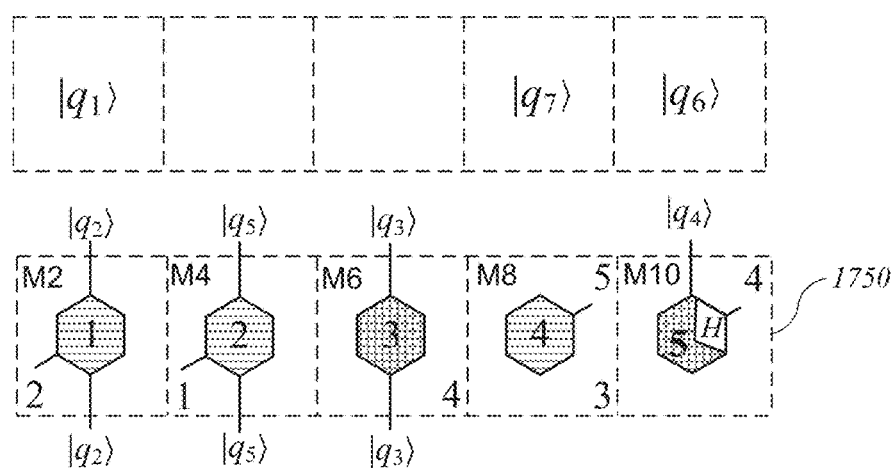
FIG. 17

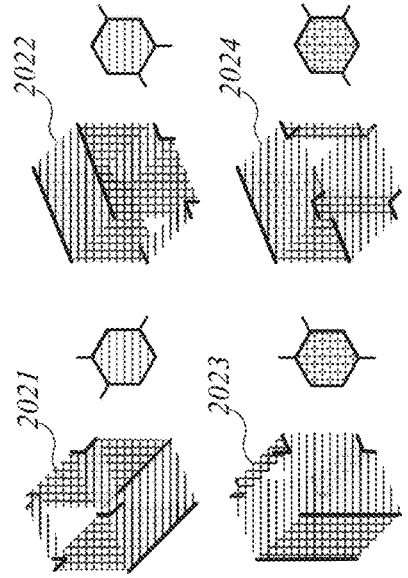
FIG. 20A
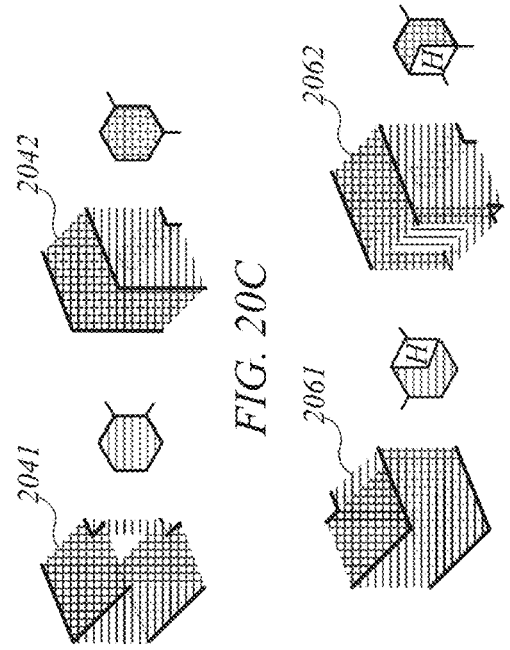
FIG. 20B
FIG. 20C
FIG. 20D
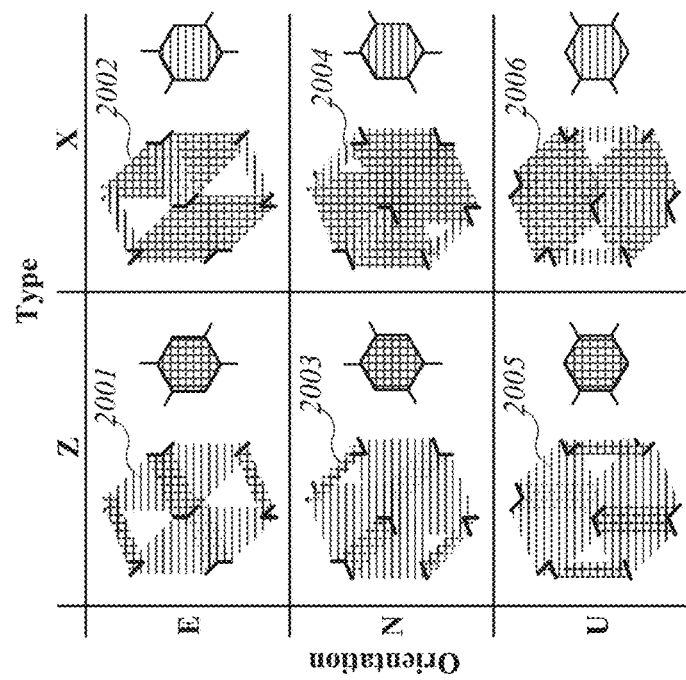
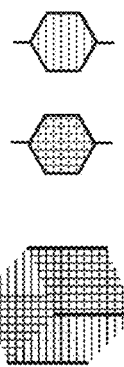
FIG. 20E

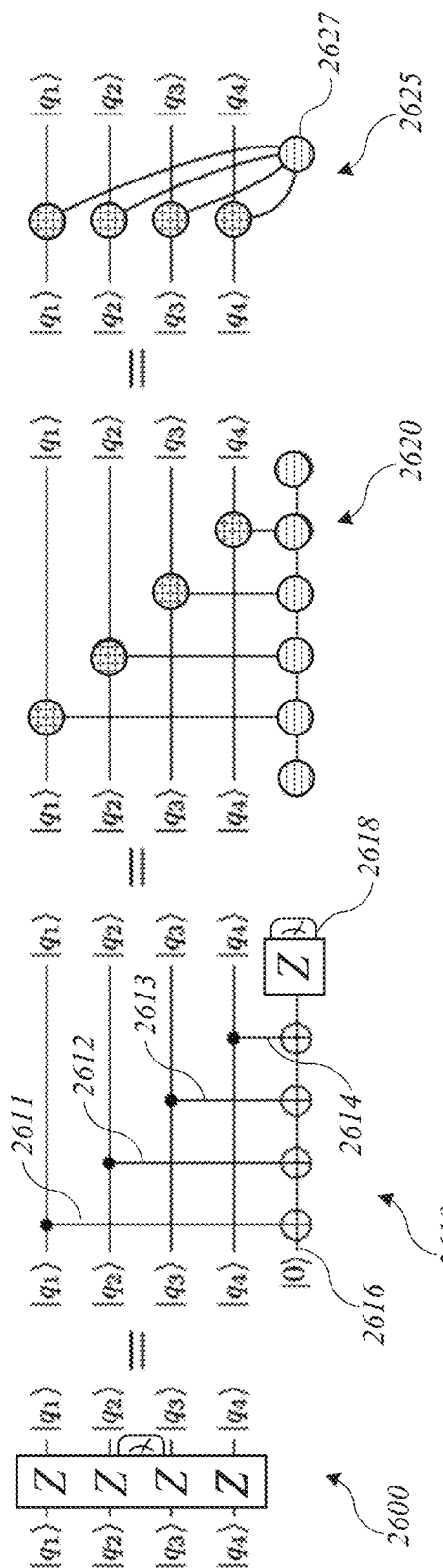
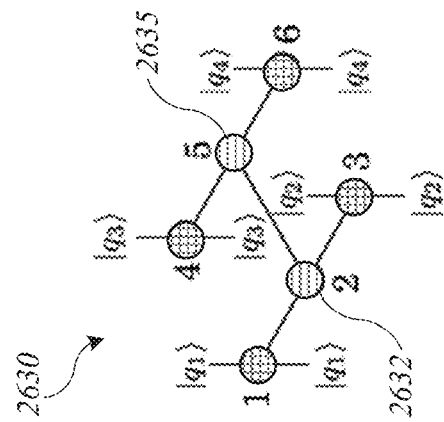
FIG. 26A
FIG. 26B
FIG. 26C

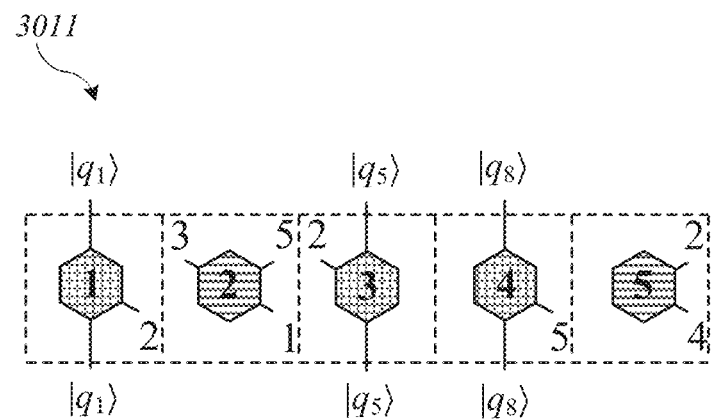
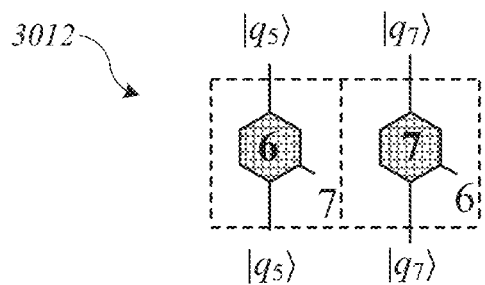
FIG. 30C

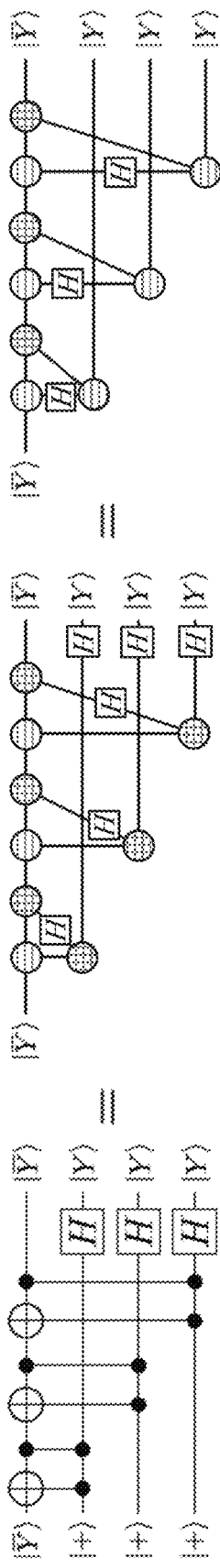
*FIG. 34C*
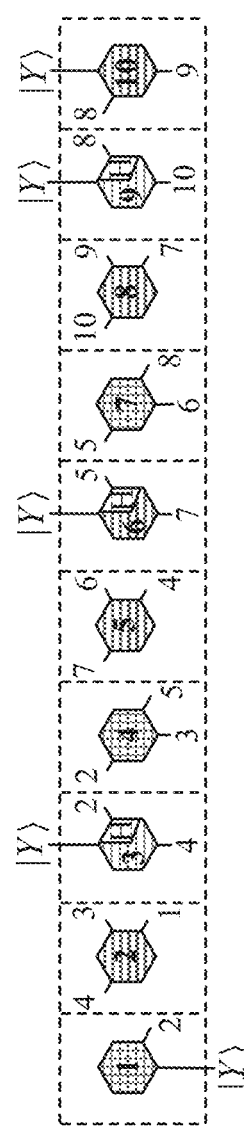
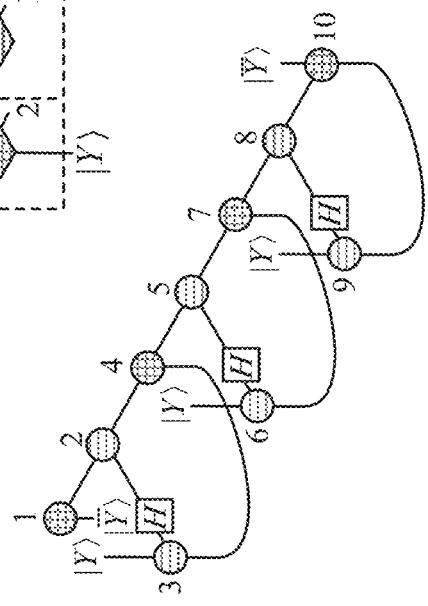
*FIG. 34D*

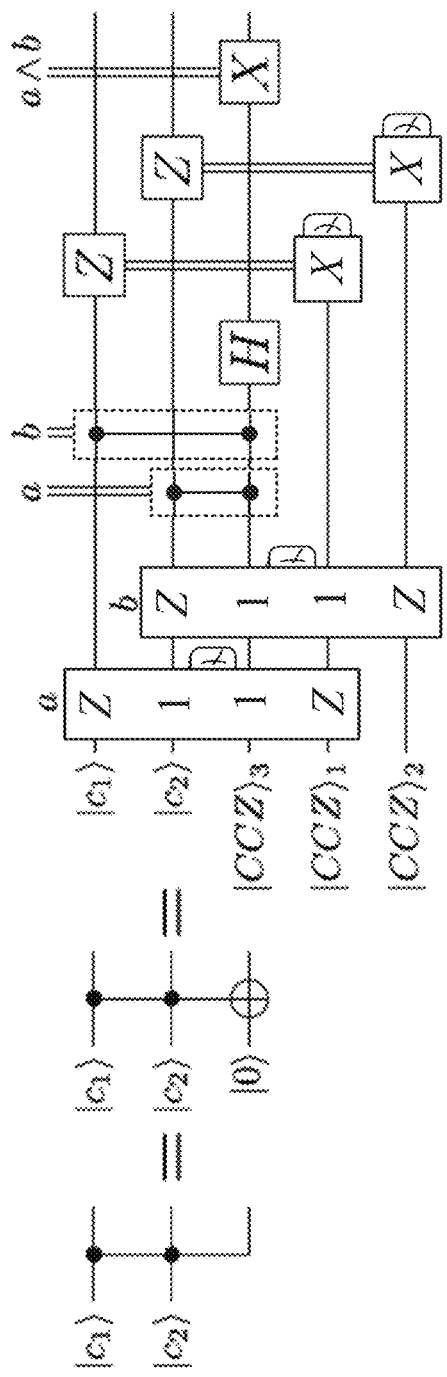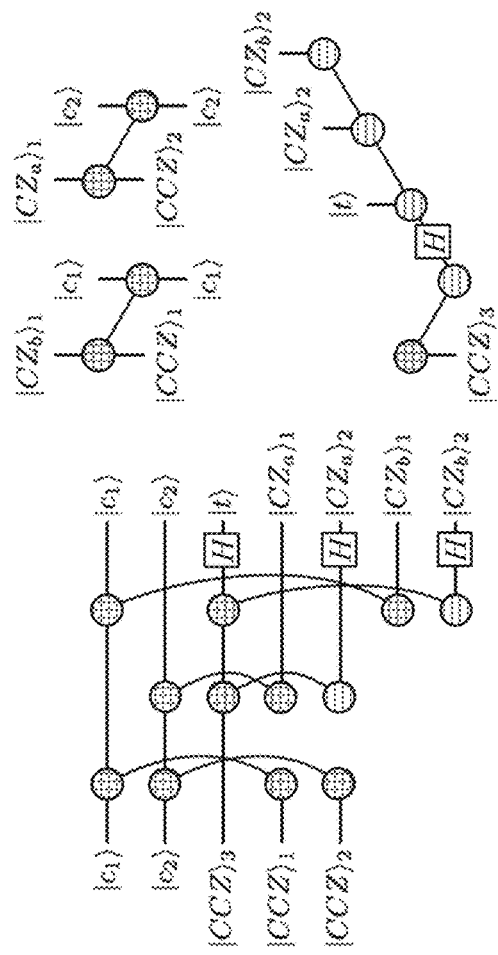
FIG. 36A
FIG. 36B

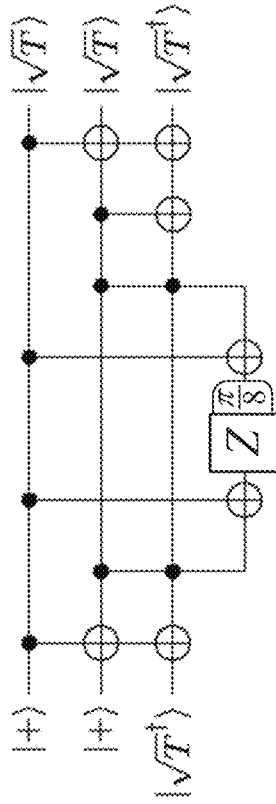
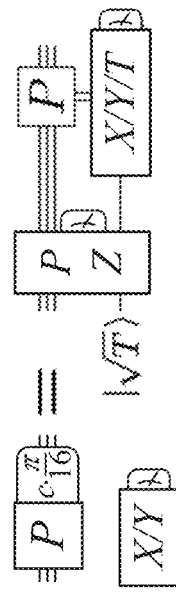
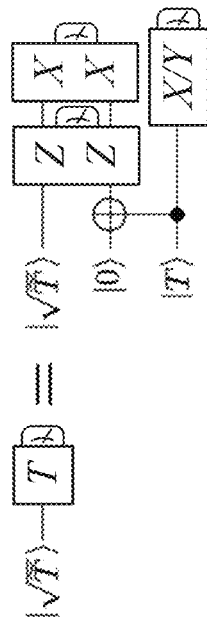
*FIG. 39B*
*FIG. 39C*
*FIG. 39D*
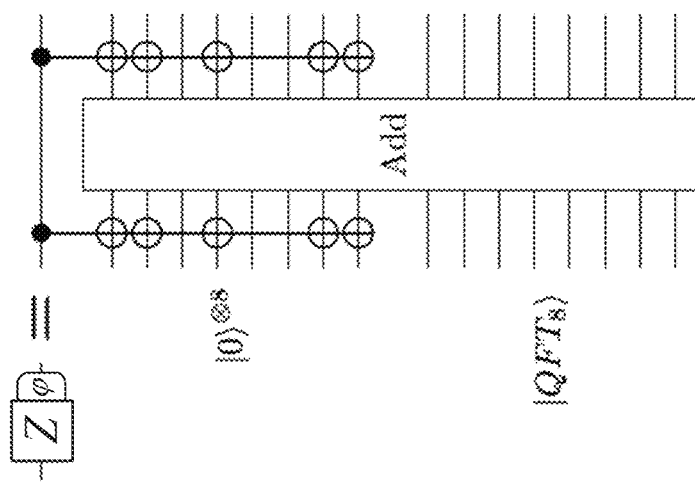
*FIG. 39A*

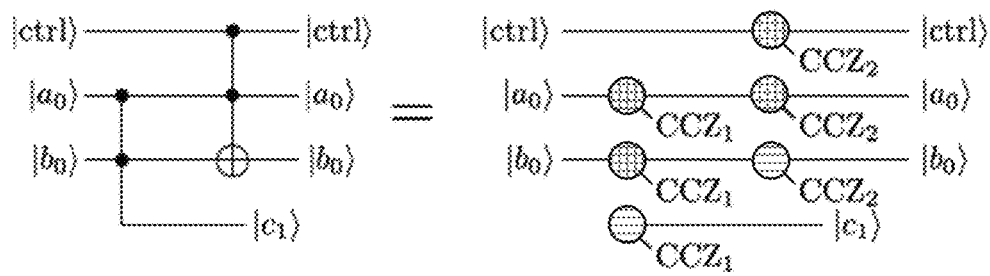
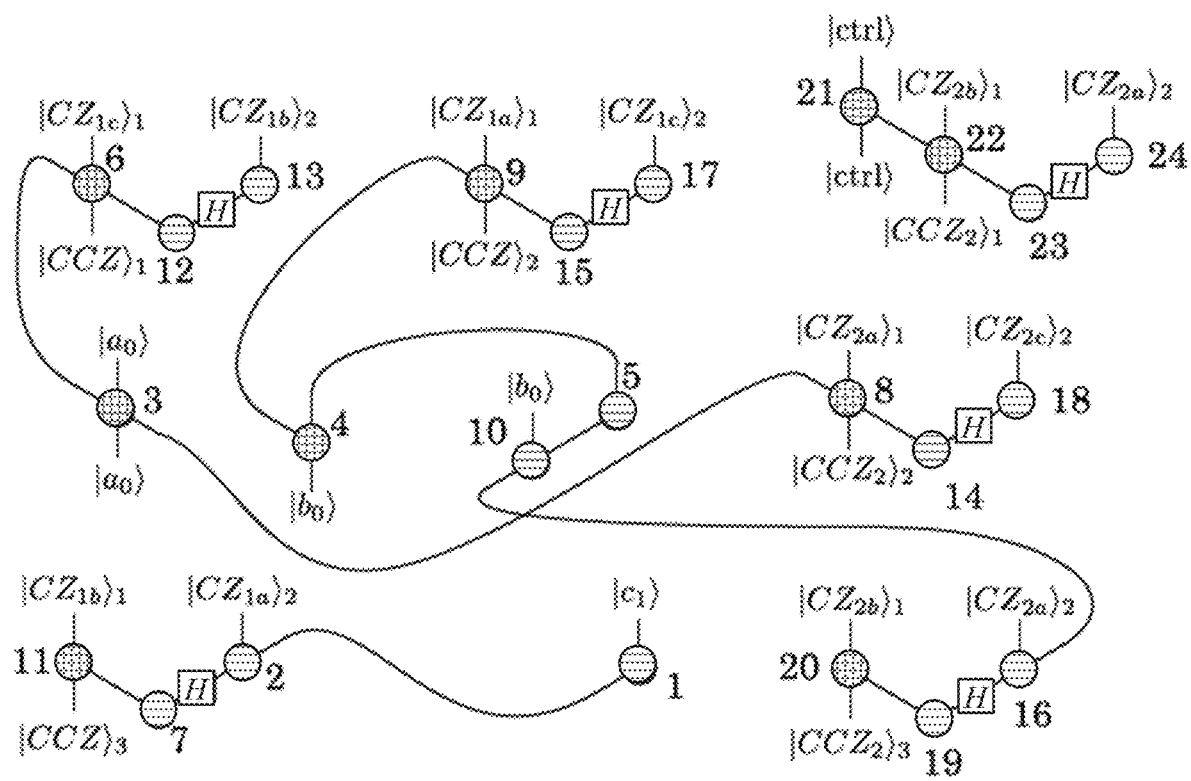
FIG. 40B

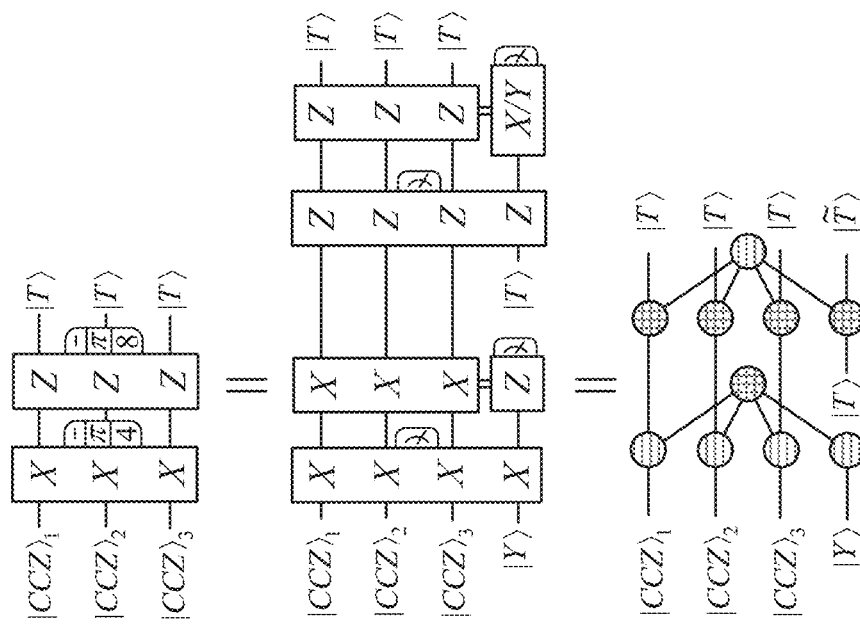
FIG. 43D
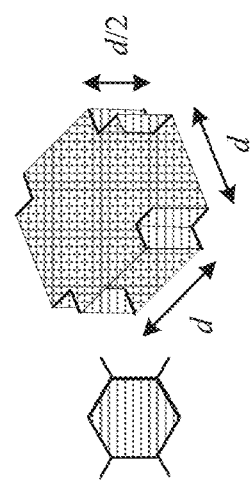
FIG. 43B
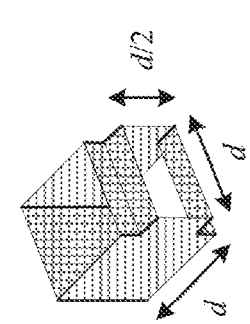
FIG. 43C
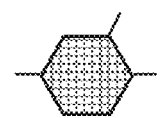
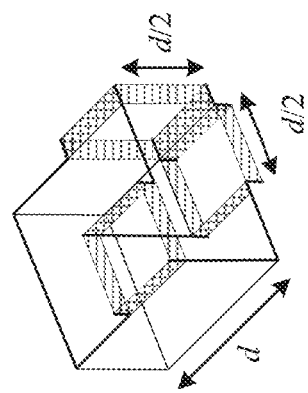
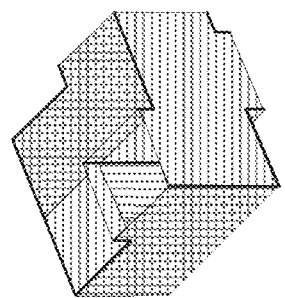
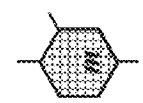

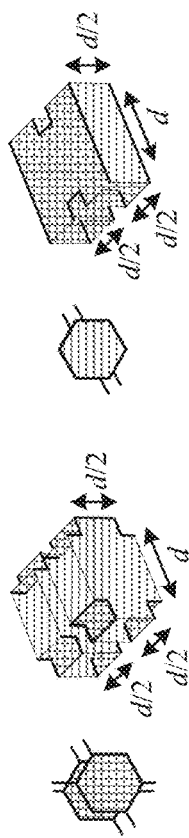
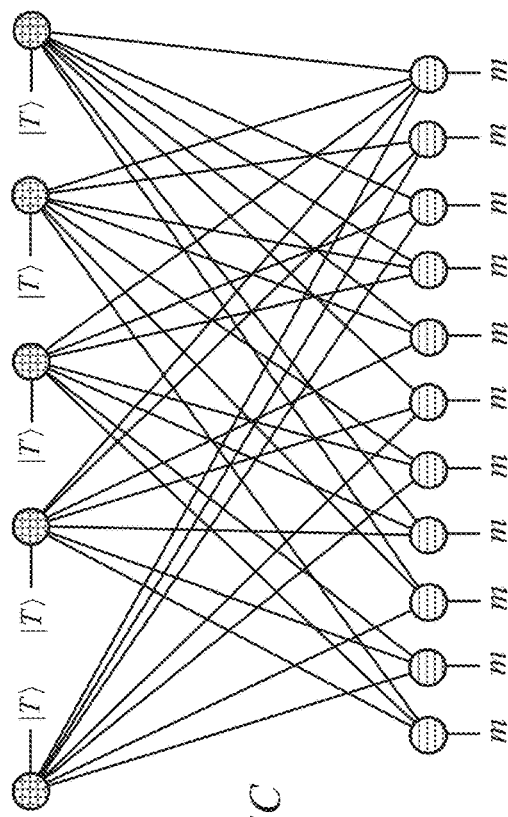
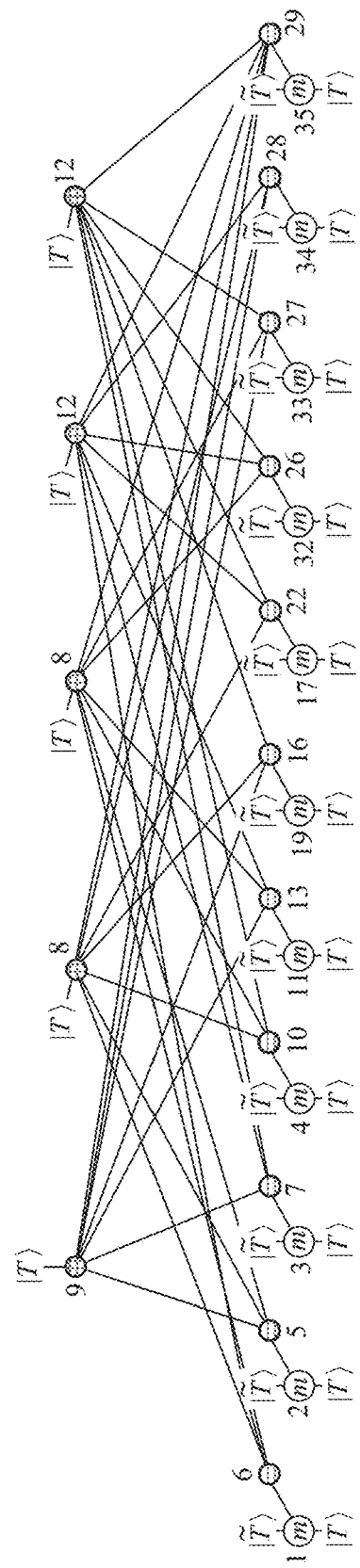
FIG. 44B
FIG. 44C
FIG. 44D

| Subroutine | Active volume (in blocks) Elementary gates | Reaction depth |
|---|---|---|
| Hadamard | 3 | 0 |
| CNOT | 4 | 0 |
| Two-qubit $Z \otimes Z$ (or $X \otimes X$) measurement | 2 | 0 |
| Conditional (reactive) CZ | 5 | 1 |
| Toffoli | $12 + C_{\|CCZ\rangle}$ | 1 |
| Controlled SWAP | $20 + C_{\|CCZ\rangle}$ | 1 |
| $Z_{c \cdot \pi/8}$ rotation with odd $c$ | $3.5 + C_{\|T\rangle}$ | 1 |
| $Z_{c \cdot \pi/16}$ rotation with odd $c$ | $17.25 + 1/2 C_{\|CCZ\rangle} + C_{\|T\rangle}$ | 1.5 |
| Weight-$w$ Z-type (or X-type) PPR | $\lceil 1.5w \rceil$ | 0 |
| Weight-$(w_x, w_z)$ PPM | $\lceil 1.5w_x \rceil + \lceil 1.5w_z \rceil + 1$ | 0 |
| Weight-$(w_x, w_z)$ $\pi/8$-angle PPR | $C_m + 1.5 + C_{\|T\rangle}$ | 0 |
| Weight-$(w_x, w_z)$ $b$-bit-precision PPR (variant 1 [33]) | $C_m + 3b \cdot (4 + C_{\|T\rangle}) + 1$ | $3b$ |
| Weight-$(w_x, w_z)$ $b$-bit-precision PPR (variant 2 [31]) | $C_m + (b-1)(22.5 + C_{\|CCZ\rangle}) - 3.5$ | $2b - 3$ |
| Weight-$(w_x, w_z)$ $b$-bit-precision PPR (variant 3 [39]) | $C_m + 1/40 b \cdot (305 + 6 C_{\|CCZ\rangle} + 24 C_{\|T\rangle})$ | $0.75b$ |
| $n$ commuting equiangular PPRs with average weight $(w_x, w_z)$ | $\approx (C_m + 39 + C_{\|CCZ\rangle}) \cdot n + O(\log n \cdot C_{rot})$ | $2n + \delta_r$ |
| Arbitrary $n$-qubit Clifford gate | $\approx 3n^2$ | 0 |
| Arbitrary $n$-qubit operation with $n_r$ rotations | $\approx 3n^2 + n_r \cdot (1.5n + C_{rot})$ | 0 |

*FIG. 45*

| Subroutine | Active volume (in blocks) | Reaction depth |
|---|---|---|
| Arithmetic and data loading | | |
| $n$-qubit Gidney adder | $(n-1) \cdot (22 + C_{|CCZ\rangle}) - 3$ | $2n - 3$ |
| Controlled $n$-qubit Gidney adder | $(n-1) \cdot (30 + 2C_{|CCZ\rangle}) + 9 + C_{|CCZ\rangle}$ | $4n - 3$ |
| Out-of-place adder (compute block) | $21 + C_{|CCZ\rangle}$ | 1 |
| Out-of-place adder (uncompute block) | 18 | 1 |
| $n$-qubit quantum Fourier transform | $(n^2 - 1) \cdot (15 + C_{|CCZ\rangle}) - 3n + 1$ | $2n^2 - n - 1$ |
| SELECT of $n$ Pauli operators with average weight $(w_x, w_z)$ | $(n-1) \cdot (13 + C_m + C_{|CCZ\rangle})$ | $n - 1$ |
| QROM read of $n$-bit numbers, $\lambda$ numbers at a time | $(n/\lambda - 1) \cdot (15 + 3/4 b\lambda + C_{|CCZ\rangle})$ $+ b \cdot (\lambda - 1) \cdot (20 + C_{|CCZ\rangle})$ | $n/\lambda + \log \lambda$ |
| Magic state distillation and management of resource states and catalysts | | |
| Cloning a $Y$ state | 3 | 0 |
| Cloning two $\sqrt{T}$ states | $25.5 + C_{|CCZ\rangle} + C_{|T\rangle}$ | 0 |
| CCZ-to-2T conversion | 16.5 | 1 |
| (8-to-CCZ)$_{d,d,d/2}$ distillation protocol | 25./2 | 1 |
| (15-to-1)$_{d,d/2,d/2}$ distillation protocol | 35/2 | 1 |
| (15-to-1)$_{d/2,d/4,d/4}$ × (8-to-CCZ)$_{d,d,d/2}$ distillation protocol | 30 | 2 |
| Estimated cost of a $|T\rangle$ state | $C_{|T\rangle} \approx 25$ | |
| Estimated cost of a $|CCZ\rangle$ state | $C_{|CCZ\rangle} \approx 35$ | |

*FIG. 45 (Continued)*

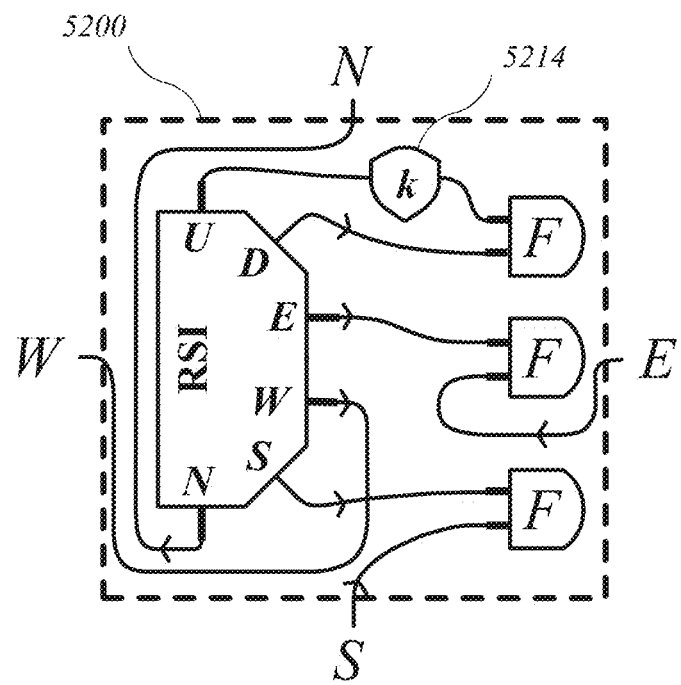
can implement:
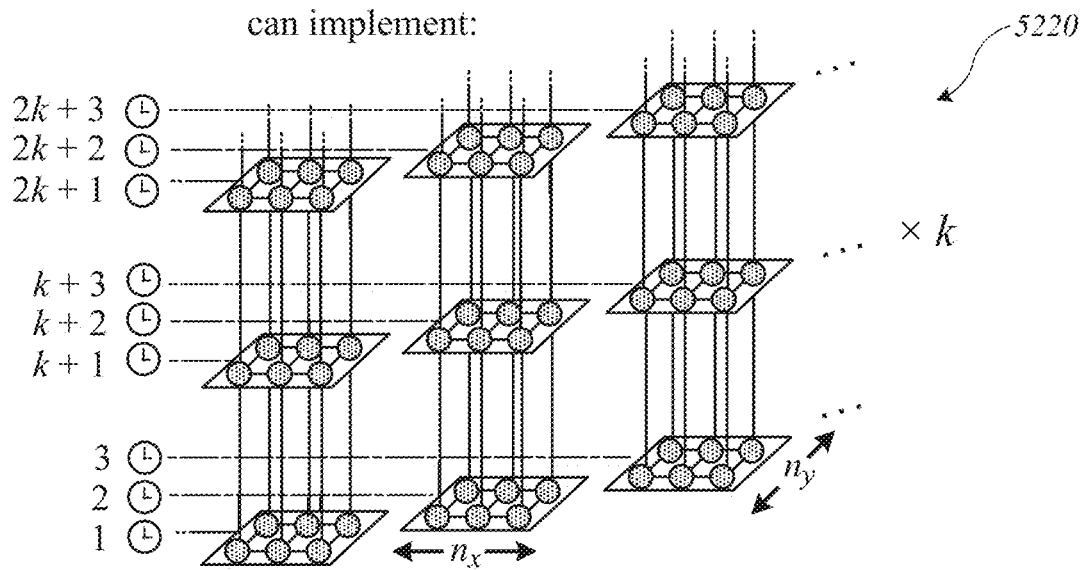
FIG. 52

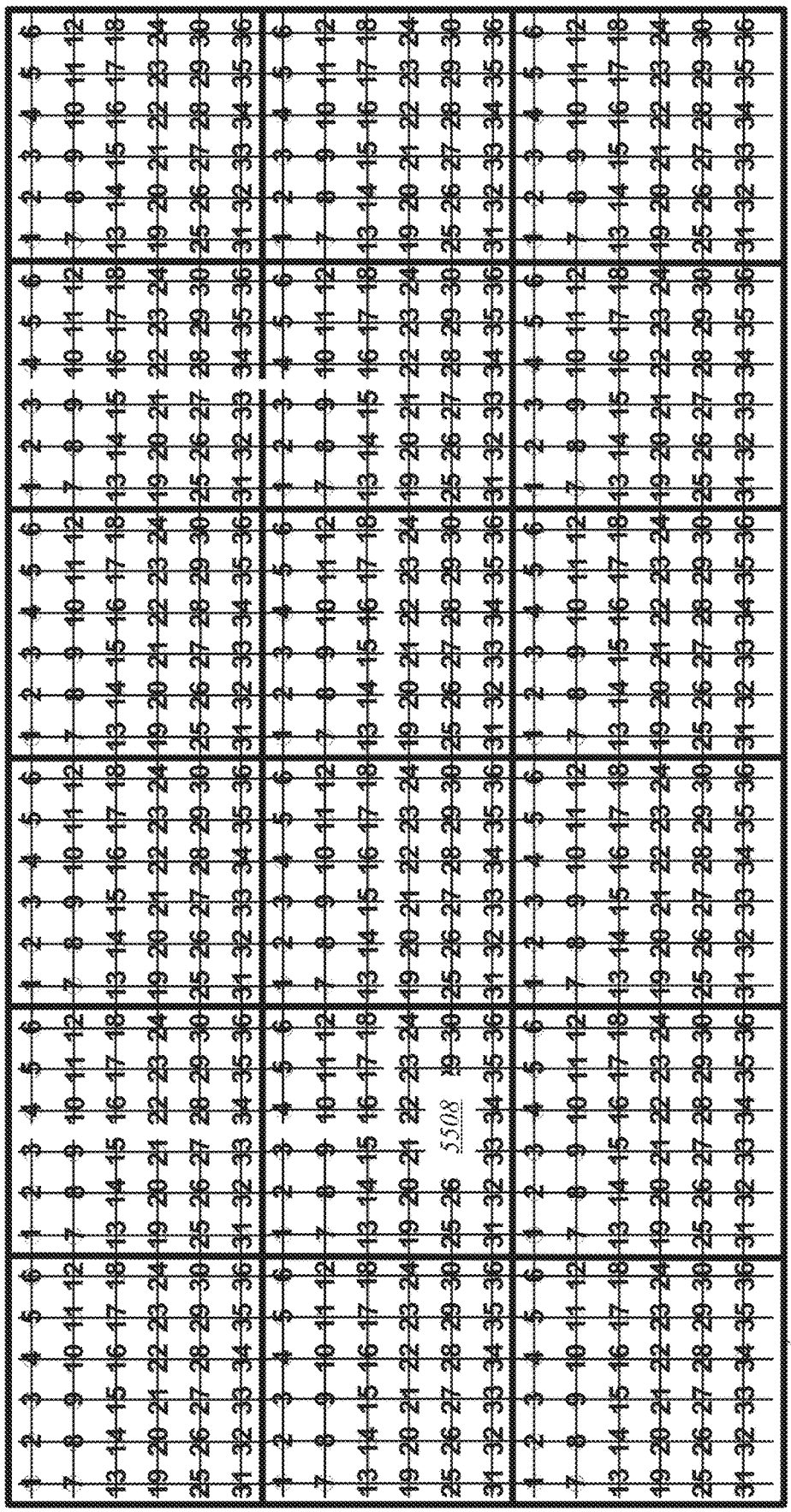
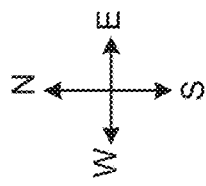
FIG. 55A

5600

| RSI Cycle | ROUTING | | | | FUSION CIRCUITS | | | |
|---|---|---|---|---|---|---|---|---|
| | N switch 1716a | S switch 1716b | E switch 1716d | W switch 1716c | Local N/S 1712a | Net N/S 1712d | Local E/W 1712a | Net E/W 1712d |
| 1 | N1; net | S31; net | E36; net | W1; net | - | - | - | F(E36,W') |
| 2 | N2; net | S32; net | E1; local | W2; local | - | F(N",S31) | F(E1,W2) | - |
| 3 | N3; net | S33; net | E2; local | W3; local | - | F(N",S32) | F(E2,W3) | - |
| 4 | N4; net | S34; net | E3; local | W4; local | - | F(N",S33) | m(E3)m(W4) | - |
| 5 | N5; net | S35; net | E4; local | W5; local | - | F(N",S34) | F(E4,W5) | - |
| 6 | N6; net | S36; net | E5; local | W6; local | - | F(N",S35) | F(E5,W6) | - |
| 7 | N7; local | S1; local | E6; net | W7; net | F(N7,S1) | F(N",S36) | F(E6,W') | - |
| 8 | N8; local | S2; local | E7; local | W8; local | F(N8,S2) | - | F(E7,W8) | - |
| ... | ... | ... | ... | ... | ... | ... | ... | ... |
| 31 | N31; local | S25; local | E30; net | W31; net | F(N31,S25) | - | - | F(E30,W') |
| 32 | N32; local | S26; local | E31; local | W32; local | F(N32,S26) | - | F(E31,W32) | - |
| 33 | N33; local | S27; local | E32; local | W33; local | F(N33,S27) | - | F(E32,W33) | - |
| 34 | N34; local | S28; local | E33; local | W34; local | F(N34,S28) | - | F(E33,W34) | - |
| 35 | N35; local | S29; local | E34; local | W35; local | F(N35,S29) | - | F(E34,W35) | - |
| 36 | N36; local | S30; local | E35; local | W36; local | F(N36,S30) | - | F(E35,W36) | - |

*FIG. 56*

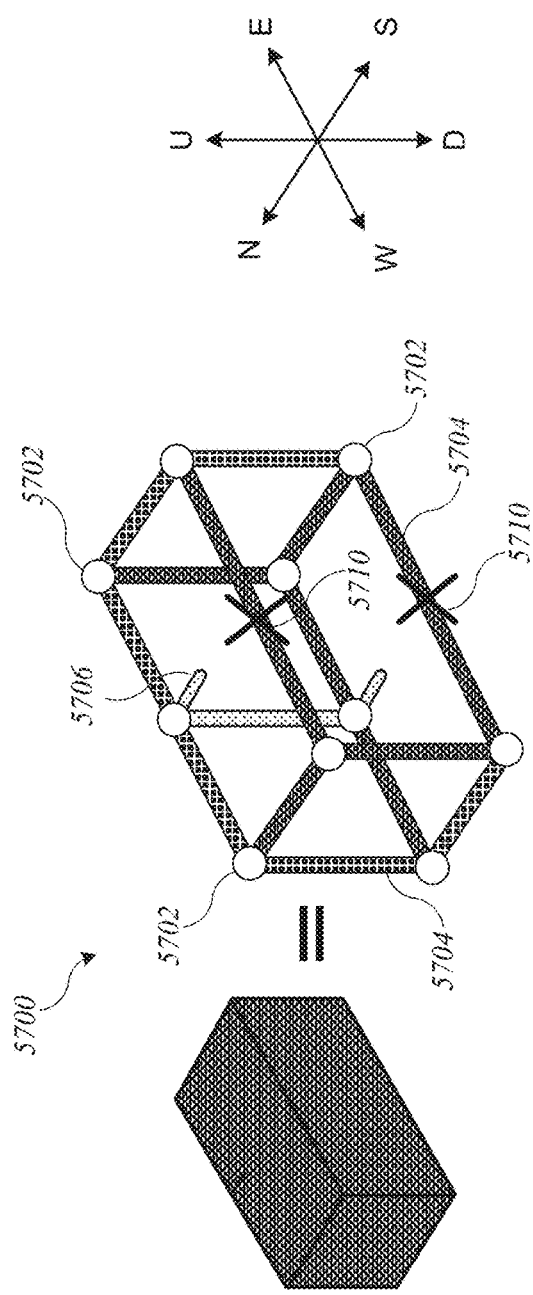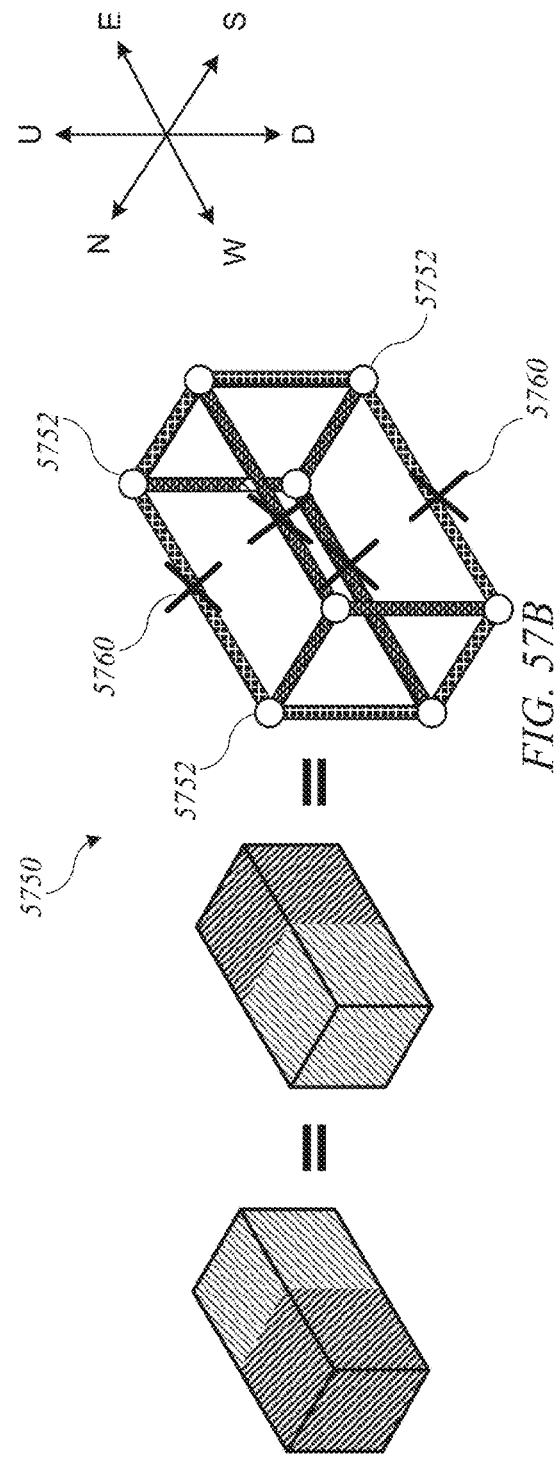
FIG. 57A
FIG. 57B

| Performance Metrics | Device 1<br>1.6 km<br>64x<br>$d = 32$ $\lambda = 2^{13}$ | Device 2<br>1.6 km<br>16x<br>$d = 16$ $\lambda = 2^{13}$ | Device 3<br>10 km<br>4x<br>$d = 16$ $\lambda = 2^{15}$ | Device 4<br>1.6 km<br>1024x<br>$d = 32$ $\lambda = 2^{13}$ | Device 5<br>10 km<br>256x<br>$d = 32$ $\lambda = 2^{15}$ | Device 6<br>310 km<br>8x<br>$d = 32$ $\lambda = 2^{20}$ | Device 7<br>$10^4$ km<br>1x<br>$d = 32$ $\lambda = 2^{25}$ |
|---|---|---|---|---|---|---|---|
| Memory in qubits | 256 | 256 | 256 | 4096 | 4096 | 4096 | 16384 |
| Speed in blocks / sec | $9.8 \times 10^5$ | $2.0 \times 10^6$ | $4.9 \times 10^5$ | $1.6 \times 10^7$ | $3.9 \times 10^6$ | $1.2 \times 10^5$ | $1.5 \times 10^4$ |
| Error rate per block | $10^{-16}$ | $10^{-8}$ | $10^{-8}$ | $10^{-16}$ | $10^{-16}$ | $10^{-16}$ | $10^{-16}$ |
| Reaction time | 13 μs | 13 μs | 38 μs | 13 μs | 38 μs | 1 ms | 34 ms |

*FIG. 68*

QUANTUM COMPUTER USING SWITCHABLE NETWORK FUSIONS

CROSS-REFERENCE TO RELATED APPLICATION

This application claims the benefit of U.S. Provisional Application No. 63/308,879, filed Feb. 10, 2022, and of U.S. Provisional Application No. 63/427,083, filed Nov. 21, 2022, the disclosures of which are incorporated herein by reference.

BACKGROUND

Quantum computing is distinguished from "classical" computing by its reliance on information units referred to as "qubits." In general terms, a "qubit" is the information content of a quantum system that can exist in one of two orthogonal states (denoted as $|0\rangle$ and $|1\rangle$ in the conventional bra/ket notation) or in a superposition of the two states (e.g., any state ($\alpha|0\rangle + \beta|1\rangle$)), where $|\alpha|^2+|\beta|^2=1$). Physical qubits have been realized in a variety of quantum systems, including superconducting systems, ion traps, and photons.

A quantum computer is a device that operates on a system (or ensemble) of physical qubits to execute quantum computations. Because the physical qubits (unlike classical bits) can exist in superposition states, a quantum computer can quickly perform certain categories of computations that would require impractical amounts of time in a classical computer.

Practical realization of a general-purpose quantum computer, however, has remained a challenging task.

SUMMARY

According to some embodiments, a fault-tolerant quantum computer using surface codes can have an architecture that reduces the amount of idle volume generated. The architecture can include qubit modules that generate surface code patches for different qubits and a network of interconnections between different qubit modules. In some embodiments, the interconnections can include "port" connections that selectably enable coupling of boundaries of surface code patches generated in different qubit modules. In some embodiments, the interconnections can include "quickswap" connections that selectably enable transferring the state of a surface code patch from one qubit module to another. In some embodiments, both a port connection network and a quickswap connection network are provided. Connections can be made between a subset of qubit modules. For instance port connections can connect a given qubit module to other qubit modules within a fixed range. Quickswap connections can provide a log-tree network of direct connections between qubit modules.

According to some embodiments, a system can comprise: a plurality of qubit modules, each qubit module including circuitry configured to operate on a plurality of physical qubits to generate a topological code patch (e.g., a surface code patch) for a logical qubit during each of a plurality of code cycles, each topological code patch having a plurality of boundaries associated with different directions in an entanglement space; and a plurality of quickswap connections, each quickswap connection coupling a pair of the qubit modules and being selectably operable to swap respective logical qubits between the pair of the qubit modules within one code cycle, wherein the quickswap connections couple each of the qubit modules to two or more other qubit modules.

In some embodiments, the quickswap connections include at least one quickswap connection coupling a pair of qubit modules that are not physically adjacent to each other.

In some embodiments, the quickswap connections couple at least one of the qubit modules to at least four other qubit modules.

In some embodiments, each quickswap connection implements a transversal SWAP gate on physical qubits in the respective topological code patches of the pair of the qubit modules.

In some embodiments, the system can further comprise classical control logic circuitry coupled to the quickswap connections and configured to selectably enable or disable operation of each of the quickswap connections.

In some embodiments, the plurality of qubit modules includes a number (N) of qubit modules, wherein each qubit modules has an identifying index in a range from 1 to N, and wherein the plurality of quickswap connections includes a quickswap connection coupling each pair of qubit modules having identifying index values i and j such that $|i-j|=2^k$, for every integer k such that $0 \leq k \leq \lfloor \log N \rfloor -1$.

In some embodiments, the quickswap connections are configured such that swapping is concurrently performable for two or more disjoint pairs of qubit modules.

In some embodiments, the physical qubits are photonic qubits and each quickswap connection includes an optical waveguide.

According to some embodiments, a method can comprise: providing a plurality of qubit modules including a plurality of workspace qubit modules and a plurality of memory qubit modules, wherein each qubit module includes circuitry configured to operate on a plurality of physical qubits to generate a topological code patch (e.g., a surface code patch) for a logical qubit during a code cycle; storing a logical qubit in each of at least a subset of the memory qubit modules; executing, during a first code cycle, one or more quickswap operations between memory qubit modules and workspace qubit modules, wherein each quickswap operation swaps a current state in one of the workspace qubit modules with a logical qubit in one of the memory qubit modules; and executing a logical cycle consisting of a plurality of code cycles, wherein executing the logical cycle includes: executing, in the plurality of workspace qubit modules, a plurality of logical blocks corresponding to one or more logical gate operations on one or more logical qubits, wherein executing the logical blocks includes generating a topological code patch (e.g., a surface code patch) for a different logical qubit in at least two of the workspace qubit modules and executing an entangling operation between the topological code patches in different workspace qubit modules; and concurrently with executing the plurality of logical blocks, executing one or more additional quickswap operations between memory qubit modules, wherein each additional quickswap operation swaps respective logical qubits between a pair of memory qubit modules within one code cycle.

In some embodiments, at least one of the additional quickswap operations is executed between a pair of non-adjacent memory qubit modules.

In some embodiments, executing the one or more additional quickswap operations includes: executing a first group of one or more quickswap operations during a first code cycle of the logical cycle; and executing a second group of one or more quickswap operations during a second code cycle of the logical cycle.

In some embodiments, the method can further comprise executing a plurality of logical cycles by iteratively performing the acts of executing one or more quickswap operations between memory qubit modules and workspace qubit modules and executing a logical cycle.

In some embodiments, the one or more additional quickswap operations between memory qubit modules executed during a first logical cycle result in rearranging logical qubits in the memory modules in preparation for a subsequent logical cycle.

According to some embodiments, a system can comprise: a plurality of qubit modules, each qubit module including circuitry configured to operate on a plurality of physical qubits to generate a topological code patch (e.g., a surface code patch) for a logical qubit during each of a plurality of code cycles, each topological code patch having a plurality of boundaries associated with different directions in an entanglement space; and a plurality of quickswap connections, each quickswap connection coupling a first one of the qubit modules to a second one of the qubit modules and being selectably operable to transfer a logical qubit from the first qubit module to the second qubit module within one code cycle, wherein the quickswap connections couple each of the qubit modules to two or more other qubit modules.

In some embodiments, for at least one of the quickswap connections, the first qubit module and the second qubit module are not physically adjacent to each other.

In some embodiments, the quickswap connections couple at least one of the qubit modules to at least four other qubit modules.

In some embodiments, the quickswap connections are configured such that swapping is concurrently performable for two or more disjoint pairs of first and second qubit modules.

In some embodiments, the system can further comprise classical control logic circuitry coupled to the quickswap connections and configured to selectably enable or disable operation of each of the quickswap connections.

In some embodiments, the plurality of qubit modules includes a number (N) of qubit modules, wherein each qubit modules has an identifying index in a range from 1 to N, and wherein the plurality of quickswap connections includes a quickswap connection coupling each pair of qubit modules having identifying index values i and j such that $|i-j|=2^k$, for every integer k such that $0 \leq k \leq \lfloor \log N \rfloor -1$.

In some embodiments, the physical qubits are photonic qubits and each quickswap connection includes an optical waveguide.

According to some embodiments, a system can comprise: a plurality of qubit modules, each qubit module including circuitry configured to operate on a plurality of physical qubits to generate a topological code patch (e.g., a surface code patch) for a fault-tolerant logical qubit during each of a plurality of operating cycles, each topological code patch having a plurality of boundaries in an entanglement space; and a plurality of port connections, each port connection coupling a pair of the qubit modules and being selectably operable to perform, during one code cycle, joint measurement operations on physical qubits of the respective topological code patches generated in the pair of the qubit modules, wherein the port connections couple each of the qubit modules to two or more other qubit modules.

In some embodiments, the port connections include at least one port connection coupling a pair of qubit modules that are not physically adjacent to each other.

In some embodiments, the port connections couple at least one of the qubit modules to six or more other qubit modules.

In some embodiments, the boundaries of each topological code patch are associated with different directions in the entanglement space; each port connection includes a plurality of separately controllable sub-connections, each sub-connection associated with a different one of the directions in the entanglement space; and each sub-connection couples one of the boundaries of the topological code patch of a first qubit module of the pair to a corresponding one of the boundaries of the topological code patch of a second qubit module of the pair.

In some embodiments, the boundaries of a topological code patch include a first boundary associated with an input direction in the entanglement space; each sub-connection associated with the input direction transversely couples physical qubits between the first boundary of a first topological code patch of the first qubit module of the pair and the first boundary of a second topological code patch of the second qubit module of the pair.

In some embodiments, the transverse coupling of the physical qubits is operable to create a Bell state between a first logical qubit in the first qubit module and a second logical qubit in the second qubit module.

In some embodiments, the boundaries of each topological code patch include a first boundary associated with an output direction in the entanglement space; each sub-connection associated with the output direction transversely couples physical qubits between the first boundary of a first topological code patch of the first qubit module of the pair and the first boundary of a second topological code patch of the second qubit module of the pair.

In some embodiments, the transverse coupling of the physical qubits is operable to perform a Bell basis measurement on a first logical qubit in the first qubit module and a second logical qubit in the second qubit module.

In some embodiments, the system can further comprise classical control logic circuitry coupled to the port connections and configured to selectably enable or disable operation of each of the port connections.

In some embodiments, the plurality of qubit modules includes a number (N) of qubit modules, wherein each qubit modules has an identifying index in a range from 1 to N, and the plurality of port connections includes port connections coupling each pair of qubit modules for which $1 \leq |i-j| \leq r$, wherein r is a range parameter, wherein r is at least two; the port connections include at least one port connection coupling a pair of qubit modules that are not physically adjacent to each other. Range parameter r can be, for example, at least 6, at least 12 or another number.

In some embodiments, the system can further comprise a plurality of quickswap connections, each quickswap connection coupling a pair of the qubit modules and being selectably operable to swap a fault-tolerant logical qubit from a first qubit module of the pair and a second qubit module of the pair within one code cycle, wherein the quickswap connections couple each of the qubit modules to two or more other qubit modules.

In some embodiments, the plurality of qubit modules includes a number (N) of qubit modules, wherein each qubit modules has an identifying index in a range from 1 to N; the plurality of quickswap connections includes a quickswap connection coupling each pair of qubit modules having identifying index values i and j such that $|i-j|=2^k$, for every integer k such that $0 \leq k \leq \lfloor \log N \rfloor -1$. In some embodiments, the plurality of port connections includes port connections coupling each pair of qubit modules for which $1 \le |i-j| \le r$, wherein r is a range parameter, wherein r is at least two; the port connections include at least one port connection coupling a pair of qubit modules that are not physically adjacent to each other.

According to some embodiments, a method can comprise: providing a plurality of qubit modules including a plurality of workspace qubit modules and a plurality of memory qubit modules, wherein each qubit module includes circuitry configured to operate on a plurality of physical qubits to generate a topological code patch (e.g., a surface code patch) for a fault-tolerant logical qubit during a code cycle; transferring a logical qubit from a memory qubit module to a workspace qubit module; and executing a logical block network in the workspace qubit modules during a logical cycle consisting of a plurality of code cycles, wherein executing the logical block network includes: for each of a plurality of logical blocks in the logical block network, generating a topological code patch (e.g., a surface code patch) in one of the workspace qubit modules, wherein a first topological code patch is generated in a first workspace qubit module and a second topological code patch is generated in a second workspace qubit module, wherein the first workspace qubit module and the second workspace qubit module are non-adjacent modules; and performing topological code check operator measurements between the first topological code patch and the second topological code patch using a port connection that directly couples physical qubits between the first workspace qubit module and the second workspace qubit module.

In some embodiments, the logical block network corresponds to a gate operation on one or more logical qubits.

In some embodiments, the method can further comprise, during the logical cycle, executing one or more quickswap operations on the plurality of memory qubit modules, wherein each quickswap operation swaps respective logical qubits between a pair of memory qubit modules within one code cycle.

In some embodiments, at least two logical block networks corresponding to successive gate operations in a quantum circuit are executed in different workspace qubit modules during the logical cycle. In some embodiments, the method can further comprise: prior to executing the logical block networks, initializing a Bell pair of logical qubits in a Bell state, wherein a first logical qubit of the Bell pair is initialized as a third topological code patch in a first one of the memory qubit modules and a second logical qubit of the Bell pair is initialized as the first topological code patch in the first one of the workspace qubit modules; and after executing the plurality of logical blocks, performing a Bell-basis measurement on the first and second logical qubits of the Bell pair. In some embodiments, the method can further comprise, during the logical cycle, executing one or more quickswap operations on the plurality of memory qubit modules, wherein each quickswap operation swaps respective logical qubits between a pair of memory qubit modules within one code cycle. In some embodiments, executing the one or more quickswap operations on the plurality of memory qubit modules includes swapping the first logical qubit of the Bell pair from the first one of the memory qubit modules to a second one of the memory qubit modules, and the Bell-basis measurement is performed between the first one of the workspace qubit modules and the second one of the memory qubit modules.

According to some embodiments, a method can comprise: providing a plurality of qubit modules including a plurality of workspace qubit modules and a plurality of memory qubit modules, wherein each qubit module includes circuitry configured to operate on a plurality of physical qubits to generate a topological code patch (e.g., a surface code patch) for a logical qubit during an operating cycle; storing a logical qubit in each of at least a subset of the memory qubit modules; executing, during a first code cycle, a first set of one or more quickswap operations between memory qubit modules and workspace qubit modules, wherein each quickswap operation in the first set of one or more quickswap operations swaps a current state in one of the workspace qubit modules with a logical qubit in one of the memory qubit modules; executing a logical block network in the workspace qubit modules during a logical cycle consisting of a plurality of code cycles, wherein executing the logical block network includes: for each of a plurality of logical blocks in the logical block network, generating a topological code patch in one of the workspace qubit modules, wherein a first topological code patch is generated in a first workspace qubit module and a second topological code patch is generated in a second workspace qubit module, wherein the first workspace qubit module and the second workspace qubit module are non-adjacent modules; and performing topological code check operator measurements between the first topological code patch and the second topological code patch using a port connection that directly couples physical qubits between the first workspace qubit module and the second workspace qubit module; and concurrently with executing the logical block network in the workspace qubit modules, executing a second set of quickswap operations on the plurality of memory qubit modules, wherein each quickswap operation in the second set of one or more quickswap operations swaps respective logical qubits between a pair of memory qubit modules within one code cycle, wherein at least one of the quickswap operations in the second set of one or more quickswap operations swaps respective logical qubits between a pair of non-adjacent memory qubit modules.

According to some embodiments, a circuit can comprise: a resource state interconnect having a plurality of output paths to output a resource state during each of a plurality of operating cycles, wherein each resource state is a quantum system of multiple entangled physical qubits, wherein different physical qubits of the resource state are output on a different ones of the output paths; a plurality of reconfigurable fusion circuits, each of the plurality of reconfigurable fusion circuits being configured to receive two input physical qubits and to selectably perform either a projective entangling measurement between the two input physical qubits or one of a plurality of single-qubit measurements on each of the two input physical qubits, thereby producing measurement outcome data; a plurality of routing switches, each routing switch having an input path coupled to a respective one of the output paths of the resource state interconnect and a plurality of output routing paths selectably coupled to the input path, wherein, for each routing switch, the plurality of output routing paths includes: a first local path, wherein the first local paths of different ones of the routing switches introduce different delays; a plurality of internal port routing paths; and a plurality of port transfer paths that exit the circuit; and a plurality of external port routing paths to receive physical qubits from a plurality of external circuits, wherein the plurality of reconfigurable fusion circuits includes: a plurality of local fusion circuits, wherein each local fusion circuit is coupled to respective first local routing paths of two of the routing switches; and a plurality of port fusion circuits, wherein each port fusion circuit has a first input coupled to one of the internal port routing paths of one of the routing switches and a second input coupled to one of the of the external port routing paths.

In some embodiments, the circuit is one of a plurality of instances of the circuit and, for each routing switch, the port transfer paths are coupled to the external port routing paths of other instances of the circuit.

In some embodiments, each of the routing switches is associated with a different surface of a topological code patch (e.g., a surface code patch) for a fault-tolerant logical qubit, and the port fusion circuits operate on physical qubits from like surfaces of different topological code patches.

In some embodiments, the plurality of local fusion circuits includes a first local fusion circuit, a second local fusion circuit, and a third local fusion circuit, wherein: one of the first local routing paths coupled to the first local fusion circuit introduces a delay of one operating cycle relative to the other of the first local routing paths coupled to the first local fusion circuit; one of the first local routing paths coupled to the second local fusion circuit introduces a delay of a number d of operating cycles relative to the other of the first local routing paths coupled to the second local fusion circuit, wherein the number d is a code distance greater than 1; and one of the first local routing paths coupled to the third local fusion circuit introduces a delay of a number $d^2$ of operating cycles relative to the other of the first local routing paths coupled to the third local fusion circuit.

In some embodiments, the first local fusion circuit is coupled to the respective first local routing paths of a first routing switch and a second routing switch; the first local routing path of the first routing switch introduces the delay of one operating cycle; the plurality of output routing paths of each of the first routing switch and the second routing switch further includes a third local routing path, wherein the third local routing path of the first routing switch introduces a delay of two operating cycles relative to the third local routing path of the second routing switch; and the plurality of local fusion circuits further includes a fourth local fusion circuit coupled to the third local routing paths of the first routing switch and the second routing switch. In some embodiments, the third local fusion circuit is coupled to the respective first local routing paths of a first routing switch and a second routing switch; the first local routing path of the first routing switch introduces the delay of $d^2$ operating cycles; the plurality of output routing paths of the first routing switch further includes a plurality of quickswap transfer paths that exit the circuit after a delay of $d^2$ operating cycles; the plurality of output routing paths of the second routing switch further includes a plurality of internal quickswap routing paths; the circuit further includes a plurality of external quickswap routing paths that receive physical qubits from a plurality of external circuits; and the plurality of reconfigurable fusion circuits further includes a plurality of quickswap fusion circuits, each quickswap fusion circuit having a first input coupled to one of the internal quickswap routing paths and a second input coupled to one of the external quickswap routing paths.

In some embodiments, each of the plurality of reconfigurable fusion circuits is configured such that the projective entangling measurement operation includes a destructive measurement on both of the input qubits.

In some embodiments, each of the reconfigurable fusion circuits is configured such that the projective entangling measurement is a type II fusion operation that provides a joint XX measurement outcome and a joint ZZ measurement outcome.

In some embodiments, each of the reconfigurable fusion circuits is configured such that the plurality of single-qubit measurements includes one or more of: a Pauli X measurement; a Pauli Y measurement; a Pauli Z measurement; and a phase rotation of $e^{-8\pi/8}$ followed by a Pauli Z measurement.

In some embodiments, the circuit can further comprise classical control logic coupled to the plurality of reconfigurable fusion circuits and to the plurality of routing switches, the classical control logic being configured to select an output routing path for the each of the plurality of routing switches and an operation for each of the plurality of reconfigurable fusion circuits.

In some embodiments, the physical qubits of the resource state are photonic qubits. In some embodiments, the resource state interconnect includes a plurality of waveguides coupled between an external source of resource states and the output paths of the resource state interconnect.

According to some embodiments, a system can comprise: a network of interleaving modules, each interleaving module including: a resource state interconnect having a plurality of output paths to output a resource state during each of a plurality of operating cycles, wherein each resource state is a quantum system of multiple entangled physical qubits, wherein different physical qubits of the resource state are output on a different ones of the output paths; a plurality of reconfigurable fusion circuits, each of the plurality of reconfigurable fusion circuits being configured to receive two input physical qubits and to selectably perform either a projective entangling measurement between the two input physical qubits or one of a plurality of single-qubit measurements on each of the two input physical qubits, thereby producing measurement outcome data; a plurality of routing switches, each routing switch having an input path coupled to a respective one of the output paths of the resource state interconnect and a plurality of output routing paths selectably coupled to the input path, wherein, for each routing switch, the plurality of output routing paths includes: a first local path, wherein the first local paths of different ones of the routing switches introduce different delays; a plurality of internal port routing paths; and a plurality of port transfer paths that exit the interleaving module; and a plurality of external port routing paths to receive physical qubits from a plurality of other interleaving modules in the network, wherein the plurality of reconfigurable fusion circuits includes: a plurality of local fusion circuits, wherein each local fusion circuit is coupled to respective first local routing paths of two of the routing switches; and a plurality of port fusion circuits, wherein each port fusion circuit has a first input coupled to one of the internal port routing paths of one of the routing switches and a second input coupled to one of the of the external port routing paths.

In some embodiments, in each interleaving module, each of the routing switches is associated with a different surface of a topological code patch (e.g., a surface code patch) for a fault-tolerant logical qubit, and the port fusion circuits operate on physical qubits from like surfaces of different topological code patches.

In some embodiments, in each interleaving module, the plurality of local fusion circuits includes a first local fusion circuit, a second local fusion circuit, and a third local fusion circuit; one of the first local routing paths coupled to the first local fusion circuit introduces a delay of one operating cycle relative to the other of the first local routing paths coupled to the first local fusion circuit; one of the first local routing paths coupled to the second local fusion circuit introduces a delay of a number d of operating cycles relative to the other of the first local routing paths coupled to the second local fusion circuit, wherein the number d is a code distance greater than 1; and one of the first local routing paths coupled to the third local fusion circuit introduces a delay of a number $d^2$ of operating cycles relative to the other of the first local routing paths coupled to the third local fusion circuit.

In some embodiments, in each interleaving module: the first local fusion circuit is coupled to the respective first local routing paths of a first routing switch and a second routing switch; the first local routing path of the first routing switch introduces the delay of one operating cycle; the plurality of output routing paths of each of the first routing switch and the second routing switch further includes a third local routing path, wherein the third local routing path of the first routing switch introduces a delay of two operating cycles relative to the third local routing path of the second routing switch; and the plurality of local fusion circuits further includes a fourth local fusion circuit coupled to the third local routing paths of the first routing switch and the second routing switch.

In some embodiments, the plurality of local fusion circuits includes a first local fusion circuit, a second local fusion circuit, and a third local fusion circuit; one of the first local routing paths coupled to the first local fusion circuit introduces a delay of one operating cycle relative to the other of the first local routing paths coupled to the first local fusion circuit; one of the first local routing paths coupled to the second local fusion circuit introduces a delay of a number d of operating cycles relative to the other of the first local routing paths coupled to the second local fusion circuit, wherein the number d is a code distance greater than 1; and one of the first local routing paths coupled to the third local fusion circuit introduces a delay of a number $d^2$ of operating cycles relative to the other of the first local routing paths coupled to the third local fusion circuit.

In some embodiments, in each interleaving module: the first local fusion circuit is coupled to the respective first local routing paths of a first routing switch and a second routing switch; the first local routing path of the first routing switch introduces the delay of one operating cycle; the plurality of output routing paths of each of the first routing switch and the second routing switch further includes a third local routing path, wherein the third local routing path of the first routing switch introduces a delay of two operating cycles relative to the third local routing path of the second routing switch; and the plurality of local fusion circuits further includes a fourth local fusion circuit coupled to the third local routing paths of the first routing switch and the second routing switch.

In some embodiments, in each interleaving module: the third local fusion circuit is coupled to the respective first local routing paths of a first routing switch and a second routing switch; the first local routing path of the first routing switch introduces the delay of $d^2$ operating cycles; the plurality of output routing paths of the first routing switch further includes a plurality of quickswap transfer paths that exit the circuit after a delay of $d^2$ operating cycles; the plurality of output routing paths of the second routing switch further includes a plurality of internal quickswap routing paths; the circuit further includes a plurality of external quickswap routing paths that receive physical qubits from a plurality of external circuits; and the plurality of reconfigurable fusion circuits further includes a plurality of quickswap fusion circuits, each quickswap fusion circuit having a first input coupled to one of the internal quickswap routing paths and a second input coupled to one of the external quickswap routing paths.

In some embodiments, in each interleaving module, each of the plurality of reconfigurable fusion circuits is configured such that the projective entangling measurement operation includes a destructive measurement on both of the input qubits.

In some embodiments, in each interleaving module, each of the reconfigurable fusion circuits is configured such that: the projective entangling measurement is a type II fusion operation that provides a joint XX measurement outcome and a joint ZZ measurement outcome; and the plurality of single-qubit measurements includes a Pauli X measurement, a Pauli Y measurement, and a Pauli Z measurement, and a phase rotation of $e^{-i\pi/8}$ followed by a Pauli Z measurement.

In some embodiments, the system can further comprise classical control logic coupled to the plurality of reconfigurable fusion circuits and to the plurality of routing switches in the interleaving modules, the classical control logic being configured to select an output routing path for the each of the plurality of routing switches and an operation for each of the plurality of reconfigurable fusion circuits. In some embodiments, the classical control logic is further configured to select the output routing path for the each of the plurality of routing switches and the operation for each of the plurality of reconfigurable fusion circuits based at least in part on a logical block network representing a quantum computation to be executed.

In some embodiments, the physical qubits of the resource state are photonic qubits. In some embodiments, the resource state interconnect includes a plurality of waveguides coupled between an external source of resource states and the output paths of the resource state interconnect.

According to some embodiments, a circuit can comprise: a resource state interconnect having a plurality of output paths to output a resource state during each of a plurality of operating cycles, wherein each resource state is a quantum system of multiple entangled physical qubits, wherein different physical qubits of the resource state are output on a different ones of the output paths; a plurality of reconfigurable fusion circuits, each of the plurality of reconfigurable fusion circuits being configured to receive two input physical qubits and to selectably perform either a projective entangling measurement between the two input physical qubits or one of a plurality of single-qubit measurements on each of the two input physical qubits, thereby producing measurement outcome data; a plurality of routing switches, each routing switch having an input path coupled to a respective one of the output paths of the resource state interconnect and a plurality of output routing paths selectably coupled to the input path, wherein, for each routing switch, the plurality of output routing paths includes a first local path, wherein the first local paths of different ones of the routing switches introduce different delays, wherein, for a first one of the routing switches, the plurality of output routing paths further includes a plurality of internal quickswap routing paths, and wherein, for a second one of the routing switches, the plurality of output routing paths further includes a plurality of quickswap transfer paths that exit the circuit; and a plurality of external quickswap routing paths that receive physical qubits from a plurality of external circuits, wherein the plurality of reconfigurable fusion circuits includes: a plurality of local fusion circuits, wherein each local fusion circuit is coupled to respective first local routing paths of two of the routing switches; and a plurality of quickswap fusion circuits, wherein each quickswap fusion circuit has a first input coupled to one of the internal quickswap routing paths of the first one of the routing switches and a second input coupled to one of the of the external quickswap routing paths.

In some embodiments, the circuit is one of a plurality of instances of the circuit and wherein, for each routing switch, the quickswap transfer paths are coupled to the external quickswap routing paths of other instances of the circuit.

In some embodiments each of the routing switches is associated with a different surface of a topological code patch (e.g., a surface code patch) for a fault-tolerant logical qubit, and wherein the quickswap fusion circuits operate on physical qubits from an upper surface of one topological code patch and physical qubits from a lower surface of another topological code patch.

In some embodiments, a circuit can comprise: a resource state interconnect having a plurality of output paths to output a resource state during each of a plurality of operating cycles, wherein each resource state is a quantum system of multiple entangled physical qubits, wherein different physical qubits of the resource state are output on a different ones of the output paths; a plurality of reconfigurable fusion circuits, each of the plurality of reconfigurable fusion circuits being configured to receive two input physical qubits and to selectably perform either a projective entangling measurement between the two input physical qubits or one of a plurality of single-qubit measurements on each of the two input physical qubits, thereby producing measurement outcome data; a plurality of routing switches, each routing switch having an input path coupled to a respective one of the output paths of the resource state interconnect and a plurality of output routing paths selectably coupled to the input path, wherein, for each routing switch, the plurality of output routing paths includes: a first local path, wherein the first local paths of different ones of the routing switches introduce different delays; a plurality of internal port routing paths; and a plurality of port transfer paths that exit the circuit; and a plurality of external port routing paths to receive physical qubits from a plurality of external circuits, wherein the plurality of reconfigurable fusion circuits includes: a plurality of local fusion circuits, wherein each local fusion circuit is coupled to respective first local routing paths of two of the routing switches; and a plurality of port fusion circuits, wherein each port fusion circuit has a first input coupled to one of the internal port routing paths of one of the routing switches and a second input coupled to one of the of the external port routing paths, and wherein, for a first one of the routing switches, the plurality of output routing paths further includes a plurality of internal quickswap routing paths, and wherein, for a second one of the routing switches, the plurality of output routing paths further includes a plurality of quickswap transfer paths that exit the circuit; and a plurality of external quickswap routing paths that receive physical qubits from a plurality of external circuits, wherein the plurality of reconfigurable fusion circuits includes: a plurality of local fusion circuits, wherein each local fusion circuit is coupled to respective first local routing paths of two of the routing switches; and a plurality of quickswap fusion circuits, wherein each quickswap fusion circuit has a first input coupled to one of the internal quickswap routing paths of the first one of the routing switches and a second input coupled to one of the of the external quickswap routing paths.

In some embodiments, the circuit is one of a plurality of instances of the circuit and wherein, for each routing switch, the port transfer paths are coupled to the external port routing paths of other instances of the circuit.

In some embodiments, each of the routing switches is associated with a different surface of a topological code patch (e.g., a surface code patch) for a fault-tolerant logical qubit, and wherein the port fusion circuits operate on physical qubits from like surfaces of different topological code patches.

In some embodiments, the plurality of local fusion circuits includes a first local fusion circuit, a second local fusion circuit, and a third local fusion circuit; one of the first local routing paths coupled to the first local fusion circuit introduces a delay of one operating cycle relative to the other of the first local routing paths coupled to the first local fusion circuit; one of the first local routing paths coupled to the second local fusion circuit introduces a delay of a number d of operating cycles relative to the other of the first local routing paths coupled to the second local fusion circuit, wherein the number d is a code distance greater than 1; and one of the first local routing paths coupled to the third local fusion circuit introduces a delay of a number $d^2$ of operating cycles relative to the other of the first local routing paths coupled to the third local fusion circuit.

In some embodiments, the first local fusion circuit is coupled to the respective first local routing paths of a first routing switch and a second routing switch; the first local routing path of the first routing switch introduces the delay of one operating cycle; the plurality of output routing paths of each of the first routing switch and the second routing switch further includes a third local routing path, wherein the third local routing path of the first routing switch introduces a delay of two operating cycles relative to the third local routing path of the second routing switch; and the plurality of local fusion circuits further includes a fourth local fusion circuit coupled to the third local routing paths of the first routing switch and the second routing switch.

In some embodiments, the third local fusion circuit is coupled to the respective first local routing paths of a first routing switch and a second routing switch; the first local routing path of the first routing switch introduces the delay of $d^2$ operating cycles; and the plurality of quickswap transfer paths exit the circuit after a delay of $d^2$ operating cycles.

In some embodiments, each of the plurality of reconfigurable fusion circuits is configured such that the projective entangling measurement operation includes a destructive measurement on both of the input qubits.

In some embodiments, each of the reconfigurable fusion circuits is configured such that the projective entangling measurement is a type II fusion operation that provides a joint XX measurement outcome and a joint ZZ measurement outcome.

In some embodiments, each of the reconfigurable fusion circuits is configured such that the plurality of single-qubit measurements includes at least one of: a Pauli X measurement; a Pauli Y measurement; a Pauli Z measurement; or a phase rotation of $e^{-i\pi/8}$ followed by a Pauli Z measurement.

In some embodiments, the circuit can further comprise classical control logic coupled to the plurality of reconfigurable fusion circuits and to the plurality of routing switches, the classical control logic being configured to select an output routing path for the each of the plurality of routing switches and an operation for each of the plurality of reconfigurable fusion circuits.

In some embodiments, the physical qubits of the resource state are photonic qubits. In some embodiments, the resource state interconnect includes a plurality of waveguides coupled between an external source of resource states and the output paths of the resource state interconnect.

According to some embodiments, a system can comprise: a network of interleaving modules, each interleaving module including: a resource state interconnect having a plurality of output paths to output a resource state during each of a plurality of operating cycles, wherein each resource state is a quantum system of multiple entangled physical qubits, wherein different physical qubits of the resource state are output on a different ones of the output paths; a plurality of reconfigurable fusion circuits, each of the plurality of reconfigurable fusion circuits being configured to receive two input physical qubits and to selectably perform either a projective entangling measurement between the two input physical qubits or one of a plurality of single-qubit measurements on each of the two input physical qubits, thereby producing measurement outcome data; a plurality of routing switches, each routing switch having an input path coupled to a respective one of the output paths of the resource state interconnect and a plurality of output routing paths selectably coupled to the input path, wherein, for each routing switch, the plurality of output routing paths includes: a first local path, wherein the first local paths of different ones of the routing switches introduce different delays; a plurality of internal port routing paths; and a plurality of port transfer paths that exit the interleaving module; and a plurality of external port routing paths to receive physical qubits from a plurality of other interleaving modules in the network, wherein the plurality of reconfigurable fusion circuits includes: a plurality of local fusion circuits, wherein each local fusion circuit is coupled to respective first local routing paths of two of the routing switches; and a plurality of port fusion circuits, wherein each port fusion circuit has a first input coupled to one of the internal port routing paths of one of the routing switches and a second input coupled to one of the of the external port routing paths, and wherein, for a first one of the routing switches, the plurality of output routing paths further includes a plurality of internal quickswap routing paths, and wherein, for a second one of the routing switches, the plurality of output routing paths further includes a plurality of quickswap transfer paths that exit the circuit; and a plurality of external quickswap routing paths that receive physical qubits from a plurality of external circuits, wherein the plurality of reconfigurable fusion circuits includes: a plurality of local fusion circuits, wherein each local fusion circuit is coupled to respective first local routing paths of two of the routing switches; and a plurality of quickswap fusion circuits, wherein each quickswap fusion circuit has a first input coupled to one of the internal quickswap routing paths of the first one of the routing switches and a second input coupled to one of the of the external quickswap routing paths.

In some embodiments, in each interleaving module, each of the routing switches is associated with a different surface of a topological code patch (e.g., a surface code patch) for a fault-tolerant logical qubit, and wherein the port fusion circuits operate on physical qubits from like surfaces of different topological code patches.

In some embodiments, in each interleaving module, the plurality of local fusion circuits includes a first local fusion circuit, a second local fusion circuit, and a third local fusion circuit and wherein: one of the first local routing paths coupled to the first local fusion circuit introduces a delay of one operating cycle relative to the other of the first local routing paths coupled to the first local fusion circuit; one of the first local routing paths coupled to the second local fusion circuit introduces a delay of a number d of operating cycles relative to the other of the first local routing paths coupled to the second local fusion circuit, wherein the number d is a code distance greater than 1; and one of the first local routing paths coupled to the third local fusion circuit introduces a delay of a number $d^2$ of operating cycles relative to the other of the first local routing paths coupled to the third local fusion circuit.

In some embodiments, in each interleaving module: the first local fusion circuit is coupled to the respective first local routing paths of a first routing switch and a second routing switch; the first local routing path of the first routing switch introduces the delay of one operating cycle; the plurality of output routing paths of each of the first routing switch and the second routing switch further includes a third local routing path, wherein the third local routing path of the first routing switch introduces a delay of two operating cycles relative to the third local routing path of the second routing switch; and the plurality of local fusion circuits further includes a fourth local fusion circuit coupled to the third local routing paths of the first routing switch and the second routing switch.

In some embodiments, in each interleaving module: the third local fusion circuit is coupled to the respective first local routing paths of a first routing switch and a second routing switch; the first local routing path of the first routing switch introduces the delay of $d^2$ operating cycles; and the plurality of quickswap transfer paths exit the circuit after a delay of $d^2$ operating cycles.

In some embodiments, in each interleaving module: each of the reconfigurable fusion circuits is configured such that the projective entangling measurement is a type II fusion operation that provides a joint XX measurement outcome and a joint ZZ measurement outcome; and each of the reconfigurable fusion circuits is configured such that the plurality of single-qubit measurements includes at least one of: a Pauli X measurement; a Pauli Y measurement; a Pauli Z measurement; and a phase rotation of $e^{-i\pi/8}$ followed by a Pauli Z measurement.

In some embodiments, the system can further comprise classical control logic coupled to the plurality of reconfigurable fusion circuits and to the plurality of routing switches in the interleaving modules, the classical control logic being configured to select an output routing path for the each of the plurality of routing switches and an operation for each of the plurality of reconfigurable fusion circuits. In some embodiments, the classical control logic is further configured to select the output routing path for the each of the plurality of routing switches and the operation for each of the plurality of reconfigurable fusion circuits based at least in part on a logical block network representing a quantum computation to be executed.

In some embodiments, the physical qubits of the resource state are photonic qubits.

In some embodiments, the resource state interconnect includes a plurality of waveguides coupled between an external source of resource states and the output paths of the resource state interconnect.

According to some embodiments, a method can comprise: providing, to a classical computer system, a library of logical block networks that correspond to quantum subroutines, each logical block network specifying a set of port connections among a plurality of logical blocks, wherein each logical block corresponds to a topological code patch (e.g., a surface code patch) for a fault-tolerant logical qubit and the port connections define coupling operations between the topological code patches; specifying, to the classical computer system, a quantum computation as a sequence of quantum subroutines to be executed; for each quantum subroutine in the sequence of quantum subroutines: determining, by the classical computer system, whether a logical block network corresponding to the quantum subroutine is present in the library; in response to determining that a logical block network corresponding to the quantum subroutine is present in the library, retrieving, by the classical computer system, the logical block network from the library and adding the logical block network to an execution list; and in response to determining that a logical block network corresponding to the quantum subroutine is not present in the library, generating, by the classical computer system, a new logical block network corresponding to the quantum subroutine and adding the new logical block network to the execution list; identifying, by the classical computer system, one or more additional logical block networks to generate ancillary states to be used by the sequence of subroutines; inserting, by the classical computer system, the one or more additional logical block networks into the execution list; scheduling, by the classical computer system and based on the execution list, a sequence of logical cycles, including scheduling each of the logical block networks from the execution list to be executed by a particular one of a plurality of workspace qubit modules in a quantum computer core during a particular one of the logical cycles, wherein each logical cycle includes a plurality of code cycles; scheduling, by the classical computer system and based on the execution list, one or more layers of quickswap operations to be executed by a plurality of memory qubit modules in the quantum computer core during one or more of the logical cycles, wherein each layer of quickswap operations includes one or more quickswaps between disjoint sets of memory qubit modules and wherein each layer of quickswap operations completes in one code cycle; and scheduling, by the classical computer system and based on the execution list, a layer of additional quickswap operations between the plurality of workspace qubit modules and a plurality of memory qubit modules in the quantum computer core to be performed between successive logical cycles in the sequence of logical cycles.

In some embodiments, scheduling the sequence of logical cycles includes: determining that a first logical block network and a second logical block network both operate on a same input logical qubit; scheduling the first logical block network for execution in a first group of the workspace qubit modules during a first logical cycle, the first group of the workspace qubit modules including a first workspace qubit module that receives the input logical qubit; scheduling the second logical block network for execution in a second group of the workspace qubit modules during the first logical cycle, the second group of the workspace qubit modules including a second workspace qubit module that receives the input logical qubit; scheduling generation of a Bell pair of logical qubits prior to the first logical cycle such that a first logical qubit of the Bell pair is generated in a first memory qubit module and a second logical qubit of the Bell pair is generated in the second workspace qubit module; and scheduling a Bell measurement after the first logical cycle between the first logical qubit of the Bell pair and an output logical qubit of the first logical block network. In some embodiments, the Bell measurement is scheduled between the first memory qubit module and the first workspace qubit module. In some embodiments, the Bell measurement is scheduled between the first memory qubit module and a third workspace qubit module from the first group of the workspace qubit modules.

In some embodiments, scheduling the one or more layers of quickswap operations includes scheduling one or more quickswap operations that move the first logical qubit of the Bell pair from the first memory qubit module to a second memory qubit module.

In some embodiments, scheduling the sequence of logical cycles includes: determining that a first logical block network produces an output logical qubit that is an input qubit of a second logical block network; scheduling the first logical block network for execution in a first group of the workspace qubit modules during a first logical cycle, the first group of the workspace qubit modules including a first workspace qubit module that produces the output logical qubit; scheduling the second logical block network for execution in a second group of the workspace qubit modules during a second logical cycle, the second group of the workspace qubit modules including a second workspace qubit module that receives the input logical qubit; scheduling generation of a Bell pair of logical qubits during the first logical cycle such that a first logical qubit of the Bell pair is generated in a first memory qubit module and a second logical qubit of the Bell pair is generated in a second memory qubit module; scheduling one or more quickswap operations during the first logical cycle that move the first logical qubit of the Bell pair from the first memory qubit module to a third memory qubit module; scheduling a Bell measurement after the first logical cycle between the second logical qubit of the Bell pair and the output logical qubit from the first workspace module; and scheduling a quickswap operation after the Bell measurement and prior to the second logical cycle between the third memory qubit module and the second workspace qubit module.

In some embodiments, the method can further comprise scheduling, by the classical computer system and based on the execution list, one or more measurement operations to remove each ancillary state from the memory qubit modules after the ancillary state has been used in a subroutine.

In some embodiments, the measurement operations include reactive measurement operations and wherein, after being used in a subroutine, each ancillary state is maintained in the memory qubit modules for at least a reaction time sufficient to allow decoding of output data from previously executed logical blocks.

In some embodiments, the quantum subroutine specifies a unitary transformation operation on one or more logical qubits, and generating a new logical block network corresponding to the quantum subroutine includes: converting the unitary transformation operation to a sequence of Pauli product rotations and a Clifford gate that operates on all of the logical qubits; and translating the Pauli product rotations and the Clifford gate into logical block networks.

In some embodiments, generating a new logical block network corresponding to the quantum subroutine includes: defining the quantum subroutine as a ZX diagram including one or more spiders; optimizing the ZX diagram; and converting the optimized ZX diagram to a logical block network. In some embodiments, optimizing the ZX diagram includes: splitting or combining spiders until a number of input ports of each spider is between 0 and 4, a number of output ports of each spider is between 0 and 4, and a total number of input and output ports of each spider is between 2 and 4; defining an entanglement space having at least a first axis, a second axis, and a third axis; assigning each uncoupled input port to a first direction along the first axis and each uncoupled output port to a second direction along the first axis, the second direction opposite the first direction; assigning each port coupling between spiders to one or another of the second or third axes; determining an orientation of each spider; and adding zero or more additional spiders to satisfy a commensurability constraint based on the orientation of each spider and a Z or X type of each spider. In some embodiments, the quantum subroutine is specified as a unitary transformation operation and defining the quantum subroutine as a ZX diagram includes translating the unitary transformation operation to a ZX diagram. In some embodiments, the quantum subroutine is specified as a reversible circuit and defining the quantum subroutine as a ZX diagram includes translating the reversible circuit into a ZX diagram.

In some embodiments, the method can further comprise executing the sequence of logical cycles in a quantum computer core having a plurality of qubit modules; a plurality of port connections between pairs of the qubit modules; and a plurality of quickswap connections between pairs of the qubit modules, wherein executing the sequence of logical cycles includes: generating in at least some of the qubit modules, respective topological code patch for a fault-tolerant logical qubit during each of a plurality of code cycles within the logical cycle; operating at least one of the port connections between at least one pair of the qubit modules to perform, during one code cycle, joint measurement operations on physical qubits of the respective topological code patches generated in the pair of the qubit modules wherein the port connections are operated in accordance with the scheduled logical block networks; and operating at least one of the quickswap connections between at least one pair of the qubit modules to swap respective logical qubits between the pair of qubit modules within one code cycle, wherein the quickswap connections are operated according to the scheduled layers of quickswap operations.

In some embodiments, a classical computer system can comprise: a storage device to store a library of logical block networks that correspond to quantum subroutines, each logical block network specifying a set of port connections among a plurality of logical blocks, wherein each logical block corresponds to a topological code patch (e.g., a surface code patch) for a fault-tolerant logical qubit and the port connections define coupling operations between the topological code patches; and a processor coupled to the storage device and configured to: receive input specifying a quantum computation as a sequence of quantum subroutines to be executed; for each quantum subroutine in the sequence of quantum subroutines: determine whether a logical block network corresponding to the quantum subroutine is present in the library; in response to determining that a logical block network corresponding to the quantum subroutine is present in the library, retrieve the logical block network from the library and add the logical block network to an execution list; and in response to determining that a logical block network corresponding to the quantum subroutine is not present in the library, generate a new logical block network corresponding to the quantum subroutine and adding the new logical block network to the execution list; identify one or more additional logical block networks to generate ancillary states to be used by the sequence of subroutines; insert the one or more additional logical block networks into the execution list; schedule, based on the execution list, a sequence of logical cycles, including scheduling each of the logical block networks from the execution list to be executed by a particular one of a plurality of workspace qubit modules in a quantum computer core during a particular one of the logical cycles, wherein each logical cycle includes a plurality of code cycles; schedule, based on the execution list, one or more layers of quickswap operations to be executed by a plurality of memory qubit modules in the quantum computer core during one or more of the logical cycles, wherein each layer of quickswap operations includes one or more quickswaps between disjoint sets of memory qubit modules and wherein each layer of quickswap operations completes in one code cycle; and schedule, based on the execution list, a layer of additional quickswap operations between the plurality of workspace qubit modules and a plurality of memory qubit modules in the quantum computer core to be performed between successive logical cycles in the sequence of logical cycles.

In some embodiments, the processor is further configured such that scheduling the sequence of logical cycles includes: determining that a first logical block network and a second logical block network both operate on a same input logical qubit; scheduling the first logical block network for execution in a first group of the workspace qubit modules during a first logical cycle, the first group of the workspace qubit modules including a first workspace qubit module that receives the input logical qubit; scheduling the second logical block network for execution in a second group of the workspace qubit modules during the first logical cycle, the second group of the workspace qubit modules including a second workspace qubit module that receives the input logical qubit; scheduling generation of a Bell pair of logical qubits prior to the first logical cycle such that a first logical qubit of the Bell pair is generated in a first memory qubit module and a second logical qubit of the Bell pair is generated in the second workspace qubit module; and scheduling a Bell measurement after the first logical cycle between the first logical qubit of the Bell pair and an output logical qubit of the first logical block network.

In some embodiments, the processor is further configured such that scheduling the sequence of logical cycles includes: determining that a first logical block network produces an output logical qubit that is an input qubit of a second logical block network; scheduling the first logical block network for execution in a first group of the workspace qubit modules during a first logical cycle, the first group of the workspace qubit modules including a first workspace qubit module that produces the output logical qubit; scheduling the second logical block network for execution in a second group of the workspace qubit modules during a second logical cycle, the second group of the workspace qubit modules including a second workspace qubit module that receives the input logical qubit; scheduling generation of a Bell pair of logical qubits during the first logical cycle such that a first logical qubit of the Bell pair is generated in a first memory qubit module and a second logical qubit of the Bell pair is generated in a second memory qubit module; scheduling one or more quickswap operations during the first logical cycle that move the first logical qubit of the Bell pair from the first memory qubit module to a third memory qubit module; scheduling a Bell measurement after the first logical cycle between the second logical qubit of the Bell pair and the output logical qubit from the first workspace module; and scheduling a quickswap operation after the Bell measurement and prior to the second logical cycle between the third memory qubit module and the second workspace qubit module.

In some embodiments, the processor is further configured to schedule, based on the execution list, one or more measurement operations to remove each ancillary state from the memory qubit modules after the ancillary state has been used in a subroutine.

In some embodiments, the measurement operations include reactive measurement operations, and the processor is further configured to schedule the reactive measurement operations such that, after being used in a subroutine, each ancillary state is maintained in the memory qubit modules for at least a reaction time sufficient to allow decoding of output data from previously executed logical blocks.

In some embodiments, the quantum subroutine specifies a unitary transformation operation on one or more logical qubits, and the processor is further configured such that generating a new logical block network corresponding to the quantum subroutine includes: converting the unitary transformation operation to a sequence of Pauli product rotations and a Clifford gate that operates on all of the logical qubits; and translating the Pauli product rotations and the Clifford gate into logical block networks.

According to some embodiments, a system can comprise: a network of interleaving modules, wherein each interleaving module includes: a resource state interconnect having a plurality of output paths to output a resource state during each of a plurality of operating cycles, wherein each resource state is a quantum system of multiple entangled physical qubits, wherein different physical qubits of the resource state are output on a different ones of the output paths; a plurality of reconfigurable fusion circuits, each of the plurality of reconfigurable fusion circuits being configured to receive two input physical qubits and to selectably perform either a projective entangling measurement between the two input physical qubits or one of a plurality of single-qubit measurements on each of the two input physical qubits, thereby producing measurement outcome data; a plurality of routing switches, each routing switch having an input path coupled to a respective one of the output paths of the resource state interconnect and a plurality of output routing paths selectably coupled to the input path, wherein, for each routing switch the plurality of output routing paths includes: a first local routing path, wherein the first local routing paths of different ones of the routing switches introduce different delays; a second local routing path; and a set of port routing paths that includes a number (r) of routing paths, wherein the number r is greater than 1; a plurality of port input switches, each port input switch having the number r of inputs coupled to respective port routing paths of r other interleaving modules and an output path, wherein the plurality of reconfigurable fusion circuits includes: a plurality of local fusion circuits, wherein each local fusion circuit is coupled to respective first local routing paths of two of the routing switches; and a plurality of port fusion circuits, wherein each port fusion circuit is coupled to the second local routing path of a respective one of the routing switches and to the output path of a respective one of the port input switches; and classical control logic coupled to the network of interleaving modules and configured to control the routing switches and the reconfigurable fusion circuits and to receive classical data signals representing the measurement outcome data from the reconfigurable fusion circuits.

In some embodiments, each of the reconfigurable fusion circuits is configured such that the plurality of single-qubit measurements includes a Pauli X measurement, a Pauli Y measurement, and a Pauli Z measurement.

In some embodiments, each of the reconfigurable fusion circuits is configured such that the plurality of single-qubit measurements further includes a phase rotation of $e^{-i\pi/8}$ followed by a Pauli Z measurement.

In some embodiments, the classical control logic is further configured to determine a sequence of control settings for the routing switches and the reconfigurable fusion circuits based at least in part on a fusion graph representing a quantum computation to be executed.

In some embodiments, the system can further comprise a plurality of resource state generator circuits to generate resource states and to provide the resource states to the resource state interconnects of the interleaving modules.

In some embodiments, the physical qubits of the resource state are photonic qubits. In some embodiments, the resource state interconnect in each interleaving module includes a plurality of waveguides coupled between an external source of resource states and the output paths of the resource state interconnect.

According to some embodiments, a method can comprise: initializing a first qubit and a second qubit in a Bell state; executing, using a first group of interconnected qubit modules, a first gate on a first set of qubits, the first set of qubits including the first qubit; executing, using a second group of interconnected qubit modules, a second gate on a second set of qubits, the second set of qubits including a third qubit, wherein the first quantum gate and the second quantum gate are executed in parallel and wherein the first set of qubits and the second set of qubits are disjoint sets; and after executing the first quantum gate and the second quantum gate, performing a Bell-basis measurement on the second qubit and the third qubit.

In some embodiments, the second qubit is not in either of the first set or the second set.

In some embodiments, each of the qubits is a topological coded logical qubit, which can be, e.g., a surface coded logical qubit.

In some embodiments, each of the qubits is a topological coded (e.g., surface coded) logical qubit that is stored in one of the qubit modules; executing the first gate includes operating port connections in the first group of interconnected qubit modules to couple the topological coded logical qubits; and executing the second gate includes operating port connections in the second group of interconnected qubit modules to couple the topological coded logical qubits. In some embodiments, the topological code is a surface code.

The following detailed description, together with the accompanying drawings, will provide a better understanding of the nature and advantages of the claimed invention.

BRIEF DESCRIPTION OF THE DRAWINGS

FIG. 1 shows two representations of a portion of a pair of waveguides corresponding to a dual-rail-encoded photonic qubit.

FIG. 2A shows a schematic diagram for coupling of two modes.

FIG. 2B shows, in schematic form, a physical implementation of mode coupling in a photonic system that can be used in some embodiments.

FIGS. 11A-11H show examples of surface-code implementations for a logical qubit.

FIG. 11A shows a physical qubit; FIGS. 11B and 11C show an entangled system of physical qubits providing a surface code usable for error correction. FIGS. 11D-11F illustrate circuits implementing stabilizer measurements on the surface code of FIGS. 11B and 11C. FIGS. 11G and 11H illustrate graphical representations of an identity gate applied to a logical qubit.

FIG. 17 shows a surface-code-level diagram of a portion of an active volume quantum computer system during an operation according to some embodiments.

FIGS. 20A-20D show examples of spacetime diagrams for four-port, three-port, and two-port logical blocks that can be used in some embodiments.

FIG. 20E shows an example of a logical block corresponding to an identity gate that can be used in some embodiments.

FIGS. 26A-26E show a process for conversion of a 4-qubit Z-type measurement to a logical block network according to some embodiments.

FIG. 30C shows logical block networks corresponding to portions of the quantum circuit of FIG. 30A according to some embodiments.

FIGS. 34A-34G illustrate conversion of Pauli product rotation circuits to logical block networks according to some embodiments.

FIGS. 36A-36D illustrate conversion of temporary-AND Toffoli gate circuits to logical block networks according to some embodiments.

FIGS. 39A-39D illustrate additional techniques for implementing Pauli product rotations according to some embodiments.

FIGS. 40A-40E illustrate conversion of controlled adder circuits to logical block networks according to some embodiments.

FIGS. 43A-43D illustrate construction of logical block networks implementing a magic state distillation protocol according to some embodiments.

FIGS. 44A-44D illustrate construction of logical block networks implementing another magic state distillation protocol according to some embodiments.

FIG. 45 is a table summarizing estimated computational costs for various quantum subroutines in an active volume quantum computer system according to some embodiments.

FIG. 52 shows a simplified fusion graph illustrating patch-based generation of a layer using a network array of unit cells according to some embodiments.

FIG. 55A shows a view of a representative layer of a fusion graph, with interleaving coordinates overlaid thereon.

FIG. 56 shows a table illustrating configuration settings for an interleaving module that can be determined from a patch of a fusion graph according to some embodiments.

FIGS. 57A and 57B show examples of fusion graphs for operations that change the lattice structure.

FIG. 68 is a table summarizing examples of the performance metrics and example device implementations for active volume quantum computer architectures with different choices of design parameters according to some embodiments.

DETAILED DESCRIPTION

Figure 3A:
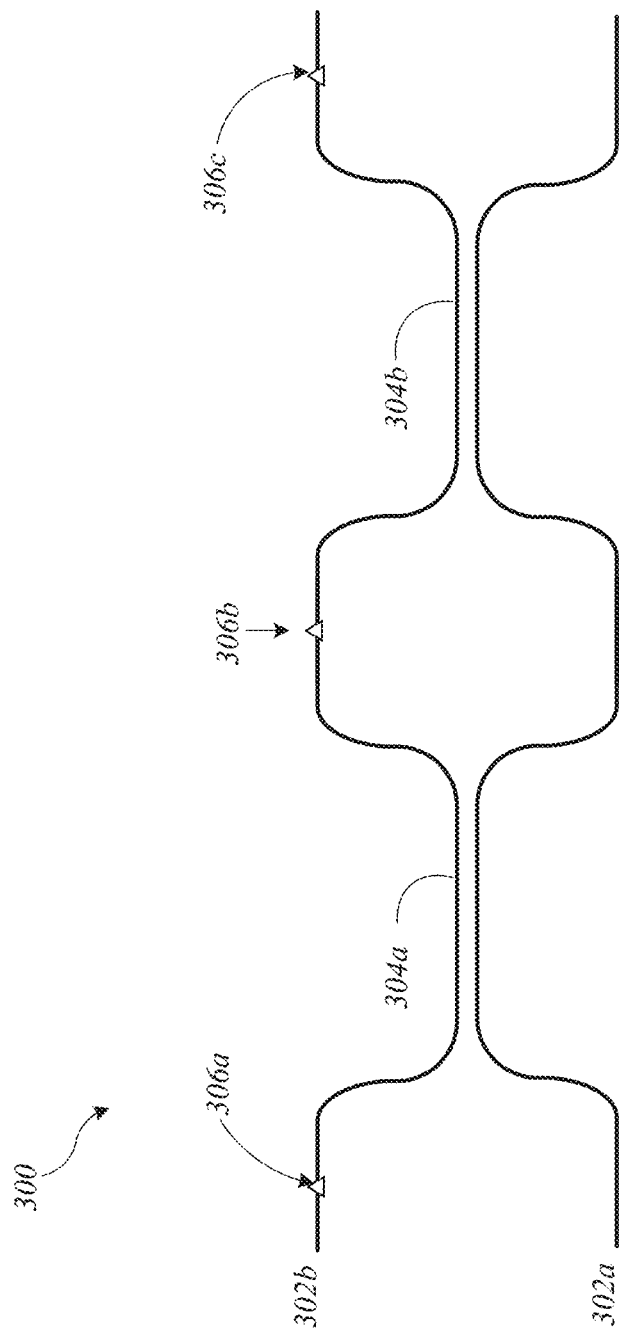
FIGS. 3A and 3B show, in schematic form, examples of physical implementations of a Mach-Zehnder Interferometer (MZI) configuration that can be used in some embodiments.

Disclosed herein are examples (also referred to as "embodiments") of systems and methods for performing operations on ensembles of qubits based on various physical quantum systems, including photonic systems. Such embodiments can be used, for example, in quantum computing as well as in other contexts (e.g., quantum communication) that exploit quantum entanglement. To facilitate understanding of the disclosure, an overview of relevant concepts and terminology is provided in Section 1. An active volume architecture for a quantum computer is described in Section 2. Example implementations of an active volume architecture using photonic qubits and fusion-based quantum computing (FBQC), as well as a quantum computer system using photonic qubits and FBQC, are described in sections 3 and 4.

1. Overview of Quantum Computing

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, the orbital angular momentum state of the photon, and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon is propagating in, and the temporal mode $t_j$ is determined by which one of a set of discrete time periods (referred to herein as "bins") the photon is present in. In some photonic implementations, the degree of temporal discretization can be provided by a pulsed laser which is responsible for generating the photons. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multimode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two-particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1_3\rangle$.

1.1. Qubits

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of molecules, atoms, ions, nuclei, or photons. Other examples include other engineered quantum systems such as flux qubits, phase qubits, or charge qubits (e.g., formed from a superconducting Josephson junction); topological qubits (e.g., Majorana fermions); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \qquad (1)$$

$$|1\rangle_L = |01\rangle_{1,2} \qquad (2)$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$ (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide). In some instances throughout this disclosure, the various subscripts are omitted to avoid unnecessary mathematical clutter.

1.2. Entangled States

Many of the advantages of quantum computing relative to "classical" computing (e.g., conventional digital computers using binary logic) stem from the ability to create entangled states of multi-qubit systems. In mathematical terms, a state $|\psi\rangle$ of n quantum objects is a separable state if $|\psi\rangle = |\psi_1\rangle \otimes \ldots \otimes |\psi_n\rangle$, and an entangled state is a state that is not separable. One example is a Bell state, which, loosely speaking, is a type of maximally entangled state for a two-qubit system, and qubits in a Bell state may be referred to as a Bell pair. For example, for qubits encoded by single photons in pairs of modes (a dual-rail encoding), examples of Bell states include:

$$|\Phi^+\rangle = \frac{|0\rangle_L|0\rangle_L + |1\rangle_L|1\rangle_L}{\sqrt{2}} = \frac{|10\rangle|10\rangle + |01\rangle|01\rangle}{\sqrt{2}} \qquad (3)$$

$$|\Phi^-\rangle = \frac{|0\rangle_L|0\rangle_L - |1\rangle_L|1\rangle_L}{\sqrt{2}} = \frac{|10\rangle|10\rangle - |01\rangle|01\rangle}{\sqrt{2}} \qquad (4)$$

$$|\Psi^+\rangle = \frac{|0\rangle_L|1\rangle_L + |1\rangle_L|0\rangle_L}{\sqrt{2}} = \frac{|10\rangle|01\rangle + |01\rangle|10\rangle}{\sqrt{2}} \qquad (5)$$

$$|\Psi^-\rangle = \frac{|0\rangle_L|1\rangle_L - |1\rangle_L|0\rangle_L}{\sqrt{2}} = \frac{|10\rangle|01\rangle - |01\rangle|10\rangle}{\sqrt{2}} \qquad (6)$$

More generally, an n-qubit Greenberger-Horne-Zeilinger (GHZ) state (or "n-GHZ state") is an entangled quantum state of n qubits. For a given orthonormal logical basis, an n-GHZ state is a quantum superposition of all qubits being in a first basis state superposed with all qubits being in a second basis state:

$$|GHZ\rangle = \frac{|0\rangle^{\otimes M} + |1\rangle^{\otimes M}}{\sqrt{2}} \qquad (7)$$

where the kets above refer to the logical basis. For example, for qubits encoded by single photons in pairs of modes (a dual-rail encoding), a 3-GHZ state can be written:

$$|GHZ\rangle = \frac{|0\rangle_L|0\rangle_L|0\rangle_L - |1\rangle_L|1\rangle_L|1\rangle_L}{\sqrt{2}} = \frac{|10\rangle|10\rangle|10\rangle + |01\rangle|01\rangle|01\rangle}{\sqrt{2}} \quad (8)$$

where the kets above refer to photon occupation number in six respective modes (with mode subscripts omitted).

1.3. Physical Implementations

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding, a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|0\rangle_L$ state of a photonic qubit. At 100', a photon 108 is in waveguide 104 and no photon is in waveguide 102; in some embodiments this corresponds to the $|1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like.

In such cases, operation of the photon source may be non-deterministic (also sometimes referred to as "stochastic") such that a given pump pulse may or may not produce a photon pair. In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation introduced above), mode coupling can result in a state in which both modes have a nonzero probability of being occupied, e.g., a state $a_1|10\rangle + a_2|01\rangle$, where $|\alpha_1|^2 + |a_2|^2 = 1$. In some embodiments, operations of this kind can be implemented using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

FIG. 2A shows a schematic diagram 210 (also referred to as a circuit diagram or circuit notation) for coupling of two modes. The modes are drawn as horizontal lines 212, 214, and the mode coupler 216 is indicated by a vertical line that is terminated with nodes (solid dots) to identify the modes being coupled. In the more specific language of linear quantum optics, the mode coupler 216 shown in FIG. 2A represents a 50/50 beam splitter that implements a transfer matrix:

$$T = \frac{1}{\sqrt{2}}\begin{pmatrix} 1 & i \\ i & 1 \end{pmatrix}, \tag{9}$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 212), and the second column corresponds to creation operators on the second mode (referred to herein as mode 2, labeled as horizontal line 214), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}}\begin{pmatrix} 1 & -i \\ -i & 1 \end{pmatrix}\begin{pmatrix} a_1^\dagger \\ a_2^\dagger \end{pmatrix}_{output}, \tag{10}$$

where subscripts on the creation operators indicate the mode that is operated on, the subscripts input and output identify the form of the creation operators before and after the beam splitter, respectively and where:

$$a_i|n_i,n_j\rangle = \sqrt{n_i}|n_i-1,n_j\rangle$$

$$a_j|n_i,n_j\rangle = \sqrt{n_j}|n_i,n_j-1\rangle$$

$$a_j^\dagger|n_i,n_j\rangle = \sqrt{n_j+1}|n_i,n_j+1\rangle \tag{11}$$

For example, the application of the mode coupler shown in FIG. 2A leads to the following mappings:

$$a_{1_{input}}^\dagger \mapsto \frac{1}{\sqrt{2}}\left(a_{1_{output}}^\dagger - i a_{2_{output}}^\dagger\right) \tag{12}$$

$$a_{2_{input}}^\dagger \mapsto \frac{1}{\sqrt{2}}\left(-i a_{1_{output}}^\dagger - a_{2_{output}}^\dagger\right)$$

Thus, the action of the mode coupler described by Eq. (9) is to take the input states $|10\rangle$, $|01\rangle$, and $|11\rangle$ to $$|10\rangle \mapsto \frac{|10\rangle - i|01\rangle}{\sqrt{2}} \tag{13}$$

$$|01\rangle \mapsto \frac{-i|10\rangle + |01\rangle}{\sqrt{2}}$$

$$|11\rangle \mapsto \frac{-i}{2}(|20\rangle + |02\rangle)$$

FIG. 2B shows a physical implementation of a mode coupling that implements the transfer matrix T of Eq. (9) for two photonic modes in accordance with some embodiments. In this example, the mode coupling is implemented using a waveguide beam splitter 200, also sometimes referred to as a directional coupler or mode coupler. Waveguide beam splitter 200 can be realized by bringing two waveguides 202, 204 into close enough proximity that the evanescent field of one waveguide can couple into the other. By adjusting the separation d between waveguides 202, 204 and/or the length l of the coupling region, different couplings between modes can be obtained. In this manner, a waveguide beam splitter 200 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \tag{14}$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Figure 3B:
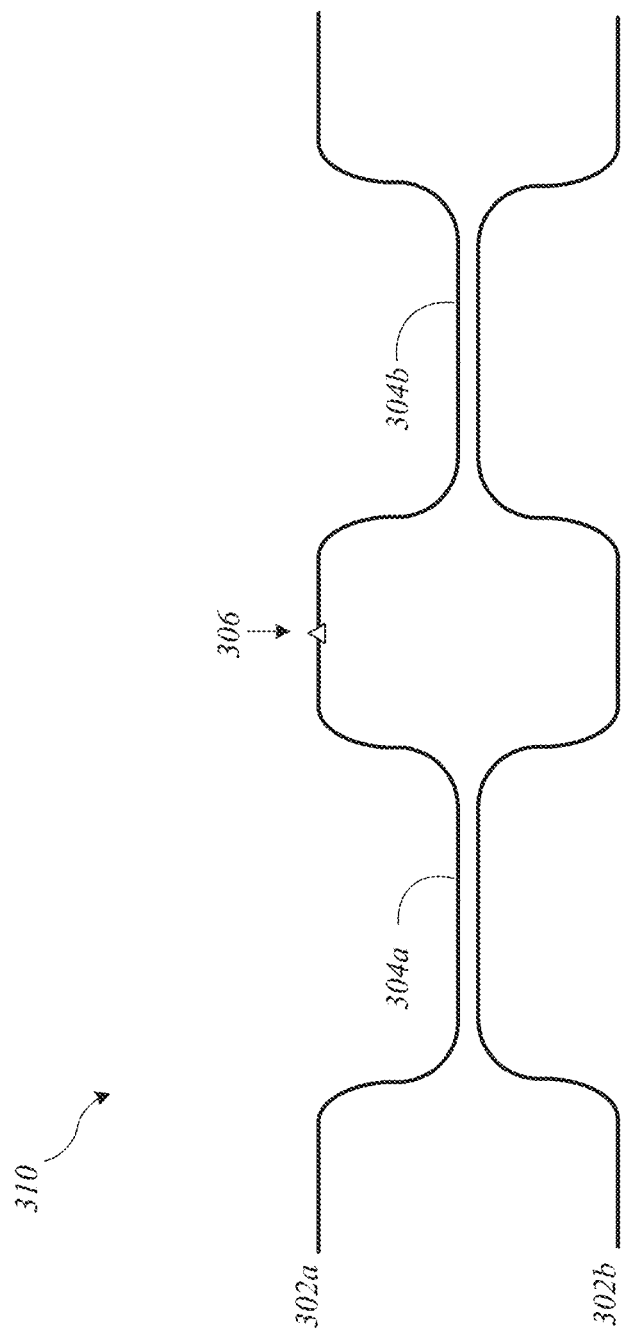

Beam-splitters with variable transmissivity and arbitrary phase relationships between output modes can also be achieved by combining directional couplers and variable phase-shifters in a Mach-Zehnder Interferometer (MZI) configuration 300, e.g., as shown in FIG. 3A. Complete control over the relative phase and amplitude of the two modes 302a, 302b in dual rail encoding can be achieved by varying the phases imparted by phase shifters 306a, 306b, and 306c and the length and proximity of coupling regions 304a and 304b. FIG. 3B shows a slightly simpler example of a MZI 310 that allows for a variable transmissivity between modes 302a, 302b by varying the phase imparted by the phase shifter 306. FIGS. 3A and 3B are examples of how one could implement a mode coupler in a physical device, but any type of mode coupler/beam splitter can be used without departing from the scope of the present disclosure.

Figure 4A:
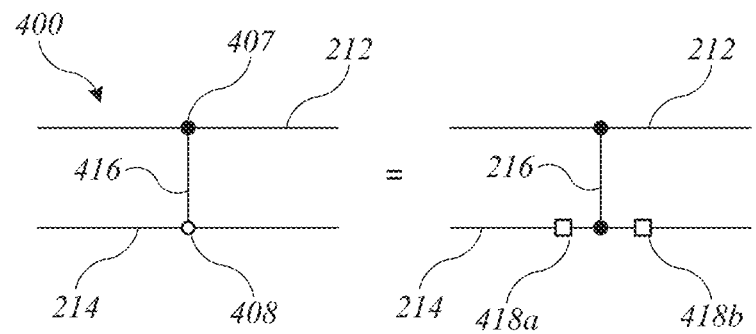
FIG. 4A shows another schematic diagram for coupling of two modes.

In some embodiments, beam splitters and phase shifters can be employed in combination to implement a variety of transfer matrices. For example, FIG. 4A shows, in a schematic form similar to that of FIG. 2A, a mode coupler 400 implementing the following transfer matrix:

$$T_r = \frac{1}{\sqrt{2}}\begin{pmatrix} 1 & 1 \\ 1 & -1 \end{pmatrix}. \tag{15}$$

Thus, mode coupler 400 applies the following mappings:

$$|10\rangle \mapsto \frac{|10\rangle + |01\rangle}{\sqrt{2}} \tag{16}$$

$$|01\rangle \mapsto \frac{|10\rangle - |01\rangle}{\sqrt{2}}$$

$$|11\rangle \mapsto \frac{1}{2}(|20\rangle + |02\rangle).$$

Figure 4B:
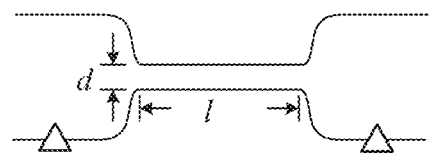
FIG. 4B shows, in schematic form, a physical implementation of the mode coupling of FIG. 4A in a photonic system that can be used in some embodiments.

The transfer matrix $T_r$ of Eq. (15) is related to the transfer matrix T of Eq. (9) by a phase shift on the second mode. This is schematically illustrated in FIG. 4A by the closed node 407 where mode coupler 416 couples to the first mode (line 212) and open node 408 where mode coupler 416 couples to the second mode (line 214). More specifically, $T_r$=sTs, and, as shown at the right-hand side of FIG. 4A, mode coupler 416 can be implemented using mode coupler 216 (as described above), with a preceding and following phase shift (denoted by open squares 418*a*, 418*b*). Thus, the transfer matrix $T_r$ can be implemented by the physical beam splitter shown in FIG. 4B, where the open triangles represent +i phase shifters.

Figure 5:
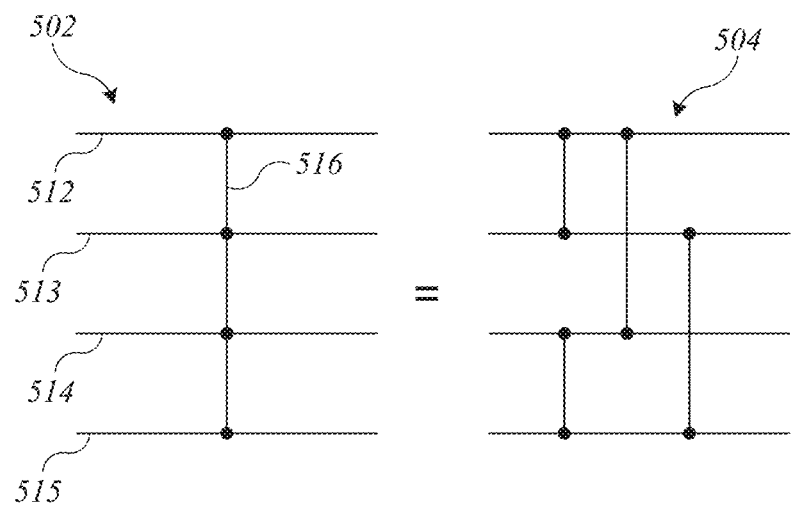
FIG. 5 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 5 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation.) As in FIG. 2A, the horizontal lines 512-515 correspond to modes, and the mode coupling is indicated by a vertical line 516 with nodes (dots) to identify the modes being coupled. In this case, four modes are coupled. Circuit notation 502 is an equivalent representation to circuit diagram 504, which is a network of first-order mode couplings. More generally, where a higher-order mode coupling can be implemented as a network of first-order mode couplings, a circuit notation similar to notation 502 (with an appropriate number of modes) may be used.

Figure 6:
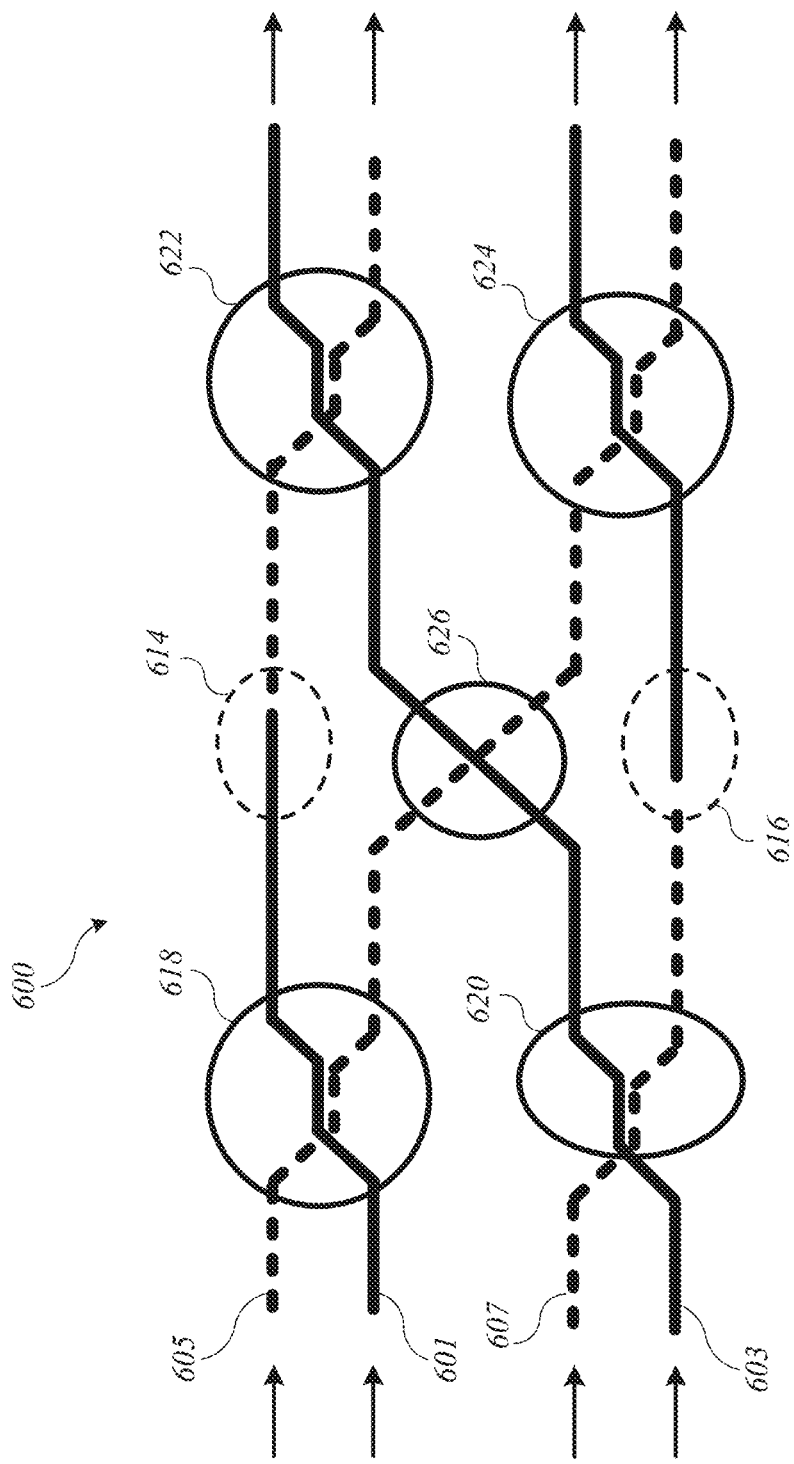
FIG. 6 illustrates an example optical device that can implement the four-mode mode-spreading transform shown schematically in FIG. 5 in accordance with some embodiments.

FIG. 6 illustrates an example optical device 600 that can implement the four-mode mode-spreading transform shown schematically in FIG. 5 in accordance with some embodiments. Optical device 600 includes a first set of optical waveguides 601, 603 formed in a first layer of material (represented by solid lines in FIG. 6) and a second set of optical waveguides 605, 607 formed in a second layer of material that is distinct and separate from the first layer of material (represented by dashed lines in FIG. 6). The second layer of material and the first layer of material are located at different heights on a substrate. One of ordinary skill will appreciate that an interferometer such as that shown in FIG. 6 could be implemented in a single layer if appropriate low loss waveguide crossing were employed.

At least one optical waveguide 601, 603 of the first set of optical waveguides is coupled with an optical waveguide 605, 607 of the second set of optical waveguides with any type of suitable optical coupler, e.g., the directional couplers described herein (e.g., the optical couplers shown in FIGS. 2B, 3A, 3B). For example, the optical device shown in FIG. 6 includes four optical couplers 618, 620, 622, and 624. Each optical coupler can have a coupling region in which two waveguides propagate in parallel. Although the two waveguides are illustrated in FIG. 6 as being offset from each other in the coupling region, the two waveguides may be positioned directly above and below each other in the coupling region without offset. In some embodiments, one or more of the optical couplers 618, 620, 622, and 624 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 6 can include two inter-layer optical couplers 614 and 616. Optical coupler 614 allows transfer of light propagating in a waveguide on the first layer of material to a waveguide on the second layer of material, and optical coupler 616 allows transfer of light propagating in a waveguide on the second layer of material to a waveguide on the first layer of material. The optical couplers 614 and 616 allow optical waveguides located in at least two different layers to be used in a multi-channel optical coupler, which, in turn, enables a compact multi-channel optical coupler.

Furthermore, the optical device shown in FIG. 6 includes a non-coupling waveguide crossing region 626. In some implementations, the two waveguides (603 and 605 in this example) cross each other without having a parallel coupling region present at the crossing in the non-coupling waveguide crossing region 626 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

Figure 7:
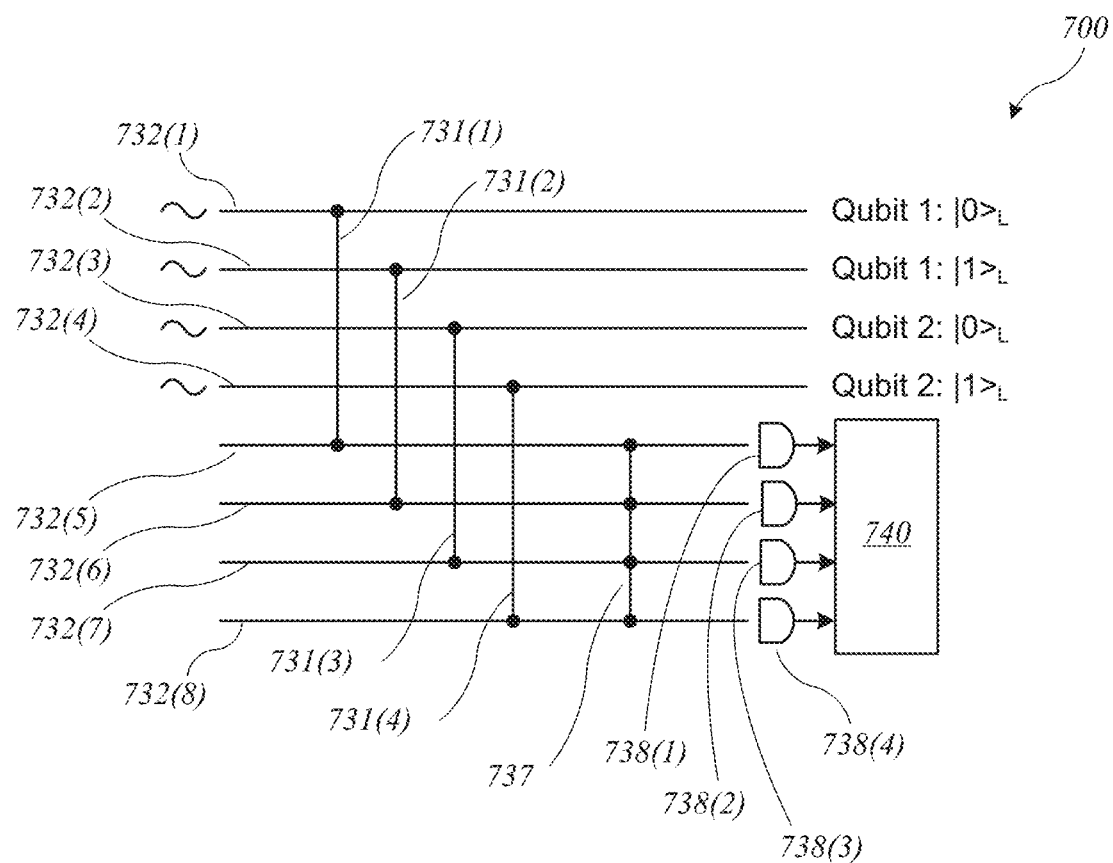
FIG. 7 shows a circuit diagram for a dual-rail-encoded Bell state generator that can be used in some embodiments.

In some embodiments, entangled states of multiple photonic qubits can be created by coupling modes of two (or more) qubits and performing measurements on other modes. By way of example, FIG. 7 shows a circuit diagram for a Bell state generator 700 that can be used in some dual-rail-encoded photonic embodiments. In this example, modes 732(1)-732(4) are initially each occupied by a photon (indicated by a wavy line); modes 732(5)-732(8) are initially vacuum modes. (Those skilled in the art will appreciate that other combinations of occupied and unoccupied modes can be used.)

A first-order mode coupling (e.g., implementing transfer matrix T of Eq. (9)) is performed on pairs of occupied and unoccupied modes as shown by mode couplers 731(1)-731(4). Thereafter, a mode-information erasure coupling (e.g., implementing a four-mode mode spreading transform as shown in FIG. 5) is performed on four of the modes (modes 732(5)-732(8)), as shown by mode coupler 737. Modes 732(5)-732(8) act as "heralding" modes that are measured and used to determine whether a Bell state was successfully generated on the other four modes 732(1)-732(4). For instance, detectors 738(1)-738(4) can be coupled to the modes 732(5)-732(8) after second-order mode coupler 737. Each detector 738(1)-738(4) can output a classical data signal (e.g., a voltage level on a conductor) indicating whether it detected a photon (or the number of photons detected). These outputs can be coupled to classical decision logic circuit 740, which determines whether a Bell state is present on the other four modes 732(1)-732(4). For example, decision logic circuit 740 can be configured such that a Bell state is confirmed (also referred to as "success" of the Bell state generator) if and only if a single photon was detected by each of exactly two of detectors 738(1)-738(4). Modes 732(1)-732(4) can be mapped to the logical states of two qubits (Qubit 1 and Qubit 2), as indicated in FIG. 7. Specifically, in this example, the logical state of Qubit 1 is based on occupancy of modes 732(1) and 732(2), and the logical state of Qubit 2 is based on occupancy of modes 732(3) and 732(4). It should be noted that the operation of Bell state generator 700 can be non-deterministic; that is, inputting four photons as shown does not guarantee that a Bell state will be created on modes 732(1)-732(4). In one implementation, the probability of success is 4/32.

In some embodiments, it is desirable to form quantum systems of multiple entangled qubits (two or more qubits). One technique for forming multi-qubit quantum systems is through the use of an entangling measurement, which is a projective measurement that can be employed to create entanglement between systems of qubits. As used herein, "fusion" (or "a fusion operation" or "fusing") refers to a projective entangling measurement. A "fusion gate" is a structure that receives two (or more) input qubits, each of which is typically part of a different quantum system. Prior to applying the fusion gate, the different quantum systems need not be entangled with each other. In the case of two input qubits, the fusion gate performs a projective measurement operation on the input qubits that produces either one ("type I fusion") or zero ("type II fusion") output qubits in a manner such that the initial two quantum systems are fused into a single quantum system of entangled qubits. Fusion gates are specific examples of a general class of projective entangling measurements and are particularly suited for photonic architectures. Examples of type I and type II fusion gates will now be described.

Figure 8A:
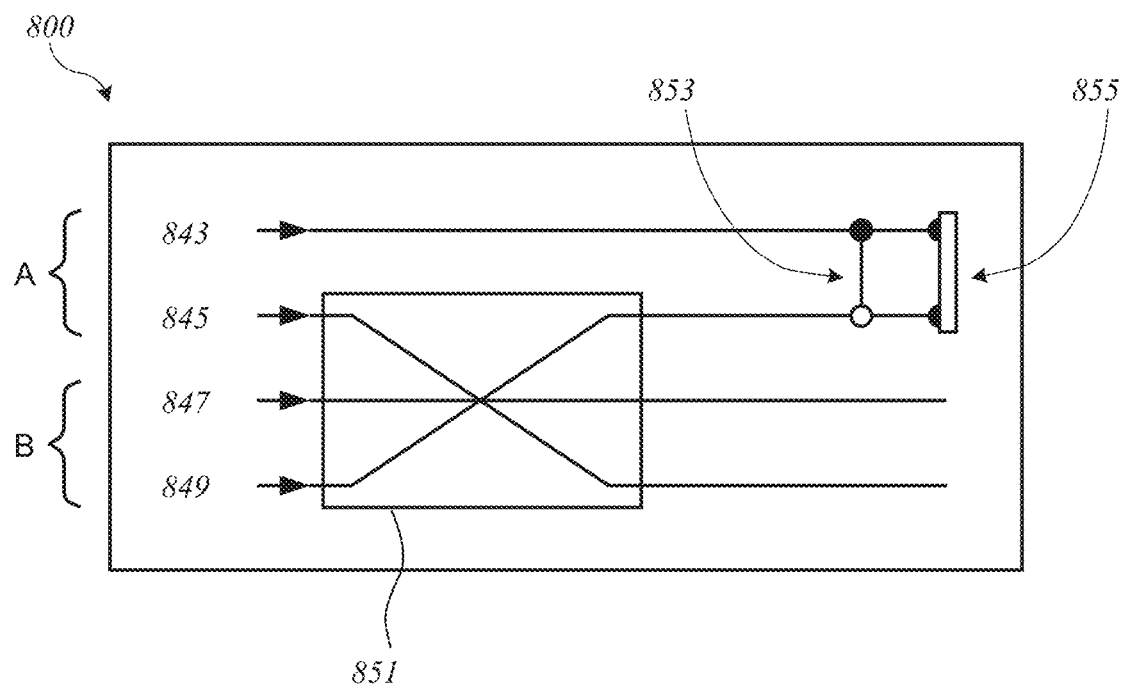
FIG. 8A shows a circuit diagram for a dual-rail-encoded type I fusion gate that can be used in some embodiments.

FIG. 8A shows a circuit diagram illustrating a type I fusion gate 800 in accordance with some embodiments. The diagram shown in FIG. 8A is schematic with each horizontal line representing a mode of a quantum system, e.g., a photon. In a dual-rail encoding, each pair of modes represents a qubit. In a photonic implementation of the gate the modes in diagrams such as that shown in FIG. 8A can be physically realized using single photons in photonic waveguides. Most generally, a type I fusion gate like that shown in FIG. 8A takes qubit A (physically realized, e.g., by photon modes 843 and 845) and qubit B (physically realized, e.g., by photon modes 847 and 849) as input and outputs a single "fused" qubit that inherits the entanglement with other qubits that were previously entangled with either (or both) of input qubit A or input qubit B.

Figure 8B:
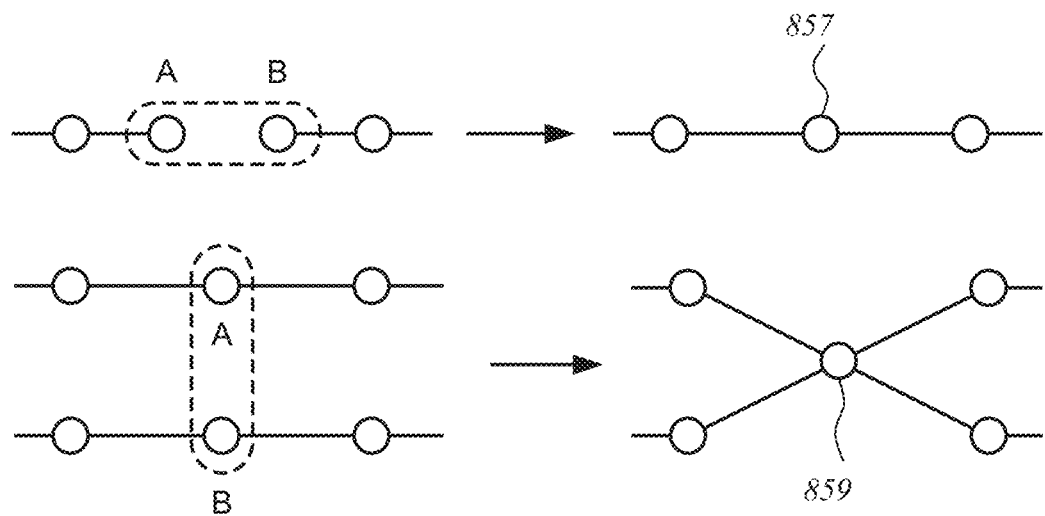
FIG. 8B shows example results of type I fusion operations using the gate of FIG. 8A.

For example, FIG. 8B shows the result of type-I fusing of two qubits A and B that are each, respectively, a qubit located at the end (i.e., a leaf) of some longer entangled cluster state (only a portion of which is shown). The qubit 857 that remains after the fusion operation inherits the entangling bonds from the original qubits A and B thereby creating a larger linear cluster state. FIG. 8B also shows the result of type-I fusing of two qubits A and B that are each, respectively, an internal qubit that belongs to some longer entangled cluster of qubits (only a portion of which is shown). As before, the qubit 859 that remains after fusion inherits the entangling bonds from the original qubits A and B thereby creating a fused quantum system. In this case, the qubit that remains after the fusion operation is entangled with the larger quantum system by way of four other nearest neighbor qubits as shown.

Returning to the schematic illustration of type I fusion gate 800 shown in FIG. 8A, qubit A is dual-rail encoded by modes 843 and 845, and qubit B is dual-rail encoded by modes 847 and 849. For example, in the case of path-encoded photonic qubits, the logical zero state of qubit A (denoted $|0\rangle_A$) occurs when mode 843 is a photonic waveguide that includes a single photon and mode 845 is a photonic waveguide that includes zero photons (and likewise for qubit B). Thus, type I fusion gate 800 can take as input two dual-rail-encoded photon qubits thereby resulting in a total of four input modes (e.g., modes 843, 845, 847, and 849). To accomplish the fusion operation, a mode coupler (e.g., 50/50 beam splitter) 853 is applied between a mode of each of the input qubits, e.g., between mode 843 and mode 849 before performing a detection operation on both modes using photon detectors 855 (which includes two distinct photon detectors coupled to modes 843 and 849 respectively). In addition, to ensure that the output modes are adjacently positioned, a mode swap operation 851 can be applied that swaps the position of the second mode of qubit A (mode 845) with the position the second mode of qubit B (mode 849). In some embodiments, mode swapping can be accomplished through a physical waveguide crossing as described above or by one or more photonic switches or by any other type of physical mode swap.

FIG. 8A shows only an example arrangement for a type I fusion gate and one of ordinary skill will appreciate that the position of the mode coupler and the presence of the mode swap region 851 can be altered without departing from the scope of the present disclosure. For example, beam splitter 853 can be applied between modes 845 and 847. Mode swaps are optional and are not necessary if qubits having non-adjacent modes can be dealt with, e.g., by tracking which modes belong to which qubits by storing this information in a classical memory.

Type I fusion gate 800 is a nondeterministic gate, i.e., the fusion operation succeeds with a certain probability less than 1, and in other cases the quantum state that results is not a larger quantum system that comprises the original quantum systems fused together to form a larger quantum system. More specifically, gate 800 "succeeds," with probability 50%, when only one photon is detected by detectors 855, and "fails" if zero or two photons are detected by detectors 855. When the gate succeeds, the two quantum systems that qubits A and B were a part of become fused into a single larger quantum system with a fused qubit remaining as the qubit that links the two previously unlinked quantum systems (see, e.g., FIG. 8B). However, when the fusion gate fails, it has the effect of removing both qubits from the original quantum systems without generating a larger quantum system.

Figure 9A:
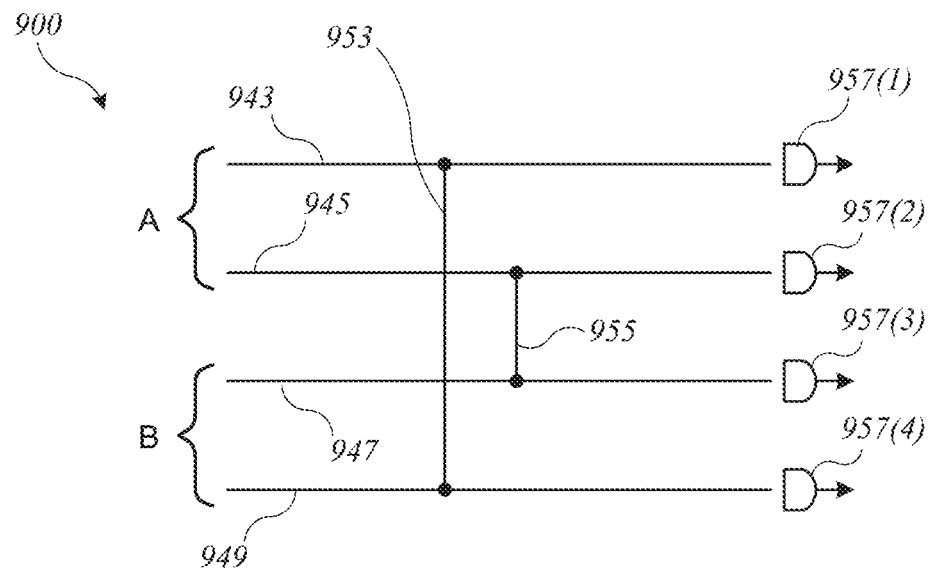
FIG. 9A shows a circuit diagram for a dual-rail-encoded type II fusion gate that can be used in some embodiments.

FIG. 9A shows a circuit diagram illustrating a type II fusion gate 900 in accordance with some embodiments. Like other diagrams herein, the diagram shown in FIG. 9A is schematic with each horizontal line representing a mode of a quantum system, e.g., a photon. In a dual-rail encoding, each pair of modes represents a qubit. In a photonic implementation of the gate the modes in diagrams such as that shown in FIG. 9A can be physically realized using single photons in photonic waveguides. Most generally, a type II fusion gate such as gate 900 takes qubit A (physically realized, e.g., by photon modes 943 and 945) and qubit B (physically realized, e.g., by photon modes 947 and 949) as input and outputs a quantum state that inherits the entanglement with other qubits that were previously entangled with either (or both) of input qubit A or input qubit B. (For type II fusion, if the input quantum states had a total of N qubits between them, the output quantum state has N−2 qubits. This is different from type I fusion where input quantum states having a total of N qubits between them leads to an output quantum state having N−1 qubits.)

Figure 9B:
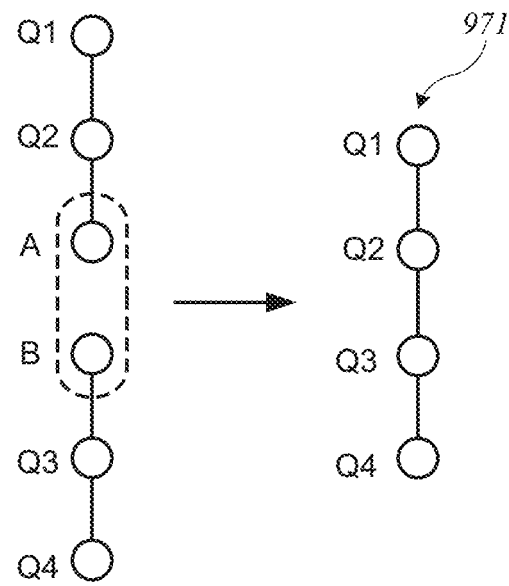
FIG. 9B shows an example result of a type II fusion operation using the gate of FIG. 9A.

For example, FIG. 9B shows the result of type-II fusing of two qubits A and B that are each, respectively, a qubit located at the end (i.e., a leaf) of some longer entangled cluster state (only a portion of which is shown). The resulting quantum system 971 inherits the entangling bonds from qubits A and B thereby creating a larger linear quantum system.

Returning to the schematic illustration of type II fusion gate 900 shown in FIG. 9A, qubit A is dual-rail encoded by modes 943 and 945, and qubit B is dual-rail encoded by modes 947 and 949. For example, in the case of path encoded photonic qubits, the logical zero state of qubit A (denoted $|0\rangle_A$) occurs when mode 943 is a photonic waveguide that includes a single photon and mode 945 is a photonic waveguide that includes zero photons (and likewise for qubit B). Thus, type II fusion gate 900 takes as input two dual-rail-encoded photon qubits thereby resulting in a total of four input modes (e.g., modes 943, 945, 947, and 949). To accomplish the fusion operation, a first mode coupler (e.g., 50/50 beam splitter) 953 is applied between a mode of each of the input qubits, e.g., between mode 943 and mode 949, and a second mode coupler (e.g., 50/50 beam splitter) 955 is applied between the other modes of each of the input qubits, e.g., between modes 945 and 947. A detection operation is performed on all four modes using photon detectors 957(1)-957(4). In some embodiments, mode swap operations (not shown in FIG. 9A) can be performed to place modes in adjacent positions prior to mode coupling. In some embodiments, mode swapping can be accomplished through a physical waveguide crossing as described above or by one or more photonic switches or by any other type of physical mode swap. Mode swaps are optional and are not necessary if qubits having non-adjacent modes can be dealt with, e.g., by tracking which modes belong to which qubits by storing this information in a classical memory.

FIG. 9A shows only an example arrangement for the type II fusion gate and one of ordinary skill will appreciate that the positions of the mode couplers and the presence or absence of mode swap regions can be altered without departing from the scope of the present disclosure.

The type II fusion gate shown in FIG. 9A is a nondeterministic gate, i.e., the fusion operation succeeds with a certain probability less than 1, and in other cases the quantum state that results is not a larger quantum system that comprises the original quantum systems fused together to a larger quantum system. More specifically, the gate "succeeds" in the case where one photon is detected by one of detectors 957(1) and 957(4) and one photon is detected by one of detectors 957(2) and 957(3); in all other cases, the gate "fails." When the gate succeeds, the two quantum systems that qubits A and B were a part of become fused into a single larger quantum system; unlike type-I fusion, no fused qubit remains (compare FIG. 8B and FIG. 9B). When the fusion gate fails, it has the effect of removing both qubits from the original quantum systems without generating a larger quantum system.

Figure 10:
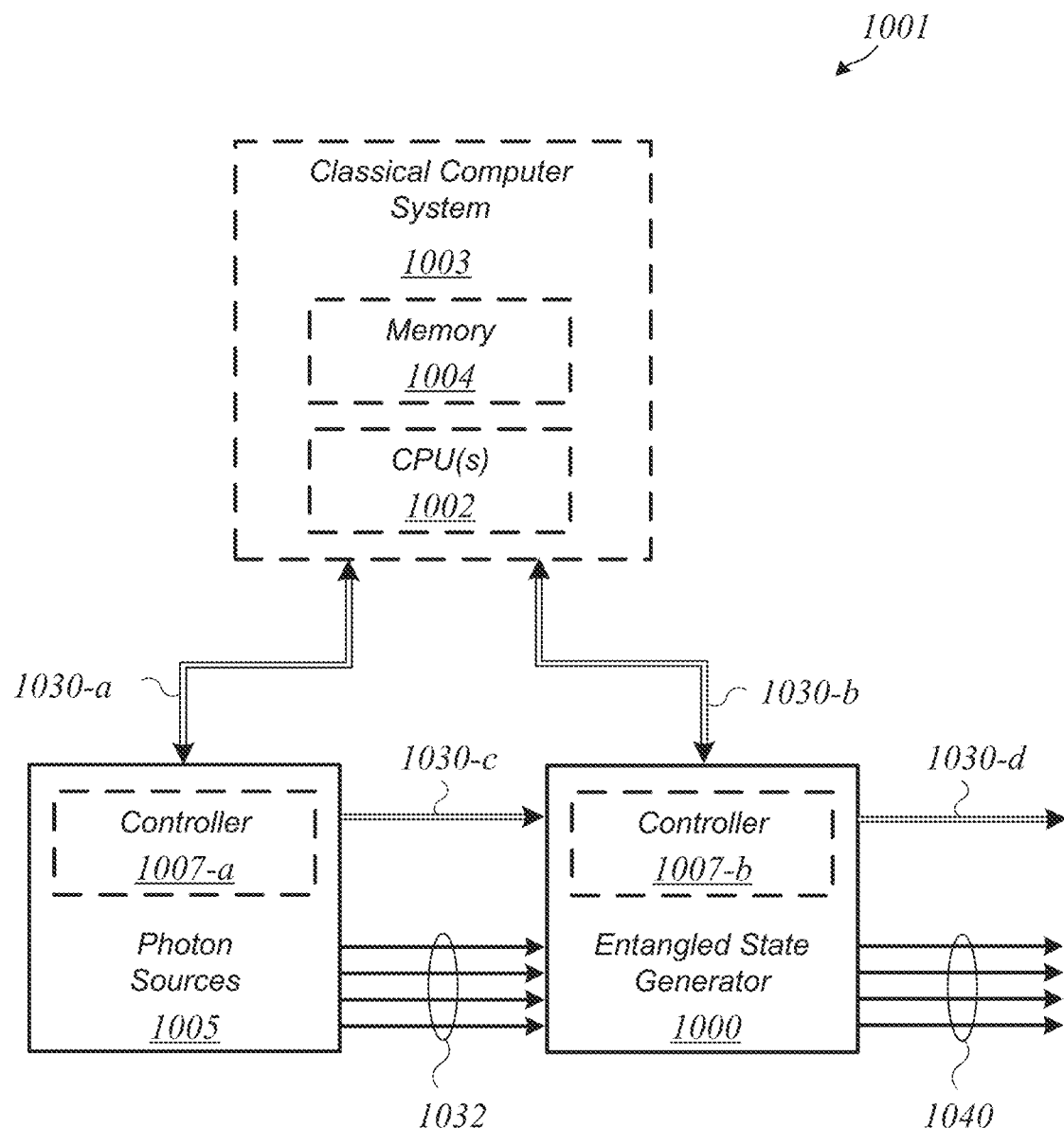
FIG. 10 illustrates an example of a qubit entangling system in accordance with some embodiments.

FIG. 10 illustrates an example of a qubit entangling system 1001 in accordance with some embodiments. Such a system can be used to generate qubits (e.g., photons) in an entangled state (e.g., a GHZ state, Bell pair, and the like), in accordance with some embodiments. In some embodiments, qubit entangling system 1001 can operate as a resource state generator as described below.

In an illustrative photonic architecture, qubit entangling system 1001 can include a photon source module 1005 that is optically connected to entangled state generator 1000. Both the photon source module 1005 and the entangled state generator 1000 may be coupled to a classical processing system 1003 such that the classical processing system 1003 can communicate and/or control (e.g., via the classical information channels 1030a-b) the photon source module 1005 and/or the entangled state generator 1000. Photon source module 1005 may include a collection of single-photon sources that can provide output photons to entangled state generator 1000 by way of interconnecting waveguides 1032. Entangled state generator 1000 may receive the output photons and convert them to one or more entangled photonic states and then output these entangled photonic states into output waveguides 1040. In some embodiments, output waveguide 1040 can be coupled to some downstream quantum photonic circuit that may use the entangled states, e.g., for performing a quantum computation. For example, the entangled states generated by the entangled state generator 1000 may be used as resource states for one or more interleaving modules as described below.

In some embodiments, system 1001 may include classical channels 1030 (e.g., classical channels 1030-a through 1030-d) for interconnecting and providing classical information between components. It should be noted that classical channels 1030-a through 1030-d need not all be the same. For example, classical channel 1030-a through 1030-c may comprise a bi-directional communication bus carrying one or more reference signals, e.g., one or more clock signals, one or more control signals, or any other signal that carries classical information, e.g., heralding signals, photon detector readout signals, and the like.

In some embodiments, qubit entangling system 1001 includes the classical computer system 1003 that communicates with and/or controls the photon source module 1005 and/or the entangled state generator 1000. For example, in some embodiments, classical computer system 1003 can be used to configure one or more circuits, e.g., using a system clock that may be provided to photon sources 1005 and entangled state generator 1000 as well as any downstream quantum photonic circuits used for performing quantum computation. In some embodiments, the quantum photonic circuits can include optical circuits, electrical circuits, or any other types of circuits. In some embodiments, classical computer system 1003 includes memory 1004, one or more processor(s) 1002, a power supply, an input/output (I/O) subsystem, and a communication bus or interconnecting these components. The processor(s) 1002 may execute modules, programs, and/or instructions stored in memory 1004 and thereby perform processing operations.

In some embodiments, memory 1004 stores one or more programs (e.g., sets of instructions) and/or data structures. For example, in some embodiments, entangled state generator 1000 can attempt to produce an entangled state over successive stages, any one of which may be successful in producing an entangled state. In some embodiments, memory 1004 stores one or more programs for determining whether a respective stage was successful and configuring the entangled state generator 1000 accordingly (e.g., by configuring entangled state generator 1000 to switch the photons to an output if the stage was successful, or pass the photons to the next stage of the entangled state generator 1000 if the stage was not yet successful). To that end, in some embodiments, memory 1004 stores detection patterns (described below) from which the classical computing system 1003 may determine whether a stage was successful. In addition, memory 1004 can store settings that are provided to the various configurable components (e.g., switches) described herein that are configured by, e.g., setting one or more phase shifts for the component.

In some embodiments, some or all of the above-described functions may be implemented with hardware circuits on photon source module 1005 and/or entangled state generator 1000. For example, in some embodiments, photon source module 1005 includes one or more controllers 1007-*a* (e.g., logic controllers) (e.g., which may comprise field programmable gate arrays (FPGAs), application specific integrated circuits (ASICS), a "system on a chip" that includes classical processors and memory, or the like). In some embodiments, controller 1007-*a* determines whether photon source module 1005 was successful (e.g., for a given attempt on a given clock cycle, described below) and outputs a reference signal indicating whether photon source module 1005 was successful. For example, in some embodiments, controller 1007-*a* outputs a logical high value to classical channel 1030-*a* and/or classical channel 1030-*c* when photon source module 1005 is successful and outputs a logical low value to classical channel 1030-*a* and/or classical channel 1030-*c* when photon source module 1005 is not successful. In some embodiments, the output of control 1007-*a* may be used to configure hardware in controller 1007-*b*.

Similarly, in some embodiments, entangled state generator 1000 includes one or more controllers 1007-*b* (e.g., logical controllers) (e.g., which may comprise field programmable gate arrays (FPGAs), application specific integrated circuits (ASICS), or the like) that determine whether a respective stage of entangled state generator 1000 has succeeded, perform the switching logic described above, and output a reference signal to classical channels 1030-*b* and/or 1030-*d* to inform other components as to whether the entangled state generator 400 has succeeded.

In some embodiments, a system clock signal can be provided to photon source module 1005 and entangled state generator 1000 via an external source (not shown) or by classical computing system 1003 generates via classical channels 1030-*a* and/or 1030-*b*. In some embodiments, the system clock signal provided to photon source module 1005 triggers photon source module 1005 to attempt to output one photon per waveguide. In some embodiments, the system clock signal provided to entangled state generator 1000 triggers, or gates, sets of detectors in entangled state generator 1000 to attempt to detect photons. For example, in some embodiments, triggering a set of detectors in entangled state generator 1000 to attempt to detect photons includes gating the set of detectors.

It should be noted that, in some embodiments, photon source module 1005 and entangled state generator 1000 may have internal clocks. For example, photon source module 1005 may have an internal clock generated and/or used by controller 1007-*a* and entangled state generator 1000 has an internal clock generated and/or used by controller 1007-*b*. In some embodiments, the internal clock of photon source module 1005 and/or entangled state generator 1000 is synchronized to an external clock (e.g., the system clock provided by classical computer system 1003) (e.g., through a phase-locked loop). In some embodiments, any of the internal clocks may themselves be used as the system clock, e.g., an internal clock of the photon source may be distributed to other components in the system and used as the master/system clock.

In some embodiments, photon source module 1005 includes a plurality of probabilistic photon sources that may be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) may generate zero, one, or more photons. As used herein, the term "attempt" is used to refer to the act of driving a photon source with some sort of driving signal, e.g., a pump pulse, that may produce output photons non-deterministically (i.e., in response to the driving signal, the probability that the photon source will generate one or more photons may be less than 1). In some embodiments, a respective photon source may be most likely to, on a respective attempt, produce zero photons (e.g., there may be a 90% probability of producing zero photons per attempt to produce a single-photon). The second most likely result for an attempt may be production of a single-photon (e.g., there may be a 9% probability of producing a single-photon per attempt to produce a single-photon). The third most likely result for an attempt may be production of two photons (e.g., there may be an approximately 1% probability of producing two photons per attempt to produce a single photon). In some circumstances, there may be less than a 1% probability of producing more than two photons.

In some embodiments, the apparent efficiency of the photon sources may be increased by using a plurality of single-photon sources and multiplexing the outputs of the plurality of photon sources.

The precise type of photon source used is not critical and any type of source can be used, employing any photon generating process, such as spontaneous four wave mixing (SPFW), spontaneous parametric down-conversion (SPDC), or any other process. Other classes of sources that do not necessarily require a nonlinear material can also be employed, such as those that employ atomic and/or artificial atomic systems, e.g., quantum dot sources, color centers in crystals, and the like. In some cases, sources may or may be coupled to photonic cavities, e.g., as can be the case for artificial atomic systems such as quantum dots coupled to cavities. Other types of photon sources also exist for SPWM and SPDC, such as optomechanical systems and the like. In some examples the photon sources can emit multiple photons already in an entangled state in which case the entangled state generator 400 may not be necessary, or alternatively may take the entangled states as input and generate even larger entangled states.

For the sake of illustration, an example which employs spatial multiplexing of several non-deterministic photon sources is described as an example of a MUX photon source. However, many different spatial MUX architectures are possible without departing from the scope of the present disclosure. Temporal MUXing can also be implemented instead of or in combination with spatial multiplexing. MUX schemes that employ log-tree, generalized Mach-Zehnder interferometers, multimode interferometers, chained sources, chained sources with dump-the-pump schemes, asymmetric multi-crystal single photon sources, or any other type of MUX architecture can be used. In some embodiments, the photon source can employ a MUX scheme with quantum feedback control and the like.

The foregoing description provides an example of how photonic circuits can be used to implement physical qubits and operations on physical qubits using mode coupling between waveguides. In these examples, a pair of modes can be used to represent each physical qubit. Examples described below can be implemented using similar photonic circuit elements.

1.4. Fault Tolerance and Logical Qubits

"Quantum computation," as used herein, refers generally to performing a sequence of operations (a "computation") on an ensemble of qubits. Quantum computation is often considered in the framework of "circuit-based quantum computation" (CBQC), in which the operations are specified as a sequence of logical "gates" performed on qubits. Gates can be either single-qubit unitary operations (rotations), two-qubit entangling operations such as the CNOT gate, or other multi-qubit gates such as the Toffoli gate. In the CBQC framework, quantum computations can be modeled as reversible circuits in which a set of input qubits are initialized in known states, then operated on by applying a series of "gates," each of which is a unitary transform operation acting on one or more of the qubits. A measurement of the state of each qubit after applying the last gate yields a result of the computation. Gates used in quantum computing correspond to unitary operators acting on the qubits. Gates can include single-qubit unitary operations (e.g., Pauli rotations, identity gate), two-qubit entangling operations such as the CNOT gate, and other multi-qubit gates such as the three-qubit Toffoli gate. In a commonly-used circuit model of quantum computing, a particular computation can be defined by specifying a number of qubits and a particular sequence of gates. It has been shown that arbitrary quantum computations can be modeled using a finite set of gates that includes Clifford gates (which belong to a mathematical group of unitary transforms that includes Pauli rotations, CNOT gates, and Hadamard transforms), T gates that implement the transform $$T = \begin{pmatrix} 1 & 0 \\ 0 & e^{i\pi/4} \end{pmatrix}$$

and Toffoli gates (which are three-qubit gates analogous to a classical logic gate that negates its third input bit if and only if the first two input bits are both in the logical 1 state). A "general-purpose quantum computer" refers to a quantum computer that is able to execute different quantum computations (or circuits) using the same hardware, for example by applying different sequences of gates to the underlying physical qubits.

A quantum circuit model provides a conceptual framework that can potentially be realized using a variety of physical systems to implement the qubits and gates. However, physical systems implementing qubits and operations on qubits are often non-deterministic and noisy. For example, the photonic Bell state generator and fusion circuits described above can create entanglement between photonic qubits, but they do so non-deterministically, with a probability of success that is considerably less than 1. In addition, the physical systems may be "noisy"; for instance, a waveguide propagating a photon may be somewhat less than perfectly efficient, resulting in occasional loss of photons. For reasons such as these, fault tolerant quantum computing is a desirable goal. In general, fault tolerance entails constructing a "logical qubit" using systems of multiple physical qubits that are entangled in a manner that allows errors to be detected and corrected. Gate operations can then be performed on the logical qubits. One technique for fault tolerance that has been developed uses surface codes, in which many physical qubits are subject to parity-check operations to encode a single logical qubit.

It should be understood that a "qubit" is a unit of information. In some contexts, the term "qubit" refers to a physical system whose state space corresponds to one qubit of information, and in some contexts, the term "qubit" refers to a logical construct (such as a surface code) involving multiple physical qubits that collectively encode one qubit of information in a fault-tolerant manner. Where the context may leave the meaning ambiguous, the present disclosure uses the term "physical qubit" to refer to a physical system and "logical qubit" to refer to the fault-tolerant construct. A "measurement" operation on a logical qubit generally involves measuring the underlying physical qubits and analyzing the result (e.g., using a decoder algorithm) to extract a qubit of information.

1.5. Surface Code Quantum Computing

Figure 11A:
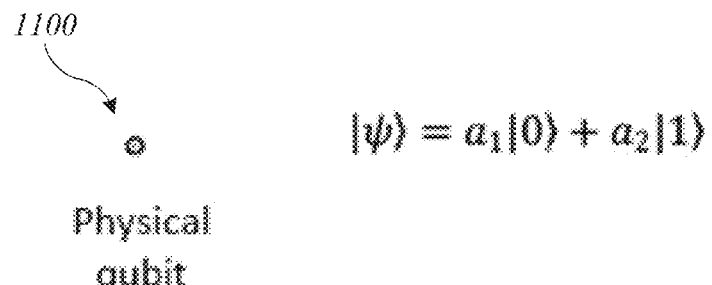
Figure 11B:
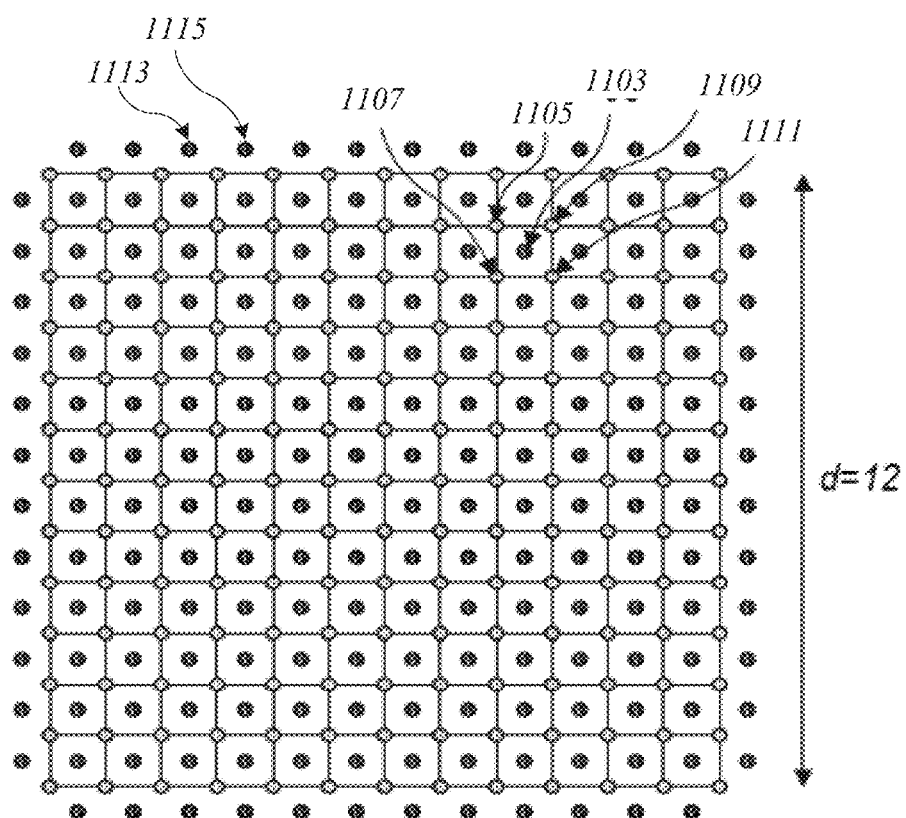

A single physical qubit (such as the 2-level physical qubit 1100 illustrated in FIG. 11A with a quantum state $|\psi\rangle = a_1|0\rangle + a_2|1\rangle$ ) may be used for quantum computation. However, individual physical qubits are generally highly susceptible to noise and decoherence. Fault-tolerant quantum computing utilizes a plurality of entangled physical qubits to encode a single logical qubit to mitigate the frailty and/or short coherence times of individual physical qubits. In fault-tolerant quantum computing schemes, a plurality of physical qubits such as those illustrated in FIG. 11B are mutually entangled according to a specific error correcting code to produce a single logical qubit that is less susceptible to noise and decoherence. Encoding qubits in this manner causes the resultant logical qubit to be less sensitive to error and noise, and resultant errors may be dealt with via quantum error correction.

In some quantum computing methodologies, such as the fusion-based quantum computing described herein and circuit-based quantum computing, a logical qubit is encoded from a plurality of physical qubits using a sequence of specific measurements (e.g., stabilizer measurements). The measurement sequence may be constructed where a subset of the physical qubits is measured (e.g., producing classical information in the form of the measurement result) in such a way that the remaining unmeasured/un-collapsed degrees of freedom (e.g., a 2-dimensional subspace which has support over all the physical qubits) form the desired encoded logical qubit. Accordingly, the processes of performing stabilizer measurements and/or encoding a fault-tolerant logical qubit may receive a plurality of physical qubits as input and as output may produce both the encoded logical qubit and classical information (e.g., syndrome graph data) resulting from the measurement sequence.

In some quantum computing implementations, the classical information takes the form of syndrome graph data, where the syndrome graph is a geometric representation of the outcomes of the measurement sequence. Because the input physical qubits are prepared in an initial state and measured according to a predetermined measurement sequence, it may be determined how the syndrome should appear in the absence of any errors involving the physical qubits during the measurement sequence (e.g., Pauli or erasure errors). Accordingly, any deviation of the syndrome graph data from the expected result may be indicative of one or more errors within the logical qubit. In general, these deviations may not indicate precisely which measurement(s) had an error, or which type of error has occurred, as there may be more than one type of error or combination of errors that is consistent with a given observed deviation from the anticipated error-free syndrome graph. For example, a syndrome graph may be determined as a grid of parity checks for adjacent nodes of the grid, whereby a parity error may indicate that one or more of the adjacent nodes had an error, but the parity error may not indicate precisely which adjacent node had an error, or which error occurred.

As used herein, the term "syndrome graph data" refers to a set of classical information (e.g., data represented by digital values such as ones and zeros) that specifies the location of one or more syndromes and/or one or more erasure errors within the syndrome graph of a logical block. A series of measurements (e.g., stabilizer measurements) are applied to the physical qubits of the error correcting code containing the encoded logical information, producing measurement outcomes as classical information. As described in further detail below, based on the knowledge of the particular geometry of the error correcting code, these measurement outcomes may be used to determine classical data referred to herein as the "syndrome graph data."

Errors that occur during operations on an encoded logical qubit may have varying degrees of severity. For example, errors in a fault-tolerant logical qubit may cause logical failure if they link up in a way that spans the syndrome graph of the logical qubit.

FIG. 11B shows an arrangement of physical qubits, including qubits 1103, 1105, 1107, 1109, 1111, that can be used to encode a fault-tolerant logical qubit using a surface code according to one or more embodiments. In FIG. 111B, the solid grid lines are guides to the eye and form an array of squares, also referred to herein as a "surface code," with physical "data qubits" (e.g., qubits 1105, 1107, 1109, 1111) disposed on the four vertices of each square and physical "measure qubits" (e.g., qubit 1103) disposed on the face of each square. As used herein, measure qubits are the physical qubits which are measured to perform the stabilizer measurements (also referred to herein as "parity checks") on adjacent data qubits without directly measuring the data qubits and collapsing the quantum information. In this example the surface code has a length (or more precisely, a "code distance") d of 12, but any length can be employed. The surface code arrangement of qubits also includes four lines of boundary measure qubits (e.g., qubits 1113, 1115) disposed adjacent to the outermost lines of data qubits. Each square is referred to herein as a plaquette. Within the bulk of the surface code (i.e., the plaquettes which don't form the outer boundary of the code) each data qubit may be coupled, via 4 two-qubit gates (not shown in FIG. 11B), to its 4 nearest neighbor measure qubits (each on four different plaquettes) and likewise, each measure qubit may be coupled, via 4 two-qubit gates to its 4 nearest neighbor data qubits. On the boundaries of the code, each boundary measure qubit may be coupled, via two two-qubit gates (not shown in FIG. 111B) to its nearest adjacent data qubits. According to one or more embodiments, the two-qubit gates can be CNOT gates, CZ gates, and the like.

In order to operate the collection of data and measure qubits as a logical qubit that is protected against errors, the following set of measurements may be repetitively performed on the system. For each plaquette within the bulk of the surface code, 4-qubit stabilizers are measured. For example, as shown in FIG. 11D, if the data qubits of a given plaquette (e.g., data qubits 1105-1111 in FIG. 111B) are labeled 1, 2, 3, 4 and the measure qubit (e.g., measure qubit 1103 in FIG. 111B) is labeled a, the stabilizer to be measured on that plaquette can be $X_1Z_2Z_3X_4$. The "quantum circuit" (which is a term that refers to the sequence of gates and measurement operations to be performed on physical qubits) used to implement this stabilizer measurement is also shown as circuit 1121 in FIG. 11D and includes first initializing the measure qubit a in the |+⟩ state, then performing the following gates: a CNOT gate 1122 between the measure qubit a and data qubit 1, respective CZ gates 1123, 1124 between the measure qubit a and qubit 2 and qubit 3, and a CNOT gate Z125 between the measure qubit a and qubit 4; followed by an X-basis measurement Mx of measure qubit a. The resulting measurement outcome (which takes the form of a classical bit, e.g., 0 or 1 or −1 or 1, depending on the choice of conventions) is equal to the outcome of the measurement of the parity check stabilizer $X_1Z_2Z_3X_4$ and becomes part of the syndrome graph. For the plaquettes found at the boundary of the surface code, examples of which are shown in FIG. 11E, a two-qubit stabilizer of the form $Z_1X_2$ is measured. The quantum circuit 1131 used to implement this two-qubit stabilizer measurement is also shown in FIG. 11E and includes first initializing the boundary measure qubit a in the |+⟩ state, then performing the following gates: a CZ gate 1132 between the measure qubit a and qubit 1; and a CNOT gate 1133 between the measure qubit and qubit 2; followed by an X-basis measurement Mx of measure qubit a. In the example surface code 1140 shown in FIG. 11C, there are two different types of boundaries depending on whether the boundary includes shaded plaquettes (e.g., at the top and bottom edges in the figure as drawn) or unshaded plaquettes (e.g., at the left and right edges in the figure). A boundary surface that includes shaded plaquettes is referred to as a "dual boundary surface" and measurements including measure qubits within the dual boundary surface contribute to the "dual syndrome graph." Similarly, a boundary surface that includes unshaded plaquettes is referred to herein as a "primal boundary surface," and measurements including measure qubits within a primal boundary surface contribute to the "primal syndrome graph."

Figure 11C:
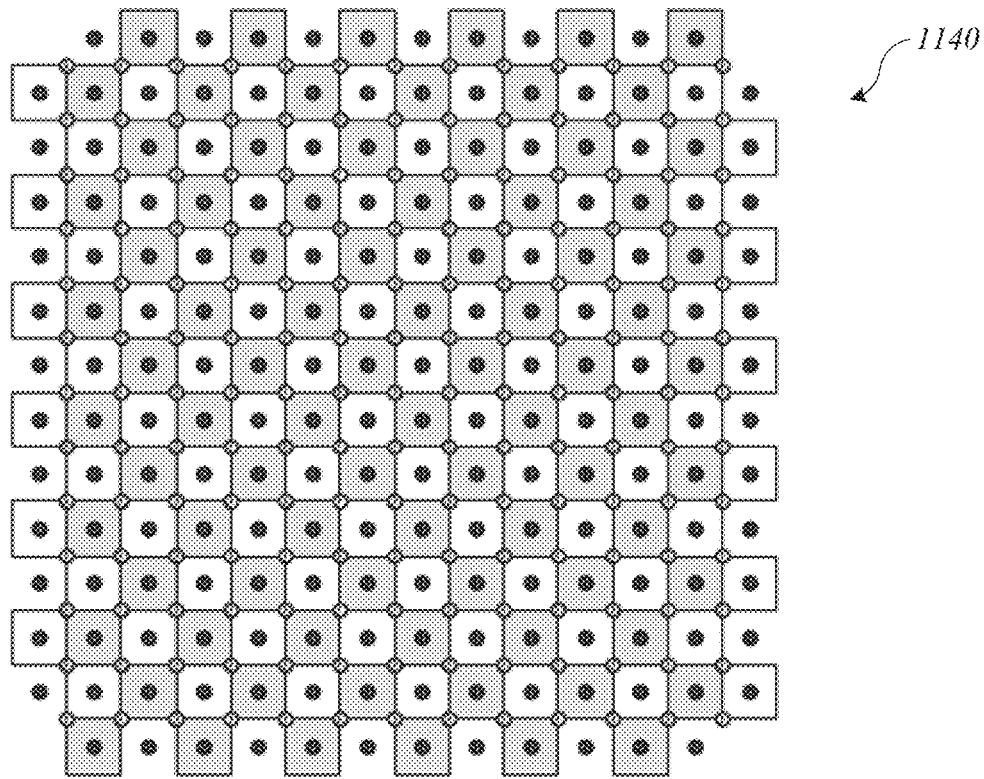
Figure 11D:
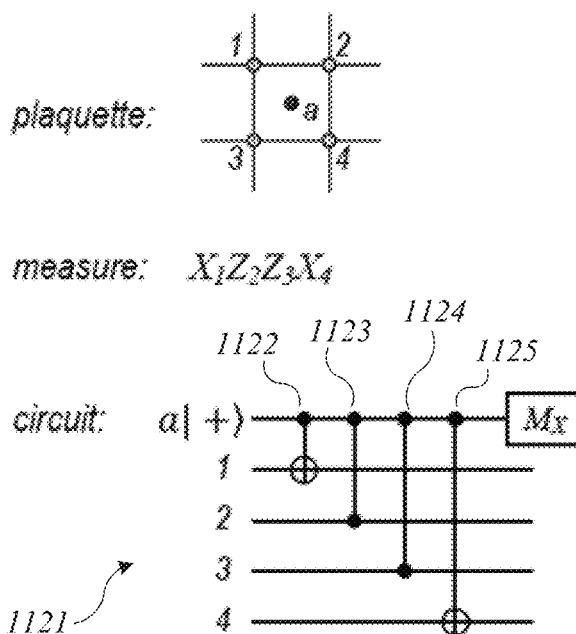
Figure 11E:
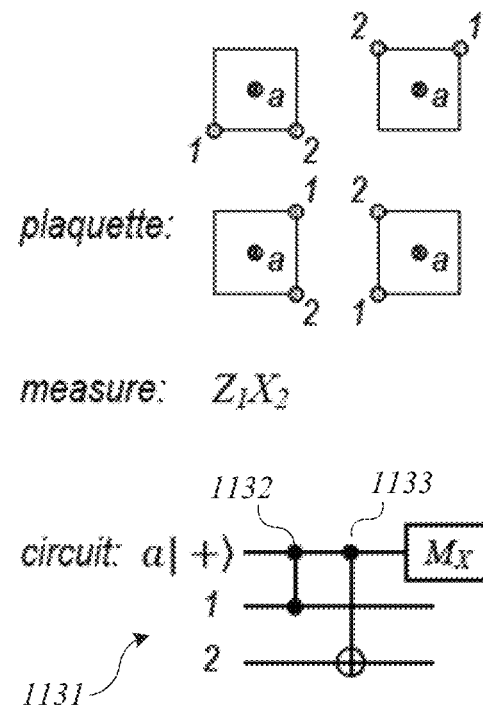

In order to implement the surface code scheme shown in FIG. 11C-11E, the plaquette measurements may be broken into two groups of measurements: a first group of measurements that measures the stabilizers associated with the shaded plaquettes during a first duration of time and a second group of measurements that measures the stabilizers with the unshaded plaquettes during a second duration of time. These two sets of measurements are performed in different times to ensure that each qubit only participates in one quantum gate at a time. One of ordinary skill in the art will appreciate that any gates that can commute with one another may be performed in the same time step, or even simultaneously, if desired. The classical data generated by each one of these measurements, referred to herein as "syndrome graph data," is then passed to a decoder for quantum error correction according to known methods, e.g., using union find decoding, minimum weight perfect matching or any other decoding process.

One of ordinary skill will appreciate that the example shown in FIGS. 11C-11E is based on a particular choice of local basis for the surface code and that other choices for the basis may be employed. For example, in some contexts, taking certain assumptions on the likely form of the errors that may occur on the underlying data and measure qubits, one may apply a single qubit gate to each data qubit to obtain a modified surface code. One may modify the basis for each check to obtain a scheme for the modified code. One example includes the CSS (Calderbank, Shor, Steane) version, where stabilizer measurements are either x-type or z-type. To obtain this version of the surface code, the stabilizers are conjugated by a Hadamard H: $X \rightarrow Z$, $Z \rightarrow X$ on half the data qubits in a bipartition, thereby resulting in the CSS surface code. Note that the measurement schedule described above remains the same, but the stabilizers are somewhat different, as summarized in FIG. 11F.

If the above-described surface code measurement schedule is applied for numerous time steps, the system of entangled physical qubits effectively acts as a fault-tolerant quantum memory for the logical qubit encoded by the underlying surface code or, viewed another way, as a fault-tolerant logical identity gate on the logical qubit that is encoded by the underlying surface code. Viewed yet another way, this process operates as a fault-tolerant logical channel.

Figure 11G:
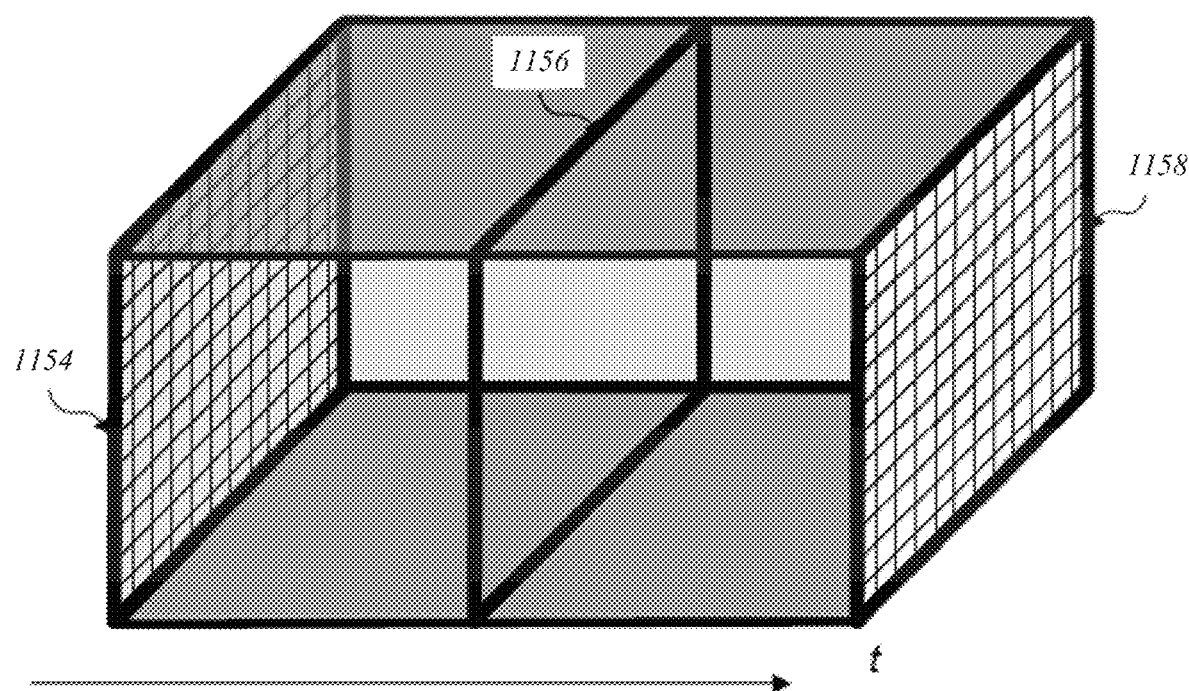

FIG. 11G illustrates a 3-dimensional graphical depiction of such a fault-tolerant logical identity gate. The surface labeled 1154 is the input port to the gate and includes an arbitrary logical state encoded in a surface code, represented as the input checkerboard surface. Likewise, the surface labeled 1158 identifies the output qubits after the identity gate I has been applied to it. The input and output surfaces, which may be associated with the physical 2D arrangement of data and measure qubits described above, are connected to each other via an intervening volume that represents the unique set of measurements to be applied over time as described above in reference to FIG. 11C-11E. Accordingly, in FIG. 11G, time flows from left to right and the lighter shaded (front and back) and darker shaded (top and bottom) sides of the boundaries of the volume depict whether the primal or dual plaquettes are disposed on that boundary as described above in reference to FIG. 11C-11E. For convenience of description, a graphical depiction of a fault-tolerant gate such as the identity gate in FIG. 11G can be associated with cardinal directions referred to as North-South (N-S), East-West (E-W), and Up-Down (U-D), with time flowing "upward" along the U-D axis and the north, south, east, and west directions corresponding to the boundaries of the volume. Such directional references are not to be understood as implying an acutal spatial arrangement of physical qubits or circuit components.

Figure 11H:
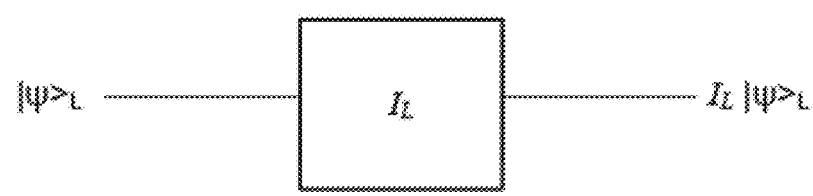

FIG. 11H represents the same concept (an identity gate) but written in a more familiar quantum circuit notation illustrating the analogy between surface codes and the more familiar quantum circuit. While FIG. 11G shows the logical identity gate, any gate can be depicted in this manner and such a depiction is one example of a "logical block" that specifies a set of instructions to be performed on the underlying surface code qubits to perform a logical operation (the identity gate in this example) on the logical qubit that is encoded by surface code. Other examples of such gates are the S gate, the Hadamard gate, and the CX gate, among other possibilities. Other examples of logical blocks that can be used to compose arbitrary logical gates are described below with reference to FIGS. 20A-20E.

The sequence of measurements performed over the flow of time illustrated in FIG. 11G (e.g., a sequence of measurements including the circuit measurements shown in FIGS. 11C-11E) may include a subset of measurements that incur a logical error (e.g., a Pauli error) or an erasure error. To identify errors in the measurement outcomes, syndrome graph data may be generated from the collection of measurement outcomes resulting from the measurements of the physical qubits. For example, the bit values associated with a plurality of edge qubits may be combined to create a syndrome value associated with an adjacent vertex that results from the intersection of the respective edges, e.g., the result of the measurements shown in FIGS. 11D and 11E. A set of syndrome values (or "syndromes"), also referred to herein as parity checks, may be associated with each vertex of the syndrome graph. The parity check values may be found by computing the parity of the bit values associated with each edge of the syndrome graph incident to the vertex. In some embodiments, a parity computation entails determining whether the sum of the edge values is an even or odd integer, with the parity result being the result of the sum modulo 2. If no errors have occurred in the quantum state or in the qubit measurements, then all syndrome values should be even (or 0). On the contrary, if an error occurs, it may result in some odd (or 1) syndrome values.

In some embodiments, half of the bit values from the qubit measurements are associated with the primal boundary surfaces, and this syndrome graph is referred to herein as the "primal graph." The syndrome graph resulting from measurements on the dual boundary surfaces is referred to as the "dual graph." There is generally an equivalent decoding problem on the syndrome values of the primal and dual graphs.

Surface codes can be implemented using a qubit entangling system, e.g., the system of FIG. 10 described above, to generate entangled systems of physical qubits. In some embodiments, an entangled system of multiple physical qubits can be mapped to one or more "logical qubits," and operations associated with a quantum computation can be defined as logical operations on logical qubits, which in turn can be mapped to physical operations on physical qubits. In general, the term "qubit," when used herein without specifying physical or logical qubit, should be understood as referring to a physical qubit.

Those skilled in the art will appreciate that the foregoing examples of surface codes and stabilizers are illustrative of topological codes that can be used for quantum error correction, with different topological codes using different stabilizers applied to different numbers and combinations of physical qubits. Accordingly, while surface codes are used herein for purposes of illustration, systems and methods described herein are not limited to surface codes or to any particular stabilizers and can be implemented in connection with other topological codes, including toric codes, color codes, and so on.

1.6. Overview of Fusion-Based Quantum Computing (FBQC)

Fusion-based quantum computing (FBQC) is a technique for implementing surface-code quantum computing that is well suited to systems where the physical qubits are implemented using photons. In FBQC, a large number of "resource states" is generated, where each resource state includes a small number (e.g., around 6 to 30) of entangled qubits. By performing projective entangling measurements (e.g., Type II fusion as described above) on qubits of different resource states, the same parity-check measurements as in conventional surface code implementations can be obtained, without the need to construct or maintain large entangled systems of physical qubits.

To understand FBQC, it is useful to first consider measurement-based quantum computing (MBQC), which is an approach to implementing quantum computing that allows for fault-tolerance. In MBQC, computation proceeds by first preparing a particular entangled state of many physical qubits, commonly referred to as a "cluster state," then carrying out a series of single-qubit measurements to enact (or execute) the quantum computation. For instance, rather than implementing a sequence of gates operating on one or two physical qubits, a subset of the physical qubits in the cluster state can be mapped to a "logical" qubit, and a gate operation on logical qubits can be mapped to a particular set of measurements on physical qubits associated with one or more logical qubits. Entanglement between the physical qubits results in expected correlations among measurements on different physical qubits, which enables error correction. The cluster state can be prepared in a manner that is not specific to a particular computation (other than, perhaps, the size of the cluster state), and the choice of single-qubit measurements is determined by the particular computation. In the MBQC approach, fault tolerance can be achieved by careful design of the cluster state and by using the topology of the cluster state to encode logical qubits in a manner that protects against any logical errors that may be caused by errors on any of the physical qubits that make up the cluster state. The value (or state) of the logical qubit(s) can be determined, i.e., read out, based on the results (also referred to herein as measurement outcomes) of the single-particle measurements that are made on the cluster state's physical qubits as the computation proceeds.

For example, a cluster state suitable for MBQC can be defined by preparing a collection of physical qubits in a particular state (sometimes referred to as the |+⟩ state) and applying a controlled-phase gate (sometimes referred to as a "CZ gate") between pairs of physical qubits to generate the cluster state. Graphically, a cluster state formed in this manner can be represented by a graph with vertices representing the physical qubits and edges that represent entanglement (e.g., the application of CZ gates) between pairs of qubits. The graph can be a three-dimensional graph having a regular structure formed from repeating unit cells and is sometimes referred to as a "lattice." One example of a lattice is the Raussendorf lattice, which is described in detail in R. Raussendorf et al., "Fault-Tolerant One-Way Quantum Computer," *Annals of Physics* 321(9):2242-2270 (2006). In such representations, two-dimensional boundaries of the lattice can be identified. Qubits belonging to those boundaries are referred to as "boundary qubits" while all other qubits are referred to as "bulk qubits." Other cluster state structures can also be used. Logical operations are performed by making single-qubit measurements on qubits of the cluster state, with each measurement being made in a particular logical basis that is selected according to the particular quantum computation to be performed. The collection of measurement results across the cluster state can be interpreted as the result of a quantum computation on a set of logical qubits through the use of a decoder. Numerous examples of decoder algorithms are available, including the Union-Find decoder as described in International Patent Application Publication No. WO 2019/002934 A1.

However, the generation and maintenance of long-range entanglement across the cluster state and subsequent storage of large cluster states can be a challenge. For example, for any physical implementation of the MBQC approach, a cluster state containing many thousands, or more, of mutually entangled qubits must be prepared and then stored for some period of time before the single-qubit measurements are performed.

"Fusion-based quantum computing" (FBQC) is a technique related to MBQC in that a computation on a set of logical qubits can be defined as a set of measurements on a (generally much larger) number of physical qubits, with correlations among measurement results on the physical qubits enabling error correction. FBQC, however, avoids the need to first create, then subsequently manipulate, a large cluster state. In a photonic implementation of FBQC, entangled states consisting of a few physical qubits (referred to as "resource states") are periodically generated and transported (via waveguides) to circuits that can perform measurement operations (e.g., type II fusion operations as described above, which can provide two-qubit measurements, and/or single-qubit measurements). The measurements destroy the measured qubits; however, the quantum information is preserved as it is transferred (teleported) to other qubits of other resource states. Thus, quantum information is not stored in a static array of physical qubits but is instead periodically teleported to freshly generated physical qubits.

In FBQC, somewhat similarly to MBQC, a computation can be mapped to an undirected graph, referred to as a fusion graph, that can have a lattice-like structure. The fusion graph can define operations to be performed on the physical qubits of the resource states, including fusion operations on selected qubits of different resource states (e.g., in the "bulk" region of a lattice) and individual qubit measurements (e.g., at boundaries of the lattice). Examples of FBQC techniques are described in WO 2021/155289, "Fusion Based Quantum Computing," published Aug. 5, 2021. This section provides a conceptual description of FBQC, to provide context for interleaving modules and other hardware components described below.

1.6.1. Resource States

As noted, FBQC can use a "resource state" as a basic physical element to implement quantum computations. As used herein, a "resource state" refers to an entangled system of a number (n) of physical qubits in a non-separable entangled state (which is an entangled state that cannot be decomposed into smaller separate entangled states). In various embodiments, the number n can be a small number (e.g., between 3 and 30), although larger numbers are not precluded.

Figure 12:
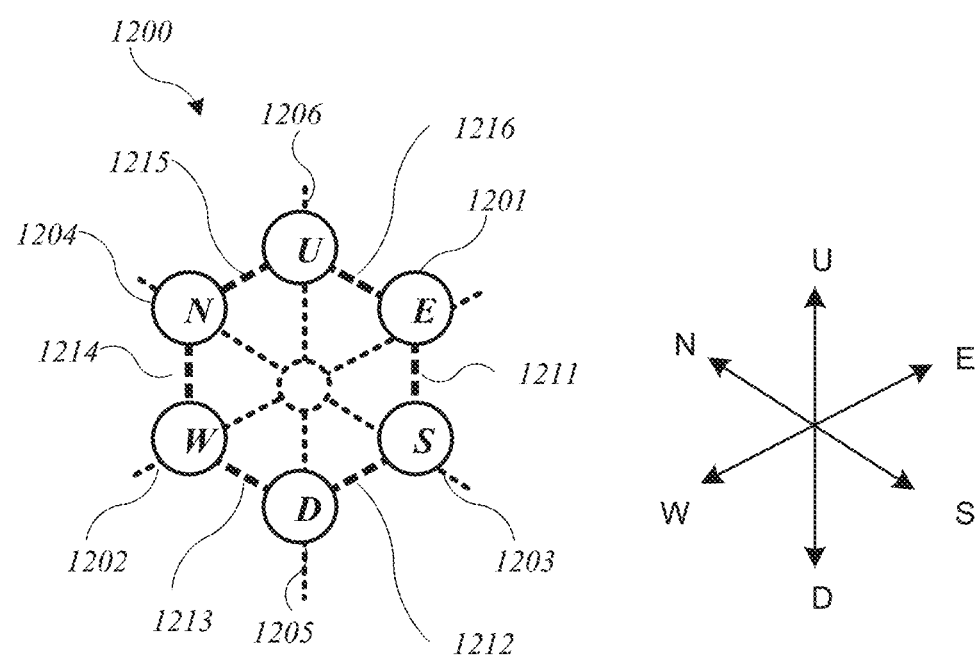
FIG. 12 shows a graph representation of a resource state that can be used in fusion-based quantum computing according to some embodiments.

FIG. 12 shows a graph representation of a resource state 1200 that can be used according to some embodiments. In the graph representation of FIG. 12, each physical qubit 1201-1206 of resource state 1200 is represented as a circle, and entanglement between physical qubits is represented by lines 1211-1216 connecting pairs of qubits. Resource state 1200 is sometimes referred to as a "6-ring" resource state. In examples used herein, the entanglement geometry defines a three-dimensional space. For convenience, the cardinal directions in the entanglement space are referred to as North-South (N-S), East-West (E-W), and Up-Down (U-D). Resource state 1200 has one qubit associated with each cardinal direction (N, S, U, D, E, W) in the entanglement space. It should be understood that the directional labels refer to entanglement space and need not correspond to physical dimensions or directions in physical space. Further, in some instances qubits may be separated in time rather than in spatial dimensions. For example, each physical qubit can be implemented using photons propagating in waveguides, and a particular section of waveguide may propagate photons associated with different qubits at different times.

In some embodiments, resource state 1200 can be generated using photon sources and entanglement circuits of the kind described above. For example, Bell pairs can be generated using one or more photon sources (which can be MUX photon sources as described above) and a circuit such as circuit 700 of FIG. 7. A 3-GHZ state can be generated from two Bell pairs using a circuit such as type-I fusion 800 of FIG. 8A. From a set of six 3-GHZ states, 6-ring resource state 1200 can be formed using a circuit such as type-II fusion circuit 900 of FIG. 9A. As noted above, entanglement-generating circuits such as Bell state generator circuit 700 and fusion circuits 800 and 900 may operate non-deterministically. In some implementations, outputs of several such circuits can be multiplexed using temporal and/or spatial multiplexing techniques to increase the probability of producing a resource state.

Resource state 1200 is illustrative and not limiting. In some embodiments, the entanglement geometry of a resource state can be chosen based on a particular computation to be executed, and different resource states that are used in the same computation can have different entanglement geometries. Further, while resource state 1200 includes six qubits, the number of qubits in a resource state can also be varied. Accordingly, a resource state may be larger or smaller than the example shown. The circuitry used to generate a resource state can also be varied, depending on the particular entanglement geometry and/or the probability of success of various entanglement-generating operations. Error correcting codes may also be constructed to account for a nonzero probability of a resource state not being generated.

1.6.2. Logical Operations

Figure 13A:
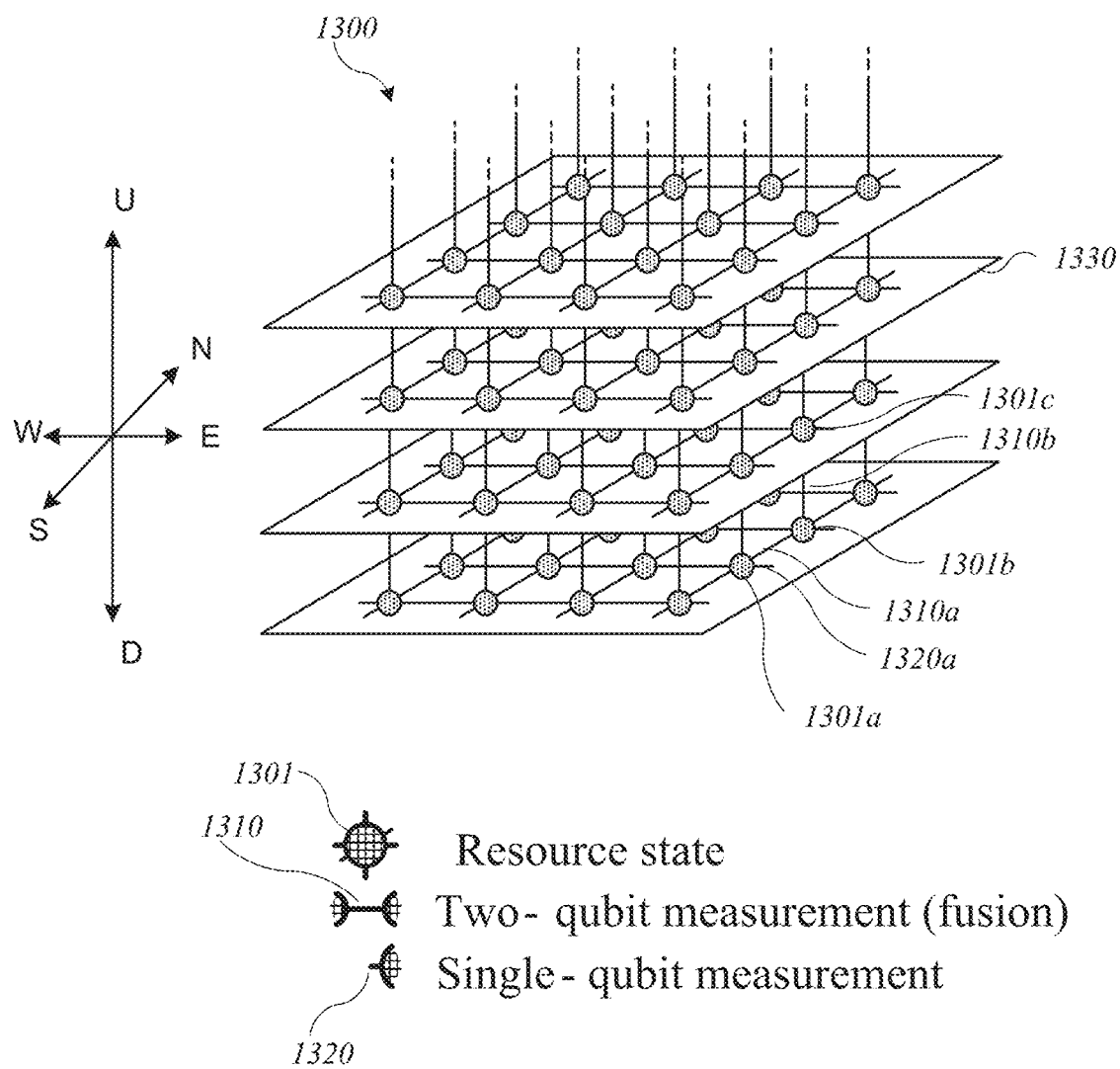
FIG. 13A shows an example of a fusion graph that can be used in some embodiments.

Operations to be performed on qubits of resource states in connection with FBQC can be represented conceptually using a fusion graph. FIG. 13A shows an example of a fusion graph 1300 according to some embodiments. The same three-dimensional entanglement space defined in FIG. 12 is used, with the same N-S, E-W, U-D naming convention (which need not correspond to any physical dimension or direction). However, unlike in FIG. 12, each vertex 1301 represents a resource state (e.g., 6-ring resource state 1200) rather than an individual qubit. Each vertex 1301 represents a physically distinct instance of the resource state. Each edge 1310 connecting two vertices 1301 corresponds to a fusion operation between qubits of different resource states. Each fusion operation can be, e.g., a type II fusion operation as described above that produces a two-qubit measurement. The particular qubits involved can be identified from the direction of the edges in the entanglement space. Thus, for example, edge 1310*a* corresponds to a fusion operation between the N qubit of a resource state represented by vertex 1301*a* and the S qubit of a (different) resource state represented by vertex 1301*b*, while edge 1310*b* corresponds to a fusion operation between the U qubit of the resource state represented by vertex 1301*b* and the D qubit of a (third) resource state represented by vertex 1301*c*. Each half-edge 1320 (a "half-edge" is connected to only one vertex 1301) represents a single-qubit measurement on the corresponding qubit of the resource state represented by that vertex 1301. Thus, for example, half-edge 1320*a* corresponds to a single-qubit measurement on the E qubit of the resource state represented by vertex 1301*a*.

In some embodiments, a fusion graph such as fusion graph 1300 can be viewed as a series of "layers" 1330, where each layer corresponds to a coordinate on the U-D axis. Implementing FBQC in a physical system can include successively generating resource states for each layer (e.g., in the direction from D to U) and performing the fusion and single-qubit measurement operations within each layer as specified by the edges and half-edges of the graph for that layer. As resource states for successive layers are generated, fusion operations can be performed between the U qubits of resource states in one layer and the D qubits of resource states in corresponding position of the next layer. In the description that follows, fusion operations may be referred to as "spacelike" or "timelike." This terminology is evocative of particular implementations in which different qubits or resource states are generated or received at different times: spacelike fusion can be performed between qubits generated or received at the same time using different instances of hardware, while timelike fusion can be performed between qubits generated or received at different times using the same instance of hardware (or different instances of hardware). For photonic qubits, timelike fusion can be implemented by delaying an earlier-produced qubit (e.g., using additional lengths of waveguide material to create a longer propagation path for the photon), thereby allowing mode coupling with a later-produced qubit. By leveraging timelike fusion, the same hardware can be used to generate and/or process multiple instances of the resource states within a layer and/or to generate multiple layers of resource states. Examples are described below.

In some encoding schemes for sequences of operations on logical qubits, a logical qubit that is "at rest" (i.e., not interacting with other logical qubits or otherwise being operated on) can be mapped onto a fusion graph having a regular lattice pattern as shown in FIG. 13A. For the 6-ring resource state of FIG. 12, each resource state in the bulk of the lattice has each of its six qubits fused with a qubit of a neighboring resource state. (Two qubits that are input to a type II fusion circuit are sometimes colloquially described as being "fused with" each other.) For instance, E qubit 1201 of a first instance of resource state 1200 and W qubit 1202 of a second instance of resource state 1200 can be input into a fusion circuit (e.g., the type II fusion circuit of FIG. 9A), resulting in a two-qubit measurement. At the boundaries of the lattice, qubits that are not subject to fusion operations can be subject to single-qubit measurements.

Logical operations on logical qubits can be specified by modifying the regular lattice pattern of a fusion graph at selected positions, e.g., by replacing single-qubit measurements with fusion operations or vice versa. The choice of modifications depends on the particular computation to be performed. Some examples will now be described.

Figure 13B:
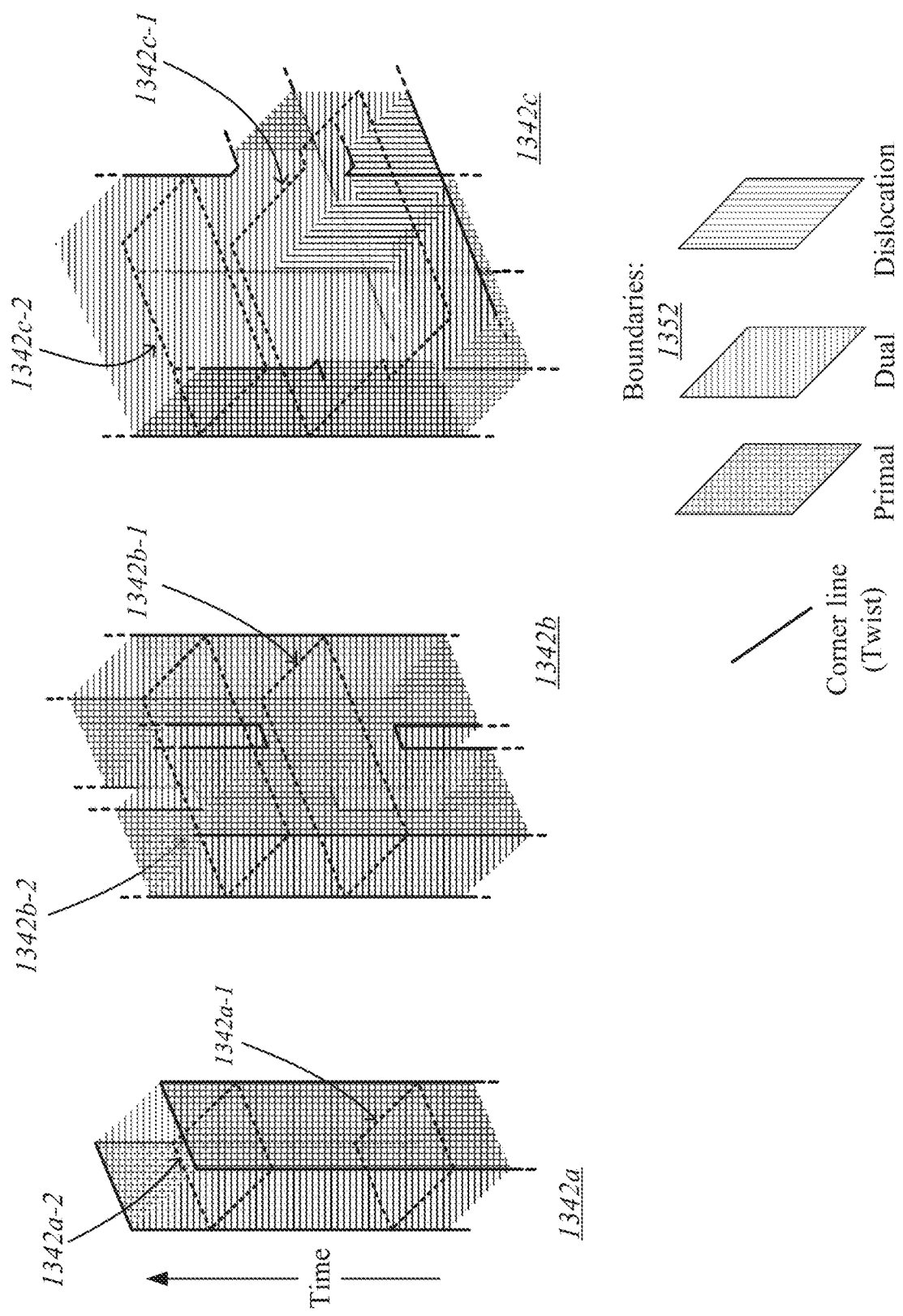
FIGS. 13B-13D shows examples of how fusion graphs (shown in FIG. 13D) can be generated from surface-code spacetime diagrams (shown in FIG. 13B) and time-slice diagrams (shown in FIG. 13C) for various logical operations on logical qubits.
Figure 13C:
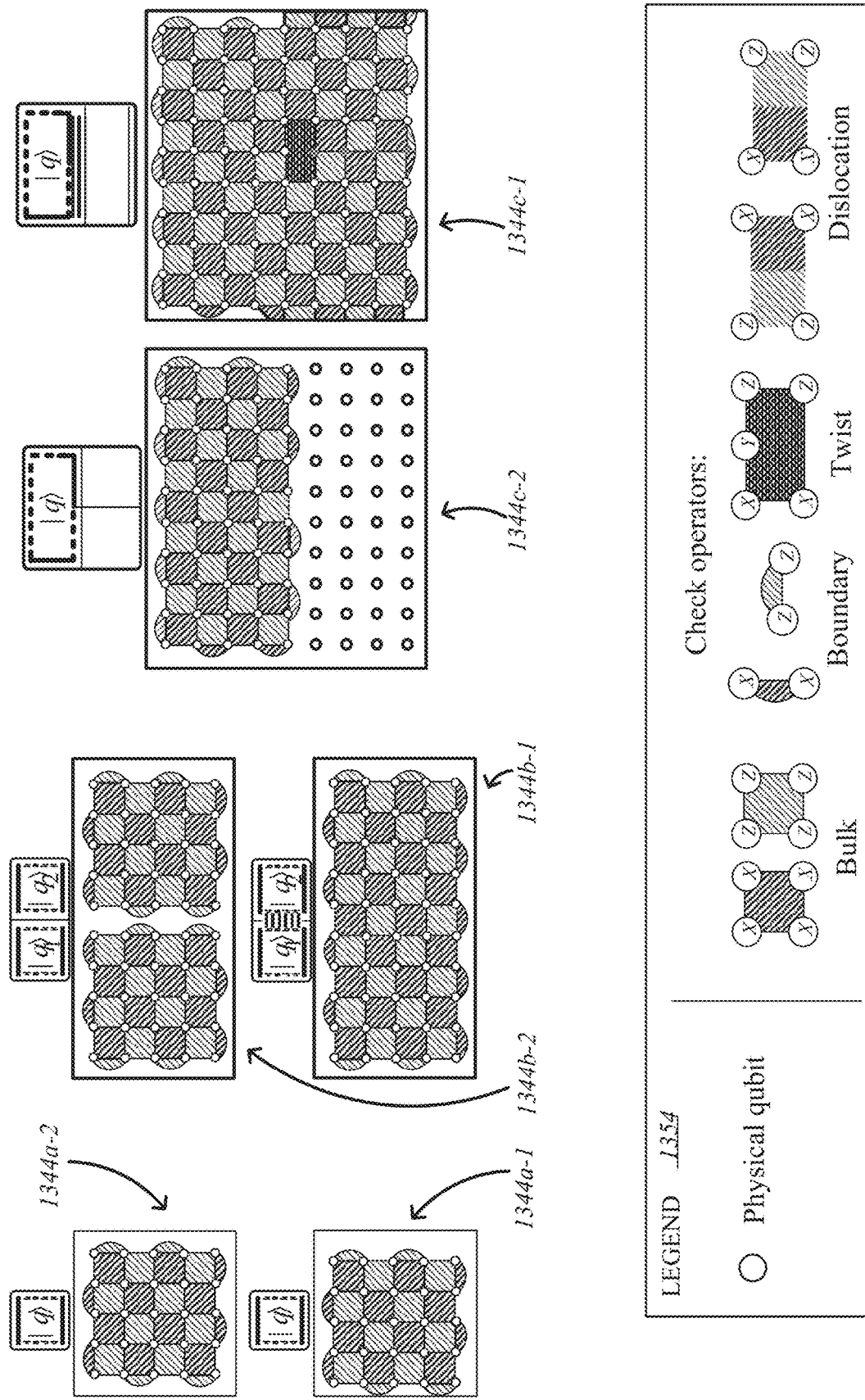
Figure 13D:
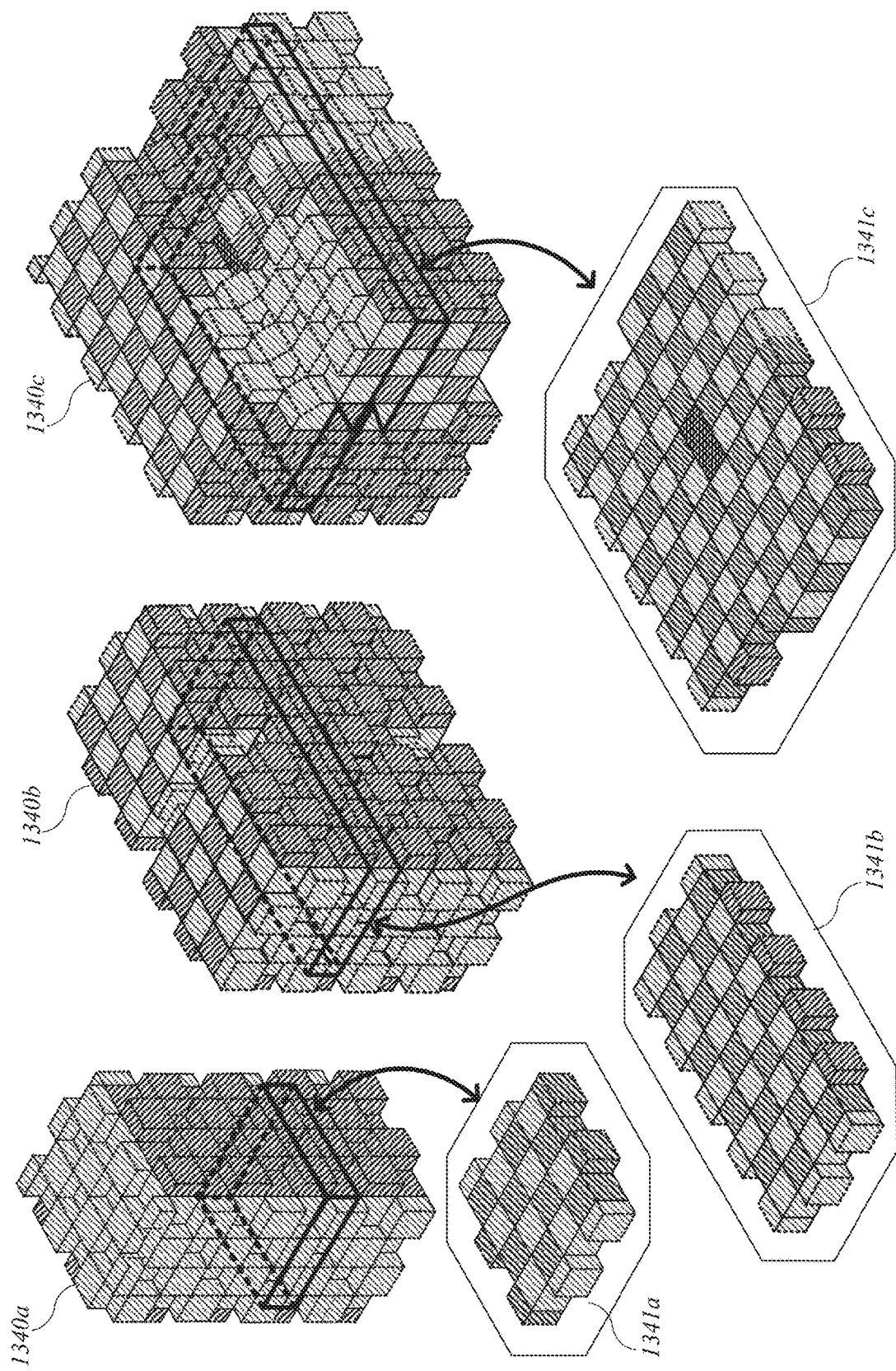
Figure 13E:
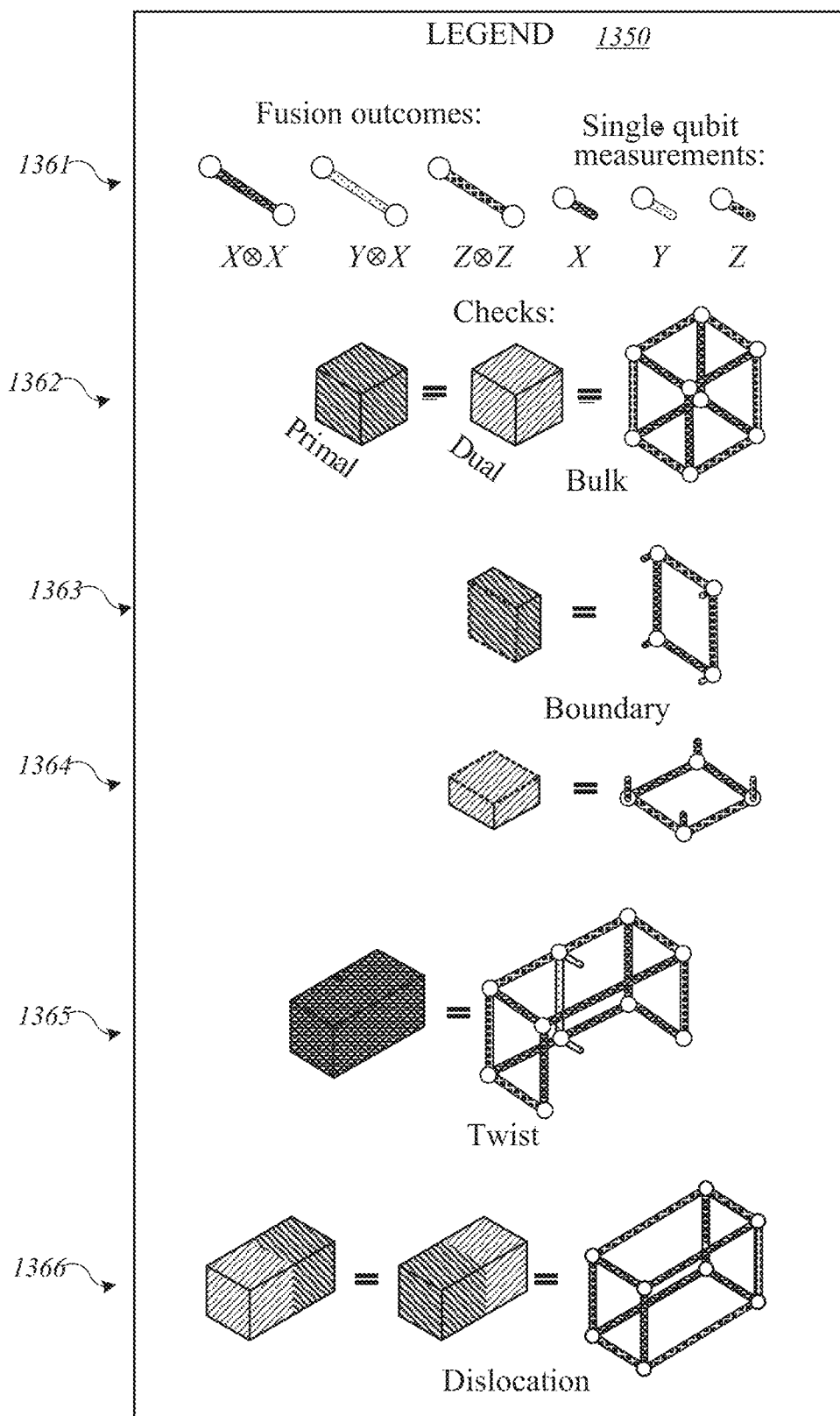
FIG. 13E shows a legend for the fusion-graph notation used in FIG. 13D.

In some embodiments, fusion graphs such fusion graph 1300 can be used to specify logical operations to be performed on a set of logical qubits. For example, a fusion graph defining a logical operation implemented in FBQC can be generated from a surface-code spacetime or time-slice diagram of the kind used to define computations in fault-tolerant CBQC, as described above in reference to FIGS. 11A-11H. FIGS. 13B-13D show examples of how fusion graphs can be generated from surface-code spacetime or time-slice diagrams for three different logical operations: (a) measurement of an idling logical qubit (i.e., a logical qubit that is not interacting with any other logical qubit); (b) two-qubit X⊗X measurements ("lattice surgery"); and (c) Y measurement with a twist. FIG. 13E shows a legend 1350 for the fusion-graph notation used in FIG. 13D.

FIG. 13B shows examples of surface-code spacetime diagrams 1342a-1342c, which can be constructed using techniques known in the art. As shown in legend 1352, surface-code spacetime diagrams can represent logical operations (e.g., twists, dislocations) on surfaces (e.g., primal and dual boundaries) that define logical qubits. Spacetime diagram 1342a corresponds to a logical qubit undergoing an identity gate as described above in reference to FIGS. 1G-1H. Spacetime diagram 1342b corresponds to a two-qubit X⊗X measurement. Spacetime diagram 1342c corresponds to a Y measurement with a twist. When performing fault-tolerant quantum computations with surface codes and CBQC, an entire quantum computation can proceed through a sequence of time slices (or time steps). At each time slice, a set of "check operator" measurements, also referred to herein a stabilizer measurements, is performed, where the check operator measurements are measurements of operators on physical qubits; the pattern of check operator measurements implements certain logical operations on logical qubits and enables the detection and correction of errors. The check operator measurements at a given time slice can be represented in a time-slice diagram. By way of example, for each logical operation in FIG. 13B, time-slice diagrams for two representative time slices are shown in FIG. 13C. Specifically, time slices 1344a-1 and 1344a-2 are selected from spacetime diagram 1342a; time slices 1344b-1 and 1344b-2 are selected from spacetime diagram 1342b; and time slices 1344c-1 and 1344c-2 are selected from spacetime diagram 1342c. In all time slice diagrams of FIG. 13C, a square code distance of 5 is used, and a logical qubit is mapped to a square patch of 5×5 physical qubits to which check operators are applied. (It should be understood that different code distances can be applied.) As shown in legend 1354, the check operators in each time slice include four-qubit operators $X^{\otimes 4}$ and $Z^{\otimes 4}$ in the bulk and two-qubit operators $X^{\otimes 2}$ and $Z^{\otimes 2}$ at the boundaries, where X, Y, and Z are the Pauli operators on physical qubits. Twist and dislocation operators are also defined as illustrated. As shown in time-slice diagrams 1344a-1, 1344a-2, 1344b-1, 1344b-2, 1344c-1, and 1344c-2, a time slice can be drawn in a simplified manner that omits notation of the physical-qubit operators; the correct operators can be inferred from the pattern of light and dark shading according to the legend.

A quantum computation can be expressed as a sequence of time slices such as the time slices of FIG. 13C. However, it is often more convenient to represent a sequence of 2D time slices in a 3D diagram, such as spacetime diagrams 1342a-1342c of FIG. 13B. The solid black lines in a spacetime diagram trace the trajectory of patch corners through spacetime. Shading-coded (or color-coded) surfaces track primal and dual boundaries through space time; the meaning of the various shading patterns is indicated in legend 1352. A 2D spacelike cross section through a spacetime diagram 1342 corresponds to a time-slice diagram 1344. The bulk has a regular pattern of primal and dual measurements (as seen in the various time slice diagrams of FIG. 13C), and measurements in the bulk can be inferred from the boundaries. Also shown in FIG. 13B are corner lines indicating the twist operation (applied in time slice 1344c-1) and associated dislocation of the boundary. Spacetime diagrams need not directly show the number of time slices (or the code distance) to which they correspond. Typically, though not necessarily, each change to the spatial configuration lasts for a number of time slices equal to the code distance.

For purposes of illustration, spacetime diagram 1342a shows a logical qubit that idles for a while until it is measured in the Z basis, as indicated by the corner lines and dual boundary capping off spacetime diagram 1342a. Spacetime diagram 1342b corresponds to a logical two-qubit measurement X⊗X via "lattice surgery." Spacetime diagram 1342c corresponds to a logical qubit encoded in a rectangular patch contributing to a logical multi-qubit Pauli measurement with its Y operator. The details of these logical operations (including how the spacetime diagrams correspond to particular logical operations) are not relevant to understanding the present disclosure; those skilled in the art will be familiar with such details and techniques for constructing spacetime diagrams and time-slice diagrams.

In some embodiments for FBQC, a spacetime diagram can be translated to a fusion graph in a straightforward manner. For instance, FIG. 13D shows fusion graphs 1340a-1340c corresponding to spacetime diagrams 1342a-1342c. Fusion graphs 1340a-1340c can be generally similar to fusion graph 1300 in that both describe a cubic lattice of resource states. However, fusion graphs 1340 add additional information about the measurement operations to be performed, by assigning color or shading to certain cubic or cuboid volumes within the lattice. FIG. 13E shows a legend 1350 indicating how the shading (or color) of a cubic or cuboid volume in fusion graphs 1340a-1340c maps to a corresponding set of measurements on qubits of different resource states. In FIG. 13E, top row 1361 defines line styles representing specific two-qubit (fusion) and single-qubit measurements. Subsequent rows 1362-1366 indicate how each cubic or cuboid volume maps to a combination of fusion and single-qubit measurements. In some embodiments, each two-qubit fusion measurement (e.g., a type II fusion measurement) produces both X⊗X and Z⊗Z measurement outcomes; thus the primal and dual checks of a CBQC spacetime diagram, when translated to a fusion graph, can both correspond to the same measurement operations (and the same hardware) and combinations of outcomes, as shown in second row 1362 of legend 1350. The difference between primal and dual checks can be in how the measurement outcome data is used in decoding. Boundary checks, shown in rows 1363 and 1364 of legend 1350, correspond to half-cubes that involve a combination of fusion outcomes and two single-qubit measurements. Twists, shown in row 1365 of legend 1350, involve Y⊗Y fusion measurements (and skipping over certain lattice locations). In some implementations, the Y⊗Y fusion measurements do not require additional hardware, as they can be determined by multiplying the X⊗X and Z⊗Z fusion measurement outcomes. Dislocations, shown in row 1366 of legend 1350, skip over certain lattice locations and involve X⊗X and Z⊗Z fusion measurements.

The translation from spacetime diagram to fusion graph can be accomplished, e.g., by comparing FIGS. 13C and 13D. The bulk of the fusion graph is filled with primal and dual bulk cubes in a 3D checkerboard pattern, and the primal and dual boundaries are decorated with primal or dual half-cubes. If twists or lattice dislocations are present, they are added using the cuboids shown in legend 1350. Slices of the fusion graph can mimic the pattern of the corresponding CBQC time slices, although the interpretation is different, as can be seen by comparing legend 1350 (FIG. 13E) and legend 1354 (in FIG. 13C). The number of cubes in the fusion graph depends on the code distance, and time slices of square patches having code distance d involve $d^2$ resource states.

Additional description related to generation of fusion graphs such as fusion graphs 1340 can be found in above-referenced WO 2021/155289 and in H. Bombin et al., "Interleaving: Modular architectures for fault-tolerant photonic quantum computing," arXiv:2013.08612v1 [quant-ph], 15 Mar. 2021, available at https://arxiv.org/abs/2103.08612.

FIGS. 11A-11H and 13A-13E illustrate the principle of using a prescribed combination of single-qubit measurements (on physical qubits) and fusions between (physical) qubits of different resource states to implement logical operations on logical qubits. It should be understood that fusion graphs can specify operations in a manner that is agnostic to the particular implementation of the physical qubits. Some embodiments described below provide reconfigurable hardware modules that can implement operations on physical qubits of resource states. In some embodiments, such operations may correspond to operations specified in a fusion graph, and measurement data provided by the reconfigurable hardware modules can be decoded to determine the result of the logical operations. However, the operation of the reconfigurable hardware modules is not dependent on any particular manner of selecting or specifying operations to be performed or on any particular downstream use of measurement data generated by the reconfigurable hardware modules.

2. Active Volume Quantum Computer Architectures

Figure 14:
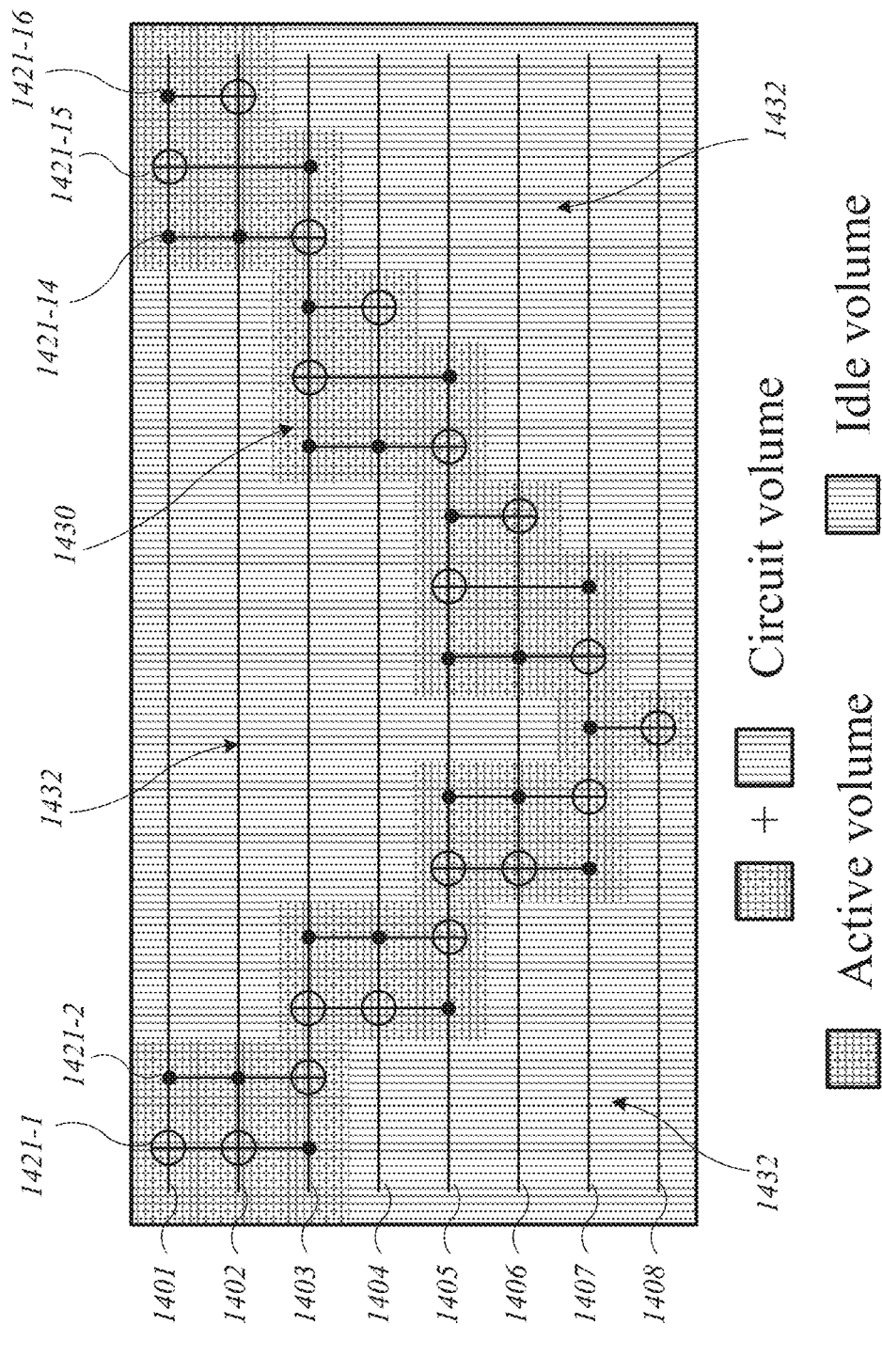
FIG. 14 shows schematic diagram of a quantum circuit.

In fault-tolerant quantum computing, maintaining idle qubits can consume significant resources. By way of illustration, FIG. 14 shows schematic diagram of a quantum circuit 1400 having eight qubits 1401-1408 (sometimes referred to as "memory" qubits, represented as horizontal lines) to which a series of T gates 1421-1 through 1421-16 are applied. As shown, not all qubits actively participate in any one gate; some of the qubits are idle. For instance, qubits 1401 and 1402 are idle from gate 1421-2 until gate 1421-14. In fault-tolerant quantum computers, qubits 1401-1408 are logical qubits (e.g., implemented using surface code patches as described above), and hardware or storage resources may be required to maintain the information content of the idle (logical) qubits while gate operations are being performed on other logical qubits. For example, an identity gate as described above can be applied to each idle qubit. In typical fault-tolerant quantum computer architectures, the identity gate involves the same number of physical qubits and measurements as any other gate. Thus, the cost (a measure of resource requirements) for a fault-tolerant quantum computation scales roughly with the circuit volume, where the "circuit volume" is defined as the number of memory qubits multiplied by the number of non-Clifford gates (e.g., T gates and/or Toffoli gates). A computation that requires a number $n_Q$ of memory qubits and includes a number $n_T$ of non-Clifford gates has a circuit volume of $n_Q \times n_T$.

The circuit volume of a quantum circuit can be divided into an "active volume" and an "idle volume." The "active volume" is the portion of the circuit volume that corresponds to logical operations that progress the computation, including both Clifford and non-Clifford gates, while the "idle volume" is the portion of the circuit volume that corresponds to idle qubits. By way of illustration, the active volume 1430 for circuit 1400 of FIG. 14 is shown with light (cream) shading while the idle volume 1432 is shown with dark (red) shading. The circuit volume is the sum of the active volume and the idle volume. As FIG. 14 suggests, the active volume can be significantly smaller than the circuit volume. The difference between circuit volume and active volume becomes more pronounced for quantum computers with more (logical) qubits. For example, the active volume of a 10,000-qubit quantum computation consisting primarily of adders is more than 100 times lower than the circuit volume.

Certain embodiments described herein relate to fault-tolerant quantum computer architectures (and implementations thereof) in which computational cost (as measured by spacetime volume) scales with the active volume rather than the circuit volume. For instance, in some embodiments, the computational cost of executing a given quantum circuit can be roughly twice the active volume of the circuit. Such architectures are referred to herein as "active volume architectures," and a quantum computer that implements an active volume architecture is referred to as an "active volume quantum computer." This section describes components and characteristics of active volume architectures and active volume quantum computers. Section 3 describes examples of implementations using FBQC and photonic qubits.

2.1. Components of Active Volume Quantum Computer

Figure 15:
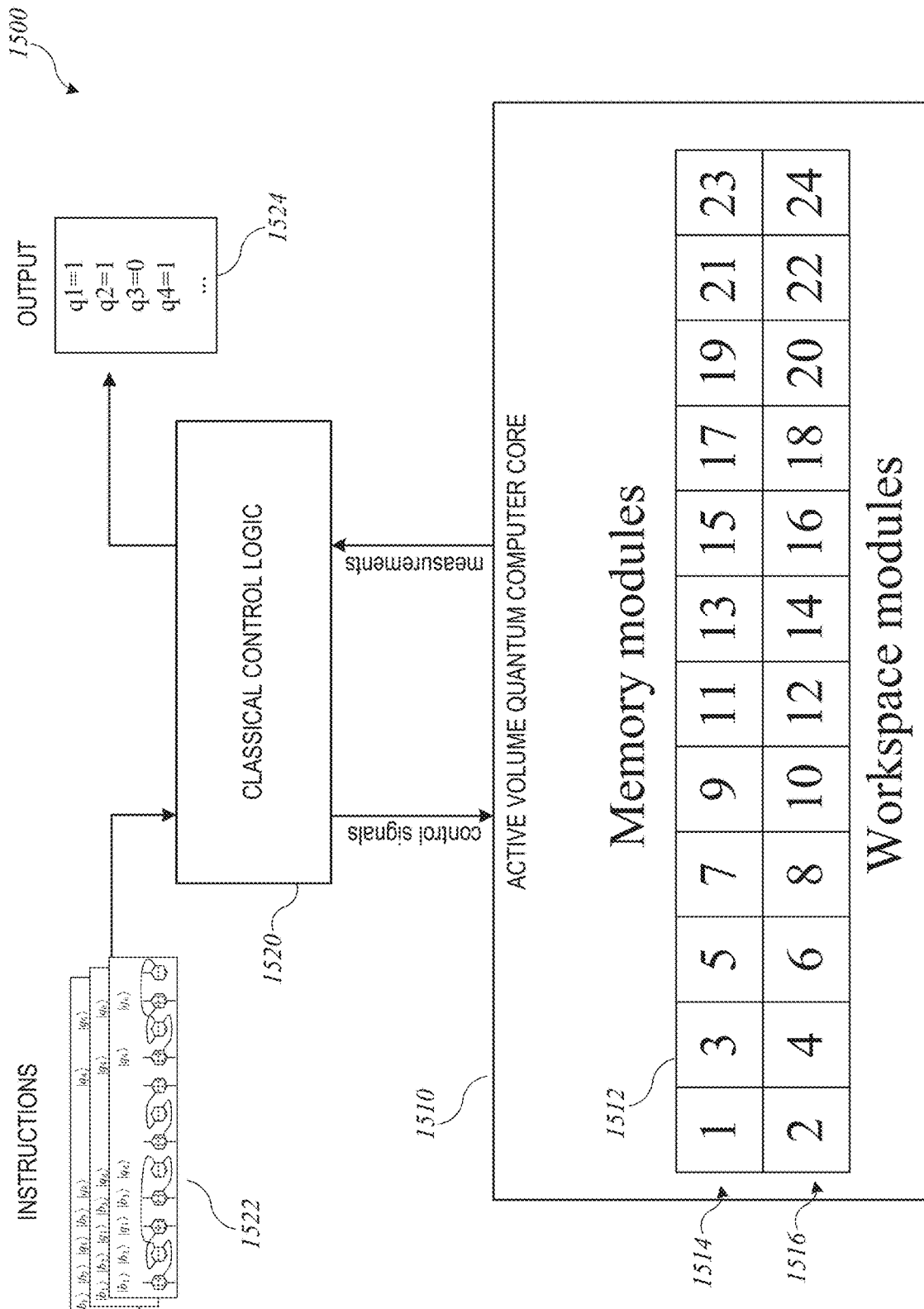
FIG. 15 shows a simplified block diagram of an active volume quantum computer system according to some embodiments.

FIG. 15 shows a simplified block diagram of an active volume quantum computer system 1500 according to some embodiments. System 1500 includes an active volume quantum computer core 1510 coupled to classical control logic 1520.

Classical control logic 1520 can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, classical control logic 1520 (or portions thereof) can be implemented in an off-chip classical computer having a processor and a memory, and the off-chip classical computer can be programmed to perform some or all of the operations of classical control logic 1520. Classical control logic 1520 can be coupled to quantum computer core 1510 to exchange classical control signals to control operations of core 1510 and classical measurement data extracted from core 1510.

In operation, classical control logic 1520 (which can include a classical computer) can receive instructions 1522 specifying a quantum computation to be executed. For example, instructions 1522 can include a (classical) machine-readable data file defining a sequence of logical block networks and quickswap operations as described below, a fusion graph as described above, or other instructions defining operations to be performed in core 1510. Classical control logic 1520 can read the program code and generate control signals to cause quantum computer core 1510 to perform the computation. The nature of the control signals depends on the particular implementation of core 1510; examples are described below.

Quantum computer core 1510 can include hardware components and devices that create and/or manipulate physical qubits to perform fault-tolerant logical operations on logical qubits. In operation, core 1510 can execute operations in response to control signals from classical control logic 1520 and return classical measurement data to classical control logic 1520. Example structures for core 1510 are described below.

As quantum computer core 1510 returns measurement data (which can be classical binary digital data), classical control logic 1520 can apply various analysis algorithms (including, e.g., decoder algorithms as described above) to the measurement data to determine results of the quantum computation. Classical control logic 1520 can output data 1524, which can include, e.g., final states of logical qubits and/or other information. In some embodiments, classical control logic 1520 can use the results of analysis algorithms to select subsequent instructions 1522 to issue to core 1510. The term "reactive measurement" as used herein refers generally to a situation where a result of executing a first instruction is used to determine all or part of a subsequent instruction, and the "reaction time" ($\tau_r$) refers to the minimum time between completion of the first instruction and completion of the subsequent instruction. The reaction time can include time consumed in decoding measurement data output from the first instruction in order to determine which subsequent instruction should be issued. In general, the reaction time for a given implementation of system 1500 depends in part on the implementation of core 1510 and in part on the implementation of classical control logic 1520.

Quantum computer core 1510 can include a number (N) of interconnected qubit modules 1512. In the example shown in FIG. 15, N=24. It should be understood that the architecture of core 1510 is scalable and that N can be any number; for instance, N can be ~100, ~1,000 or ~10,000. Qubit modules 1512 can be physically or conceptually divided into "memory" modules (shown as row 1514 in core 1510) and "workspace" modules (shown as row 1516 in core 1510). In embodiments where the total number N of qubit modules is even, the number of memory modules and the number of workspace modules can each be N/2. As will become apparent, this division can facilitate defining instructions for core 1510. In particular, workspace modules 1516 can be used to execute logical operations, while memory modules 1514 can be used to store logical qubits and to rearrange logical qubits for use in subsequent operations. Despite the different roles of memory and workspace modules, there need not be any difference in physical structure or circuit design between memory and workspace modules. For convenience of identification, each module can be assigned an identifying index (or label) in the range from 1 to N. In examples herein, memory modules have odd indexes and workspace modules have even indexes. In the following description, "M1" refers to the module with index 1, and so on. (In the drawings, "M" is sometimes omitted.)

Each qubit module 1512 can include hardware components (e.g., optical circuitry, electronic circuitry, engineered structures, or the like) to generate a surface code patch by operating on physical qubits. In some embodiments, the hardware components include circuitry or other devices to generate, receive, and/or store physical qubits and to perform surface-code check operator measurements, which can include twists and dislocations in at least one direction, on the physical qubits. The particular hardware components depend on the type and implementation of the physical qubits. Section 3 describes specific examples of circuits that can be used to implement qubit modules 1512 and core 1510 according to some embodiments where the physical qubits are photonic qubits. Each surface code patch can have dimensions d×d, where d is a code distance as described above. In some embodiments, the value of d may be fixed for a given hardware implementation of qubit modules 1512. Depending on implementation, different qubit modules 1512 can operate concurrently (or in parallel) with each other or sequentially. Regardless of implementation, a "code cycle" for a given qubit module 1512 as used herein refers to the time required to generate one d×d surface code patch (e.g., the time required to perform a full set of check operator measurements). At any given time, a given qubit module may be said to be empty (i.e., not storing any logical information used in the quantum computation but possibly storing random or other non-useful qubit states), storing a logical qubit in an idle state, or operating on a logical qubit (e.g., actively generating a surface code patch that encodes the state of a fault-tolerant logical qubit), or storing or operating on ancilla (e.g., actively generating surface code patches that can be used in operations on logical qubits).

As described above, surface codes can be defined in a three-dimensional entanglement space, with directions referred to for convenience as E, W, N, S, U, and D. For purposes of the present description, each d×d surface code patch is defined as being in the plane transverse to the U-D axis and has distinct E, W, N, and S boundaries. Surface code patches in different qubit modules 1512 can be selectably coupled using boundary-to-boundary couplings of E, W, N, or S boundaries as well as transversal couplings in the U-D direction. In some embodiments, boundary-to-boundary couplings between modules can be implemented through the coupling of physical qubits on the edge of a patch within one module (e.g., the physical qubits that reside on an E boundary) with respective physical qubits on an edge of a patch within another module. In some embodiments, transversal couplings can be implemented through coupling each physical qubit in a patch within one module with the respective physical qubits in a patch within another module. Examples of connection networks for active volume architectures are described below.

Qubit modules 1512 also support initialization of logical qubits. In some embodiments, any qubit module 1512 can initialize a (logical) qubit in either the |0⟩ state (Pauli Z basis) or |+⟩ state (Pauli X basis) in one code cycle. Initializing a logical qubit generally includes establishing the underlying physical qubits of the surface code patch in appropriate states (which may depend on the choice of Z or X basis).

In addition, any qubit module 1512 can complete a measurement of a (logical) qubit in either the Pauli X basis or Pauli Z basis in one code cycle. Measuring a logical qubit generally includes performing a single-qubit measurement on each physical qubit of the surface code patch (in the appropriate basis) and providing the measurement outcomes to classical control logic 1520. Thereafter, classical control logic 1520 can decode the measurement data and extract a measured state (0 or 1) of the logical qubit.

Qubit modules 1512 in active volume core 1510 are advantageously interconnected to form a network in which a given qubit module 1512 is directly connected to multiple other qubit modules 1512, including qubit modules that are not physically adjacent. These interconnections can enable couplings of corresponding boundaries (e.g., couplings of boundaries oriented in the same direction in entanglement space, such as E to E, W to W, N to N, S to S, U to U, D to D) of surface code patches in different qubit modules 1512 as well as transversal couplings of U and D surfaces of surface code patches in different qubit modules 1512. In some embodiments, two types of connection networks can be provided, referred to herein as "port" connections and "quickswap" connections.

In some embodiments, port connections couple each pair of qubit modules 1512 with index values i and j for which $1 \leq |i-j| \leq r$, where r is a range parameter that can be selected to provide a desired degree of connectivity. A pair of qubit modules with index values i and j is referred to as being "in range" if $|i-j| \leq r$. As will be shown below, r=12 is sufficient to implement the most commonly used quantum algorithms in a resource-efficient manner. However, other values can be chosen. For instance, r can be 6 or 24 or some other value.

When qubit modules 1512 are arranged in a two-dimensional grid, r>3 or r>4 may require port connections between pairs of qubit modules that are not physically adjacent.

Figure 16:
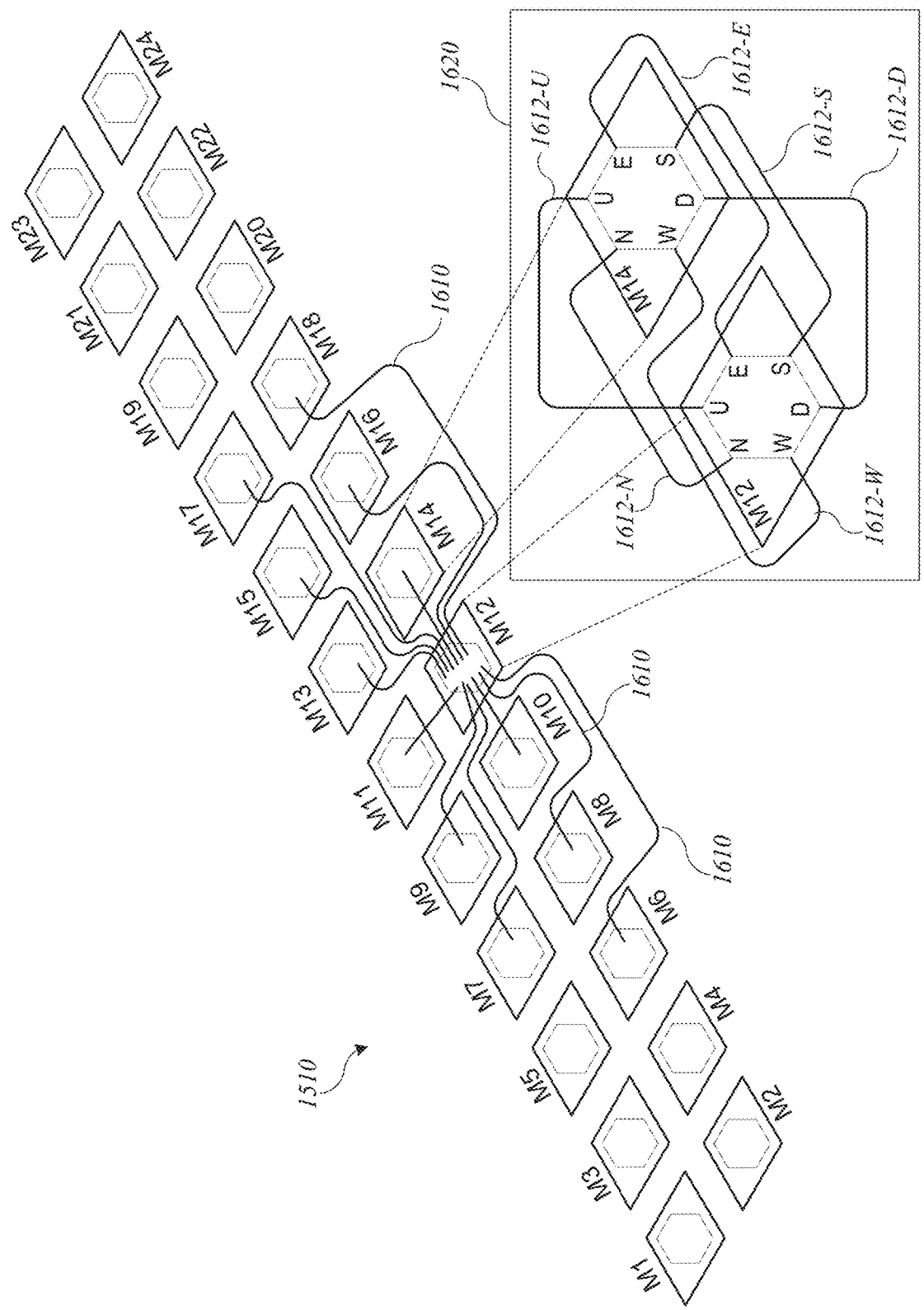
FIG. 16 shows an example of port connections for a representative qubit module of an active volume quantum computer system according to some embodiments.

FIG. 16 shows an example of port connections for a representative qubit module M12 in core 1510 according to some embodiments. Each port connection 1610 couples qubit module M12 to a different qubit module that is in range, including at least some modules that are not adjacent. In this example, r=6, and module M12 is coupled by a port connection 1610 to each of modules M6, M7, M8, M9, M10, M11, M13, M14, M15, M16, M17, and M18.

Each port connection 1610 provides multiple "sub-connections" that can directly couple physical qubits at corresponding boundaries of the surface code patches in the two modules. As shown in inset 1620 for modules M12 and M14, one port connection 1610 can include six sub-connections 1612-W, 1612-N, 1612-E, 1612-S, 1612-D, and 1612-U that couple corresponding boundaries of the surface code patches between the two modules. "Corresponding" boundaries of surface code patches, as used herein, means boundaries that are oriented in the same direction. Thus, sub-connection 1612-E couples the E boundary of a surface code patch in module M12 to the E boundary of a surface code patch in module M14; sub-connection 1612-U couples the U boundary of a surface code patch in module M12 to the U boundary of a surface code patch in module M14 and so on. A port coupling between E-E, W-W, S-S, and N-N boundaries of two surface code patches can entail performing surface-code check operator measurements between the physical qubits at the corresponding boundaries of the two patches, and a port coupling between U-U and D-D boundaries can entail performing two qubit transversal measurements or transversal preparations of 2 qubit entangled states (e.g., Bell states). In some embodiments, each sub-connection 1612 can be implemented by providing a selectable path to transfer physical qubits from one module to another so that check operator measurements can be performed at the relevant boundary. (Those skilled in the art will appreciate that the check operator measurements for a given coupling can be performed in just one of the two modules and that a swap of physical qubits is not required.) Sub-connections 1612 can be independently operable to open or close a port connection in a particular direction.

To further illustrate the nature of port connections, FIG. 17 shows a surface-code-level diagram of a portion of core 1510 during an operation. Workspace modules M2, M4, M6, M8, and M10 each generate a surface code patch, and corresponding boundaries of surface code patches in certain pairs of modules are coupled (via port connections) to execute a logical operation. Which boundaries of which surface code patches are coupled in a given instance depends on the logical operation being executed; examples are described below.

In the example shown in FIG. 17, the W boundaries of the surface code patches in modules M2 and M4 are coupled (e.g., via an instance of port connection 1612-W), and check operator measurements are performed using W boundary qubits of the surface code patches as indicated at 1724. In some embodiments using FBQC, the check operator measurements and the two-qubit transversal measurements can include performing a type-II fusion measurement on corresponding pairs of physical qubits, thereby projecting the state of the pair onto the Bell state $(|00\rangle + |11\rangle)/\sqrt{2}$. Similarly, the S boundaries of the surface code patches in modules M6 and M8 are coupled (e.g., via an instance of port connection 1612-S), and check operator measurements are performed using S boundary qubits of the surface code patches as indicated at 1768. In the example shown, in addition to the S-S coupling, the E boundary of the surface code patch in module M8 is coupled (e.g., via an instance of port connection 1612-E) to the E boundary of the surface code patch in module M10, and check operator measurements are performed using E boundary qubits of the surface code patches as indicated at 1781.

Referring again to FIG. 16, each port connection 1610 also includes sub-connections 1612-U and 1612-D. Sub-connection 1612-D transversely couples the respective D surfaces of the surface code patches in the two modules (e.g., M12 and M14). That is, a D-to-D coupling is provided between each pair of qubits in the surface code patches in the two modules. If modules M12 and M14 are initially empty (i.e., not storing logical qubits or any other quantum information), a logical Bell state $(|00\rangle + |11\rangle)/\sqrt{2}$ can be prepared between modules M12 and M14 in one code cycle by transversal physical Bell state preparation between each pair of physical data qubits in the two surface code patches. For instance, in a CBQC implementation, physical $|+\rangle$ states can be prepare in one module and $|0\rangle$ states in the other, followed by transversal physical CNOT gates between pairs of physical states using the D-to-D port connection. As described in further detail below, for an FBQC specific implementation, sub-connection 1612-D transversely couples the respective D surfaces of the surface code patches in the two modules (e.g., M12 and M14). That is, a D-to-D coupling is provided between each pair of qubits in the surface code patches in the two modules. If modules M12 and M14 each initially hold a surface code patch corresponding to a logical qubit, a logical Bell measurement can be performed between the two logical qubits by transversal physical Bell measurements between the physical qubits, i.e., transversal measurements of the two-qubit Pauli operators $X \otimes X$ and $Z \otimes Z$, using the D-to-D port connection.

Sub-connection 1612-U transversely couples the respective U surfaces of the surface code patches in the two modules (e.g., M12 and M14). That is, a U-to-U coupling is provided between each pair of qubits in the surface code patches in the two modules. If modules M12 and M14 each initially hold a surface code patch corresponding to a logical qubit, a logical Bell measurement can be performed between the two logical qubits by transversal physical Bell measurements between the physical qubits, i.e., transversal measurements of the two-qubit Pauli operators $X \otimes X$ and $Z \otimes Z$, using the U-to-U port connection.

Port connection 1610 can provide a separately controllable sub-connection 1612 for each boundary of a surface code patch; that is, at any given time, a given sub-connection can either be open (meaning that coupling with a boundary of another surface code patch occurs) or closed (meaning that coupling with a boundary of another surface code patch does not occur). For example, each sub-connection 1612 shown in inset 1620 can be independently controllable, subject to the condition that for a sub-connection in a given direction (e.g., connection 1612-E) and a given qubit module (e.g., qubit module M12), a sub-connection can be open to not more than one other module at any given time. However, a given qubit module can have open sub-connections to two (or more) other qubit modules at the same time, provided that the open sub-connections couple different boundaries. For instance, in the example shown in FIG. 17, since an E-to-E sub-connection is open between module M8 and module M10, the connection between the E port of module M8 and any other module is closed, but module M8 concurrently has an open S-to-S sub-connection to module M6 as shown. In the following description, it should be understood that any port connection involving a specific port can be implemented using a sub-connection as shown in FIG. 16.

Some embodiments of active volume core 1510 can provide a network of "quickswap" connections between pairs of qubit modules in addition to or instead of a network of port connections. In some embodiments, quickswap connections follow a log-tree rule; that is, the quickswap connections couple each pair of qubit modules with index values i and j for which $|i-j|=2^k$, where k is an integer between 0 and $\lfloor \log N \rfloor$ and all logarithms are binary (base-2) logarithms, and where N is the total number of qubit modules in the core, e.g., N=24 for core 1510 in FIG. 15. Pairs of qubit modules that are connected by a quickswap connection are referred to herein as "quickswappable."

Figure 18:
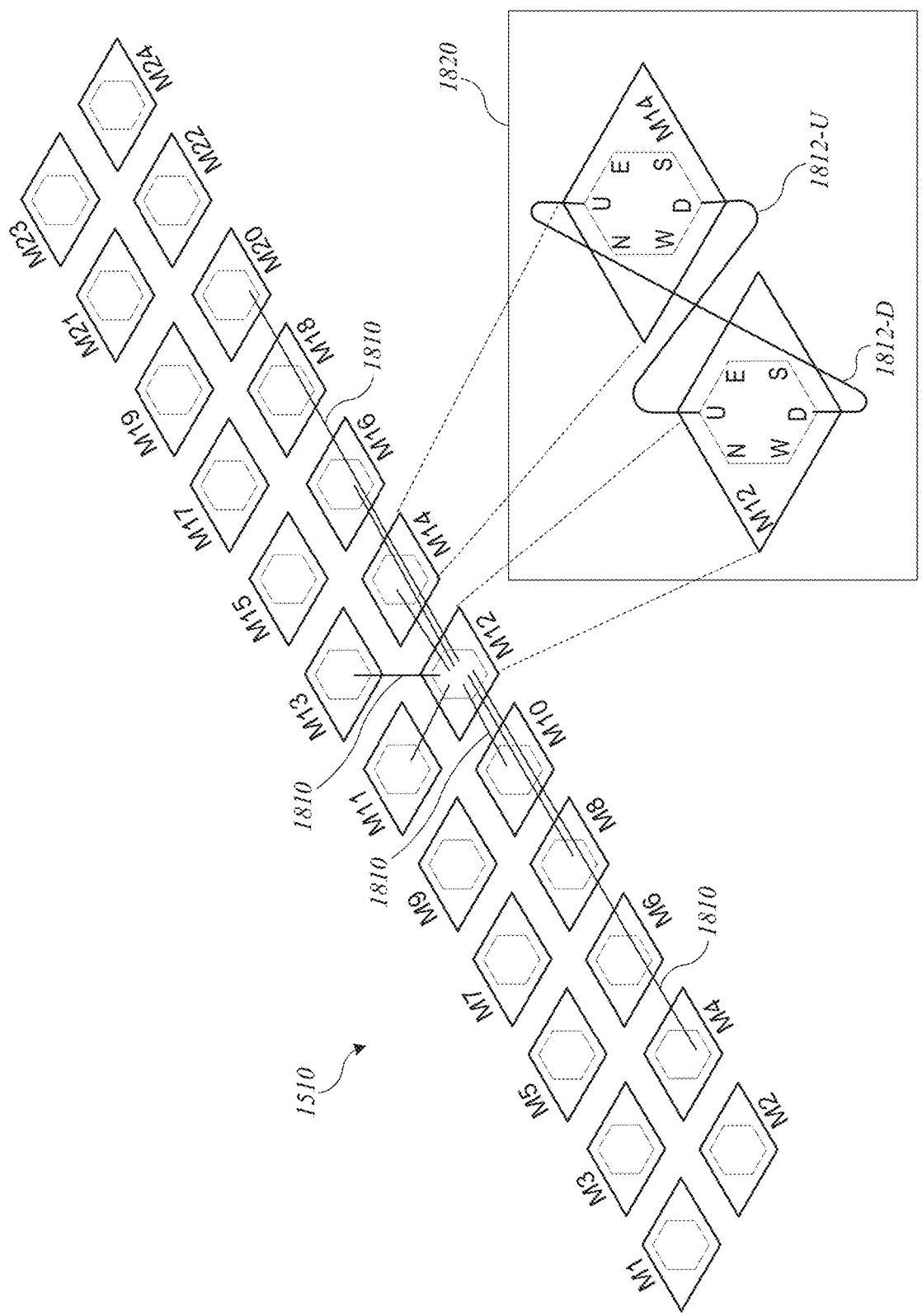
FIG. 18 shows an example of quickswap connections for a representative qubit module of an active volume quantum computer system according to some embodiments.

FIG. 18 shows an example of quickswap connections for a representative qubit module M12 in core 1510 according to some embodiments. Each quickswap connection 1810 couples qubit module M12 to a different qubit module and enables respective logical qubits in the two qubit modules to be swapped in one code cycle, e.g., by implementing transversal physical SWAP gates between the physical qubits or by any other operation that shuttles, moves, or transmits physical qubits between modules. According to the log-tree rule, quickswap connections 1810 couple qubit module M12 to modules M4, M8, M10, M11, M13, M14, M16, and M20. As shown in inset 1820, a quickswap connection between a pair of qubit modules (e.g., modules M12 and M14) can provide transversal connections 1812-U and 1812-D from the U surface of the surface code patch in each module to the D surface of the surface code patch in the other module. In some embodiments, one of the modules in a quickswap connection can be initially empty, in which case, the effect of a quickswap is to transfer a logical qubit into the empty module. (The logical qubit is thereby removed from the module where it originated.)

Figure 19:
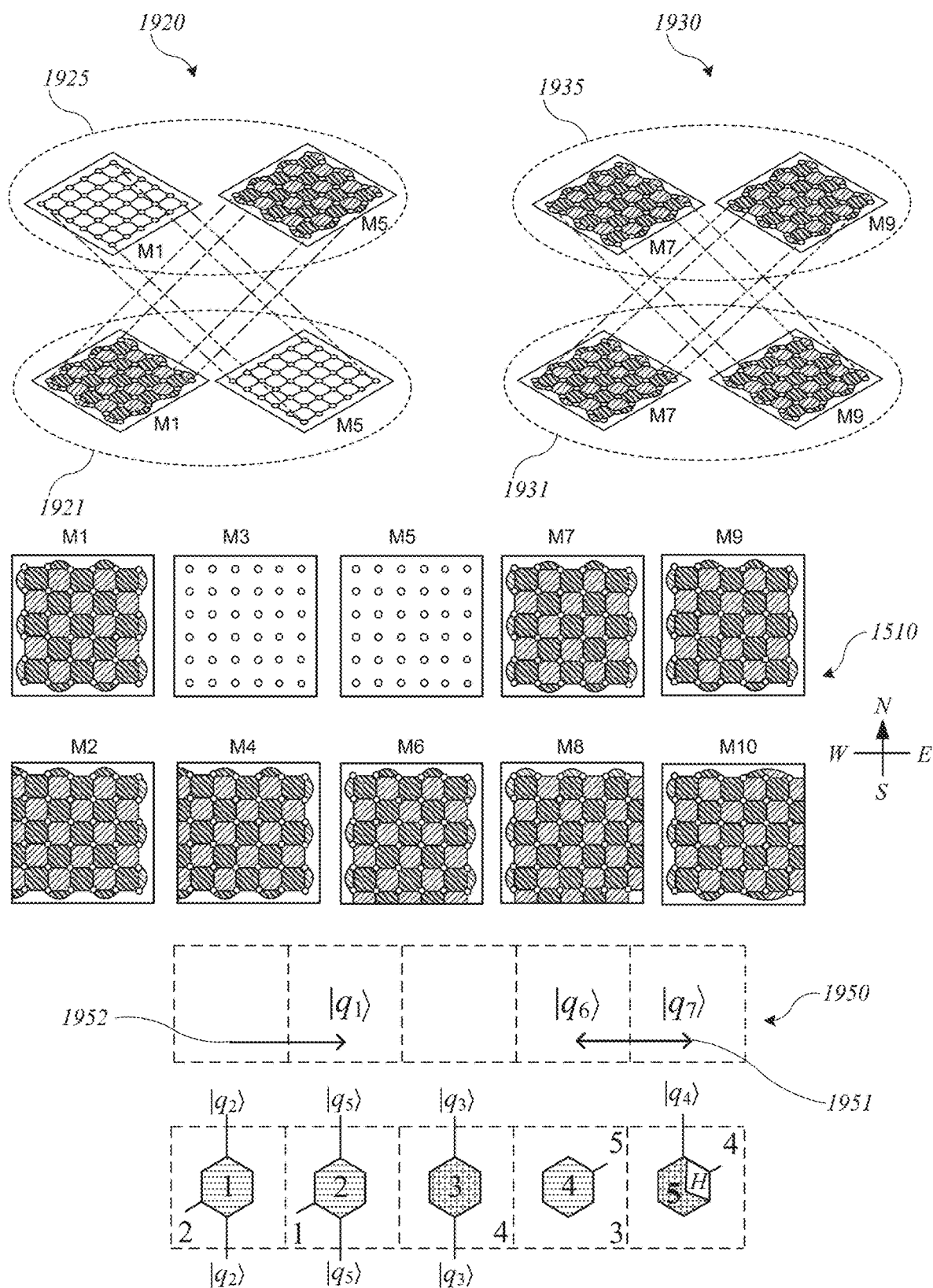
FIG. 19 shows a surface-code-level diagram of a portion of an active volume quantum computer system during an operation according to some embodiments.

To further illustrate the nature of quickswap connections 1810, FIG. 19 shows a surface-code-level diagram of a portion of core 1510 during an operation. Memory modules M1, M7, and M9 initially each store a logical qubit while memory modules M3 and M5 are empty. A quickswap operation 1920 between modules M1 and M5 performs a transversal swap in which the state of the surface code patch (or logical qubit) from module M1 is transferred to module M5. In this case, module M5 is initially empty (as shown at 1921); after the quickswap, module M1 is empty, and module M5 now stores the logical qubit (as shown at 1925). Another quickswap operation 1930 between modules M7 and M9, both of which are initially occupied (as shown at 1931), performs a transversal swap in which the state of the surface code patch from module M7 is transferred to module M9 while the state of the surface code patch from module M9 is transferred to module M7 (as shown at 1935). In this manner, a quickswap operation can swap logical qubits between a pair of qubit modules. Quickswaps can occur between any pair of qubit modules that are connected by a quickswap connection, including a pair of memory modules, a pair of workspace modules, or a workspace module and a memory module.

Quickswap connections provide separately controllable couplings; that is, at any given time, a given connection can either be open (coupling occurs) or closed (coupling does not occur). Where quickswap connections are implemented using transversal physical SWAP gates, not more than one quickswap connection at a time can be open for a given qubit module. However, any number of quickswap connections between disjoint pairs of modules (i.e., pairs of modules such that any given module is in only one pair) can be performed concurrently. For instance, as shown in FIG. 19, quickswap operations 1920 and 1930 act on disjoint pairs of qubit modules can be performed concurrently.

Each of the port connections and quickswap connections shown in FIGS. 16 and 18 is a direct connection between modules Mi and Mj that does not pass through any other qubit module. In addition, each of the port sub-connections and quickswap connections can be implemented using a distinct physical connection path, allowing a qubit module to participate in multiple port couplings (in different directions) concurrently. In some embodiments, concurrent couplings are subject to various limitations. For instance, in examples described above, a qubit module can participate in no more than one quickswap during a single code cycle, and a qubit module can participate in no more than one port coupling in a given direction at a time during a single code cycle). Further, in some embodiments, a qubit module cannot participate in a quickswap coupling and a port coupling during the same code cycle. A qubit module can participate in different couplings at different times (e.g., during different code cycles).

It should also be noted that port connections and/or quickswap connections can be provided between pairs of qubit modules that are not physically adjacent to each other. Referring to FIGS. 16 and 18, if each qubit module is implemented using a distinct circuit and the circuits are arranged in a grid as shown in the drawings, then each qubit module has up to three physically adjacent modules. For instance, module M12 is physically adjacent to modules M10, M11, and M14. In a conventional quantum computer architecture, all connections between qubit modules would be "local" connections (i.e., connections between physically adjacent qubit modules such as modules M12 and M14). As shown in FIGS. 16 and 18, an active volume architecture is not so limited, and some of the quickswap and port connections can be "non-local" connections (i.e., connections between qubit modules that are not physically adjacent). As will be shown, this enhanced connectivity can allow significant reduction in the computational cost of executing a given quantum circuit.

In addition to providing non-local couplings, active volume architectures can provide enhanced parallelism by executing different logical gates in parallel rather than sequentially. As described below in some embodiments, quantum teleportation can be exploited to enable multiple logical gates that operate successively on the same logical qubit to be executed in parallel. The ability to execute gates in parallel can increase throughput of an active volume core of given size (N qubits), as will become apparent.

To summarize the foregoing, some embodiments of an active volume quantum computer core have the following properties:

(1) A network of N qubit modules for some number N. Each qubit module can store a d×d surface-code patch encoding a logical qubit or a d×d ancilla patch that facilitates multi-patch operations. Each patch has boundaries, including lateral boundaries (N, E, S, and W) and transversal boundaries (U and D). It is not required that every qubit module store a surface code patch at all times during a computation; at some times, some qubit modules may be empty. In some embodiments, no physical qubits, measurements, or other resources are required to maintain a qubit module in the empty state. Pairs of qubit modules with indexes i and j are directly coupled to each other by port connections (and said to be "in range") if $|i-j|$; r and directly coupled to each other by quickswap connections (and said to be "quickswappable") if $|i-j|=2^k$, where k is an integer between 0 and $\lfloor \log N \rfloor$.

(2) Operation of the qubit modules defines a unit of time referred to herein as a "code cycle," which is the time required to perform all standard surface-code check measurements within each qubit module, including boundary checks; twist defects, and lattice dislocations in at least one direction; single-qubit measurements; and physical T gates for state injection. It should be noted that different qubit modules can operate in parallel or sequentially, and in some embodiments that use photons as qubits, the same hardware can be leveraged to provide multiple qubit modules; examples are described in Section 3 below.

(3) The surface code patches stored in a pair of qubit modules that are quickswappable can be swapped within one code cycle, e.g., using transversal physical SWAP gates or by physically moving qubits between modules. Quickswaps between disjoint pairs of qubit modules can be performed concurrently (i.e., in the same code cycle).

(4) A logical Bell state $(|00\rangle + |11\rangle)/2$ encoded in two surface code patches can be prepared in any pair of empty qubit modules that are in range within one code cycle. In some embodiments, Bell state preparation is implemented by transversal physical Bell-state preparations between physical data qubits, e.g., via the preparation of $|+\rangle$ states in one module and $|0\rangle$ states in the other, followed by transversal physical CNOT gates. While one of ordinary skill having the benefit of this disclosure will appreciate that any port connection can be used to support logical Bell state preparation within one logical cycle, in some embodiments, D-to-D port connections can support Bell state preparation within one code cycle.

(5) Surface-code checks can be measured between corresponding boundaries of the surface code patches of two qubit modules that are in range. In other words, lattice-surgery operations can be executed between any two surface-code patches within a range r. In examples described herein, corresponding boundaries are boundaries associated with the same direction, rather than opposite directions. (In some alternative embodiments, boundaries associated with opposite directions rather than the same direction can be coupled.)

(6) A logical Bell measurement can be performed (within one code cycle) between two logical qubits stored in a pair of qubit modules that are in range. Logical Bell measurement can be implemented using transversal physical Bell measurements between physical data qubits, i.e., transversal measurements of the two-qubit Pauli operators $X \otimes X$ and $Z \otimes Z$, which can be completed within one code cycle. While one of ordinary skill having the benefit of this disclosure will appreciate that any port connection can be used to support logical Bell state measurement within one logical cycle, in some embodiments, U-to-U port connections can support logical Bell measurement within one code cycle.

Quantum computer cores having some or all of these properties can be implemented using a variety of physical systems and devices. Using photons as the physical qubits has the advantage that photons are inherently mobile; port and quickswap connections can be implemented using active optical switches and waveguides to transfer physical qubits between qubit modules. A specific example of qubit modules implemented using photonic qubits is described in Section 3 below. However, use of other physical systems and devices is not precluded.

2.2. Operations Using Active Volume Cores

As described above, an active volume core such as core 1510 of FIG. 15 can execute logical gates on logical qubits. The particular logical gates can be specified using instructions 1522. In some embodiments, instructions 1522 can specify particular configurations (open or closed) of port connections and/or quickswap connections for the active volume core, as well as particular physical measurements (e.g., check operators or single-qubit measurements) to be performed by the qubit modules. In some embodiments, each workspace module 1516 can be assigned a unit of computational work referred to herein as a "logical block." Execution of a logical block can include generating a surface code patch with appropriate port couplings to surface code patches in one or more other workspace modules 1516, and instructions 1522 can specify a logical block to be executed by a particular workspace module 1516. Instructions 1522 can also include instructions to perform quickswap operations between qubit modules 1512, instructions to initialize or measure certain logical qubits, and so on. This section introduces the various building blocks for instructions and operations in an active volume quantum computer and concludes with several examples showing how these building blocks can be used to implement a quantum computation.

2.2.1. Logical Blocks and Logical Block Networks

In an active volume quantum computer core such as core 1510, computations are implemented by performing gate operations on logical qubits. In particular, each workspace module 1516 can be assigned a unit of computational work referred to herein as a "logical block." Execution of a logical block can include generating a surface code patch with appropriate port couplings to surface code patches in one or more other workspace modules 1516. This section introduces logical blocks and methods by which a gate operation (the building block of a quantum circuit) can be represented as a network of interconnected logical blocks.

In mathematical terms, logical blocks implement linear maps with between two and four input qubits and output qubits. More specifically, a "Z-type block" is a linear map of the form:

$$|0\rangle^{\otimes m} \langle 0|^{\otimes n} + |1\rangle^{\otimes m} \langle 1|^{\otimes n} \qquad (17)$$

and an "X-type block" is a linear map of the form:

$$|+\rangle^{\otimes m} \langle +|^{\otimes n} + |-\rangle^{\otimes m} \langle -|^{\otimes n}, \qquad (18)$$

where m and n are integers satisfying $0 \leq m \leq 4$, $0 \leq n \leq 4$, and $2 \leq m+n \leq 4$, and the kets denote qubit eigenstates of the Z and X bases, respectively. It should be understood that logical blocks operate on logical qubits, which can be implemented using surface code patches consisting of multiple physical qubits as described above.

Each of the n input and m output qubits of a linear map is referred to as a "port" of the logical block, and logical blocks can have two, three, or four ports. Each port is associated with a particular direction in the surface-code entanglement space (one of the U, D, N, S, E, W directions as defined above), with each port of the block having a different direction. Given that $2 \leq m+n \leq 4$, a logical block, therefore, has between two and four ports. As will become apparent, in an active volume architecture, the ports of a logical block correspond to open port connections between qubit modules.

Each logical block has an "orientation," defined as follows: an "N-oriented" logical block has no ports in the N or S direction; an "E-oriented" logical block has no ports in the E or W direction; and a "U-oriented" logical block has no ports in the U or D direction. It is noted that some linear maps constructed according to Eq. (17) or Eq. (18) have no orientation (e.g., a four-port block with ports in the U, D, N, and E direction would have no orientation) or an ambiguous orientation (e.g., a two-port block with ports in the U and D direction would be both N-oriented and E-oriented). In the context of active volume quantum computation, only logical blocks that have a single unambiguous orientation advance the computation, and the term "logical block" is used herein to refer to blocks with a single unambiguous orientation. Output qubits are associated with U-ports, and input qubits are associated with D ports. An example of a U-oriented Z-type block without input qubits is given mathematically by $$|0\rangle_W \otimes |0\rangle_N \otimes |0\rangle_S + |1\rangle_W \otimes |1\rangle_N \otimes |1\rangle_S \quad (19)$$

This operation prepares a three-qubit GHZ state.

Input or output qubits in the west or east port direction may also be affected by a Hadamard gate. An example of such an operation is a Z-type N-oriented block with one input qubit, given mathematically by:

$$|0\rangle_U \otimes |+\rangle_E \otimes \langle 0|_D + |1\rangle_U \otimes |-\rangle_E \otimes \langle 1|_D. \quad (20)$$

The corresponding port (in this case the E-port) is referred to as being "Hadamarded."

As noted, each logical block has a type and an orientation. Pairs of logical blocks are referred to herein as "commensurate" if they have the same type and same orientation or if they have different types and different orientations. Pairs of blocks that have the same type and different orientation, or different types and the same orientation, are referred to herein as "incommensurate."

A logical block can be visualized as a segment of a spacetime diagram having volume d×d×d with two or more surfaces that are unbounded and correspond to the ports. FIGS. 20A-20D show examples of spacetime diagrams for four-port, three-port, and two-port logical blocks. FIG. 20A shows six four-port logical blocks 2001-2006, arranged according to type and orientation. Each Z-type block 2001, 2003, 2005 is a visualization of a linear map of the form in Eq. (17), and each X-type block 2002, 2004, 2006 is a visualization of a linear map of the form in Eq. (18). It should be noted that (except for blocks with Hadamarded ports), there are no other four-port logical blocks.

FIG. 20B shows non-exhaustive examples of spacetime diagrams for three-port logical blocks: an X-type E-oriented logical block 2021; an X-type N-oriented logical block 2022; a Z-type N-oriented logical block 2023; and a Z-type U-oriented logical block 2024.

FIG. 20C shows non-exhaustive examples of two-port logical blocks: a U-oriented X-type logical block 2041 and an N-oriented Z-type logical block 2042.

FIG. 20D shows examples of spacetime diagrams for logical blocks with Hadamarded ports. X-type U oriented logical block 2061 has a Hadamarded E port, and Z-type N-oriented logical block 2062 has a Hadamarded W port.

As noted above, two-port blocks where both ports are aligned along the same axis have ambiguous orientations. FIG. 20E shows an example of a two-port block 2051 with D and U ports; this corresponds to the identity gate as described above and is both N-oriented and E-oriented (hence, ambiguous). As will become apparent, blocks of this kind do not advance a quantum computation and generally correspond to idle volume rather than active volume. Identity blocks of the kind shown in FIG. 20E may be used to store idle qubits in memory modules. In most examples herein, memory modules use an orientation in which the logical Z operators point in the north and south direction, as indicated by shading of the block boundaries. However, when defining and optimizing a logical block network corresponding to a logical operation or quantum circuit, the identity block and other blocks of ambiguous orientation are advantageously avoided.

It can be convenient to represent logical blocks using hexagons rather than spacetime diagram segments. As shown in FIGS. 20A-20D, for each logical block, there is a corresponding hexagon diagram. The corners of the hexagon are mapped to U, D, N, S, E and W port directions as indicated in legend 2000 in FIG. 20A. (This directional convention is used for all logical blocks in the figures.) The color (or shading) of the hexagon indicates the type: Z type is amber (light shading); X type is blue (dark shading). A port in a particular direction is indicated by a leg extending outward from the appropriate corner of the hexagon. For logical blocks with Hadamarded ports, such as logical blocks 2061 and 2062 in FIG. 20D, the Hadamarded port(s) can be indicated using a corner "H" notation.

Gate operations acting on logical qubits can be defined as networks of logical blocks, also referred to herein as "logical block networks" or "block networks." Logical block networks describe logical operations that can be implemented with surface codes and lattice surgery. In a logical block network, lattice surgery corresponds to coupling corresponding ports of two logical blocks. Each port connection implies that the pair of qubits at the corresponding boundaries of the respective surface code patches is projected onto the Bell state $(|00\rangle + |11\rangle)/2$.

In some embodiments, when forming logical block networks, the following rules apply:
 (1) Ports are connected only between ports of different logical blocks that point in the same direction (e.g., E-port to E-port, or U-port to U-port).
 (2) Unless exactly one of the two ports connected between two blocks is Hadamarded, the two blocks must be commensurate (as defined above). If exactly one of the two ports connected between two blocks is Hadamarded, the two blocks must be incommensurate.
 (3) In a logical operation described by a logical-block network, all ports in the W, S, E, and N directions must be connected to another logical block in the network.
 (4) Unconnected D (U) ports correspond to input (output) qubits of the logical operation. In some embodiments, logical blocks with input or output qubits must either be E-oriented Z-type blocks or N-oriented X-type blocks. A pair of connected D ports indicates that the input to the logical operation is a Bell pair.

Figure 21A:
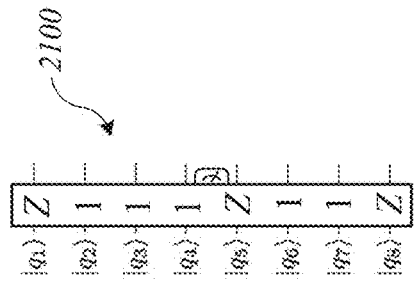
FIGS. 21A-21D illustrate a relationship between spacetime diagrams and logical block networks according to some embodiments.
Figure 21B:
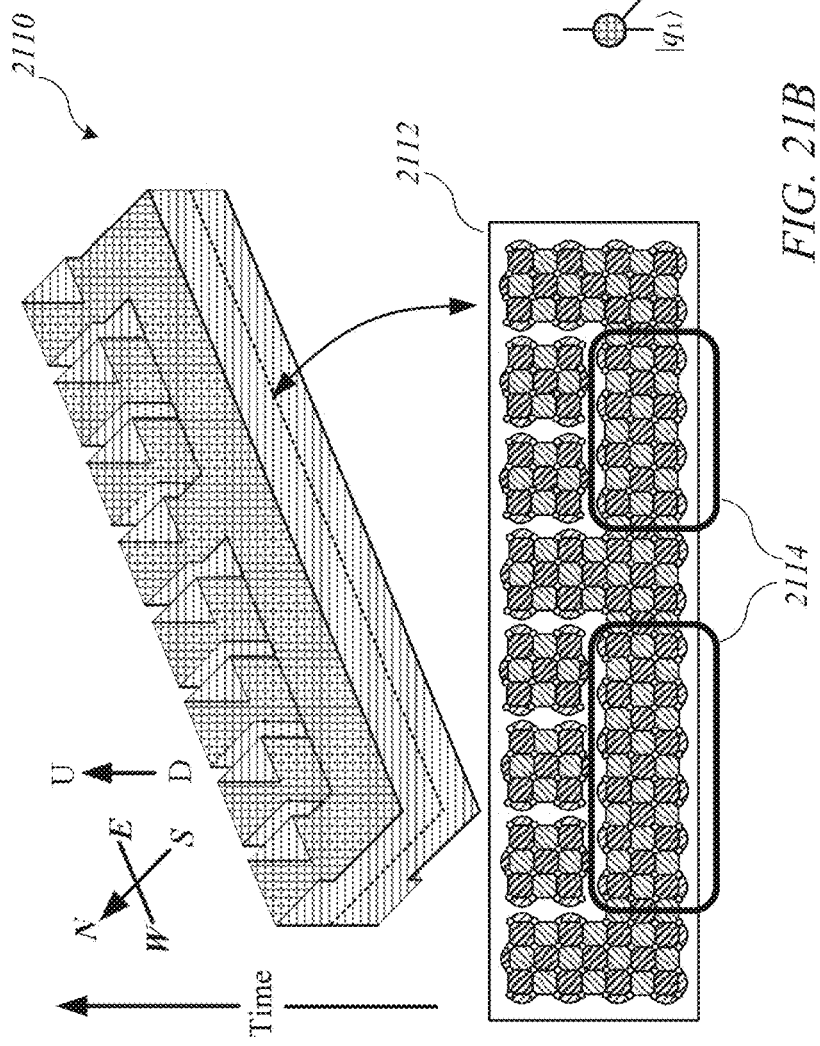
Figure 21C:
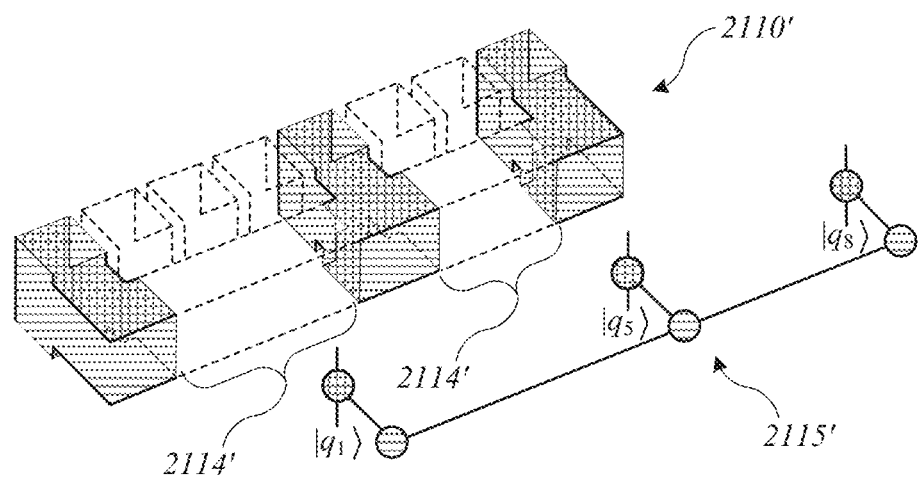

To further illustrate the relationship between spacetime diagrams and logical block networks, reference is made to FIGS. 21A-21E. FIG. 21A shows a gate diagram for a quantum circuit 2100 having eight qubits $|q_1\rangle$ through $|q_8\rangle$ on which a logical operation, specifically a Z-type Pauli product measurement on qubits $|q_1\rangle$, $|q_5\rangle$, and $|q_8\rangle$, is performed. FIG. 21B shows a corresponding spacetime diagram 2110 for execution of quantum circuit 2100 in a fault-tolerant manner using surface codes to encode eight logical qubits in a conventional architecture. Inset 2112 shows the surface-code patches for one time slice. It is noted that regions 2114 do not contribute to the computation and are present only to create surface code couplings between non-adjacent qubits $|q_1\rangle$, $|q_5\rangle$, and $|q_8\rangle$. (In the terminology introduced above, regions 2114 are considered idle volume, not active volume.) FIG. 21C shows a modified spacetime diagram 2110' for the execution of quantum circuit 2100, highlighting logical blocks that contribute to active volume. In a conventional architecture, if qubits $|q_1\rangle$, $|q_5\rangle$, and

|q₈⟩ were adjacent to each other, regions 2114' (corresponding to regions 2114 in FIG. 21B) could be omitted.

In an active volume architecture that provides port connections between surface code patches generated in non-adjacent workspace qubit modules, qubits such as |q₁⟩, |q₅⟩, and |q₈⟩ can be coupled without the extra computational work of generating regions 2114 by using port connections as described above to directly couple the surface code patches corresponding to non-adjacent logical qubits.

Figure 21D:
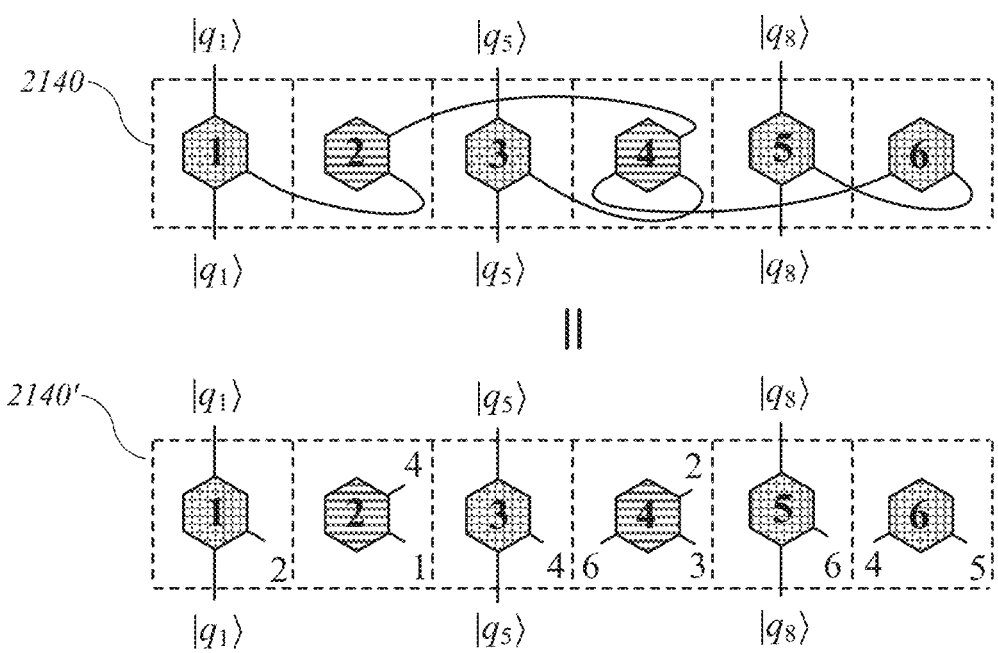

FIG. 21D shows two diagrams of a logical block network corresponding to spacetime diagram 2110' according to some embodiments. The diagrams in FIG. 21D use the hexagon notation defined above, and the mapping of spacetime regions to logical blocks follows the convention of FIGS. 20A-20D. As shown in diagram 2140, each hexagon (or logical block) is assigned a consecutive number, sometimes referred to as its position in the network. The input qubits are shown as coupled to the D ports of logical block numbered 1, 3, and 5, which are Z-type, E-oriented blocks The output qubits are shown as coupled to the U ports of logical blocks numbered 1, 3, and 5. Logical blocks numbered 2, 4, and 6 are X-type, U-oriented blocks, corresponding to the spacetime diagram segments in FIG. 21C. Port couplings between the logical blocks are shown as lines connecting the ports of different hexagons. Diagram 2140' shows the same logical block network as diagram 2140 and introduces a numbering convention to indicate the port couplings in place of actual lines, resulting in a more compact schematic. The number on each port identifies the logical block to which the port is coupled. Since the connections are always between ports that point in the same direction, it is not necessary to further specify which port. Thus, diagrams 2140 and 2140' are equivalent.

In an active volume core with port couplings, a logical block network can be executed by assigning each logical block to a different workspace module. For instance, referring again to FIG. 17, a block network diagram 1750 shows the logical operation that is being executed in workspace modules M2, M4, M6, M8, and M10. Logical block 1 is assigned to module M2; logical block 2 to module M4; logical block 3 to module M6; logical block 4 to module M8, and logical block 5 to module M10. It should be noted that the numeric identifier assigned to a logical block indicates the position of the logical block in the block network, in relation to other logical blocks in the block network, which is independent of the index of the workspace module that executes the logical block. It is usually advantageous to assign logical blocks in a network to adjacent workspace modules (e.g., so that port couplings between logical blocks are within range of the port-coupling network network), but this is not required, and it is not necessary to assign the first logical block (or indeed any logical block) to the first workspace module.

Block network diagram 1750 defines a logical operation with three input qubits (|q₂⟩, |q₃⟩ and |q₅⟩) and four output qubits (|q₂⟩, |q₃⟩, |q₄⟩ and |q₅⟩). There are port couplings between the W-ports of blocks 1 and 2, the S-ports of blocks 3 and 4, and the E-ports of blocks 4 and 5, where the E-port of block 4 is Hadamarded. The port couplings between logical blocks in block network diagram 1750 correspond to the port connections between qubit modules that are open. Logical blocks 1 and 2 have their W-ports coupled. Accordingly, the W-to-W port connection between modules M2 and M4 is open, and check operator measurements for physical qubits at the respective W boundaries of the surface-code patches in modules M2 and M4 are performed as indicated at 1724. Logical block 4 has its S port coupled to logical block 3 and its E port coupled to logical block 5. Accordingly, the S-to-S port connection between modules M6 and M8 is open, and check operator measurements for physical qubits at the respective S boundaries of the surface-code patches in modules M6 and M8 are performed as indicated at 1768. The E-to-E port connection between modules M8 and M10 is also open, and check operator measurements for physical qubits at the respective E boundaries of the surface-code patches in modules M8 and M10 are performed as indicated at 1781. The E port of logical block 5 is Hadamarded, and M10 applies the Hadamard at the E boundary of its surface code patch as indicated at 1780.

To support implementation of fault-tolerant logical gates using lattice surgery and existing decoder techniques, the operations specified by a logical block network can continue for a number of code cycles equal to the code distance d. Accordingly, a "logical cycle" can be defined as a period of time equal to d code cycles, and each qubit module can execute a logical block within a logical cycle. Different qubit modules can execute their logical blocks concurrently, with port connections opened or closed as specified by the logical block network. Since port connections have a limited range (defined by range parameter r), logical block networks can be constrained by the requirement that port connections are only permitted within a block range limit r'. It should be noted that where the assignment of index numbers to qubit modules follows the even/odd alternation shown in FIG. 15, the block range limit r' can be smaller than range parameter r; for instance, r' might be r/2.

Numerous additional examples of logical block networks are described below. It should be understood that any logical block network can specify a set of operations for qubit modules in an active volume core, and logical block networks can be interpreted and executed in the manner illustrated in FIG. 17.

2.2.2. Quantum Circuits as Logical Block Networks

As noted, logical block networks can implement gate operations on logical qubits. To determine an appropriate logical block network for a particular gate operation, it can be helpful to represent the gate operation as a linear map between qubits. The ZX calculus (described in B. Coecke and R. Duncan, "Interacting quantum observables: categorical algebra and diagrammatics," *New Journal of Physics* 13, 043016 (2011)) provides a useful graphical language for linear maps between qubits that can be used to describe and optimize quantum circuits as well as surface-code operations. The graphical language of the ZX calculus can also be used to facilitate defining and optimizing logical block networks corresponding to particular gate operations. To facilitate understanding of this disclosure, the following brief summary of relevant aspects of ZX diagrams and transformation tools is provided.

Figure 22A:
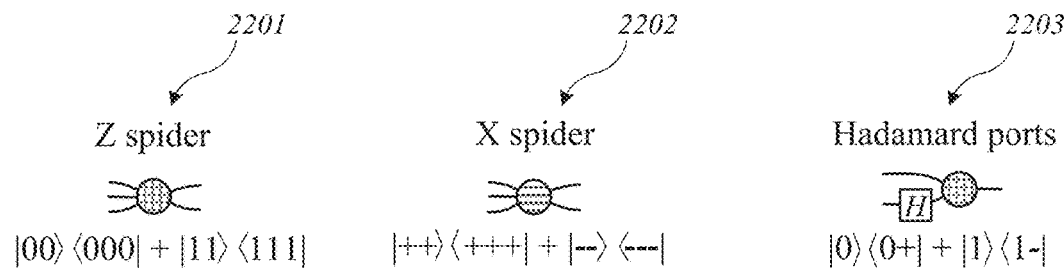
FIGS. 22A-22E illustrate ZX diagrams that can be used in some embodiments.

A ZX diagram (also sometimes referred to as a "spider diagram") consists of vertices, edges connecting pairs of vertices, and edges that connect to only one vertex. A vertex in a ZX diagram is referred to as a "spider," and each of the edges (or "legs") connected to the vertex corresponds to a port. FIG. 22A shows examples of ZX diagrams 2201-2203. (All spiders in diagrams herein are phase-free spiders.) A spider with n+m ports represents a linear map with n inputs and m outputs. Z spiders, such as ZX diagram 2201, correspond to the linear map of Eq. (17) above. X spiders, such as ZX diagram 2202, correspond to the linear map of Eq. (18) above. While spiders are clearly related to logical blocks, it should be noted that, unlike logical blocks, spiders are not limited by the constraint that $2 \leq m+n \leq 4$.) In diagrams herein, Z spiders are indicated by amber (or light) shading, X spiders by blue (or dark) shading. Spiders can have Hadamarded ports, corresponding to linear maps such as Eq. (19) above. ZX diagram 2203 shows an example of a Z spider with a Hadamarded port; the Hadamarded port is indicated by an H symbol on the appropriate leg.

Figure 22B:
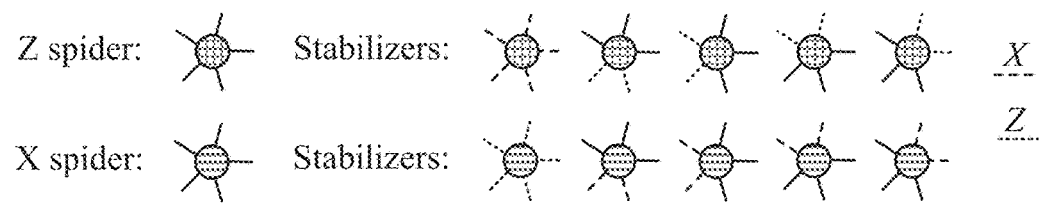

An alternative definition of ZX spiders relies on operators rather than states. In this definition, spiders can represent stabilizer-state projections, with each n-port spider describing n stabilizer generators on n qubits. The stabilizer generators described by Z (X) spiders are $X^{\otimes n}$ ($Z^{\otimes n}$) and all pairwise $Z^{\otimes 2}$ ($X^{\otimes 2}$) operators. FIG. 22B shows examples of Z and X spiders interpreted as stabilizers.

Like spacetime diagrams, ZX diagrams can be used to represent logical operations on logical qubits. For example, referring again to FIG. 21B, a ZX diagram 2115 corresponding to the three-qubit Z measurement in spacetime diagram 2110 is also shown.

Figure 22C:
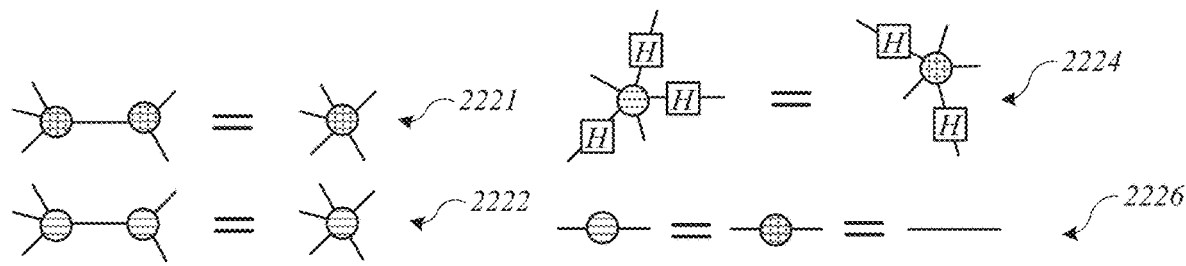

One useful aspect of the ZX calculus is that ZX diagrams can be manipulated according to various graphical transformation identities. FIG. 22C shows transformation identities that are used in the present disclosure. As shown at 2221 and 2222, two connected spiders of like type (Z or X) can be merged into a single spider. These identities runs in both directions: a spider can be split into two connected spiders of like type. As shown at 2224, an X spider can be transformed to a Z spider (or vice versa) by reversing the Hadamarded or non-Hadamarded state of each port. As shown at 2226, a Z spider with only two edges and an X spider with only two edges are each equivalent to a direct coupling.

These transformation identities can be used in optimizing logical block networks for active volume architectures. For example, referring again to FIG. 21B, a ZX diagram 2115 corresponding to spacetime diagram 2110 is shown. In FIG. 21C, a ZX diagram 2115' corresponding to spacetime diagram 2110' is shown. ZX diagram 2115' can be derived from ZX diagram 2115 by applying the transformation identity 2222 to reduce the number of X spiders. (It is noted that ZX diagram 2115' can be further optimized, as described below.)

Figure 22D:
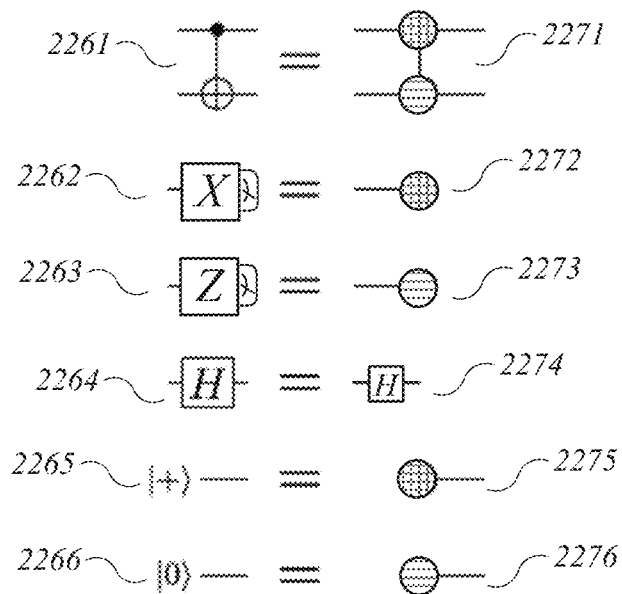

Elements of a quantum circuit model can also be represented using ZX diagrams. FIG. 22D shows examples of identities between circuit elements used herein and corresponding ZX diagrams. A CNOT gate 2261 corresponds to a ZX diagram 2271 with a three-port Z spider coupled to a three-port X spider. X-basis measurement gate 2262 corresponds to a Z spider 2272 with one input port and no output ports, and Z-basis measurement gate 2263 corresponds to an X spider 2273 with one input port and no output ports. A single-qubit Hadamard gate 2264 corresponds to a Hadamarded port 2274. Initialization of a qubit in the |+⟩ state (circuit symbol 2265) corresponds to a Z spider 2275 with no input ports and one output port, and initialization of a qubit in the |0⟩ state (circuit symbol 2266) corresponds to an X spider 2276 with no input ports and one output port.

Figure 22E:
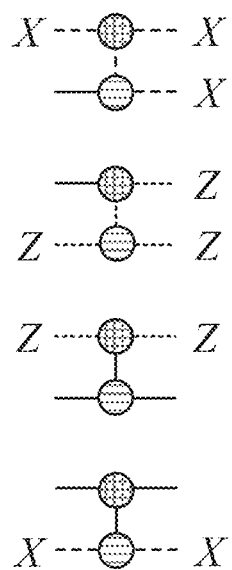

Each connection between two spiders corresponds to a Bell-state projection, i.e., the two qubits i and j corresponding to the two ports are identified via the projection $Z_i Z_j = X_i X_j = +1$. A composite ZX diagram with n unconnected ports also describes n stabilizer generators on n qubits, with the 4 stabilizer generators of a two-spider diagram shown in FIG. 22E.

In examples below, translation of quantum circuits to ZX diagrams relies on the circuit identities shown in FIG. 22D, and simplification of ZX diagrams relies on the transformation identities shown in FIG. 22C.

In the operator picture of phase-free ZX diagrams, composite diagrams describe Clifford gates and Pauli measurement. Each stabilizer generator $P_i \otimes P_o$, where $P_i$ and $P_o$ are multi-qubit Pauli operators supported on the input and output qubits (ports), respectively, describes a map $P_i \to P_j$. For example, the CNOT gate in FIG. 22E maps $X_c \to X_c X_t$, $Z_t \to Z_c Z_t$, $Z_c \to Z_c$ and $X_t \to X_t$, where c and t label the control and target qubits. Stabilizer generators supported only on input or output qubits can be thought of as multi-qubit Pauli measurements and preparations of Pauli eigenstates.

Using the identities in FIGS. 22D, it is possible to translate a quantum circuit diagram into a ZX diagram. The ZX diagram can then be transformed into an "oriented" ZX diagram (also referred to sometimes as an "oriented spider diagram"), using the following procedure:

(1) The number of ports of each spider is constrained to satisfy 2≤m+n≤4, 0≤n≤4, and 0≤m≤4 (same constraint as a logical block defined above). Spiders can be split or combined using identities 2221 and 2222 until this constraint is satisfied.

(2) Input ports of the diagram are oriented in the D direction, and output ports of the diagram are oriented to the U direction. (As a guide to the eye, the ports can be drawn in appropriate directions on the page.)

(3) Each port coupling between spiders is assigned to either the N-S or E-W axis. (As a guide to the eye, the ports can be drawn in appropriate directions on the page.)

(4) An orientation of each spider is determined using the same definition as for logical blocks: E-oriented spiders are those that do not contain ports in the W or E direction; N-oriented spiders are those that do not contain ports in the S or N direction; and U-oriented spiders are those that do not contain ports in the D or U direction. As with logical blocks, pairs of oriented spiders are defined as commensurate if they have the same type and same orientation or if they have different types and different orientations and as incommensurate if they have the same type and different orientation or if they have different types and the same orientation.

(5) Unless one (but not both) of the two ports connecting two spiders is Hadamarded, the two connected spiders must be commensurate. Otherwise, they must be incommensurate. Additional spiders can be introduced (using the transformation identities 2221 and 2222) to satisfy this requirement.

An oriented ZX diagram can then be translated to the hexagon notation for logical blocks introduced above by converting each spider to a hexagon and connecting ports that point in the same direction. In this manner, any quantum circuit diagram can be converted into a logical block network diagram. The following examples illustrate the process.

Figure 23:
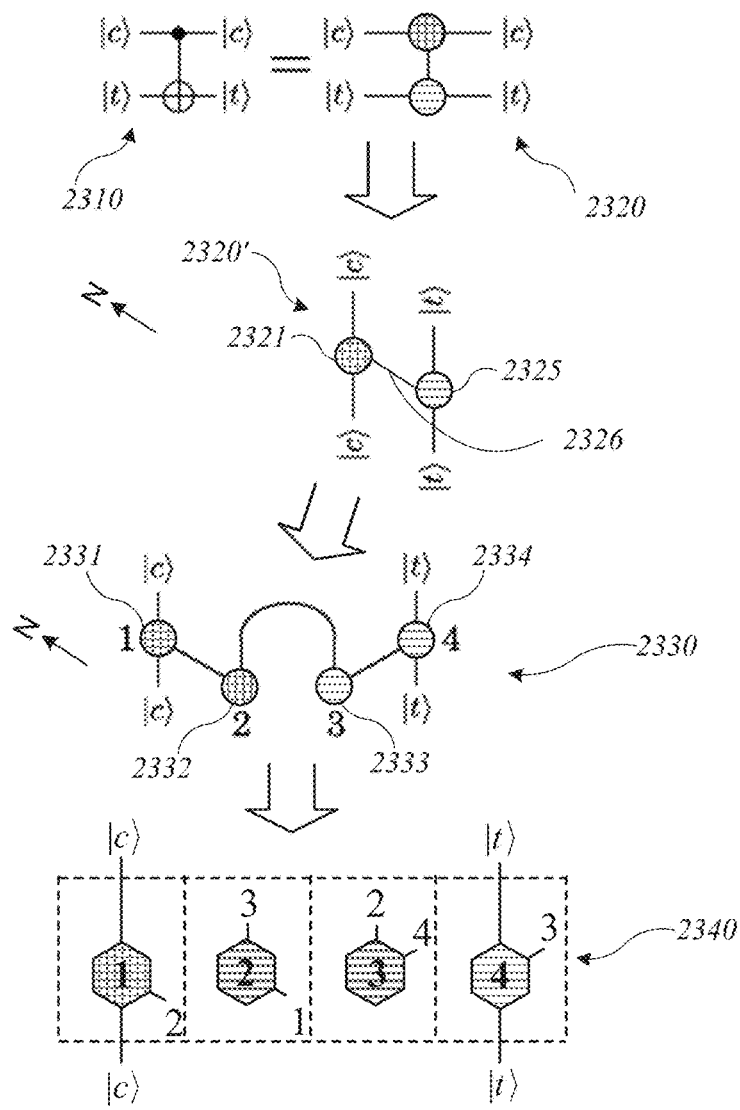
FIG. 23 shows a process for converting a CNOT gate to a logical block network according to some embodiments.

FIG. 23 shows a conversion process for a CNOT gate according to some embodiments. A circuit diagram 2310 of a CNOT gate shows two qubits labeled |c⟩ and |t⟩ (for "control" and "target"). Per circuit identity 2261, circuit diagram 2310 is equivalent to ZX diagram 2320. ZX diagram 2320 can be transformed using the procedure described above into an oriented ZX diagram 2330. As a guide to the eye, ZX diagram 2320 can be rotated 90 degrees, as shown at diagram 2320', such that the input qubits are downward on the page, the output qubits are upward on the page, and the coupling 2326 is oriented along the N-S axis. It is apparent from diagram 2320' that spider 2321 is a Z-type, E oriented spider and spider 2322 is an X-type, E-oriented spider. Hence, spiders 2321 and 2322 are not commensurate, and additional spiders should be added.

Oriented ZX diagram 2330 shows the modified set of spiders. Spiders 2331 and 2332 are obtained by applying transformation identity 2221 to spider 2321. Spider 2331 is a Z-type E-oriented spider, and spider 2332 is also a Z-type E-oriented spider. Spiders 2335 and 2336 are obtained by applying transformation identity 2222 to spider 2325. Spider 2335 is an X-type N-oriented spider, and spider 2336 is also an X-type N-oriented spider. Accordingly, all port couplings are between commensurate spiders.

Oriented ZX diagram 2330 is not directly a logical block network, as it may suggest connections between, e.g., an E port and a W port. Instead, it is meant as a guide to the eye. Each spider in oriented ZX diagram 2330 has been assigned a number (1 through 4) for a corresponding logical block. Conversion of oriented ZX diagram 2330 to a logical block network diagram 2340 is thus straightforward.

In some embodiments, the active volume of a logical operation can be determined by counting logical blocks in the corresponding logical block network. Thus, the CNOT gate 2310 has an active volume of four blocks.

Figure 24:
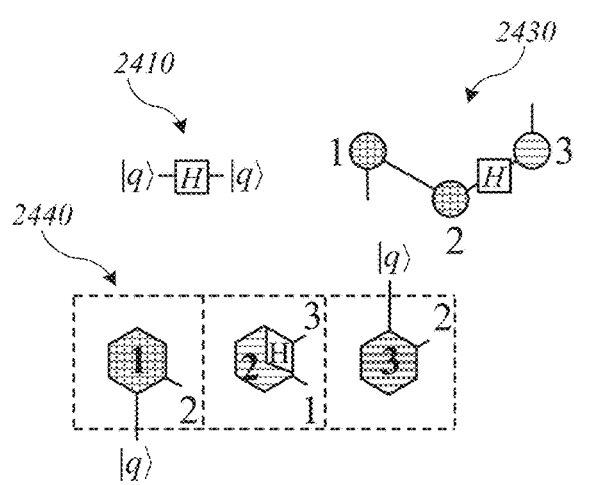
FIG. 24 shows a conversion of a single-qubit Hadamard gate to a logical block network according to some embodiments.

FIG. 24 shows a conversion of a single-qubit Hadamard gate to a logical block network according to some embodiments. A circuit diagram 2410 shows a qubit |q⟩ entering and exiting a Hadamard gate. A corresponding oriented ZX diagram 2430 and logical block network diagram 2440 are shown. The single-qubit Hadamard gate has an active volume of three blocks.

Figure 25:
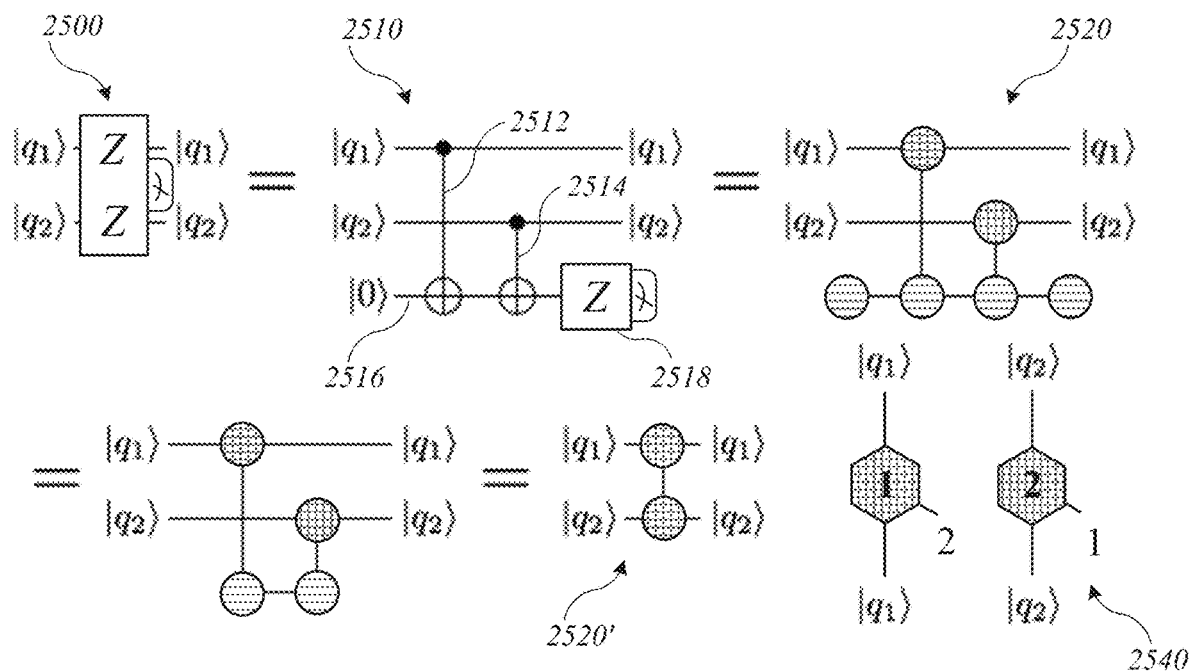
FIG. 25 shows a process for conversion process for a two-qubit Z⊗Z measurement to a logical block network according to some embodiments.

FIG. 25 shows a conversion process for a two-qubit Z⊗Z measurement according to some embodiments. A gate diagram shows the two-qubit gate 2500. As shown in circuit diagram 2510, gate 2500 corresponds to two CNOT gates 2512, 2514 with an ancilla qubit 2516 initialized in state |0⟩, followed by a Z measurement 2518 on the ancilla qubit. Using the circuit identities in FIG. 22D, circuit diagram 2510 can be translated into a ZX diagram 2520. Using transformation identities of FIG. 22C, ZX diagram 2520 can be simplified to ZX diagram 2520', which consists of two three-port Z spiders. ZX diagram 2520' can be straightforwardly converted to logical block network diagram 2540, which includes two logical blocks. It should be noted that the ancilla qubit 2516 is only used in the construction of the ZX diagram and does not appear as a qubit in the logical block network 2540.

It should also be noted that the active volume of large circuits can be smaller than the total active volume of the component operations. For instance, while the active volume of two CNOT gates is 8 blocks, the active volume of a Z⊗Z measurement (which can be composed of a series of CNOT gates, as shown in FIG. 25) is only 2 blocks.

As another example, FIGS. 26A and 26C show a conversion process for a 4-qubit Z-type measurement according to some embodiments. A gate diagram 2600 shows the four-qubit gate. As shown in circuit diagram 2610, gate 2600 can be expressed as four CNOT gates 2611-2614 involving an ancilla qubit 2616, followed by a Z measurement 2618 of the ancilla qubit (analogous to circuit 2510 of FIG. 25). Circuit 2610 can be translated to a ZX diagram 2620, which is equivalent to ZX diagram 2625. As shown in FIG. 26B, the $Z^{\otimes 4}$ operator on the four input qubits is a stabilizer generator of the ZX diagram 2626, which verifies that ZX diagram 2625 implements a measurement. FIG. 26C shows the corresponding oriented ZX diagram 2630. In constructing oriented ZX diagram 2630 from ZX diagram 2620, the 4-port X spider 2627 is split into two 3-port X spiders 2632, 2635, and the operation has an active volume of 6 blocks.

Figure 26D:
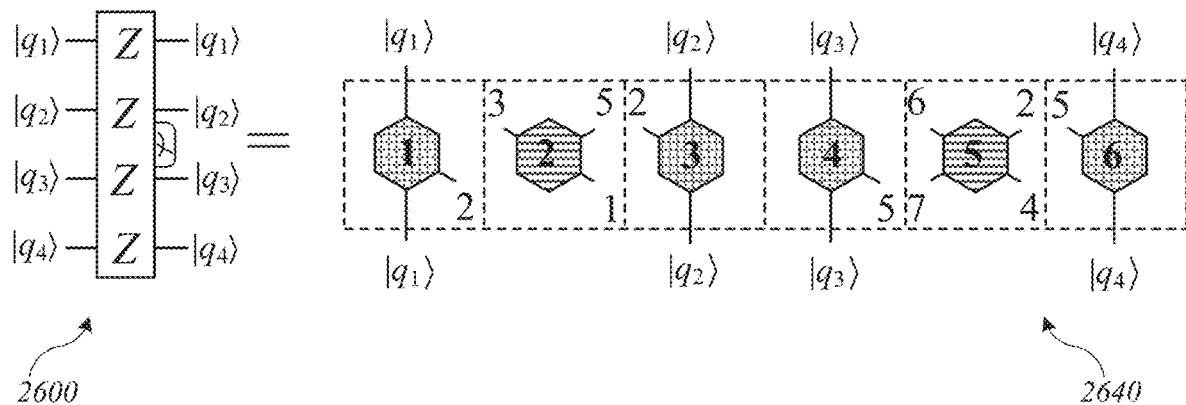

FIG. 26D shows a logical block network 2640 corresponding to oriented ZX diagram 2630, which implements gate 2600.

Figure 26E:
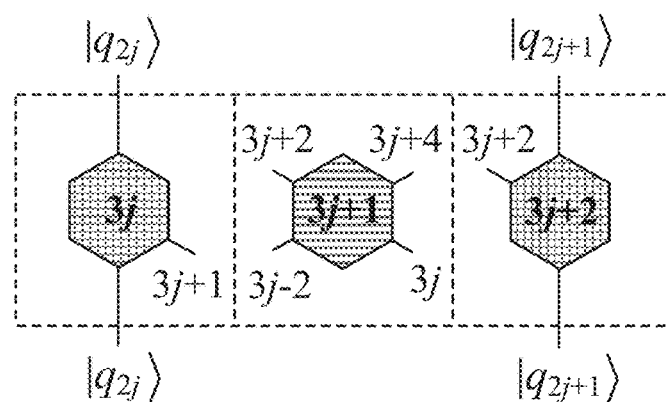

FIG. 26E shows a template for a generalized logical block network for measurement of arbitrary weight-w multi-qubit Z operators according to some embodiments. Using the three-block segment in FIG. 26E, it can be inferred that a weight-w measurement has an active volume of $$\left\lceil \frac{3}{2}w \right\rceil.$$

In a similar manner, any gate operator can be expressed as a logical block network. Additional examples of gate operators and corresponding logical block networks are described below.

2.2.3. Logical Qubit Preparation and Measurement

As described above, logical block networks define gate operations on input qubits and produce output qubits. In some embodiments, the input and output qubits for logical block networks implemented in an active volume architecture can be managed using the memory modules of the active volume core.

Before a (logical) qubit can be operated upon, the qubit should be initialized. In some embodiments, any qubit module that is empty can initialize a qubit in the Pauli-X eigenstate |0⟩ or the Pauli-Z eigenstate |+⟩ within one code cycle. The X or Z basis can be specified in an instruction to initialize a qubit in a particular qubit module. In some embodiments, qubits can be initialized in memory modules, then quickswapped to workspace modules as inputs to logical block networks. However, as noted above, workspace and memory modules can be implemented using identical hardware, and qubits can be initialized in either workspace or memory modules as desired.

In addition, in some embodiments, a pair of logical qubits can be initialized in the Bell state (|00⟩ +|11⟩ )/2 within one code cycle using a pair of qubit modules, provided that the qubit modules are in range and initially empty. As described above, the D-to-D port connection between the pair of qubit modules can be used to perform the initialization.

In addition to these states, preparation of qubits in other logical states may be desired. For example, magic states, such as T states |T⟩ =(|0⟩ +$e^{i\pi/4}$|1⟩ )/2 or CCZ states |CCZ⟩ =CCZ|+⟩ $^{\otimes 3}$ are useful in a number of logical operations. These states can be prepared using various "distillation" protocols that provide the desired state with reduced probability of error. Distillation protocols can be implemented in an active volume architecture using logical block networks, and the resulting states can be stored in memory modules until they are needed. Examples of logical block networks for distillation of magic states are described below.

Once initialized, a logical qubit in an initial qubit module can be quickswapped into a "target" qubit module in one code cycle, provided that the initial and target qubit modules are quickswappable. For example, a qubit initialized in a memory module can be quickswapped into a workspace qubit module. As described above, the quickswap connection for a given qubit couples to the D port of the target module. consistent with the association of D ports and input qubits in a logical block. Where quickswaps are implemented using transversal physical SWAPs, quickswapping a logical qubit from a memory module into a workspace module has the side effect of quickswapping any state that may be present in the workspace module into the memory module. This is not a problem, provided that one keeps track of which logical qubits (or other states) are in which modules.

Output qubits produced by executing logical blocks can also be quickswapped, e.g., to move an output qubit from a workspace module into a memory module. In this case the U port of the workspace module couples to the D port of the memory module, consistent with the association of U ports and output qubits in a logical block. Where quickswaps are implemented using transversal physical SWAPs, quickswapping a logical qubit from a workspace module into a memory module has the side effect of quickswapping any state that may be present in the memory module into the workspace module. Again, this is not a problem, provided that one keeps track of which logical qubits (or other states) are in which modules.

Quickswaps can also be used to rearrange qubits in memory modules. For instance, FIG. 19 shows using quickswaps to rearrange qubits in memory modules. An instruction to perform a quickswap can specify a pair of modules to perform a quickswap, or an instruction to perform multiple quickswaps can specify two or more disjoint pairs of modules to perform separate quickswaps. Such an instruction can be illustrated using a quickswap diagram 1950, in which quickswaps are indicated using arrows; in the convention used herein, the quickswap diagram shows the content of the qubit modules after the quickswaps (the previous state can be inferred from the arrows). Thus, in quickswap diagram 1950, a double-ended arrow 1951 indicates a quickswap between memory modules M7, which initially stored a qubit $|q_7\rangle$ and M9, which initially stored a qubit $|q_6\rangle$. The quickswap can be implemented as described above, and after the quickswap, module M7 stores qubit $|q_6\rangle$ while module M9 stores qubit $|q_7\rangle$. A single-ended arrow 1652 indicates a quickswap involving an empty memory location: Memory module M1, which initially stored a qubit $|q_1\rangle$ quickswaps with memory module M3, which initially was empty. The quickswap can be implemented as described above, and after the quickswap, module M3 stores qubit $|q_1\rangle$ while module M1 is empty.

Quickswaps between memory modules can occur during a logical cycle, while the workspace modules are executing logical blocks. (Quickswaps between memory modules and idle workspace modules can also occur while other workspace modules are executing logical blocks; however, in the ideal case, the workspace modules are not idle.)

As described above, a quickswap can be completed within a code cycle. Quickswaps between disjoint pairs of qubit modules, such as module pairs (M1, M3) and (M7, M9) in FIG. 19, can occur concurrently (in the same code cycle). Since a logical cycle has a duration of d code cycles, it is possible to execute up to d layers of quickswaps during one logical cycle, thereby rearranging the qubits in memory modules into a desired alignment for the next logical cycle. In some embodiments, quickswaps can enable an active volume core to proceed from one logical cycle to the next without incurring additional cycles of delay to rearrange the qubits in memory.

Logical qubits can also be measured to determine their final states. Measurement of a logical qubit can be implemented by performing a single-qubit measurement on each physical qubit. The results can be interpreted using classical (binary) logic, e.g., by executing a surface-code decoder algorithm, to determine the state of the logical qubit. In some embodiments, a logical qubit can be measured in either the X or Z basis within one code cycle. In some embodiments, pairs of qubits stored in modules i and j that are in range can participate in a Bell-basis measurement within one code cycle, via U-to-U port couplings. (As noted above, a Bell-basis measurement is a measurement of the two-qubit Pauli operators $X_i \otimes X_j$ and $Z_i \otimes Z_j$.)

In some embodiments, instructions to a quantum computer can specify when to measure a particular qubit (or pair of qubits) and which basis to use. In some instances, the choice of measurement basis (e.g., X, Z, or Bell measurement) for a later measurement depends on the outcome of one or more earlier (logical) measurements. Such "reactive" measurements introduce a reaction time $\tau_r$, which is the time that it takes to complete all of the following: (1) perform an appropriate set of measurements (single-qubit X or Z, or two-qubit Bell-basis measurements) on physical qubits; (2) determine a logical measurement outcome from the set of measurements (e.g., using a classical surface-code decoder algorithm); (3) use the logical measurement outcome to determine the measurement basis for the later (reactive) measurement; and (4) send the appropriate instructions to the active volume core to perform the later measurements. The reaction time $\tau_r$ in a particular embodiment depends on a variety of factors, including the speed at which physical measurements can be performed, the speed of the decoder algorithm, and the speed with which new instructions can be generated (or selected) and sent to the active volume quantum computer core. In some cases, reaction time has implications for the throughput of an active volume quantum computer; examples are described below.

2.2.4. Execution of a Quantum Computation

A quantum computer with an active volume core such as core 1510 of FIG. 15 can execute computations by executing a sequence of logical cycles. During each logical cycle, the workspace modules can execute logical blocks (one logical block per workspace module) while memory modules can execute quickswaps to rearrange qubits in memory in preparation for subsequent logical cycles. Quickswaps between memory modules and workspace modules can occur between logical cycles.

Figure 27:
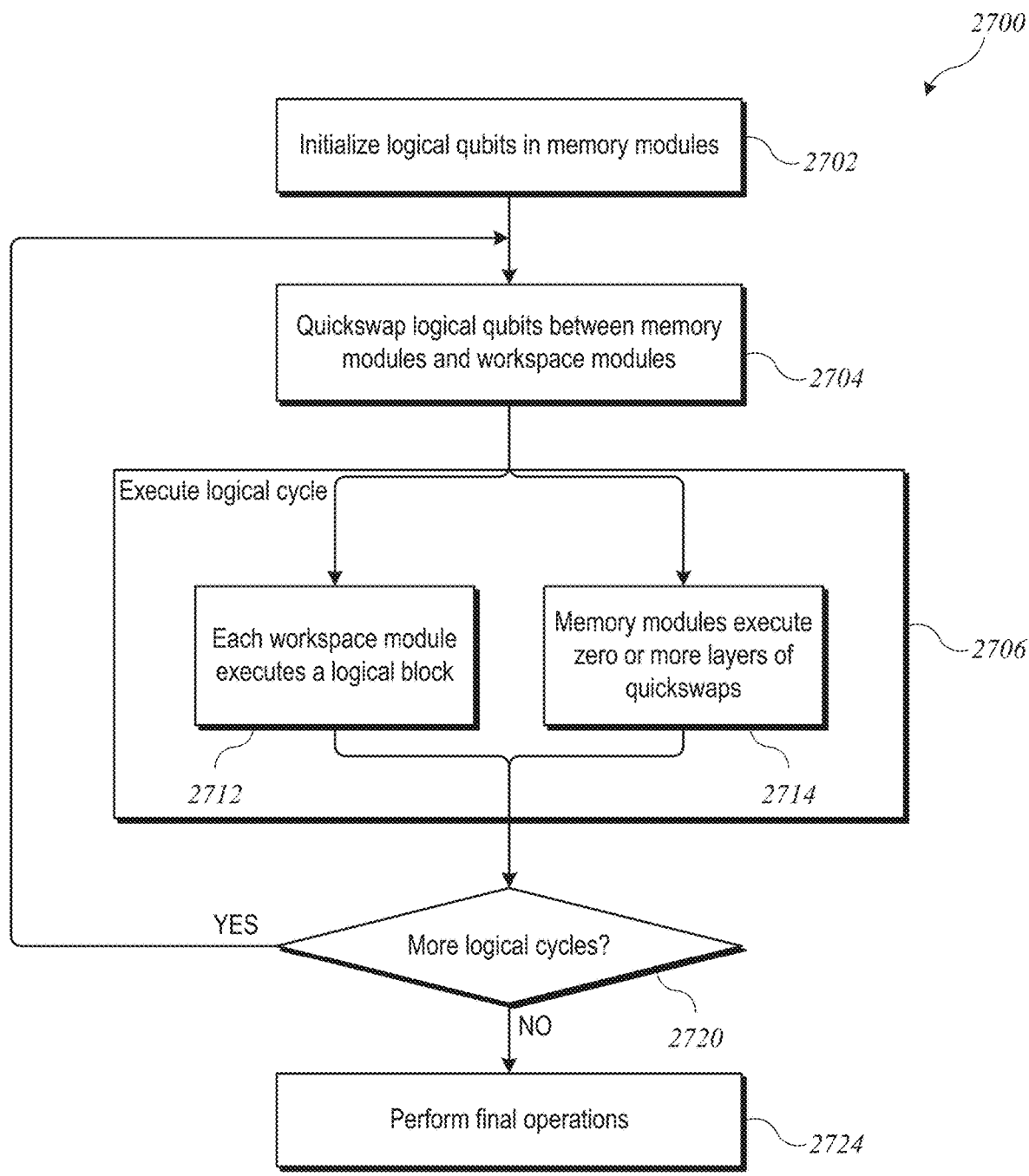
FIG. 27 shows a flow diagram of a process for executing a quantum computation in an active volume quantum computer system according to some embodiments.

FIG. 27 shows a flow diagram of a process 2700 for executing a quantum computation in an active volume quantum computer core (such as core 1510 of FIG. 15) according to some embodiments. Process 2700 assumes that the quantum computation has been expressed as one or more logical block networks. At block 2702, logical qubits can be initialized in memory modules. The number of logical qubits and their initial state depends on the particular computation. At block 2704, quickswaps between memory and workspace modules can be performed. For instance, if the logical qubits are initialized in memory modules, one or more of the logical qubits can be quickswapped into workspace modules to provide input qubit(s) for a logical block network. At block 2706 a logical cycle can be executed. During the logical cycle, at block 2712, each workspace module can execute a logical block. As described above, executing a logical block can include generating a surface code patch and selectively opening port connections to couple surface code patches at appropriate boundaries as specified by the logical block network. While the workspace modules are executing logical blocks, at block 2714, the memory modules can execute zero or more layers of quickswaps to rearrange qubits in preparation for subsequent logical cycles. The number of layers of quickswaps during a given logical cycle is determined based on the current arrangement of qubits in memory and the desired arrangement for the start of the next logical cycle. It is contemplated that at least one layer of quickswaps will be performed during most logical cycles; in the last logical cycle, rearranging memory may have little benefit. At block 2720, upon completion of the logical cycle, if more logical cycles remain to be executed, then at block 2722, process 2700 can return to block 2704 to perform quickswaps between memory and workspace modules, then execute the next logical cycle. With a suitable design of quickswaps within memory at block 2714, all the quickswaps between memory and workspace at block 2704 can be accomplished with a single layer of quickswaps. Process 2700 can continue executing logical cycles in this manner until the computation is complete. After all logical cycles have been executed, the computation is complete, and final operations, including final measurements of each logical qubit, can be performed at block 2724.

It should be understood that while process 2700 is executing, core 1510 can send measurement data in real time to classical control logic 1520, including check operator measurements, single-qubit measurements, and/or Bell basis measurements. Classical control logic 1520 can apply a decoder algorithm to the measurement data as it is received and can select or modify instructions for subsequent logical cycles based on results of the decoder algorithm.

To further illustrate process 2700, a simple example of execution of a quantum computation in an active volume core such as core 1510 of FIG. 15 will now be described. This example, which uses a small core having N=12 qubit modules and a sequence of five gate operations, is chosen to illustrate some features and benefits of active volume architectures. In practice, it is expected that a core may be significantly larger and that a larger number of gate operations may be performed.

Figure 28A:
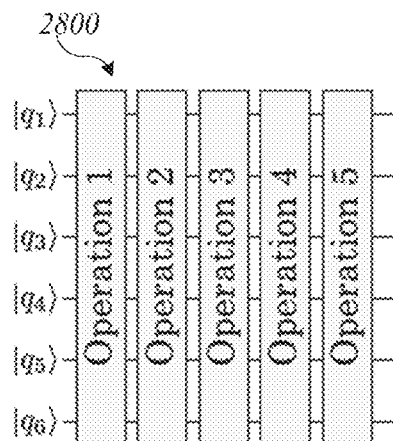
FIGS. 28A-28F illustrate execution of a quantum circuit in an active volume quantum computer system according to some embodiments.

FIG. 28A shows a quantum circuit 2800 that specifies a quantum computation as a sequence of five logical gates, or gate operations, on six logical qubits $|q_1\rangle$ through $|q_6\rangle$. FIG. 28B shows a logical block network corresponding to each gate operation. Operation 1 (block network 2801) has an active volume of 4 blocks; operation 2 (block network 2802) has an active volume of 2 blocks; operation 3 (block network 2803) has an active volume of 6 blocks; operation 4 (block network 2804) has an active volume of 2 blocks, and operation 5 (block network 2805) has an active volume of 3 blocks. Each operation affects only a subset of the six qubits; the particular input and output qubits for each operation are indicated in the logical block network diagrams in FIG. 28B.

Figure 28C:
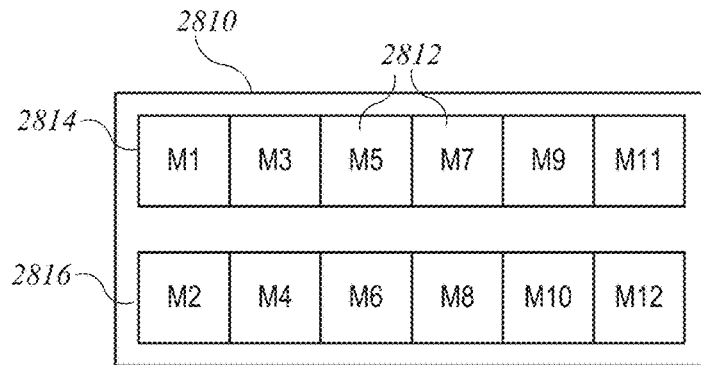
Figure 28B:
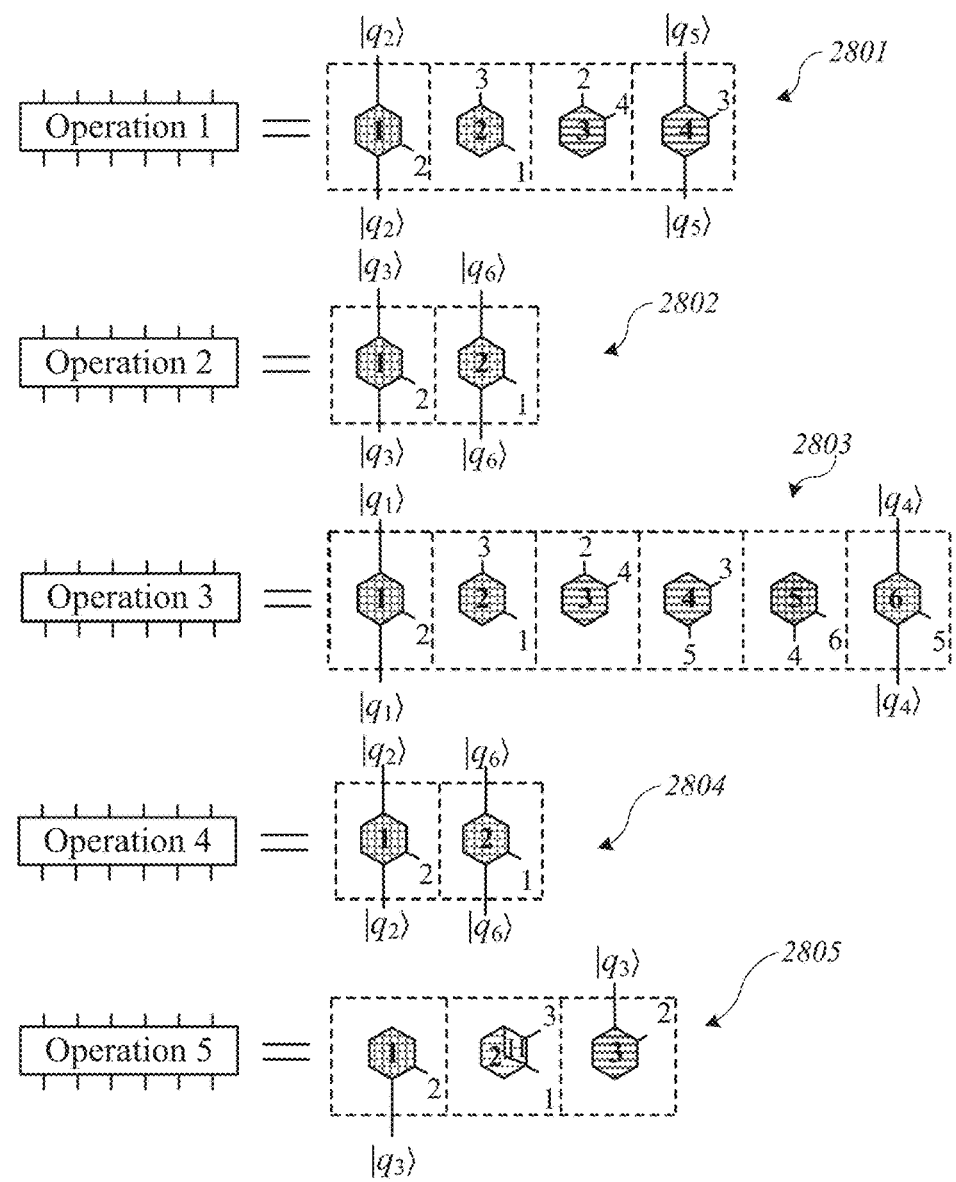

FIG. 28C shows an active volume core 2810 that can execute quantum circuit 2800 by executing logical block networks 2801-2805 according to some embodiments. Active volume core 2810 can be generally similar to active volume core 1510 and can include port and quickswap connections as described above. In this example, active volume core 2810 has N=12 qubit modules 2812, evenly divided between memory modules 2814 and workspace modules 2816. Qubit modules 2812 have index values M1-M12 as shown. Modules with odd index are memory modules; modules with even index are workspace modules.

Figure 28D:
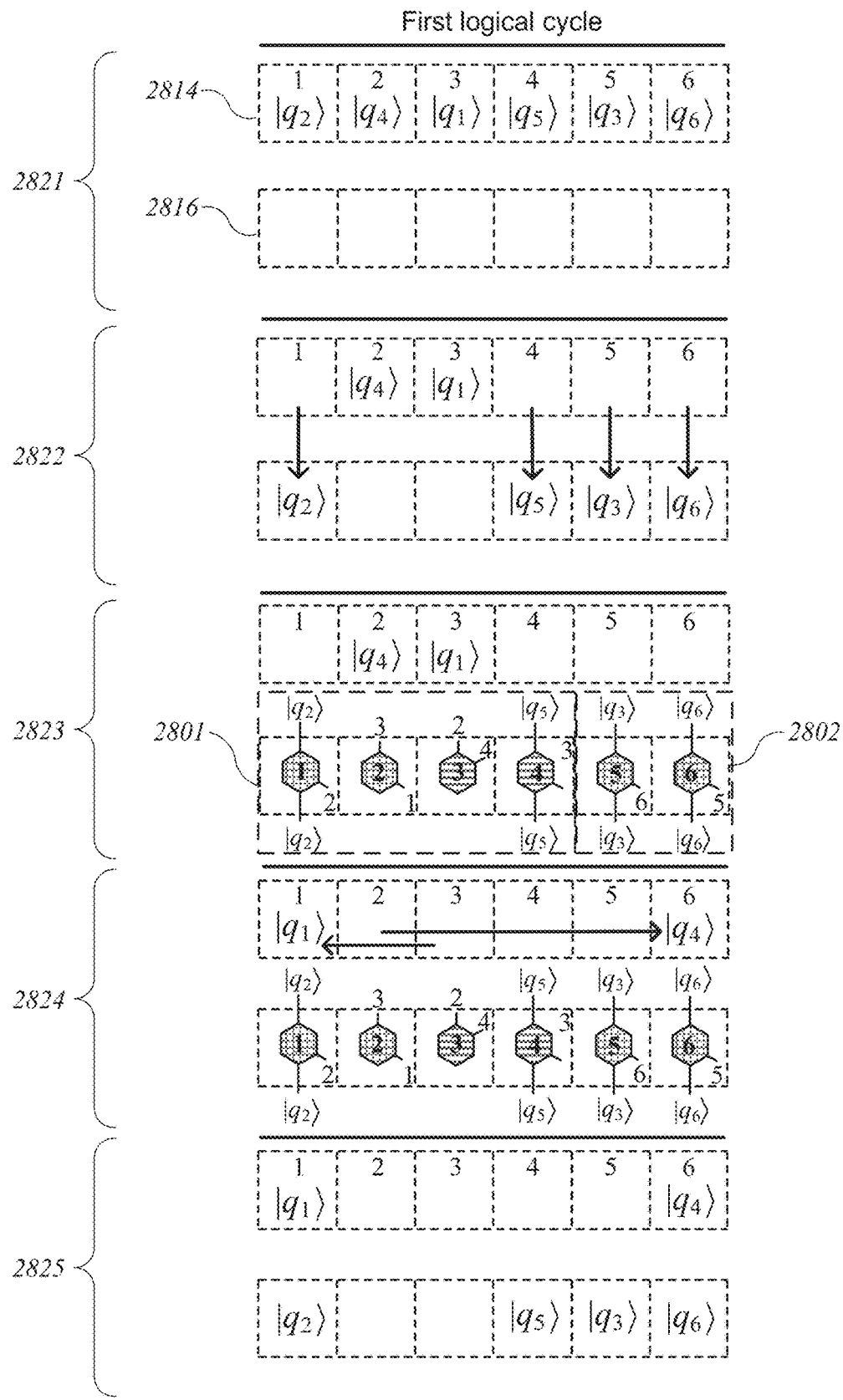
Figure 28E:
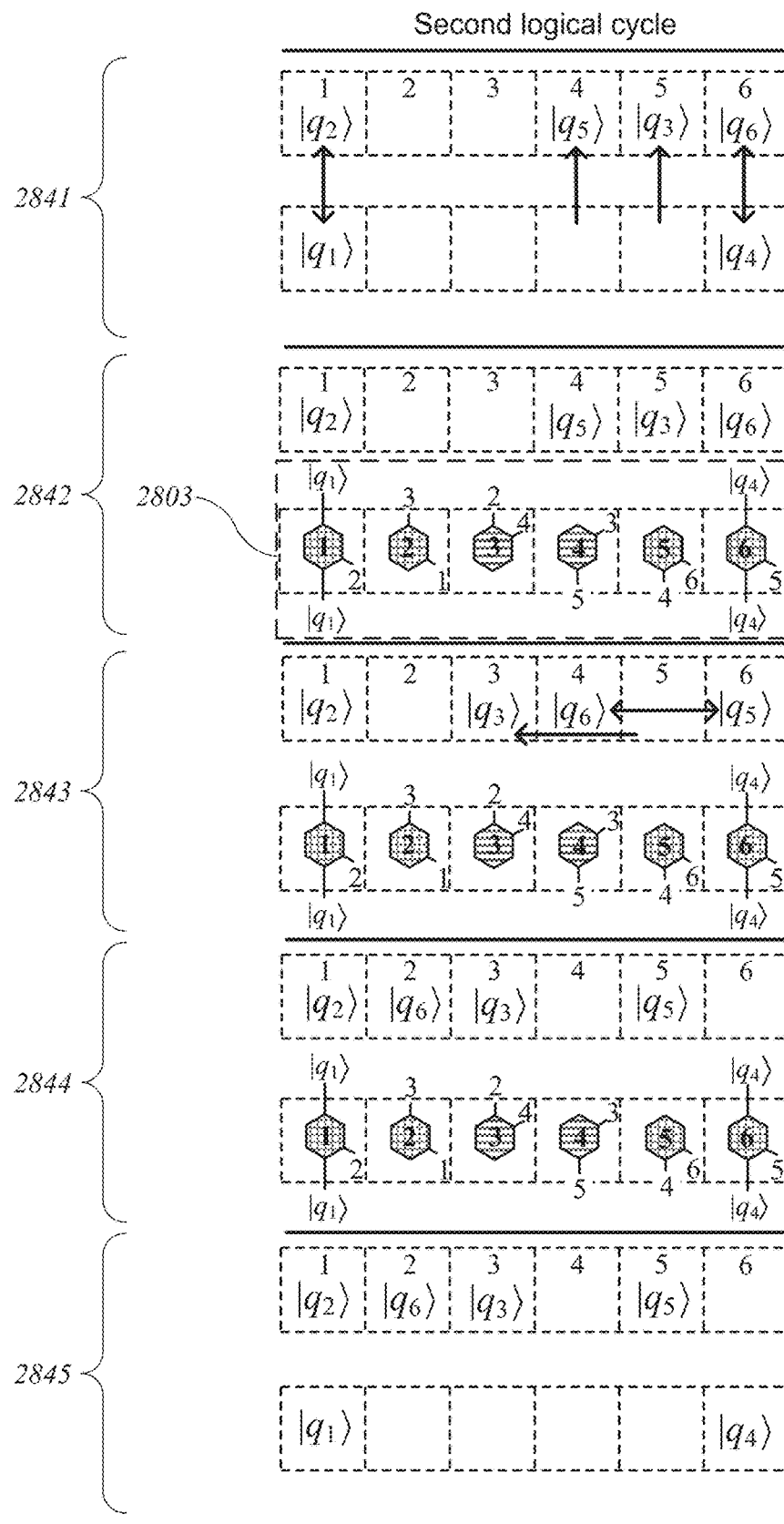
Figure 28F:
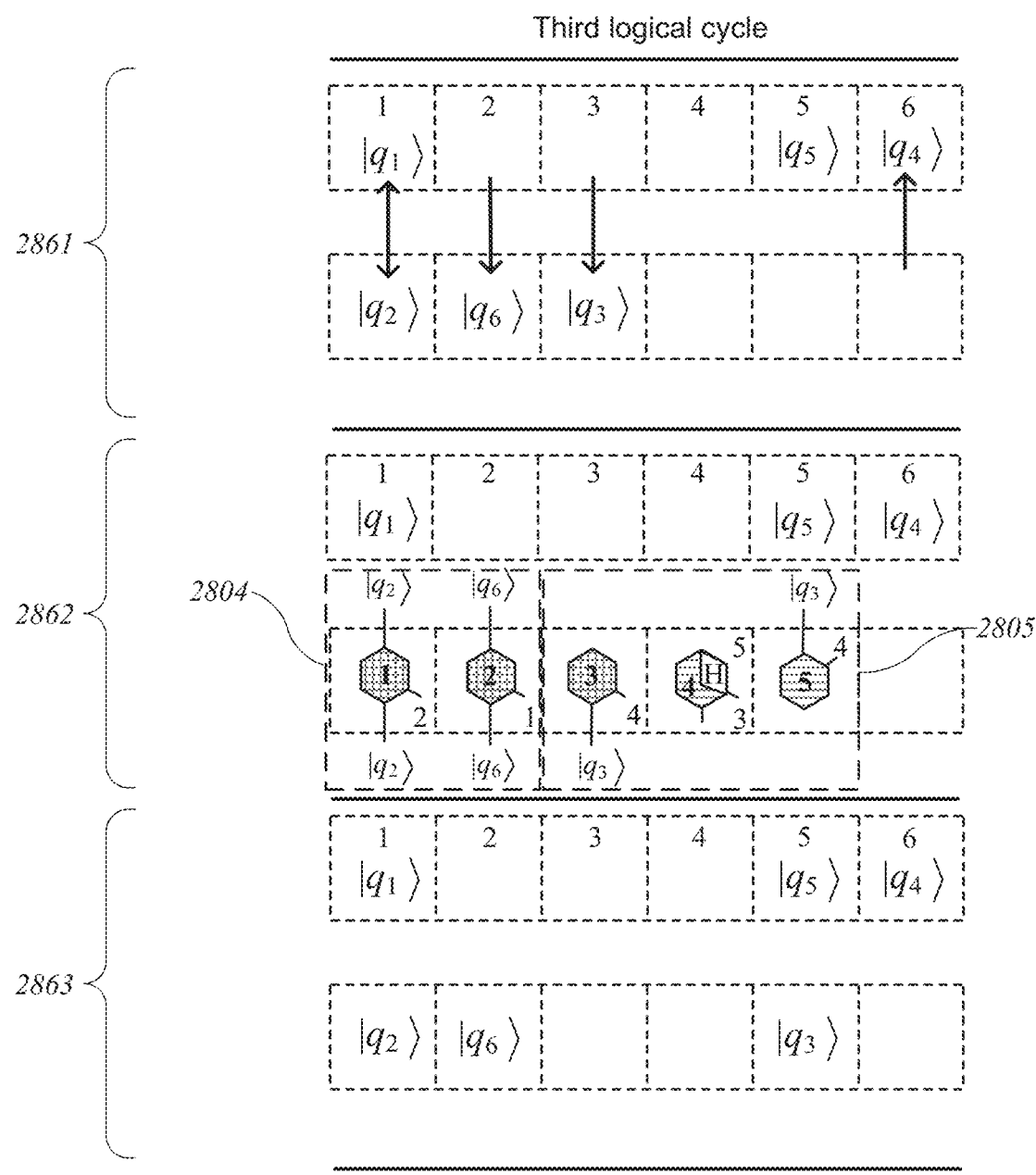

FIGS. 28D-28F show a "storyboard" view of executing the quantum computation specified by circuit 2800 using process 2700 according to some embodiments. As used herein, a storyboard view provides a succession of "snapshots," in temporal order, that schematically depict the state of an active volume core at different points in time during execution of a quantum computation (e.g., using process 2700). It should be understood that the snapshots are chosen to highlight particular features, and the elapsed time between successive snapshots need not be uniform.

As FIGS. 28D-28F show, the five logical operations are executed in three logical cycles. In each logical cycle, a goal is to execute as many logical blocks as possible, with multiple logical block networks being executed concurrently (i.e., in the same logical cycle), provided that enough workspace modules are available. As described above, each workspace module can execute one logical block in a logical cycle; accordingly, the goal in this case is to execute six logical blocks per cycle, which will fully occupy the workspace modules.

FIG. 28D shows a storyboard view for the first logical cycle. In the first logical cycle, block network 2801 (four logical blocks) and block network 2802 (two logical blocks) are executed. It is noted that block network 2801 operates on qubits $|q_2\rangle$ and $|q_5\rangle$ while block network 2802 operates on qubits $|q_3\rangle$ and $|q_6\rangle$. Since these are disjoint subsets of the qubits, parallel execution is straightforward.

Snapshot 2821 corresponds to initialization block 2702 of process 2700. In this example, six qubits $|q_1\rangle$ through $|q_6\rangle$ are arranged, in an optimized order, in the six memory modules M1 through M11. Assuming no prior computations, arranging the qubits can include initializing each qubit into an appropriate state using processes described above. If prior computations have occurred, then the qubits may be rearranged using quickswap operations, as will become apparent. The optimized order can be selected such that each qubit is in a memory module that is quickswappable with the workspace module that will next operate on the qubit.

Snapshot 2822 corresponds to block 2704 of process 2700. The qubits for operations 1 and 2 are quickswapped from memory modules into workspace modules as shown. In these storyboard views, quickswaps are represented by arrows, and the state of the core following the quickswap is shown.

Snapshot 2823 corresponds to block 2712 of process 2700. The logical block network 2801 for operation 1 is being executed in workspace modules M2 through M8, and the logical block network 2802 for operation 2 is being executed in workspace modules M10 and M12. (The two logical blocks for network 2802 have been assigned identifying numbers 5 and 6 to avoid confusion with network 2801.) Logical block executions that occur in the same logical cycle are described as being "concurrent" or "parallel." Execution of the logical blocks includes executing surface code check operators as described above and controlling the port connections to establish couplings between ports of workspace modules as specified in the logical block network(s) being executed. Execution of a logical block in some embodiments can consume d code cycles, or one logical cycle.

Snapshot 2824 corresponds to block 2714 of process 2700. While workspace modules 2816 are executing the logical block networks 2801 and 2802, memory modules 2814 can execute quickswap operations to prepare the memory for the next logical cycle. Since a given quickswap operation can be completed in one code cycle, memory modules 2814 can execute up to d layers, or stages, of quickswaps during one logical cycle. In this particular case, one layer of quickswaps suffices to move qubit $|q_1\rangle$ into memo module M1 and qubit $|q_4\rangle$ into memory module M11. (The reason for these quickswaps will become apparent.) Quickswaps in a given layer can occur between modules that are quickswappable as described above.

Snapshot 2825 shows the state of core 2810 at the end of the first logical cycle. Execution of the logical block networks 2801 and 2802 is complete, and the output qubits are present in the workspace modules. The computation is not complete, so process 2700 returns to block 2704 for a second logical cycle.

FIG. 28E shows a storyboard view for the second logical cycle. In the second logical cycle, operation 3 (six logical blocks) is executed. In this instance, operation 3 occupies all of the workspace modules, so no other operation can be executed concurrently with operation 3.

Snapshot 2841 corresponds to a second iteration of block 2704. Qubits $|q_1\rangle$ and $|q_4\rangle$ are quickswapped into the workspace, while the output qubits $|q_5\rangle$ and $|q_3\rangle$ from operations 1 and 2 are quickswapped into memory. It should now become apparent that the purpose of the quickswaps in the first logical cycle (at snapshot 2824) was to move qubits $|q_1\rangle$ and $|q_4\rangle$ into memory modules that allow logical block network 2803 (operation 3) to executed in the second logical cycle after a single layer of quickswaps.

Snapshot 2842, which corresponds to a second iteration of block 2712, shows execution of logical block network 2803 in workspace modules M2-M12. Snapshots 2843 and 2844, which correspond to a second iteration of block 2714, show that, while the workspace modules are executing logical block network 2803, two layers of quickswaps can be performed to prepare the memory for the third logical cycle, ultimately moving qubit $|q_3\rangle$ into memory module M5, qubit $|q_5\rangle$ into memory module M9 and qubit $|q_6\rangle$ into memory module M3. It should be noted that quickswap connections follow the log-tree network model described above, and quickswaps are selected accordingly.

Snapshot 2845 shows the state of core 2810 at the end of the second logical cycle. Execution of the logical block network 2803 is complete, and the output qubits are found in the workspace modules. The computation is still not complete, so process 2700 returns to block 2704 for a third logical cycle.

FIG. 28F shows a storyboard view for the third logical cycle. In the third logical cycle, operations 4 (two logical blocks) and 5 (three logical blocks) are executed, completing the computation. The third logical cycle begins with core 2810 in the state shown in snapshot 2845 (in FIG. 28E) and can immediately follow completion of executing the logical blocks of the second logical cycle.

Snapshot 2861, corresponding to a third iteration of block 2704 shows that at the beginning of the third logical cycle, qubits $|q_2\rangle$, $|q_6\rangle$, and $|q_3\rangle$ are swapped into workspace modules M2, M4, and M6. Snapshot 2861, corresponding to a third iteration of block 2712, shows workspace modules M2 and M4 executing logical block network 2804 (operation 4) and workspace modules M6-M10 executing logical block network 2805 (operation 5). Workspace module M12 is idle. Idle workspace modules can occur in an active volume core whenever the total number of logical blocks for the logical operations that are executed in a particular logical cycle is less than the number of workspace modules in the core. No quickswaps are performed in the third logical cycle since there are no subsequent logical cycles to be performed. At the end of the third logical cycle, final measurements can be performed on qubits $|q_1\rangle$ through $|q_6\rangle$. In some embodiments, both workspace modules and memory modules include hardware to perform final single-qubit measurements on the physical qubits of their respective surface code patches, so there is no need to move the logical qubits to any particular module for measurement.

FIGS. 27 and 28A-28F illustrate a general approach for executing a quantum computation using an active volume quantum core such as core 1510, not limited to any particular sequence of operations, length of sequence, or size of the active volume core. Instructions, which can use classical data structures, can specify a set of logical blocks to be executed by the workspace modules during each logical cycle as well as one or more layers of quickswaps to be performed by the memory modules during the logical cycle. The quickswaps can be planned such that, at the end of the logical cycle, a single layer of quickswaps suffices to transfer the input qubits for the next logical cycle from workspace to memory. Any number of logical cycles can be executed, and any number of logical block networks can be executed during a logical cycle, limited only by the number of workspace modules.

2.2.5. Bridge Qubits

Figure 29A:
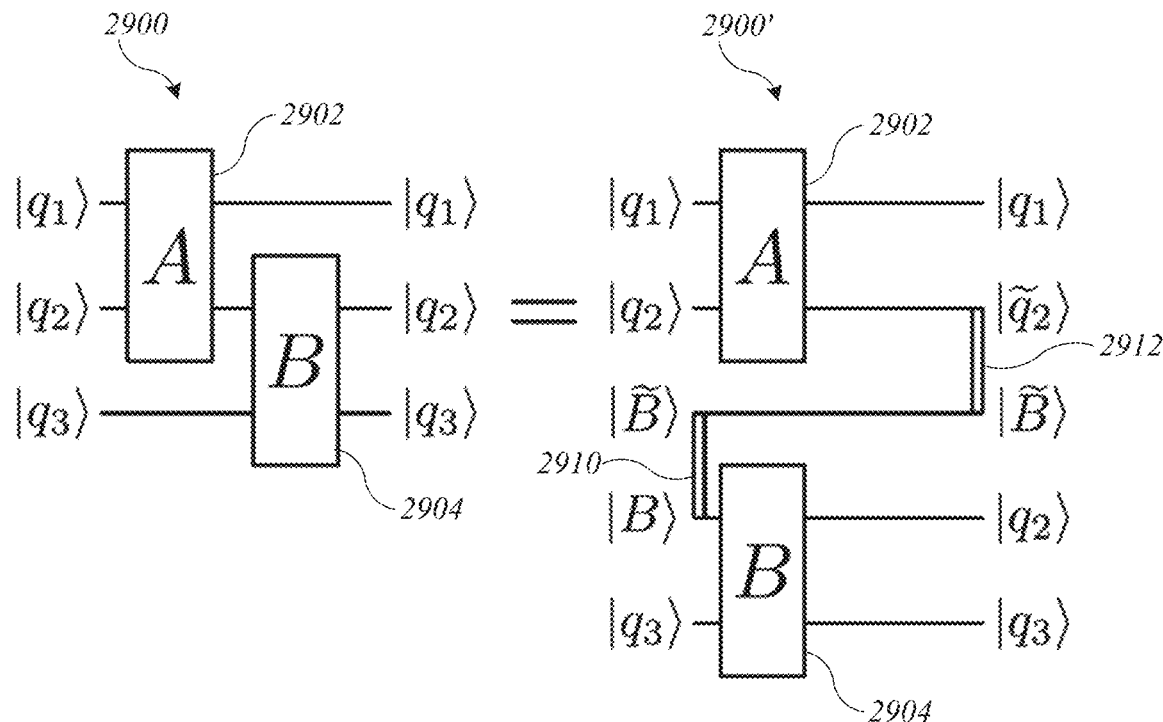
FIGS. 29A and 29B illustrate use of bridge qubits to support concurrent execution of logical blocks in an active volume computer system according to some embodiments.

In the example of FIGS. 28A-28F, successive operations act on disjoint sets of qubits, and executing multiple operations concurrently is straightforward. However, even in instances where successive operations (or logical block networks) use overlapping sets of qubits, concurrent execution of logical block networks in an active volume architecture is still possible by introducing "bridge qubits." FIG. 29A shows quantum circuit diagrams illustrating the construction of a bridge qubit according to some embodiments. FIG. 29A shows a quantum circuit 2900 in which qubit $|q_2\rangle$ participates in a first gate operation (A) 2902 followed by a second gate operation (B) 2904. Quantum circuit 2900' is an equivalent circuit to quantum circuit 2900. In circuit 2900', a pair of qubits $|B\rangle$ and $|\tilde{B}\rangle$ in the Bell state $(|00\rangle + |11\rangle)/2$ is created as indicated by entangling operation 2910. One half of the Bell pair, qubit $|B\rangle$, is used as an input qubit for operation 2904, while the other half, qubit $|\tilde{B}\rangle$, can be stored in memory. Qubit $|\tilde{B}\rangle$ is referred to herein as a "bridge qubit."

Figure 29B:
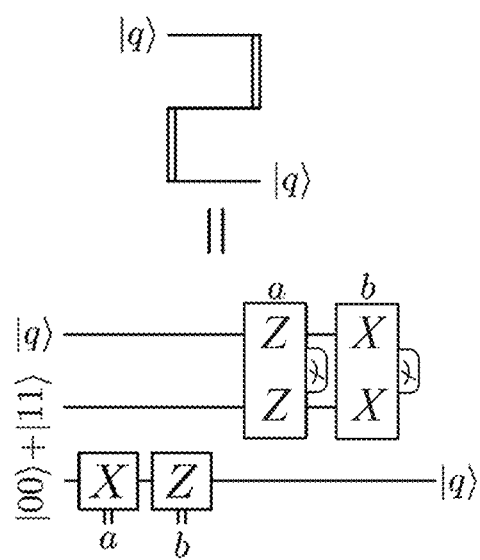

Use of bridge qubits allows the two operations 2902 and 2904 to be executed in parallel (i.e., in the same logical cycle). Specifically, original qubits $|q_1\rangle$ and $|q_2\rangle$ can participate in operation 2902 while qubits $|B\rangle$ and $|q_3\rangle$ participate in operation 2904 in the same logical cycle. During this logical cycle, the bridge qubit $|\tilde{B}\rangle$ is stored in memory (and can be quickswapped to another memory module). Operation 2904 (which received qubit $|B\rangle$) outputs qubits $|q_2\rangle$ and $|q_3\rangle$ while operation 2902 (which received qubit $|q_2\rangle$) outputs qubit $|q_1\rangle$ and a qubit $|\tilde{q}_2\rangle$. At the end of the logical cycle, bridge qubit $|\tilde{B}\rangle$ and qubit $|\tilde{q}_2\rangle$ are destroyed via a Bell basis measurement 2912. Those skilled in the art will appreciate that this sequence of operations effectively teleports the qubit $|q_2\rangle$ backward in time to be used as an input to the second operation. FIG. 29B shows the "backward in time" effect for a single qubit and expressly shows the Bell measurement operators.

According to some embodiments, bridge qubits can be used at any point in a quantum computation when it is desired to execute concurrently (in the same logical cycle) two sequential operations that affect the same qubit. In an active volume architecture as described above, Bell pair creation and measurement are operations that can be completed in one code cycle As noted above, creation of a pair of qubits in a Bell state can be supported using the D-D port connections, and Bell-basis measurements can be supported using the U-U port connections. Hence, use of bridge qubits need not slow down computations provided that: (1) the Bell pair that supplies the bridge qubit is created in a pair of qubit modules that are in range; and (2) at the end of the logical cycle, the bridge qubit and the other qubit on which Bell measurement is to be performed are in range. (In some embodiments, a bridge qubit can be moved within range of the other qubit using quickswaps.) Specific examples where bridge qubits can be advantageously used are described in the next section. Bridge qubits can also be useful to facilitate repositioning qubits in memory in some situations; an example is provided below.

2.2.6. Example: Sequential Pauli Z Measurements

As a further illustration of operation of an active volume quantum core, another example of execution of a quantum circuit using an active volume quantum core according to some embodiments will now be described.

Figure 30A:
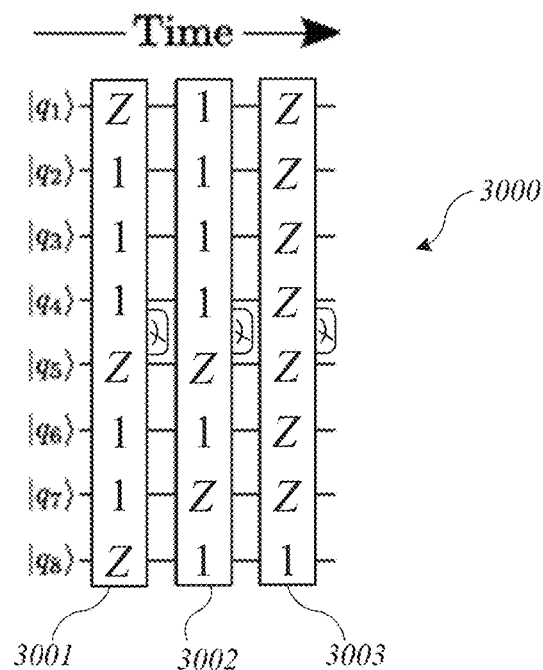
FIG. 30A shows a quantum circuit.

FIG. 30A shows a quantum circuit 3000 consisting of a succession of Z-type measurement gates 3001, 3002, 3003 applied to eight (logical) qubits $|q_1\rangle$ through $|q_8\rangle$. While typical quantum computations generally include operations other than Z-type measurement gates, consideration of circuit 3000 will reveal various features and advantages of active volume architectures.

Figure 30B:
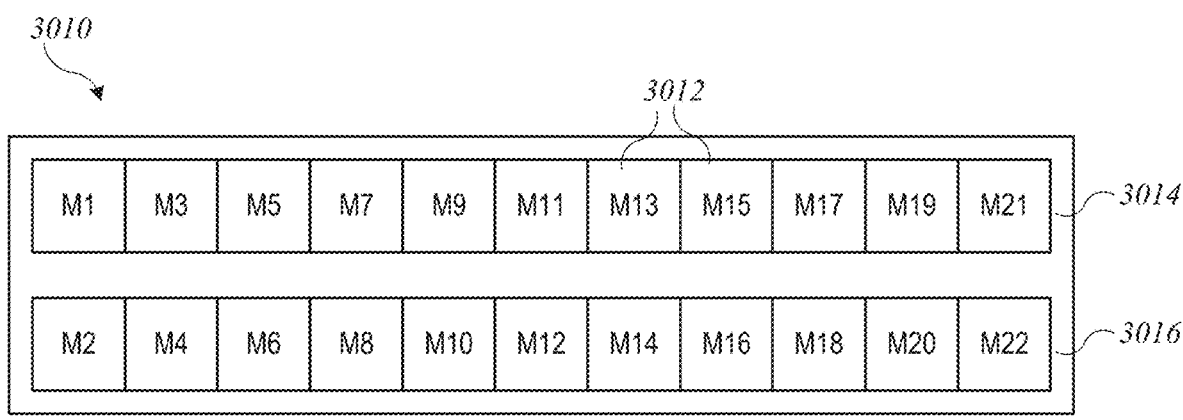
FIG. 30B shows an active volume core according to some embodiments.

FIG. 30B shows an active volume core 3010 that can execute quantum circuits such as quantum circuit 3000 according to some embodiments. Active volume core 3010 can be generally similar to active volume core 1510 and can include qubit modules 3012. In this example, active volume core 3010 has N=22 qubit modules 3012, evenly divided between memory modules 3014 and workspace modules 3016. Qubit modules 3012 have index values M1-M22 as shown. Modules with odd index are memory modules; modules with even index are workspace modules. Modules 3012 are connected by a log-tree network of quickswap connections and by a network of port connections within a range r.

The first gate 3001 is a Z-type Pauli product measurement on three logical qubits $|q_1\rangle$, $|q_5\rangle$, and $|q_5\rangle$. This is a weight-3 multi-qubit Z-type measurement, and an optimized logical block network can be derived using the prescription of FIG. 26E. The resulting logical block network 3011 is shown in FIG. 30C. Logical block network 3011 has an active volume of 5 blocks and can be assigned to workspace modules M2 through M10 in the first logical cycle.

Referring again to FIG. 30A, the second gate 3002 is a Z-type Pauli product measurement on two logical qubits $|q_5\rangle$ and $|q_7\rangle$. The corresponding logical block network 3012 is shown in FIG. 30C. Network 3012 can be derived as described above with reference to FIG. 25. Logical block network 3012, which has an active volume of two blocks, can be assigned to workspace modules M12 and M14 in the first logical cycle.

It is noted that gates 3001 and 3002 both operate on qubit $|q_5\rangle$. As described above, a bridge qubit can be used to parallelize execution of gates 3001 and 3002, and logical block network 3012 can be assigned to workspace modules M12 and M14 in the first logical cycle. (The role of the bridge qubit is described below.)

The third gate 3003 is a seven-qubit Z-type Pauli product measurement involving all qubits except $|q_8\rangle$. According to the prescription derived above with reference to FIG. 26E, a weight-7 measurement has an active volume of $$\left\lceil \frac{3}{2}(7) \right\rceil,$$

or 11 blocks. However, since 7 of the available 11 workspace modules in core 3010 have already been assigned work, it is not possible to execute all three gates 3001-3003 in one logical cycle in core 3010. (A core with more qubit modules would be able to execute all three gates in one logical cycle.)

While it is possible to wait and execute gate 3003 in a second logical cycle, it is useful to note that the operation of gate 3003 can be split into two sub-circuits that can be implemented using different logical block networks. One of the logical block networks can be made small enough (four blocks in this case) to be executed in the first logical cycle using the available four workspace modules in core 3010 while the other logical block network for gate 3003 is executed in a second logical cycle.

Figure 31:
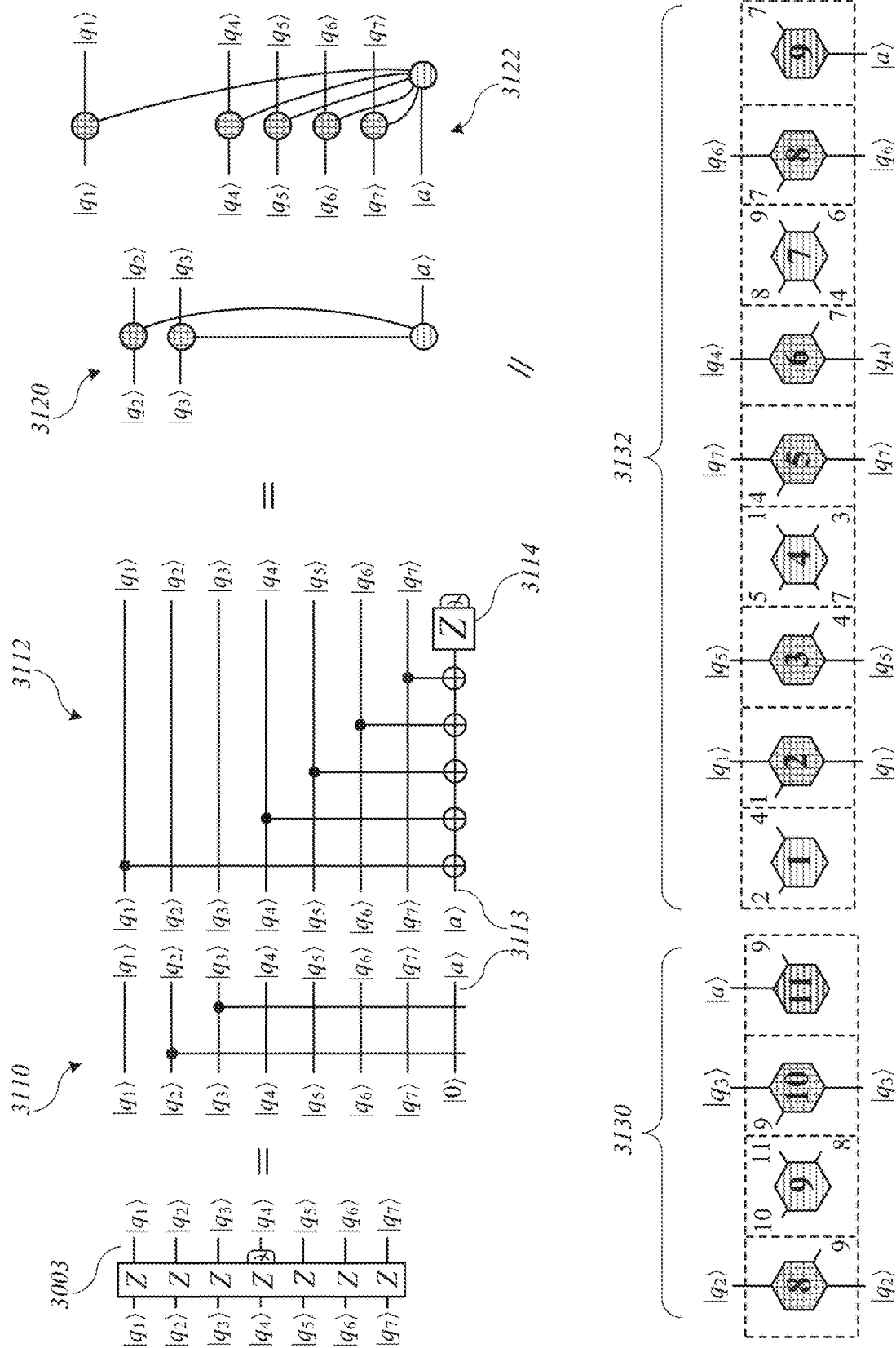
FIG. 31 shows an example of splitting the operation of a gate of a quantum circuit into two sub-circuits according to some embodiments.

FIG. 31 shows an example of splitting the operation of gate 3003 into two sub-circuits according to some embodiments. In this example, it is observed that the operation of gate 3003 is equivalent to operation of circuit 3110 followed by circuit 3112. Circuit 3110 produces an ancilla qubit $|a\rangle$ as an output 3113, which is input to circuit 3112 and eventually measured as indicated by Z measurement circuit 3114. Using ZX diagrams 3120 (which corresponds to circuit 3110) and 3122 (which corresponds to circuit 3112) and converting to logical block diagrams 3130 and 3132, gate 3003 can be executed by assigning the four-block network 3130 to workspace modules M16-M22 in the first logical cycle and the nine-block network 3132 to workspace modules M2-M18 in a second logical cycle. It should be noted that in this case, the split between circuits 3110 and 3112 is defined such that circuit 3110 operates on qubits $|q_2\rangle$ and $|q_3\rangle$, both of which are idle in gate operations 3001 and 3002, while circuit 3112 operates on the remaining qubits. (This choice reduces the need for bridge qubits but is not required.)

The benefit of splitting a gate operation into two steps may not be immediately apparent in this example, since circuit 3000 does not include any further operations after gate 3003. However, where there are subsequent operations, a policy of having all workspace modules occupied with logical blocks in every logical cycle can provide a significant reduction in computation time.

Figure 32A:
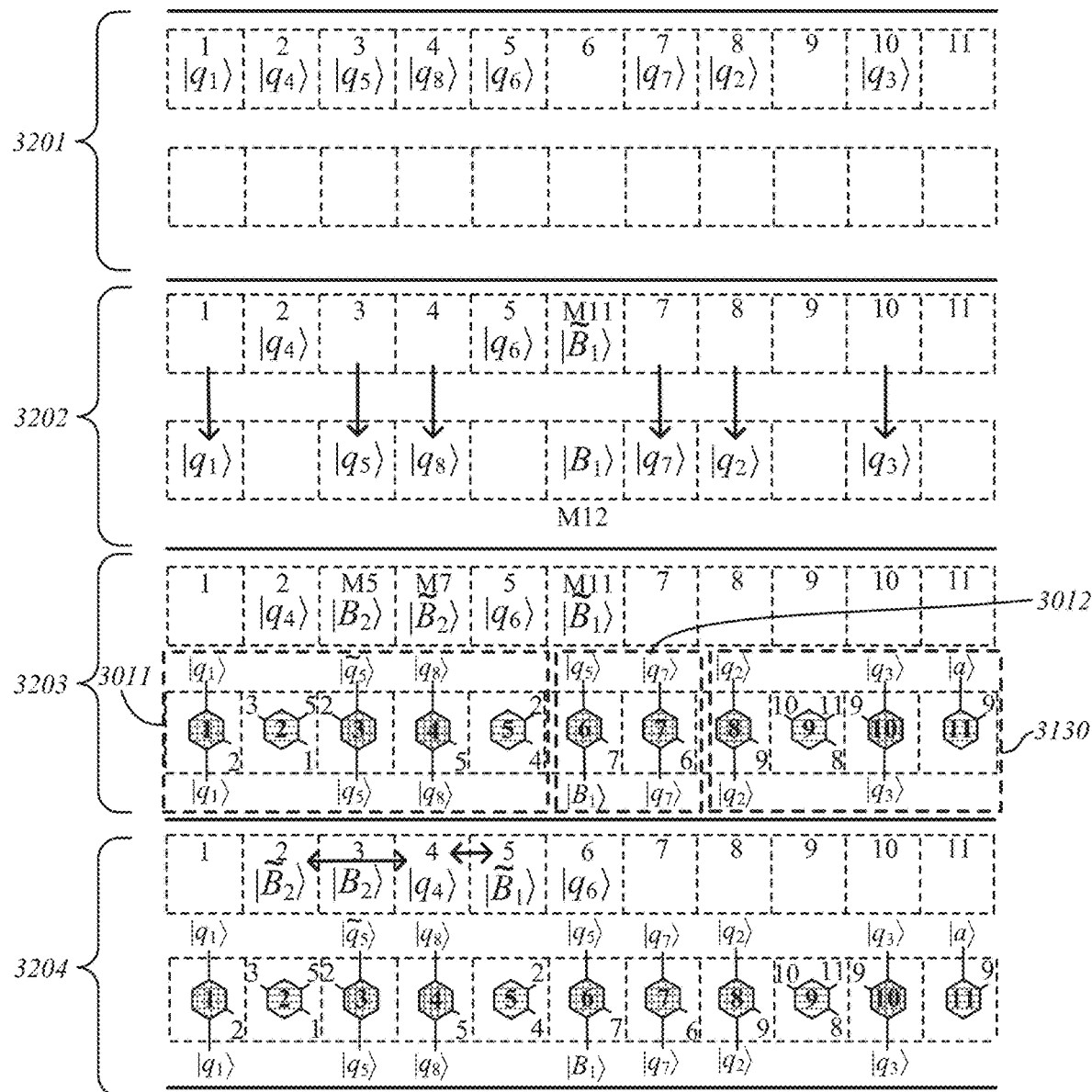
FIGS. 32A and 32B show a storyboard view of execution of the circuit of FIG. 30A in the core of FIG. 30B according to some embodiments.
Figure 32A:
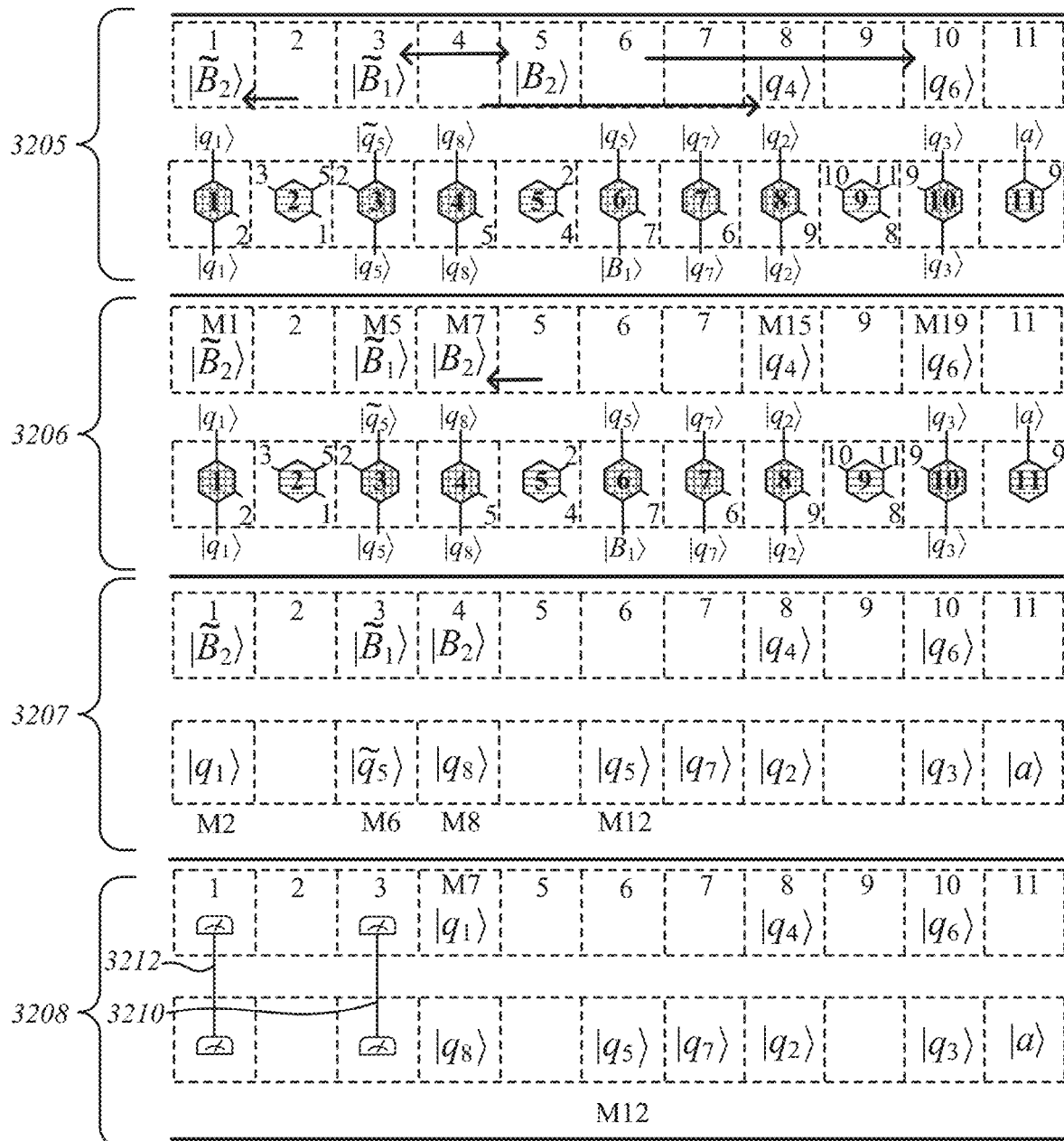
Figure 32B:
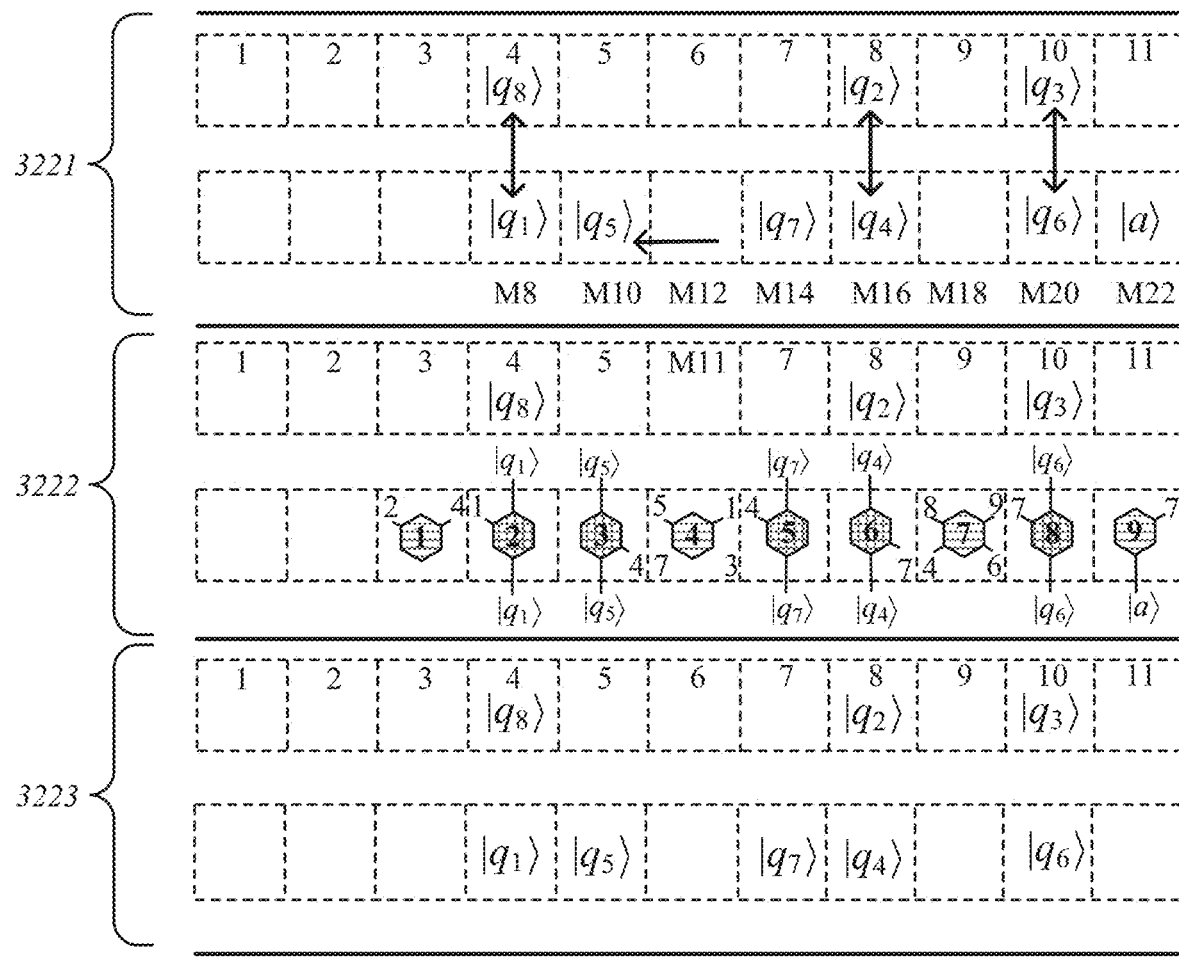

FIGS. 32A and 32B show a storyboard view of execution of circuit 3000 in core 3010 according to some embodiments. Circuit 3000 can be executed using process 2700 described above. FIG. 32A shows a storyboard view for the first logical cycle, in which gate operation 3001, gate operation 3002 and the first four-block step of gate operation 3003 are executed in parallel. Snapshot 3201 shows an initial state in which the eight qubits $|q_1\rangle$ through $|q_8\rangle$ are arranged, in an optimized order, in eight of memory modules M1 through M21. This order is chosen to facilitate quickswaps between memory modules and workspace modules, as will become apparent. Assuming no prior computations, arranging the qubits can include initializing each qubit into an appropriate state using processes described above. If prior computations have occurred, then the qubits may be rearranged into an optimized order using quickswap operations. The optimized order can be selected such that, at the end of a given logical cycle, each memory qubit is in a memory module that is quickswappable with the workspace module that will operate on the qubit during the next logical cycle.

At snapshot 3202, qubits for gate operation 3001 (which affects qubits $|q_1\rangle$, $|q_5\rangle$, and $|q_8\rangle$) are quickswapped into workspace modules as shown. For gate operation 3002, which affects qubits $|q_5\rangle$ and $q_7\rangle$, qubit $|q_7\rangle$ is quickswapped into a workspace module as shown. Qubit $|q_5\rangle$, however, is already participating in gate operation 3001. Accordingly, a bridge qubit as described above is used to enable parallel execution of gate operations 3001 and 3002. Specifically a pair of qubits $|B_1\rangle$ and $|\tilde{B}_1\rangle$ are initialized in a Bell state in empty memory module M11 and adjacent workspace module M12 (using a D-D port connection as described above). Qubit $|B_1\rangle$ (which is in workspace module M12) is used as an input to gate operation 3002 in place of $|q_5\rangle$, and bridge qubit $|\tilde{B}_1\rangle$ remains in memory. Gate operation 3003 is split as described above, with the first portion being executed in the first logical cycle. Accordingly, the qubits $|q_2\rangle$ and $|q_3\rangle$, which are assigned to the first step, are also quickswapped into workspace modules. This set of quickswap operations involves disjoint pairs of modules and can be performed in a singe code cycle.

At snapshot 3203, the logical block network 3011 for gate operation 3001 is being executed in workspace modules M2 through M10; the logical block network 3012 for gate operation 3002 is being executed in workspace modules M12 and M14, and the logical block network 3130 for the first part of gate operation 3003 is being executed in workspace modules M16 through M22. In this manner, each workspace module has a logical block to execute and throughput is maximized. As described above, execution of the logical blocks includes executing surface code check operators and controlling port connections to establish couplings between ports of workspace modules as specified in the logical block network(s) being executed. Execution of a logical block in some embodiments can consume d code cycles, or one logical cycle.

At snapshots 3204, 3205, and 3206, while workspace modules M2-M22 (even numbers) are executing their respective logical blocks, memory modules M1-M21 (odd numbers) can execute quickswap operations to prepare the memory for the next logical cycle. Since a given quickswap operation can be completed in one code cycle, memory modules M1-M21 can execute up to d layers, or stages, of quickswaps during one logical cycle. In this case, three layers of quickswaps are executed. At the end of the logical cycle, bridge qubit $|\tilde{B}_1\rangle$ will participate in a Bell measurement with the output qubit $|\tilde{q}_5\rangle$ from the logical block in workspace module M6; to facilitate this, bridge qubit $|\tilde{B}_1\rangle$ is quickswapped from memory module M11 to memory module M5 using two operations. Concurrently with the quickswaps of bridge qubit $|\tilde{B}_1\rangle$, qubits $|q_4\rangle$ and $|q_6\rangle$ are quickswapped into memory modules M15 and M19 to prepare for the second logical cycle.

In addition to these quickswaps, snapshot 3203 shows that a second Bell pair, qubits $|B_2\rangle$ and $|\tilde{B}_2\rangle$, is initialized in memory modules M5 and M7. This second Bell pair will be used for rearranging memory at the end of the logical cycle. Specifically, the logical block network 3132 for the second part of gate operation 3003 will call for qubit $|q_1\rangle$ to be input to a logical block in workspace module M8 in the second logical cycle. However, during the first logical cycle, qubit $|q_1\rangle$ is being operated on in workspace module M2, and a quickswap from workspace module M2 to workspace module M8 cannot be executed in one code cycle (in part due to the log-tree quickswap network and in part due to the fact that workspace module M8 is not currently empty). To avoid delays in execution of the second logical cycle due to the need to move qubit $|q_1\rangle$ from one workspace module to another, quantum teleportation can be used. In this instance, as shown in snapshot 3203, qubits $|B_2\rangle$ and $|\tilde{B}_2\rangle$ are initialized in a Bell state in empty memory modules M5 and M7. Qubits $|B_2\rangle$ and $|\tilde{B}_2\rangle$ are then quickswapped as shown in snapshots 3204, 3205, and 3206 so that qubit $|\tilde{B}_2\rangle$ is in memory module M1 and qubit $|B_2\rangle$ is in memory module M7.

Snapshot 3207 shows the state of core 3010 upon completion of the logical blocks in the workspace modules. Output qubit $|q_1\rangle$ is available in workspace module M2; output qubit $|\tilde{q}_5\rangle$ in workspace module M6; output qubit $|q_8\rangle$ in workspace module M8; output qubit $|q_5\rangle$ in workspace module M12; and so on. It should be noted that labels on the qubits in workspace modules M6 and M12 have been updated: in module M6, input qubit $|q_5\rangle$ becomes output qubit $|\tilde{q}_5\rangle$, and in module M12, input qubit $|B_1\rangle$ becomes output qubit $|q_5\rangle$. This update reflects the teleportation effect of using a bridge qubit.

Snapshot 3208 shows Bell measurements performed to remove the bridge qubits $|\tilde{B}_1\rangle$ and $|\tilde{B}_2\rangle$. Specifically, a Bell measurement 3210 between qubits $|\tilde{q}_5\rangle$ (workspace module M6) and $|\tilde{B}_1\rangle$ (memory module M5) removes both qubits; qubit $|q_5\rangle$ remains in workspace module M12, in accordance with the bridge qubit protocol described above with reference to FIG. 29A. In addition, a Bell measurement 3212 between qubits $|q_1\rangle$ (workspace module M2) and $|\tilde{B}_2\rangle$ (memory module M1) removes both qubits and teleports the state of $|q_1\rangle$ to qubit $|B_2\rangle$ in memory module M7; this is reflected in snapshot 3208 where the $|B_2\rangle$ label has been replaced by $|q_1\rangle$.

More generally, Bell pair $|B_2\rangle$ and $|\tilde{B}_2\rangle$ illustrate a second use-case for bridge qubits. Whenever an output qubit $|q\rangle$ of a first logical block executed in a first logical cycle c is used as an input qubit in a second logical block executed in the next logical cycle c+1, and the first and second logical blocks are executed in a pair of workspace modules that are not quickswappable, a bridge qubit can be used to teleport the output qubit $|q\rangle$ to a memory module that is quickswappable with the workspace module that will execute the second logical block. The general procedure is as follows: During the first logical cycle c, generate a Bell pair (qubits $|B\rangle$ and $|\tilde{B}\rangle$) in a pair of memory modules that are in range. At the end of logical cycle c, the output qubit of the first logical block participates in a Bell measurement with the bridge qubit $|\tilde{B}\rangle$, thereby teleporting $|q\rangle$ to the location (memory module) of qubit $|B\rangle$. Provided that at the end of logical cycle c, $|B\rangle$ is in a memory module that is quickswappable with the workspace module that will execute the second logical block during logical cycle c+1, delay due to the need to move qubit $|q\rangle$ can be avoided.

FIG. 32B shows a storyboard view for the second logical cycle. In the second logical cycle, the remaining step of gate 3003 (logical block network 3132) is executed using workspace modules M6-M22. Workspace modules M2 and M4 are idle, as this is the end of the computation. In this case, the assignment of logical blocks to workspace modules is based on ease of rearranging qubits in memory.

Snapshot 3221 shows that at the beginning of the second logical cycle, qubits $|q_8\rangle$, $|q_2\rangle$, and $|q_3\rangle$ are quickswapped from memory into workspace modules M8, M16, and M20, while qubit $|q_5\rangle$ is quickswapped from workspace module M12 to workspace module M10. This example shows that quickswaps can be advantageously used when a pair of workspace modules is quickswappable. Qubit $|q_7\rangle$ and ancilla qubit $|a\rangle$ remain in workspace modules M14 and M22.

Snapshot 3222 shows workspace modules M6-M22 executing logical block network 3132. Since there are no further operations to be performed and no bridge qubits involved in the second logical cycle, the qubits in memory can remain in place.

Snapshot 3223 shows the state of core 3010 at the end of executing circuit 3000. Logical qubits $|q_1\rangle$ through $|q_5\rangle$ are available for final measurement or for subsequent operations as may be desired.

It should be understood that this example is illustrative and shows various features of active volume cores, including the use of bridge qubits to speed up computations by enhancing parallelism and by teleporting qubits from one module to another. In this example, two logical cycles are required because the number of logical blocks to be executed exceeds the number of workspace modules in core 3010. Given a larger core (i.e., more qubit modules), gates 3001-3003 could be executed in a single logical cycle with the use of additional bridge qubits. For practical applications, it is expected that an active volume core may include considerably more than 22 qubit modules. Some quantum algorithms call for hundreds or thousands of logical qubits, and the design of an active volume core can be scaled to support such algorithms. (Some considerations related to scaling and performance are addressed below.) Any number of bridge qubits can be introduced in a logical cycle, and any number of gate operations can be executed in parallel, limited only by the number of workspace modules in a particular core. As the foregoing example shows, gate operations can be split into multiple steps to maximize use of workspace modules in each logical cycle. Although not shown in this example, it should be understood that operations on disjoint sets of qubits can be reordered to better fit the workspace.

2.3. Implementation of Specific Subroutines

Many quantum computations can be defined as a sequence of quantum subroutines, where a subroutine implements a specific computational step. Examples of quantum subroutines known in the art include Pauli product rotation, Pauli product measurement, Toffoli gates, adders, data loaders, and magic state distillation. Those skilled in the art will be aware of many applications for these quantum subroutines.

Using the techniques described above, any quantum subroutine that can be expressed as a quantum circuit can be translated into a logical block network that can be executed using an active volume quantum computer. For instance, it is possible to convert any quantum circuit diagram to a ZX diagram, apply orientation rules to the ZX diagram (as described above), then convert the oriented ZX diagram to a logical block network.

To further illustrate various features and advantages of active volume architectures, example implementations of specific quantum subroutines as logical block networks are presented. The examples chosen herein include subroutines commonly used in quantum algorithms and are not intended as exhaustive. It should be understood that, using the principles and techniques described herein, any quantum algorithm that can be represented as a circuit can be converted to a logical block network executable in an active volume quantum computer.

2.3.1. Pauli Product Rotations and Measurements

Figure 33A:
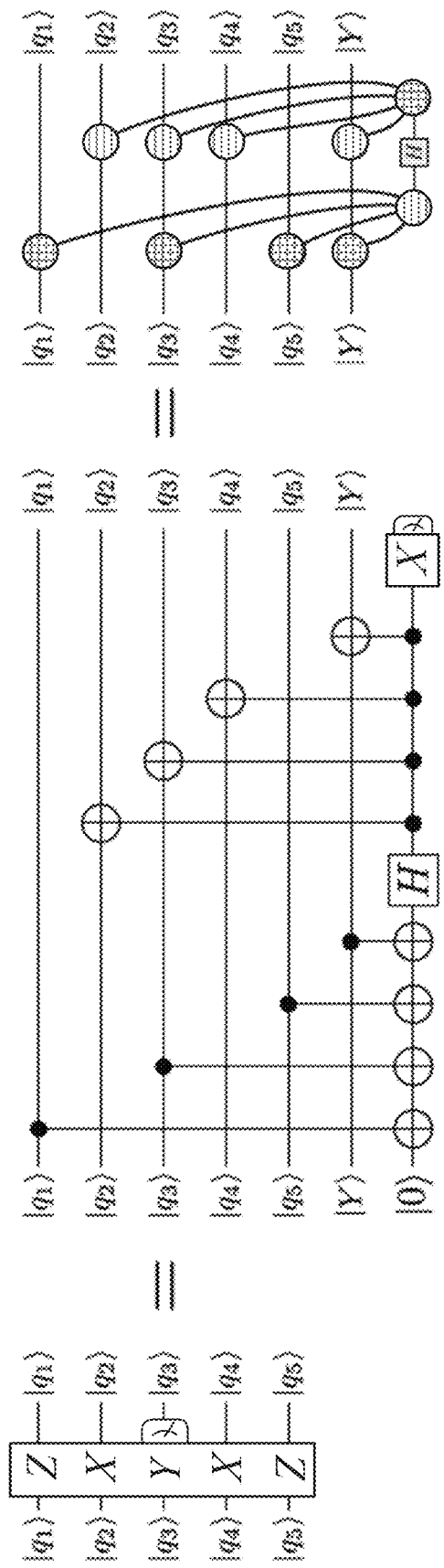
FIGS. 33A-33C illustrate conversion of multi-qubit Pauli product measurement circuits to logical block networks according to some embodiments.

Examples of logical block networks for Z-type Pauli measurements are described above. This section now considers arbitrary multi-qubit Pauli product measurements (PPMs). First, note that weight-w X-type Pauli measurements also have an active volume of $$\left\lceil \frac{3}{2}w \right\rceil,$$

as they can be obtained by replacing Z-type blocks in FIG. 26E with X-type blocks and vice versa. Using a circuit shown in FIG. 33A (referred to as "fast PPMs" in I. H. Kim et al., *Fault-tolerant resource estimates for quantum chemical simulations: Case study on Li-ion battery electrolyte modules*, Phys. Rev. Research 4, 023019 (2022)) or "twist-free lattice surgery" in C. Chamberland and E. T. Campbell, *Universal quantum computing with twist-free and temporally encoded lattice surgery*, PRX Quantum 3, 010331 (2022)), an arbitrary PPM can be decomposed into a Z-type measurement followed by an X-type measurement. As shown in FIG. 33A, an ancilla qubit is initialized in state $|0\rangle$, each qubit contributing a Z or Y is part of the first set of CNOTs, a Hadamard is applied to the ancilla, and then each qubit contributing an X or Y is part of the second set of CNOTs. The ancilla is measured in the X basis, yielding the PPM outcome. This construction works for PPMs with an even number of Y operators. If the PPM contains an odd number of Y operators, as in the example of FIG. 33A, a $|Y\rangle = (|0\rangle + i|1\rangle)/2$ state (also referred to as a Y state) can be used as a catalyst state (i.e., it is an ancillary state that is not consumed by the operation and can be reused in multiple operations). Since Y=1 for the Y state, it can contribute an extra Y to the PPM without changing the measurement outcome.

Figure 33B:
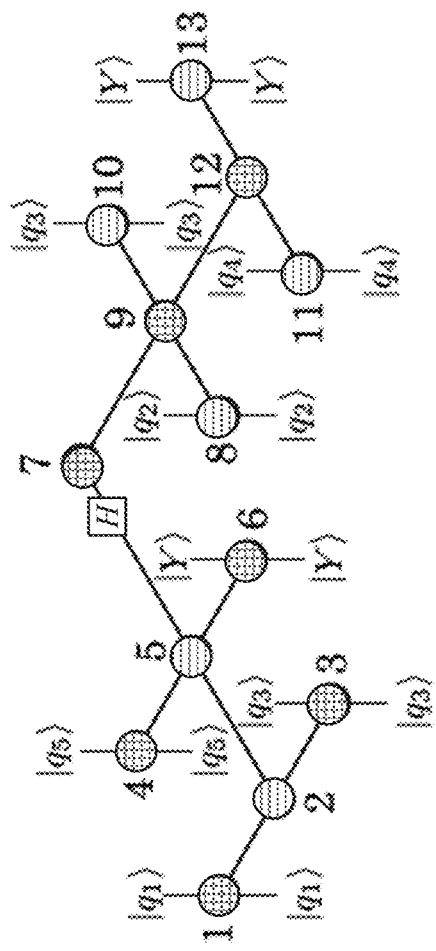
Figure 33C:
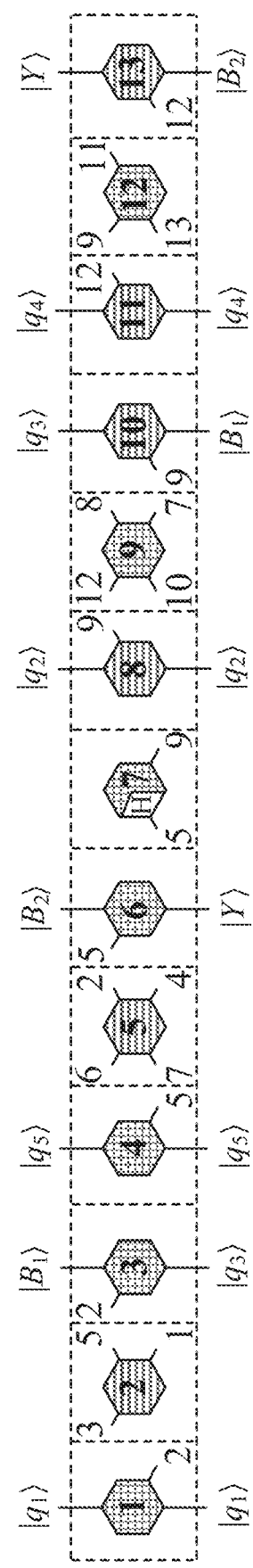

FIG. 33B shows an oriented spider diagram derived from the spider diagram in FIG. 33A, and FIG. 33C shows a logical block network corresponding to the oriented spider diagram of FIG. 33B. More generally, the active volume of an arbitrary PPM is $$\left\lceil \frac{3}{2}w_x \right\rceil + \left\lceil \frac{3}{2}w_z \right\rceil + 1,$$

where each X (Z) operator in the PPM increases $w_x$ ($w_z$) by 1. Each Y operator in the PPM increases both $w_x$ and $w_z$ by 1. If a Y state is required to turn an odd number of Y operators into an even number, $w_x$ and $w_z$ are again increased by 1.

Figure 34A:
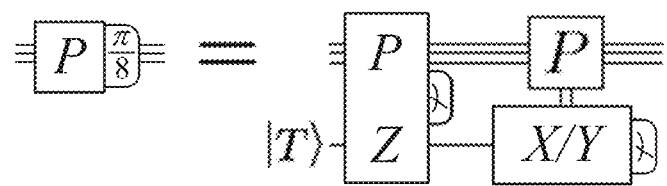

Next, we consider Pauli product rotations (PPRs), i.e., operations $P_\varphi = e^{-iP\varphi}$, where P is a multi-qubit Pauli operator and φ is a rotation angle. First, we consider PPRs with an angle φ=π/8. These are generalizations of T gates, which are $Z_{\pi/8}$ rotations. As shown in FIG. 34A, such a PPR can be executed by consuming a T-gate magic state $|T\rangle = (|0\rangle + e^{i\pi/4}|1\rangle)/2$ (also referred to as a "T state") via a P⊗Z measurement involving the data qubits and the T state. The measurement is non-destructive, so it leaves behind a qubit which we will refer to as a stale magic state. Each π/8 rotation uses a distilled T state and turns it into a stale T state. This qubit needs to be removed via a destructive single-qubit measurement. The basis of this measurement depends on the outcome of the P⊗Z measurement: If the outcome is P⊗Z=+1, the stale T state needs to be measured in the X basis, otherwise in the Y basis. Depending on the outcome of the single-qubit measurement, there can be a corrective P Pauli operation on the qubits. Note that Pauli gates are not logical operations that require quantum hardware operations, but merely influence the interpretation of future PPM outcomes. Also note that rotations with φ=±π/8 and φ=±3π/8 can all be executed by the circuit in FIG. 34A, differing only in the classical logic determining the basis of the single-qubit measurement and the presence of the Pauli correction.

Figure 34B:
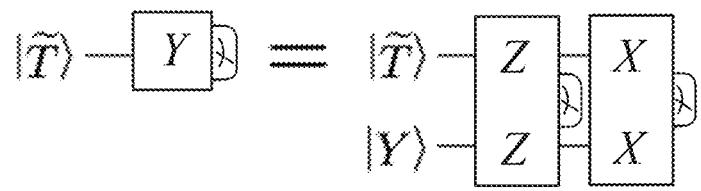

We refer to measurements whose basis depends on the outcome of previous measurements as reactive measurements. Because the speed of reactive measurements may determine how fast a particular quantum computation can be executed, it is advantageous to execute reactive measurements using only "fast" measurement operations that can be performed in a single code cycle rather than a logical cycle. In some embodiments, the allowed reactive measurements are single-qubit X and Z measurements and two-qubit Bell-basis (X⊗X and Z⊗Z) measurements. Notably, single-qubit Y measurements are not fast measurement operations with surface codes. A reactive Y measurement can be performed using a Bell-basis measurement between a stale T state and a Y state, consuming the Y state in the process, as shown in FIG. 34B. The Y outcome is given by the outcome of Y⊗Y=−(Z⊗Z)(X⊗X).

New Y states can be prepared using a |Y⟩ =(|0⟩ −i|1⟩ )/2 catalyst as shown in FIGS. 34C and 34D. FIG. 34C shows a circuit diagram and corresponding spider diagrams for preparing four Y states according to some embodiments; FIG. 34D shows a corresponding oriented spider diagram and logical block network. As FIG. 34D indicates, preparing n Y states costs 3n+1 blocks, so the cost of a Y state can be assumed to be 3 blocks, if Y states are generated in batches. In some embodiments, the initial |Y⟩ catalyst can be prepared (e.g., at the very beginning of the quantum computation) either via twist defects or via magic state distillation.

Since a reactive Y measurement only happens with a probability of 50%, the cost of a π/8 rotation is $C_m$+1.5+$C_{|T\rangle}$, where $$C_m = \left\lceil \frac{3}{2} w_x \right\rceil + \left\lceil \frac{3}{2}(w_z + 1) \right\rceil + 1$$

is the cost of the initial PPM, and 1.5 is half the cost of a Y state. For every two π/8 rotations, we need to generate a Y state. A stockpile of sufficiently many Y states can advantageously be kept in memory qubit modules, so that one does not run out of Y states whenever many such states are needed at the same time due to unfavorable random measurement outcomes. $C_{|T\rangle}$ is the cost to prepare a |T⟩ state. These states can be prepared via magic state distillation, the cost of which depends on physical error rates and target logical error rates. As described below, we estimate that $C_{|T\rangle} \approx 25$ for reasonable error parameters.

Figure 34E:
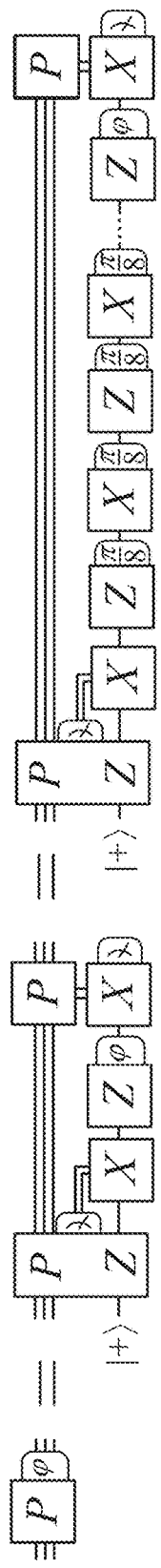
Figure 34F:
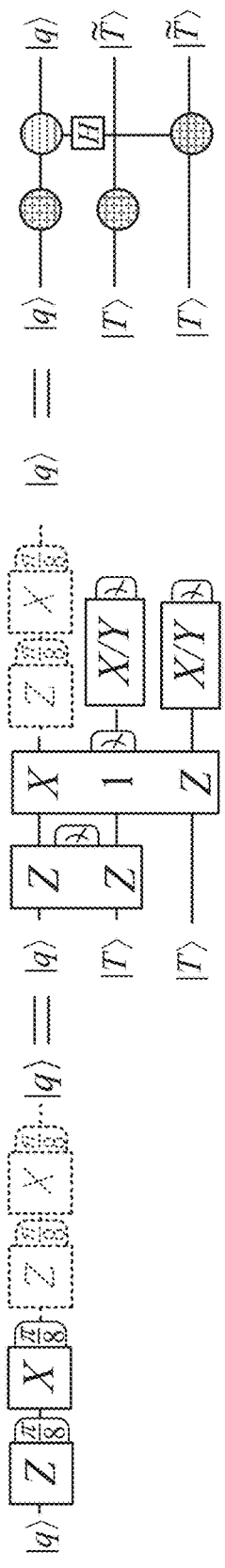
Figure 34G:
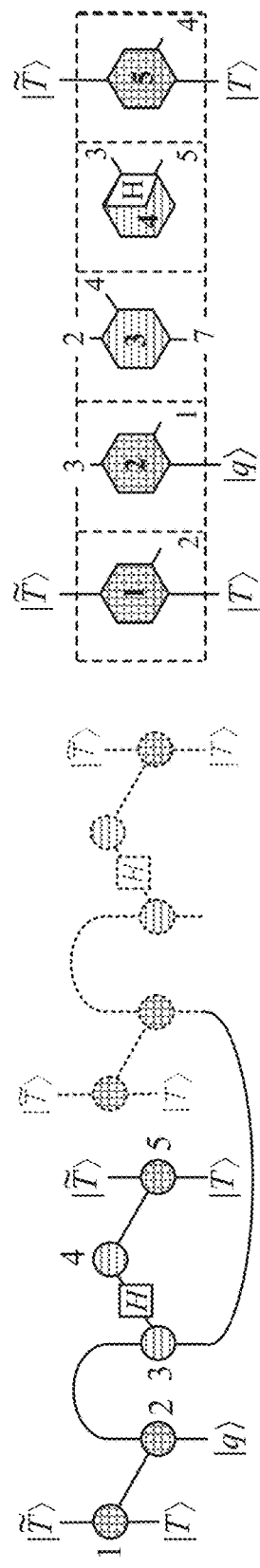

Arbitrary-angle PPRs can be decomposed into sequences of π/8 rotations, e.g., using methods described in N. J. Ross and P. Selinger, *Optimal ancilla-free Clifford+T approximation of Z rotations*, arXiv:1403.2975 (2014). Here, each $Z_\varphi$ rotation can be approximately synthesized with an error ε as a sequence of 3 log 1/ε rotations with angles $\varphi_c$=c·π/8, where c is an odd integer. The bases of these rotations alternate between X and Z, as shown in FIG. 34E. For a $P_\varphi$ rotation, the Z operator is copied onto an ancilla qubit (that is initially in the |+⟩ state) via a P⊗Z measurement, and a sequence of single-qubit rotations is executed. Each pair of rotations has an active volume of 8+2$C_{|T\rangle}$, as shown in FIGS. 34F and 34G. Therefore, the active volume of an arbitrary-angle PPR using the method of Ross and Selinger is $C_m$+3 log 1/ε·(4+$C_{|T\rangle}$). Since consecutive X and Z rotations anticommute, the reaction depth of this operation is 3 log 1/ε. In other words, the 3 log 1/ε stale T states generated by the PPR need to be reactively measured sequentially, as the outcome of a reactive measurement generates a Pauli correction that is required to determine the basis of subsequent reactive measurements.

2.3.2. Toffoli Gates, Adders, and Data Loaders

Figure 35A:
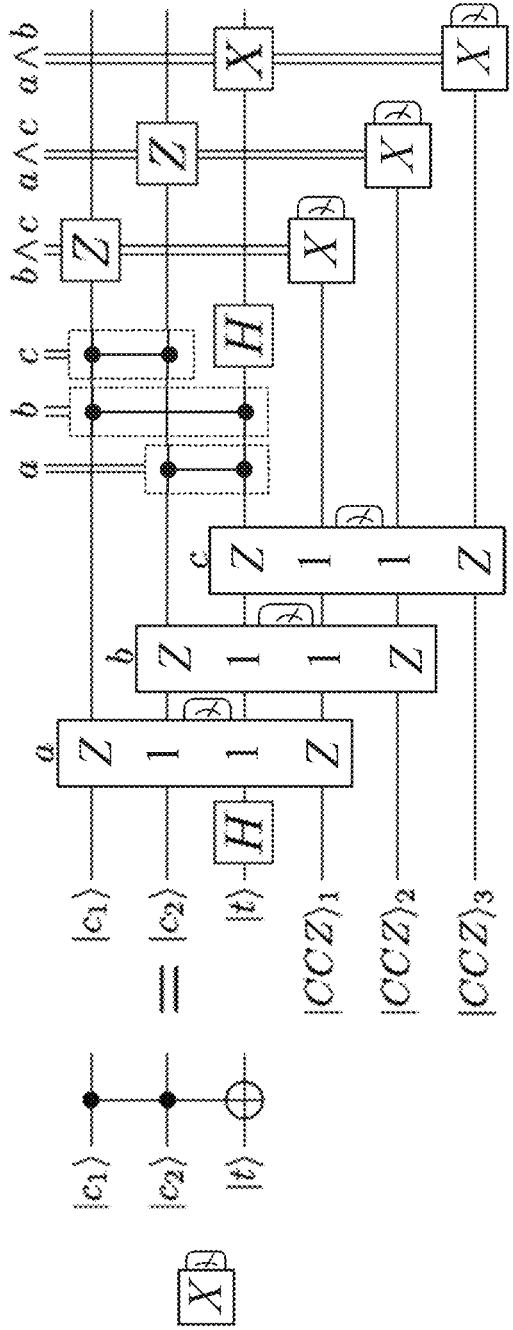
FIGS. 35A-35C illustrate conversion of Toffoli gate circuits to logical block networks according to some embodiments.
Figure 35B:
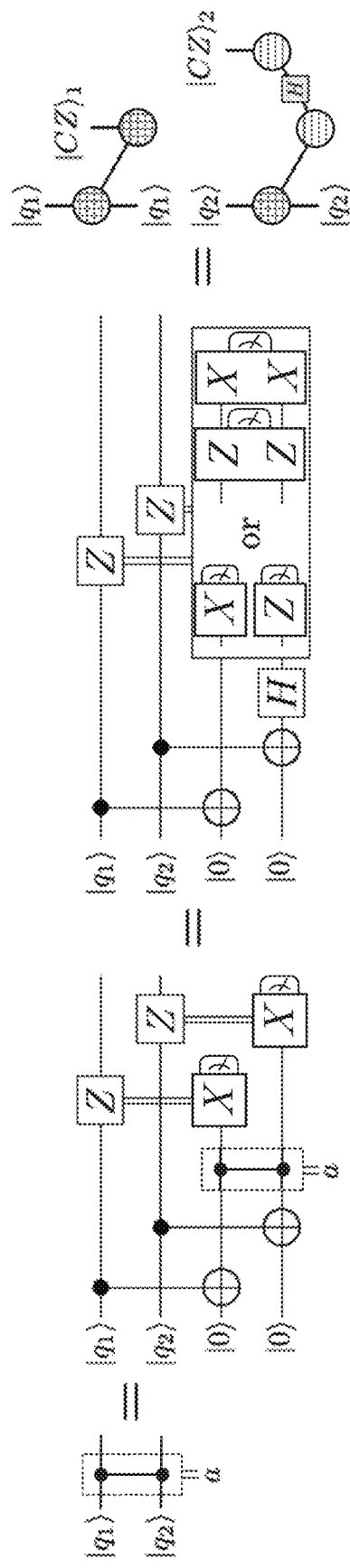
Figure 35C:
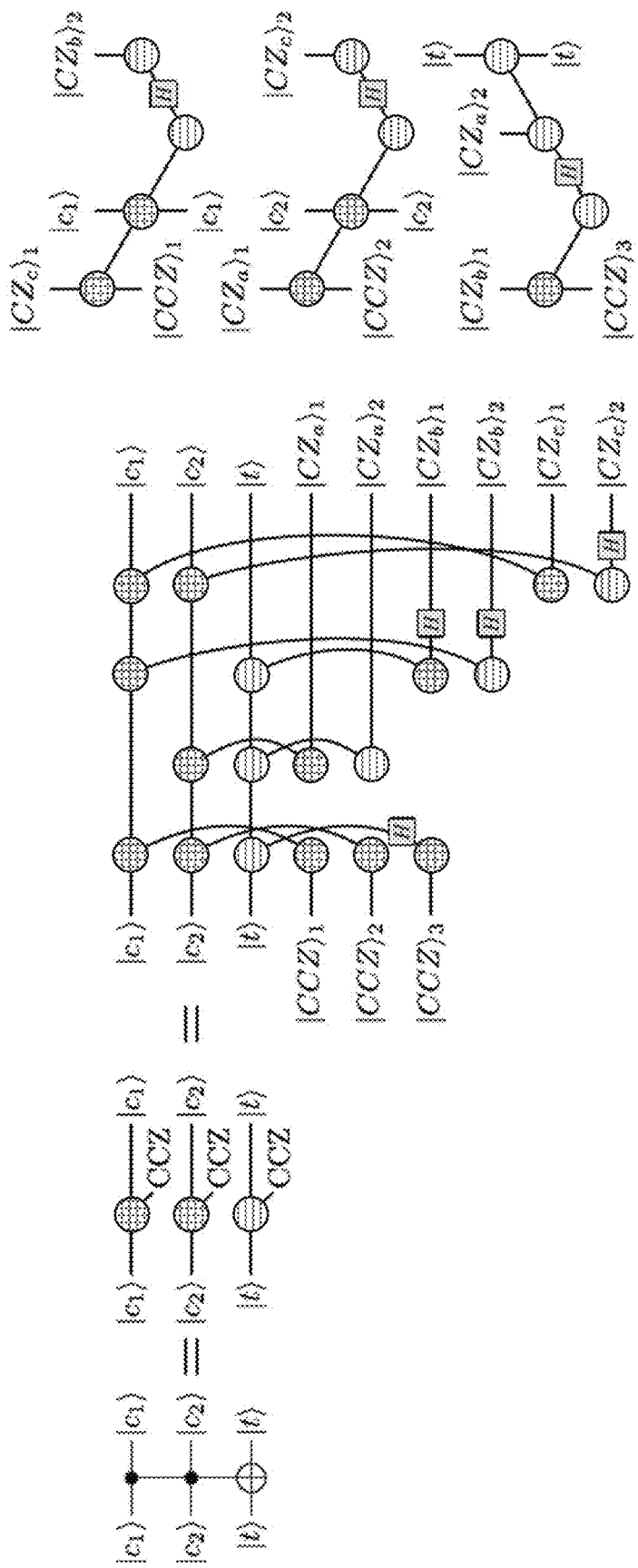

Next, we consider circuits containing Toffoli gates. While it is possible to decompose Toffoli gates into four T gates (e.g., as described in C. Jones, *Low-overhead constructions for the fault-tolerant Toffoli gate*, Phys. Rev. A 87, 022328 (2013)), it can be cheaper to execute Toffoli gates by consuming |CCZ⟩ states instead of T states. |CCZ⟩ states (also referred to as "CCZ states") are three-qubit states CCZ|+⟩ $^{\otimes 3}$, where operator CCZ is a controlled-controlled-Z gate. (Generation of CCZ states is described below.) Such states can be consumed to execute a Toffoli gate via the circuit shown in FIG. 35A. The outcomes of the three PPMs used to consume the CCZ state determine the presence or absence of a CZ Clifford gate. Such a conditional CZ gate can be converted into a reactive measurement using the circuit in FIG. 35B in a construction similar to AutoCCZ states described in C. Gidney and A. Fowler, *Flexible layout of surface code computations using AutoCCZ states*, arXiv:1905.08916 (2018). The 5-block operation shown as an oriented spider diagram in FIG. 35B generates a pair of qubits |CZ⟩ $_1$ and |CZ⟩ $_2$ that are stored in memory. These qubits can be used to retroactively teleport a CZ gate into the circuit. If a CZ gate needs to be generated, the qubit pair is removed via a Bell-basis measurement, otherwise via two single-qubit X and Z measurements. This converts the decision about the conditional CZ gate into a reactive measurement. Therefore, the full circuit for the execution of a Toffoli gate in FIG. 35C generates 6 output qubits that are used for reactive measurements. Although a logical block network is not shown in FIG. 35C, from the oriented spider diagram, it is apparent that the active volume of a Toffoli gate is 12 blocks with a reaction depth of 1.

Figure 36C:
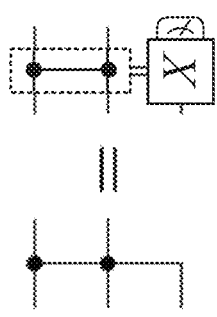
Figure 36D:
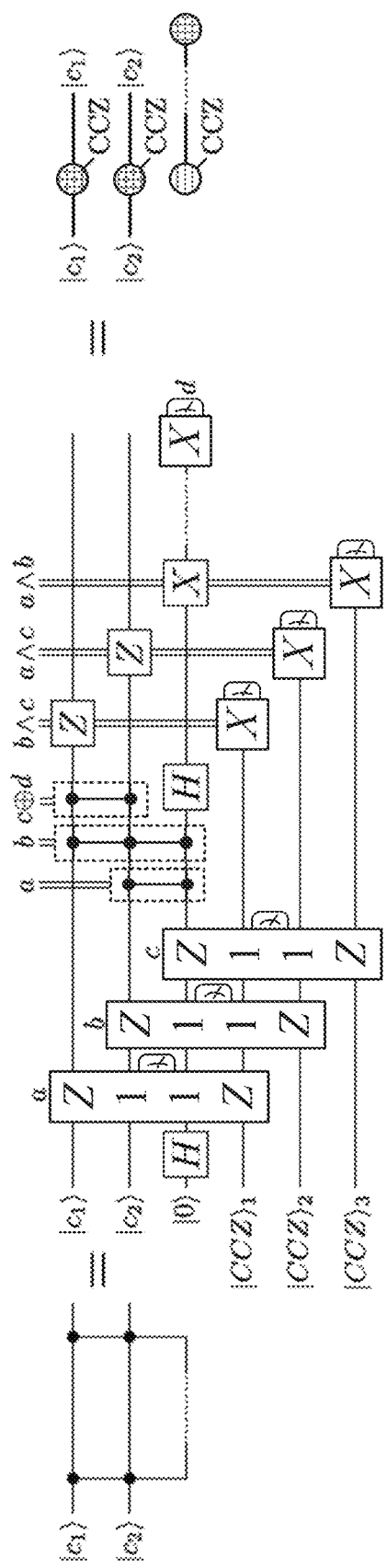

In many circuits, the target qubit of a Toffoli gate is an ancilla qubit initialized in the |0⟩ state. Such temporary-AND Toffolis can be executed with a reduced cost of 9 blocks, as shown in FIGS. 36A (circuit diagram) and 36B (spider diagrams). Typically, temporary-AND Toffolis come in compute-uncompute pairs. The uncomputation of the Toffoli can be performed via a single-qubit measurement and a conditional CZ gate, as shown in FIG. 36C. In many situations, the conditional CZ commutes with all operations between the two Toffoli gates of the compute-uncompute pair. The entire compute-uncompute pair can then be treated as a standard Toffoli gate, except that one of the conditional CZs requires the measurement outcome of the X measurement used to uncompute the Toffoli gate, as shown in FIG. 36D. Therefore, the compute-uncompute pair has an active volume of 12 blocks.

Figure 37A:
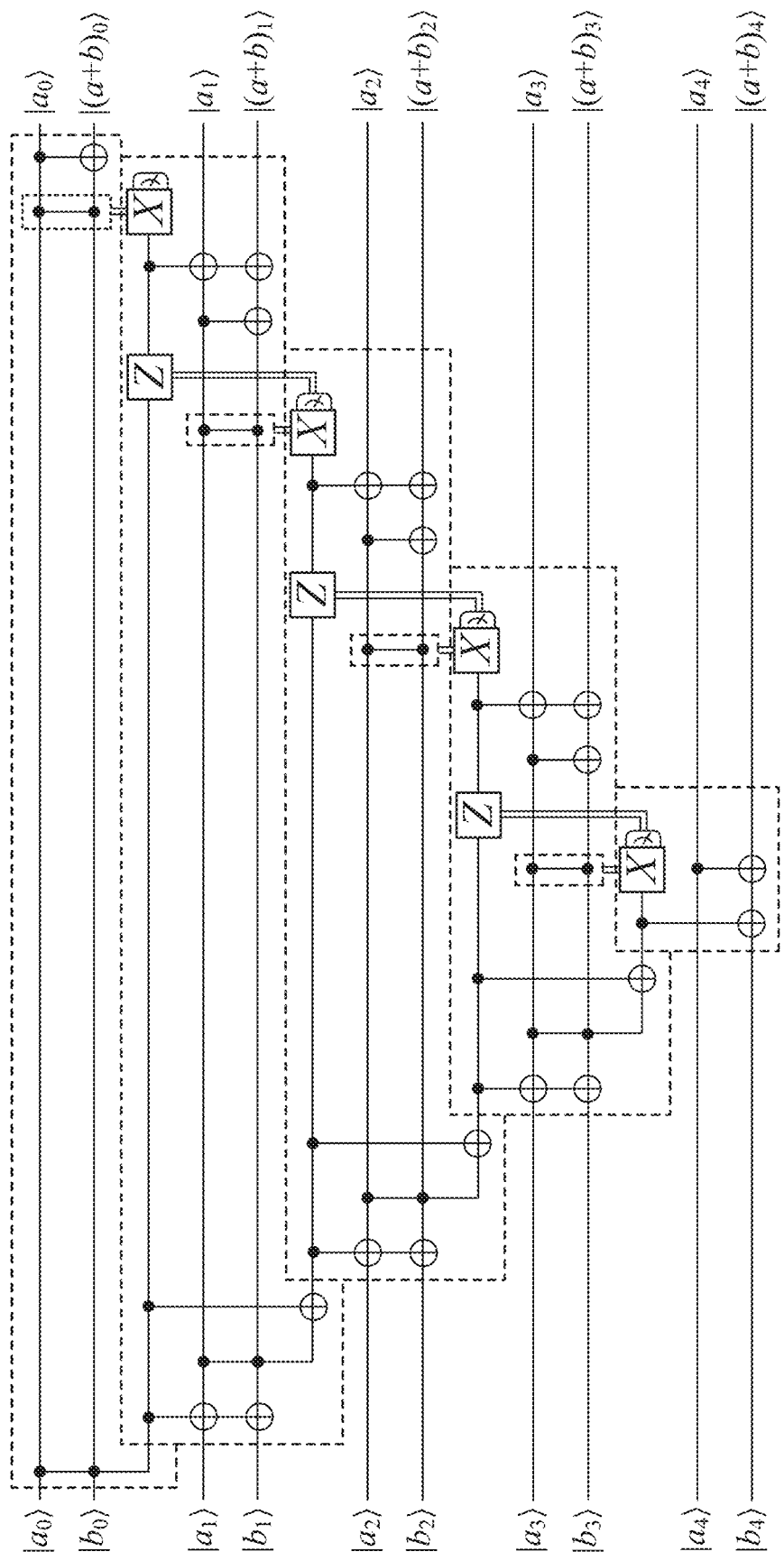
FIGS. 37A-37C illustrate conversion of quantum adder circuits to logical block networks according to some embodiments.
Figure 37B:
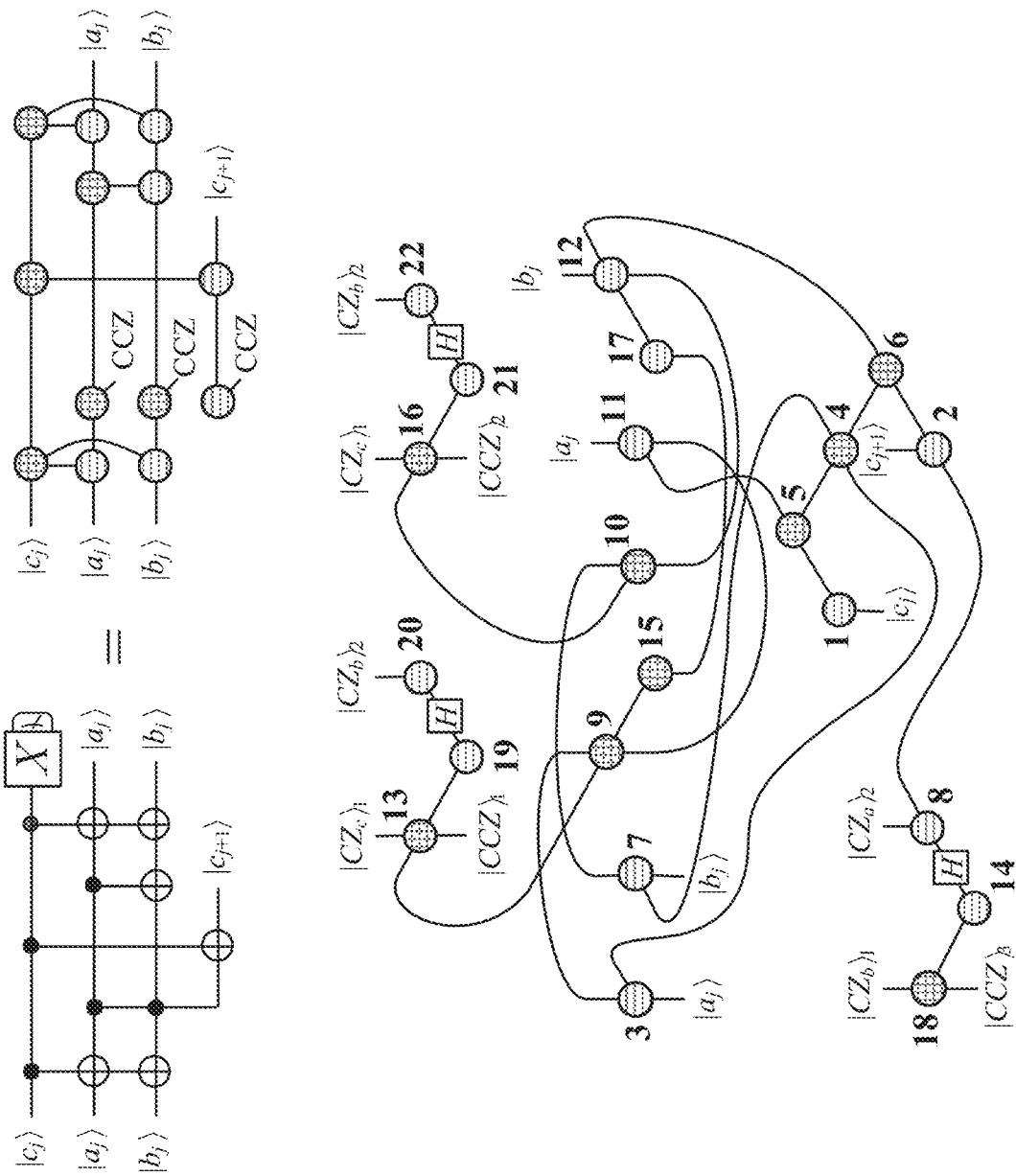
Figure 37B:
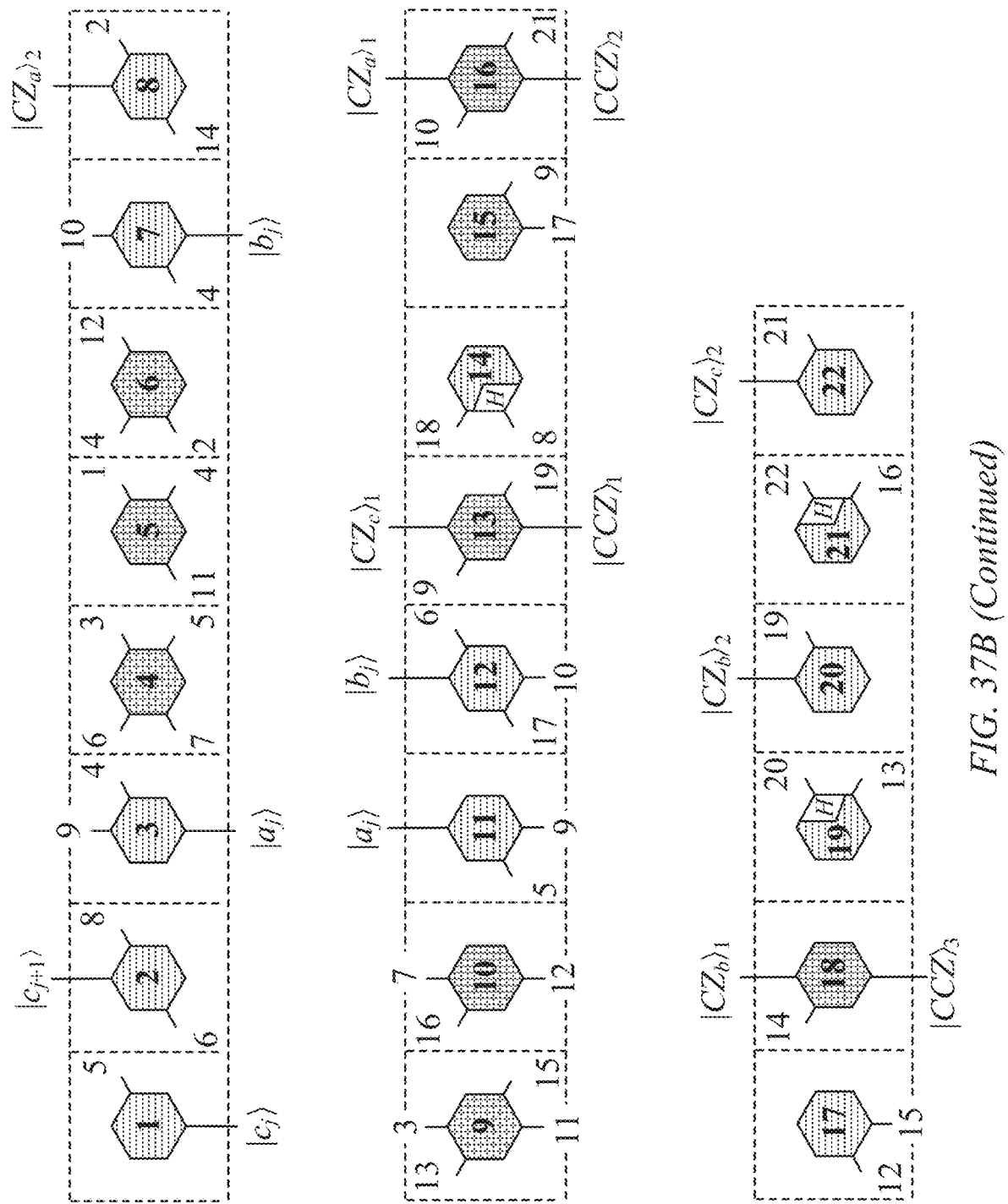
Figure 37C:
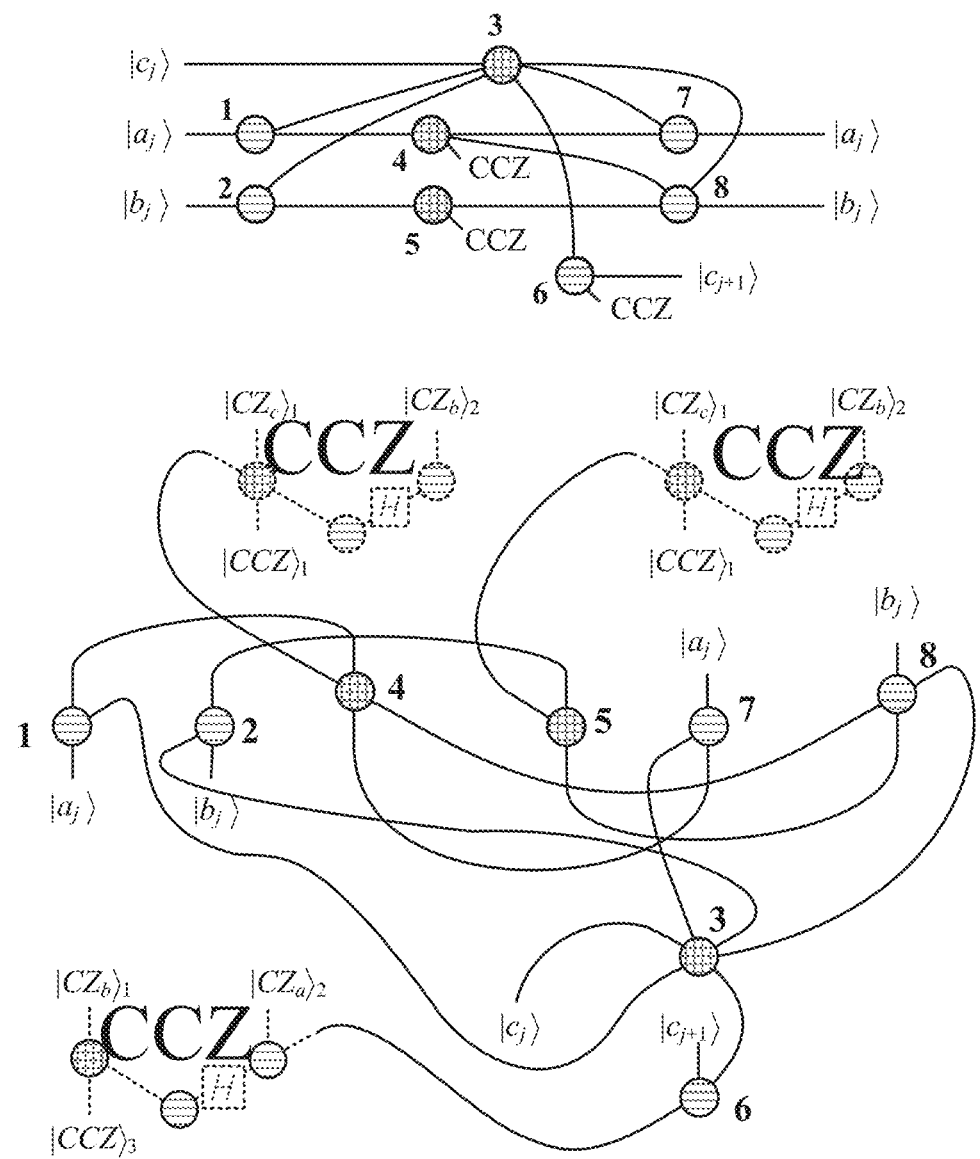

Such compute-uncompute pairs have been used to construct an n-qubit in-place ripple-carry adder using n−1 Toffoli gates, as described in C. Gidney, Halving the cost of quantum addition, Quantum 2, 74 (2018). A slightly modified version of this circuit is shown in FIG. 37A for the example of n=5. The circuit consists of n−2 identical segments, and a different first and last segment. Each of the n−2 segments can be converted into a network of 22 logical blocks as shown in FIG. 37B. The ZX diagram looks complicated, but we can confirm that it is identical to the depicted circuit by comparing the compressed ZX diagrams in FIG. 37C and verifying that they are indeed identical. Each adder segment inputs a carry qubit |$c_j$⟩ that is destroyed and generates a different carry qubit |$c_{j+1}$⟩ . This qubit may be the input of a different segment. If different segments are executed concurrently, bridge qubits (as described above with reference to FIGS. 29A and 29B) can be used to connect the carry qubits in different segments. Note that the labels of connected blocks differ by at most 6, so that a range of r=12 is sufficient to implement this network of logical blocks.

Figure 38A:
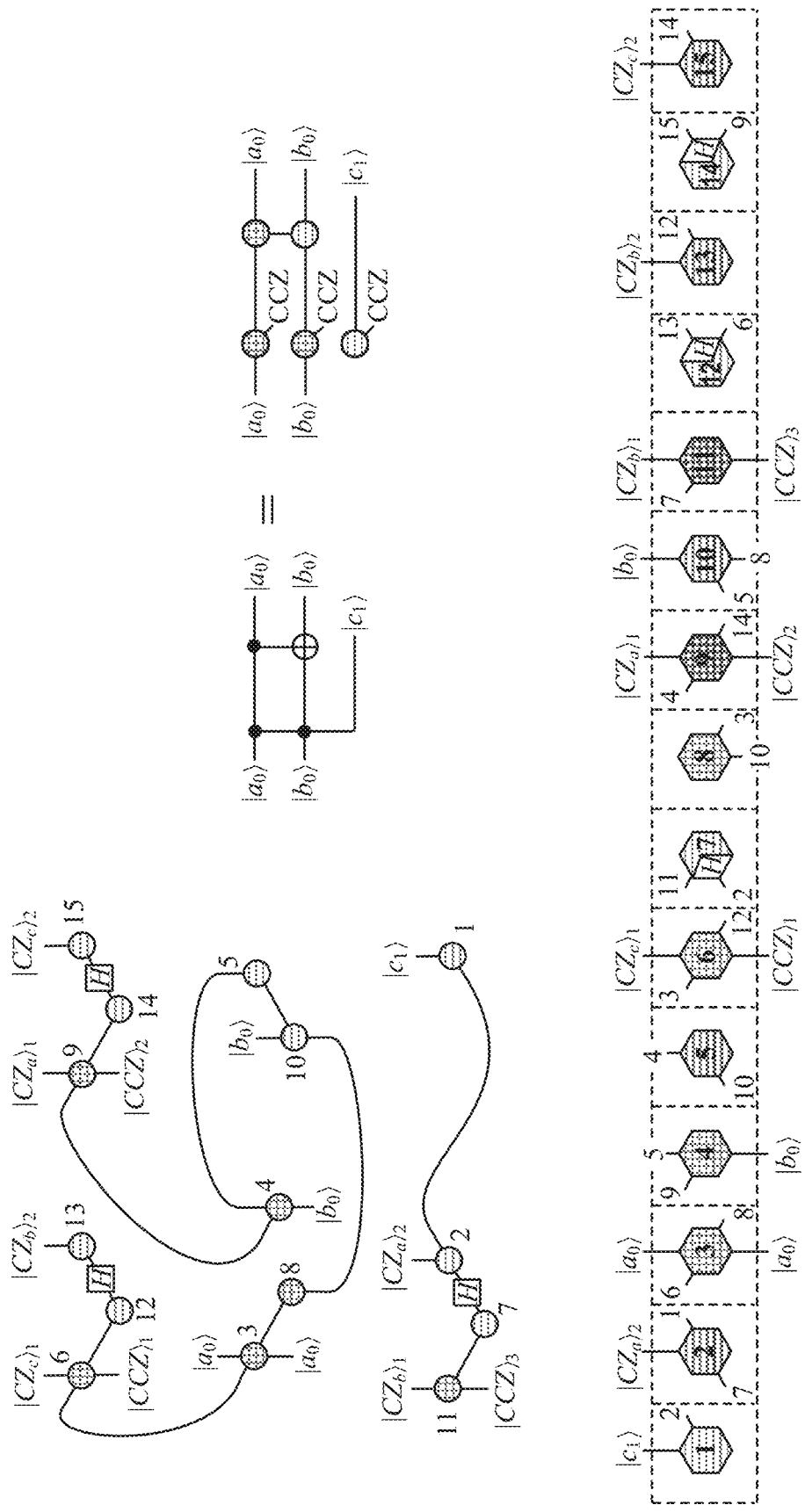
FIGS. 38A and 38B illustrate conversion of first and last segments of quantum adder circuits to logical block networks according to some embodiments.
Figure 38B:
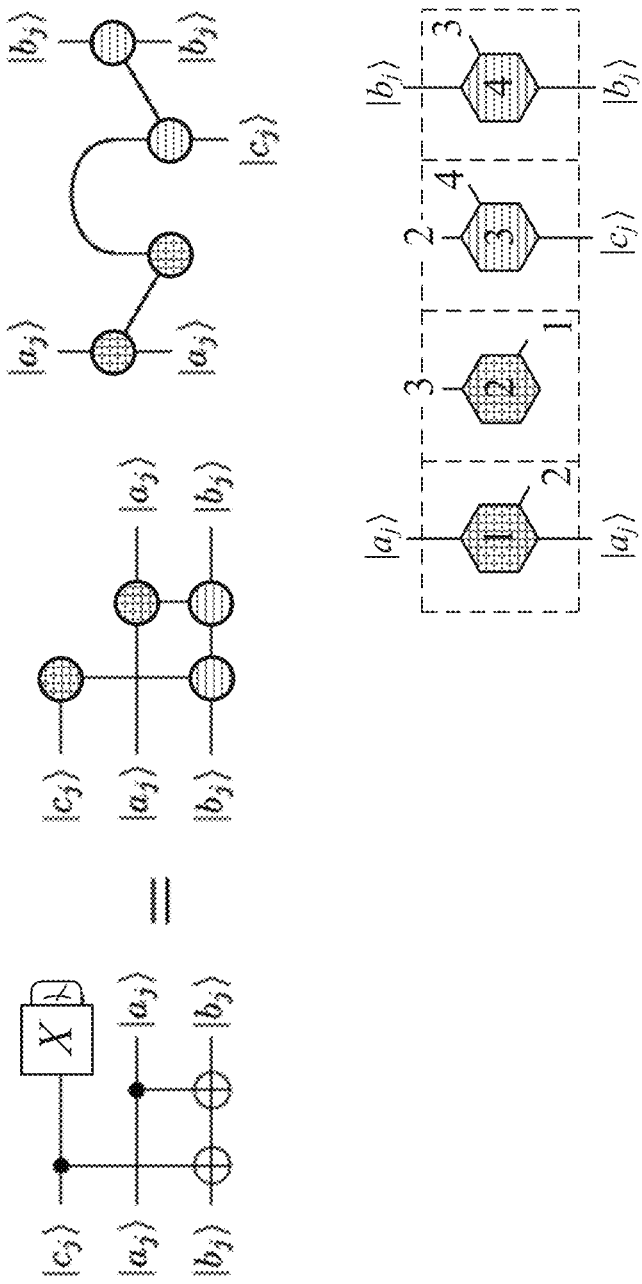

The first and last segment of an adder have an active volume of 15+$C_{|CCZ\rangle}$ and 4, respectively, as shown in FIGS. 38A (first segment) and 38B (last segment). Here, $C_{|CCZ\rangle}$ is the cost to distill a CCZ state. Below, we estimate that $C_{|CCZ\rangle} \approx 35$ for reasonable error parameters. The total active volume of an n-qubit Gidney adder is therefore (n−1)(22+ $C_{|CCZ\rangle}$)−3 with a reaction depth of 2n−3.

The active volume of an adder also has implications for the cost of arbitrary-angle PPRs. Using a phase-gradient state as a catalyst, adders can be used to perform single-qubit rotations. A phase-gradient state is an n-qubit state $$|QFT_n\rangle = \bigotimes_{j=0}^{n-1} \frac{|0\rangle + e^{-i\pi/2^j}|1\rangle}{\sqrt{2}}. \quad (21)$$

Since these qubits are catalysts, these states can be prepared at the beginning of the quantum computation (e.g., via the methods in FIG. 34A-34G) and stored in memory until the end of the computation. A single-qubit Z-rotation with an angle φ specified by b bits of precision can be executed by performing a b-qubit addition, as shown for the example of b=8 and φ=(0.11001011)$_2$·π in FIG. 39A. The initial CNOT copies the Z observable onto a subset of the 8 ancilla qubits. Since these operations can be realized with two-qubit Z measurements as in FIG. 25, they have an active volume of b/2+1 for a random b-bit number with a Hamming weight of b/2. The CNOTs for the uncomputation are free, as they can be realized by single-qubit X measurements. The total cost of a b-bit precision PPR is therefore $C_m$+(b−1)(22.5+ $C_{|CCZ\rangle}$)−3.5 with a reaction depth of 2b−3. With b≈log 1/ε, this has a lower depth compared to the sequence of π/8 rotations in FIG. 34E and, with $C_{|T\rangle}$≈25 and $C_{|T\rangle}$≈35, a lower active volume of ≈57.5b (compared to ≈87b).

PPRs via T gates. Adder circuits can be used to construct even cheaper PPRs by using the methods introduced in V. Kliuchnikov et al, *Shorter quantum circuits*, arXiv: 2203.10064 (2022). Here, each arbitrary-angle single-qubit rotation with an error E can be decomposed into a sequence of 0.6 log 1/ε single-qubit X/Y/Z rotations, half of which are rotations with an angle φ=c·π/8, and the other half with φ=c·π/16, where c is an odd integer. The π/16 rotations can be executed using |T⟩ =(|0⟩ +$e^{i\pi/8}$|1⟩ )/2 states. Such states can be generated in pairs using a |T$^+$⟩ =(|0⟩ +$e^{-i\pi/8}$|1⟩ )/2 catalyst state via an adder-type circuit as shown in FIG. 39B. This is an adder segment and a T gate, and therefore has an active volume of 25.5+ $C_{|CCZ\rangle}$+ $C_{|T\rangle}$, producing two T states.

A π/16 rotation can be executed by consuming a T state as shown in FIG. 39C. Depending on the outcome of the P⊗Z measurement, we may need to apply a T gate to the consumed (stale) T state. We refer to this as a "reactive T measurement." As shown in FIG. 39D, it can be performed in two steps using a T state encoded in a two-qubit repetition code, which can be prepared via a Z⊗Z measurement with a volume of 2 blocks. The stale V state is Bell-measured with one half of the repetition code. Based on the measurement outcome, the remaining qubit is measured in the X or Y basis. Since a reactive Y measurement is needed with a 50% probability, and a reactive T measurement with a cost of 2+ $C_{|T\rangle}$ is needed with a 50% probability, the total cost of a π/16 rotation is $C_m$+15.25+½ $C_{|CCZ\rangle}$+ $C_{|T\rangle}$. The reaction depth is 1.5, as it is 2 if a T measurement is required, and 1 otherwise.

For single-qubit rotations, we can set $C_m$=2 for Z rotations, $C_m$=3 for X rotations, and $C_m$=8 for Y rotations. For uniformly random X, Y and Z rotations, $C_m$=13/3 on average. The average cost of each π/8 rotation is therefore 13/3+3/2+ $C_{|T\rangle}$=35/6+ $C_{|T\rangle}$. Similarly, the average cost of each π/16 rotation is 235/12+½ $C_{|CCZ\rangle}$+ $C_{|T\rangle}$. With 0.3 log 1/ε π/8 rotations and 0.3 log 1/ε π/16 rotations, the total cost of an arbitrary-angle PPR is $$C_m + \frac{1}{40}\log 1/\varepsilon \cdot (305 + 6C_{|CCZ\rangle} + 24_{|T\rangle})$$

with a reaction depth of 0.75 log 1/ε. For $C_{|T\rangle}$≈25 and $C_{|CCZ\rangle}$≈35, this method is significantly cheaper than the previously mentioned methods, with a cost of ≈28 log 1/ε per PPR.

Figure 40A:
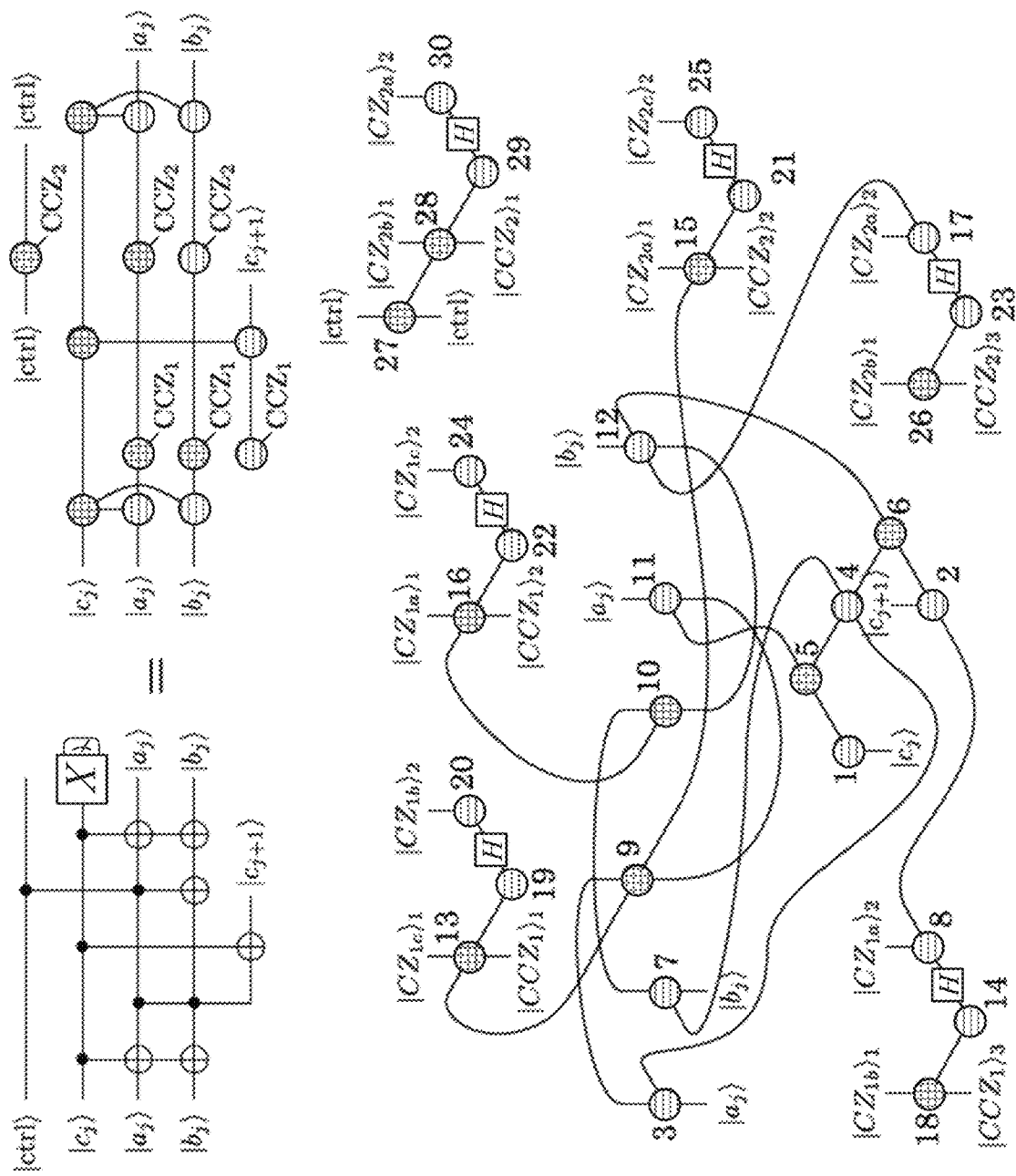
Figure 40C:
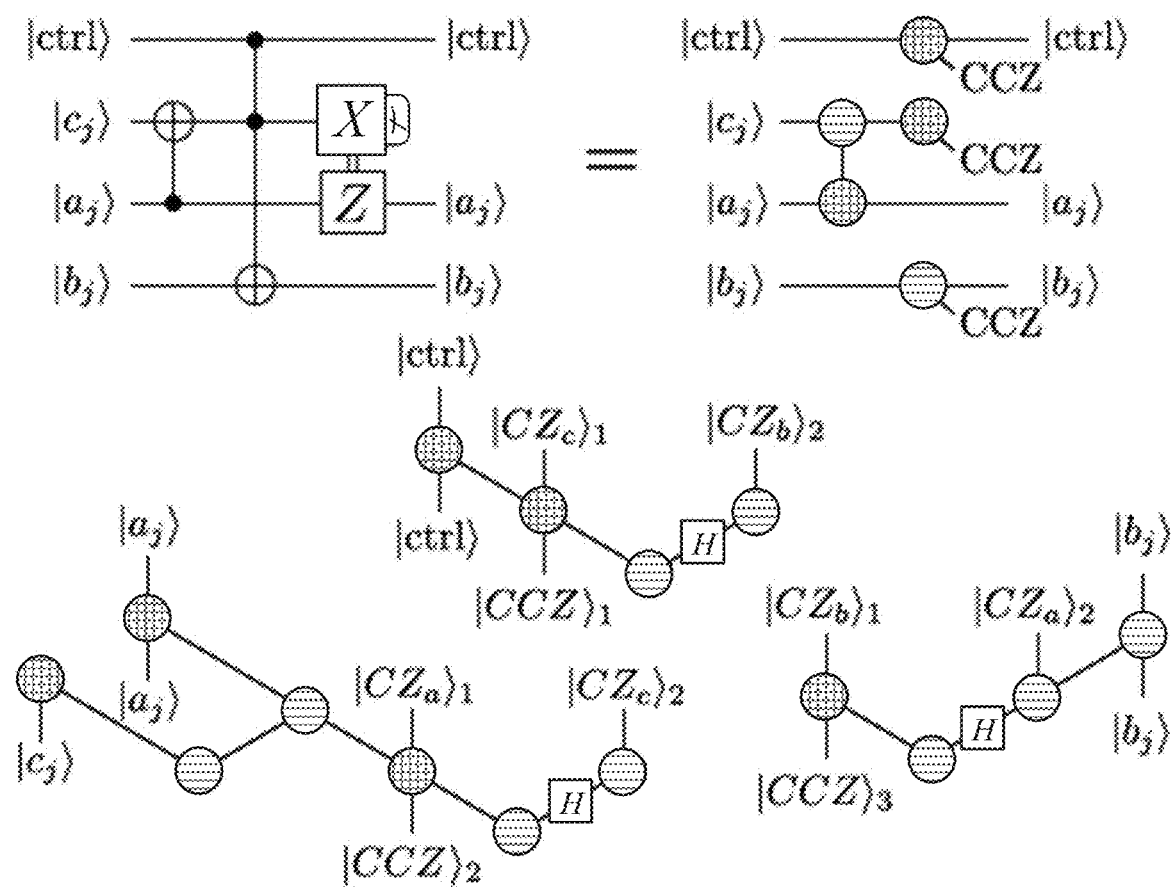
Figure 40D:
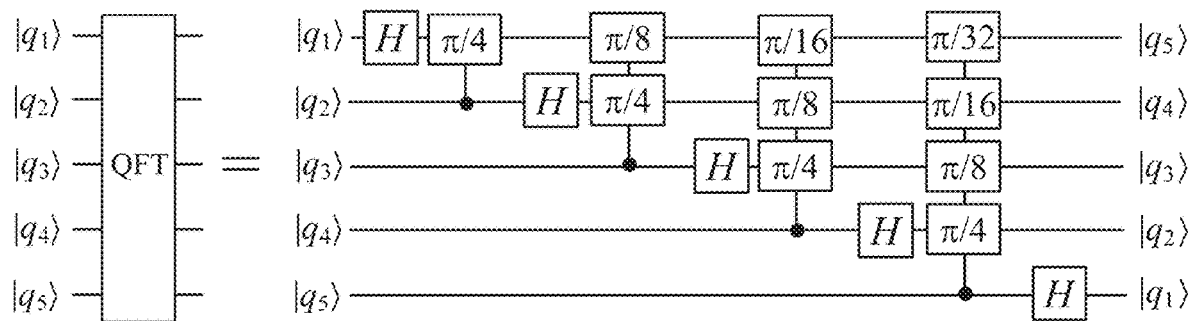
Figure 40E:
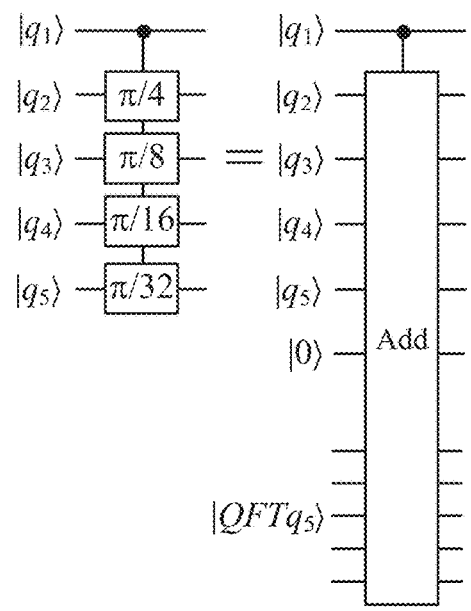

Controlled adders. Using the construction of Gidney (2018) referenced above, a controlled adder uses twice as many Toffoli gates as an uncontrolled adder. The segments are shown in FIG. 40A-40C. The active volume of a controlled adder is (n−1)·(30+2 $C_{|CCZ\rangle}$)+9+ $C_{|CCZ\rangle}$. Controlled adders can be used to construct a quantum Fourier transform (QFT). As shown in FIG. 40D, a QFT is a sequence of Hadamard gates and controlled rotations with angles π/2$^n$. An entire set of n controlled rotations can be performed via a controlled addition into an n+1-qubit phase-gradient register, as shown in FIG. 40E. The active volume of an n-qubit QFT is therefore (n$^2$−1)·(15+ $C_{|CCZ\rangle}$)−3n+1.

Figure 41A:
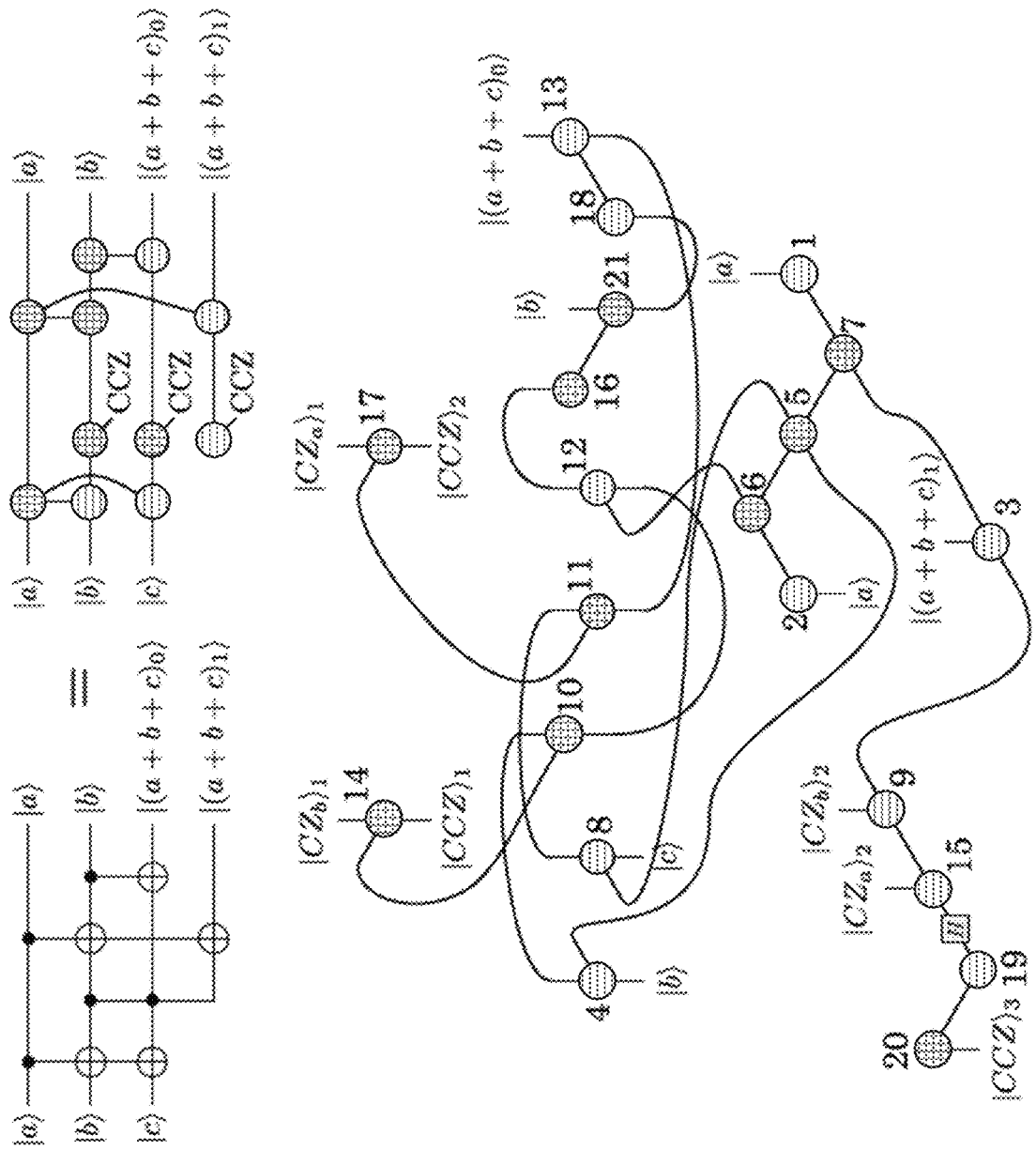
FIGS. 41A and 41B illustrate conversion of an out-of-place adder circuit to logical block networks according to some embodiments.
Figure 41B:
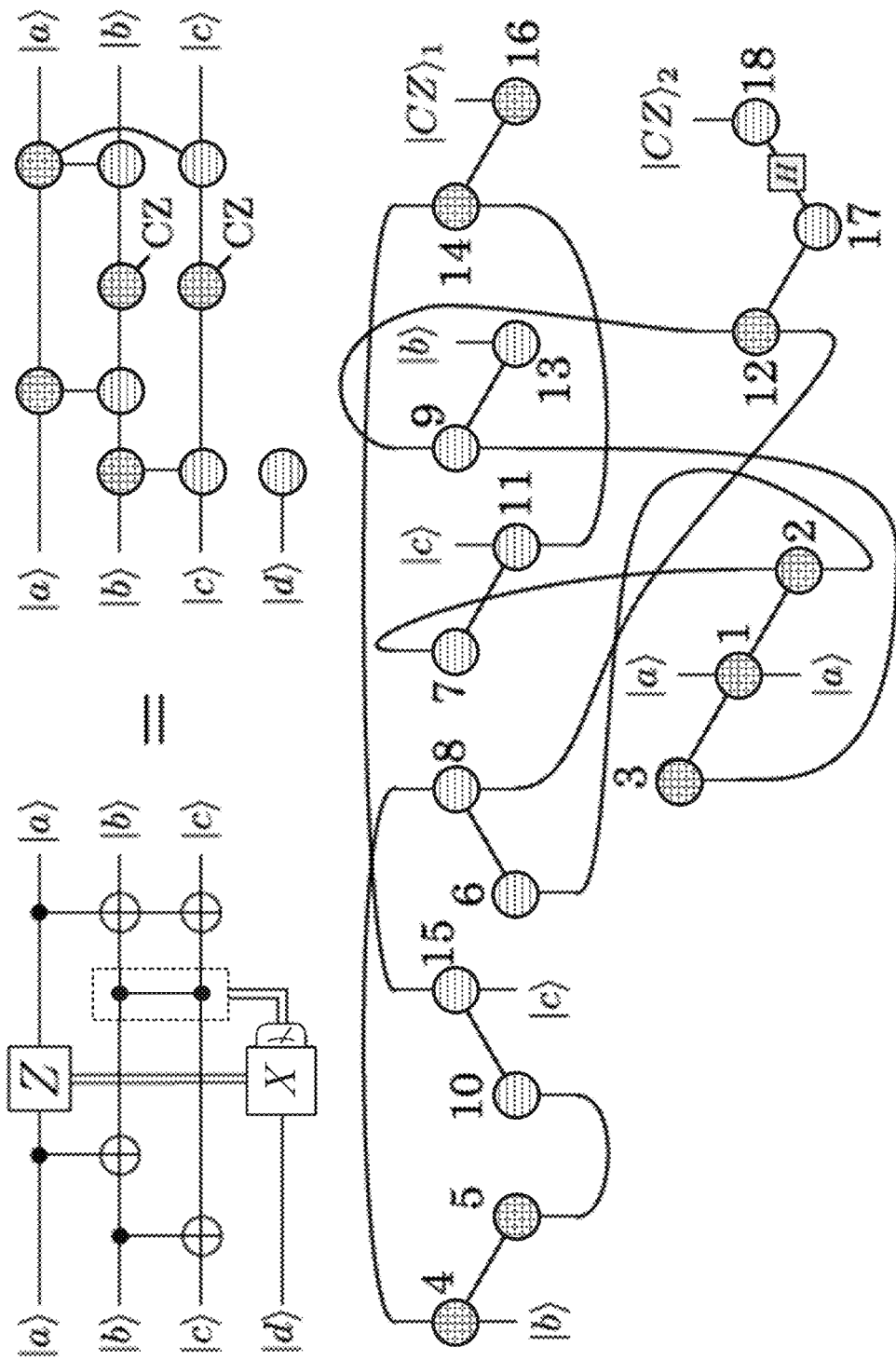

Out-of-place adders. As shown in FIGS. 41A and 41B, the cost of an out-of-place Gidney adder is 21+ $C_{|CCZ\rangle}$ for the compute block and 18 for the uncompute block. Such out-of-place adders can be used to efficiently execute sets of n commuting PPRs with identical angles by performing ≈n out-of-place additions and log n arbitrary-angle Z rotations using a technique called Hamming weight phasing (described in Gidney (2018) and in I. D. Kivlichan et al., *Improved Fault-Tolerant Quantum Simulation of Condensed-Phase Correlated Electrons via Trotterization*, Quantum 4, 296 (2020)). Therefore, the active volume of n commuting equiangular PPRs is ≈($C_m$+39+ $C_{|CCZ\rangle}$)·n+ $\mathcal{O}$(log n·$C_{rot}$), where $C_{rot}$ is the cost of an arbitrary-angle single-qubit Z rotation.

Figure 42A:
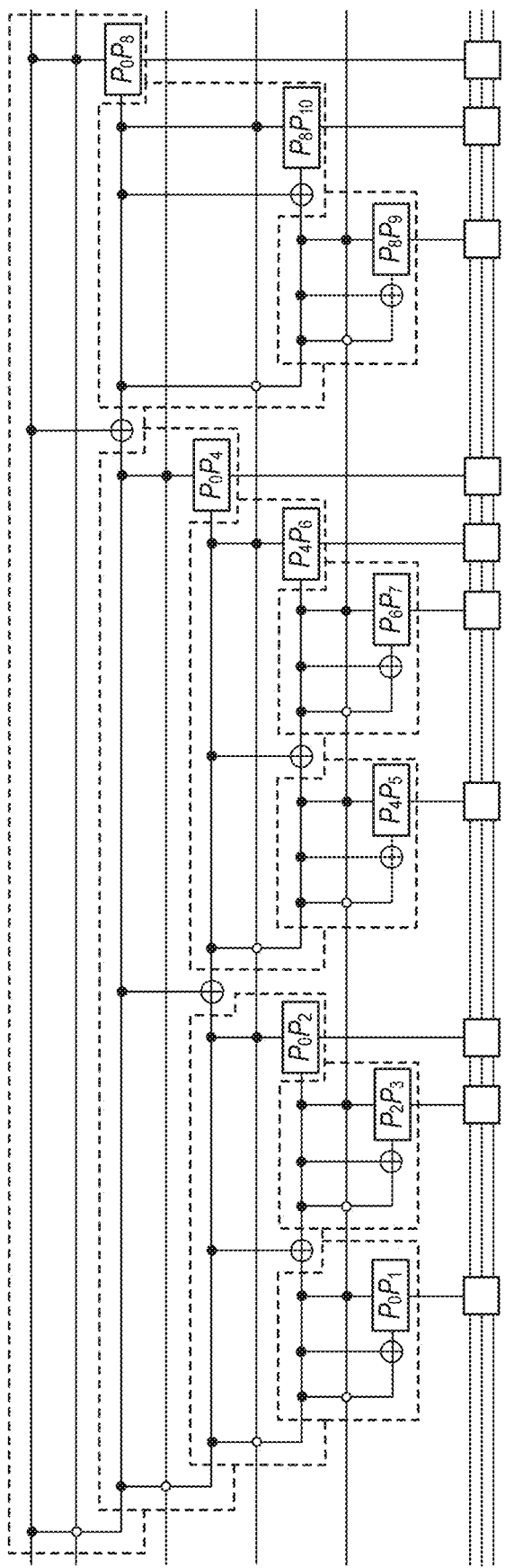
FIGS. 42A-42C illustrate construction of logical block networks implementing data loader circuits according to some embodiments.

SELECT and QROM. Other circuits that can be constructed from temporary-AND Toffolis are data loaders which are widely used in various algorithms, e.g., in block-encoding circuits. The first type of data loader is a SELECT operation, where $$\text{SELECT} = \sum_{k=1}^{n} |k\rangle\langle k| \bigotimes P_k \quad (22)$$

applies one of n Pauli operators $P_k$ to a target register controlled on a log n-qubit control register. Using a slightly modified version of a circuit described in R. Babbush et al., *Encoding electronic spectra in quantum circuits with linear T complexity*, Phys. Rev. X 8, 041015 (2018), a SELECT operation can be implemented as shown in FIG. 42A for the example of n=11. It consists of n−1 segments, each containing a temporary-AND compute-uncompute pair, a CNOT, and a PPM. We can treat these as individual operations, such that the active volume of a SELECT operation is (n−1)·(13+$C_m$+ $C_{|CCZ\rangle}$), where $C_m$ is the average cost of the PPMs.

Figure 42B:
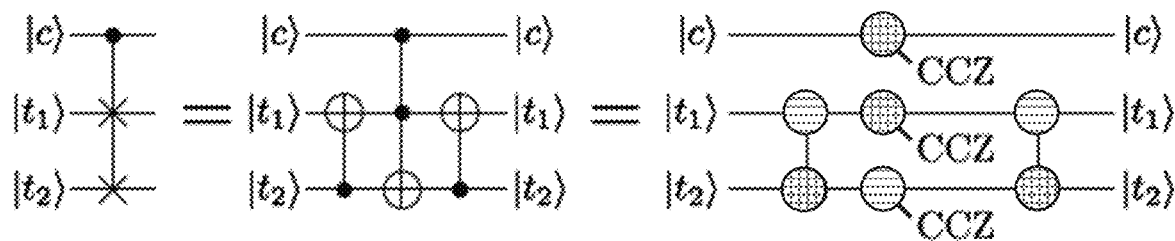
Figure 42C:
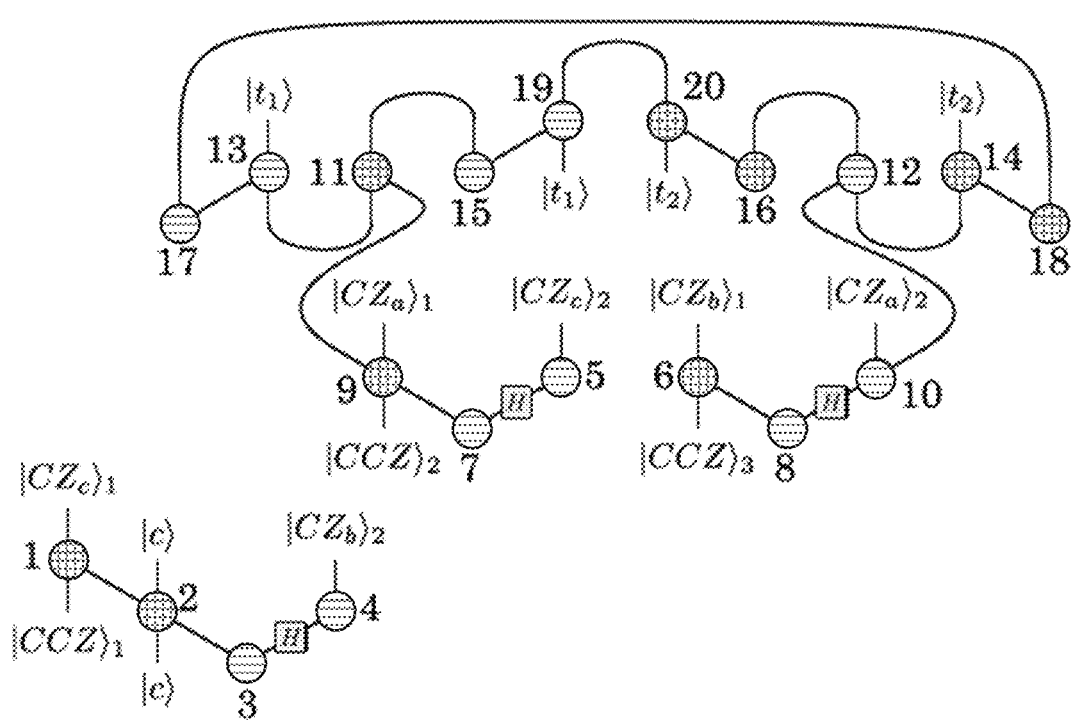

If the Pauli operators $P_k$ are X-type operators acting on a b-qubit register, the same circuit can be used as a "QROM read" loading n b-bit numbers into the quantum computer. The weight of the X-type operators is the Hamming weight of the b-bit numbers, so the PPMs will be weight-b/2 measurements on average. With $C_m \approx \frac{3}{4}b+2$, the cost to load n b-bit numbers via QROM is $(n-1) \cdot (15 + \frac{3}{4}b + C_{|CCZ\rangle})$. Using a circuit described in G. H. Low et al., *Trading T-gates for dirty qubits in state preparation and unitary synthesis*, arXiv:1812.00954 (2018), it is possible to reduce the number of Toffoli gates by increasing the number of b-bit numbers that are loaded simultaneously. Effectively, the circuit described in Low et al. (2018) is a QROM loading $n/\lambda$ different $\lambda$b-bit numbers, preceded by a circuit of $b \cdot (\lambda - 1)$ controlled SWAP gates, where $\lambda$ is a tunable integer parameter. As shown in FIG. 42B, the active volume of a controlled SWAP gate is $20 + C_{|CCZ\rangle}$. Therefore, the active volume of a QROM read with the construction of Low et al. (2018) is $(n/\lambda - 1) \cdot (15 + \frac{3}{4}b\lambda + C_{|CCZ\rangle}) + b \cdot (\lambda - 1) \cdot (20 + C_{|CCZ\rangle})$.

Note that, regardless of $\lambda$, the active volume always contains a term proportional to n·b, i.e., the total number of classical bits loaded into the quantum computer. While this contribution is due to large PPMs that do not consume non-Clifford resource states, and would be considered cheap in baseline architectures where the cost is primarily determined by the total number of T gates and Toffoli gates, the scaling with n·b can make QROMs considerably more expensive than arithmetic circuits with the same number of Toffoli gates. For example, for $C_{|CCZ\rangle} = 35$, the per-Toffoli cost of an adder is 57 blocks, whereas the per-Toffoli cost of a 1000-bit QROM read is 800.

2.3.3. Magic State Distillation

Many of the previously discussed operations consume T states or CCZ states. These states can be prepared using a magic state distillation protocol. Many distillation protocols have been described in the literature and can be implemented as logical block networks. For purposes of illustration, we consider two protocols: 8-to-CCZ distillation, which produces a distilled CCZ state from 8 noisy T states; and 15-to-1 distillation, which produces a distilled T state from 15 noisy T states. With surface codes, it is possible to prepare noisy T states with an error rate proportional to the physical error rate using a protocol called state injection (described in Y. Li, *A magic state's fidelity can be superior to the operations that created it*, New J. Phys. 17, 023037 (2015)), which typically only requires physical T gates in addition to standard surface-code operations. Since injected T states typically have very high error rates, it is necessary to produce higher-quality T states and CCZ states via magic state distillation.

8-to-CCZ distillation. Magic state distillation protocols can be constructed as quantum circuits consisting of Z-type $\pi/8$ rotations. An example is the 8-to-CCZ circuit in FIG. 43A. It is a sequence of 7 PPRs which are executed using noisy T states. An additional noisy T state is used as an input qubit in the quantum circuit. The X measurement at the end of the circuit is used to detect errors: If the outcome is $X = -1$, the output qubits are discarded. If the outcome is $X = +1$, the three output qubits constitute a distilled CCZ state with a quadratically suppressed error rate $\sim p^2$, where p is the error rate of the noisy input T states.

Because the input magic states are noisy and distillation protocols are error-detecting circuits, it is possible to significantly reduce the cost of distillation by reducing the code distances of various parts of the protocol. The optimal choice of code distances depends on the physical error rate, target logical error rate, and the scaling of the logical error rate with the code distance. However, in D. Litinski, *Magic State Distillation: Not as Costly as You Think*, Quantum 3, 205 (2019), it was observed that a reasonable operating regime is approximately the following: qubits corresponding to output magic states are encoded as $d_X \times d_X$ surface-code patches, input T states in the circuit as $d_Z \times d_X$ patches, all measurements are performed with a temporal code distance of $d_m$, and input T states that are used in PPRs as $d_m \times d_m$ surface-code patches. An n-to-k distillation protocol with such parameters can then be labeled as $(n\text{-to-}k)_{d_X, d_Z, d_m}$. When optimizing the code distances to reduce the volume of the distillation protocols, one often finds $d_X = d$, $d_Z \approx d/2$, $d_m \approx d/2$.

We first consider an $(8\text{-to-CCZ})_{d,d,d/2}$ protocol. Because the temporal code distance is $d_m = d/2$, all logical blocks will be half-distance blocks as shown in FIG. 43B, i.e., they will be executed in half of a logical cycle. The input magic states are half-distance qubits. Half-distance qubits are supported by the active-volume architecture, as we can store four half-distance qubits in each memory module, one in each quadrant of the full-distance patch. However, when we execute a PPR using a half-distance magic state, the stale half-distance T state needs to participate in a reactive Y measurement. Since we want to avoid storing half-distance Y states in memory (as they have a significantly higher error rate), we can use the block in FIG. 43C to consume a magic state. This corresponds to an operation that consumes the magic state and applies an $X_{\pi/4}$ Clifford rotation to the stale T state, changing the X/Y measurement to an X/Z measurement. (Note that this operation is identical to an auto-corrected $\pi/8$ rotation.) We also break with our convention that memory qubits are stored in the orientation of FIG. 20E where the logical Z check operators point in the north and south direction. The volume of distillation protocols can be reduced if input magic states are stored in a rotated manner with the logical Z check operators pointing in the west and east direction. Therefore, the input qubits in a distillation protocol will feed into N-oriented Z-type blocks, rather than E-oriented Z-type blocks as would be required by the usual convention. Output qubits of distillation protocols, however, will follow the usual convention.

Figure 43A:
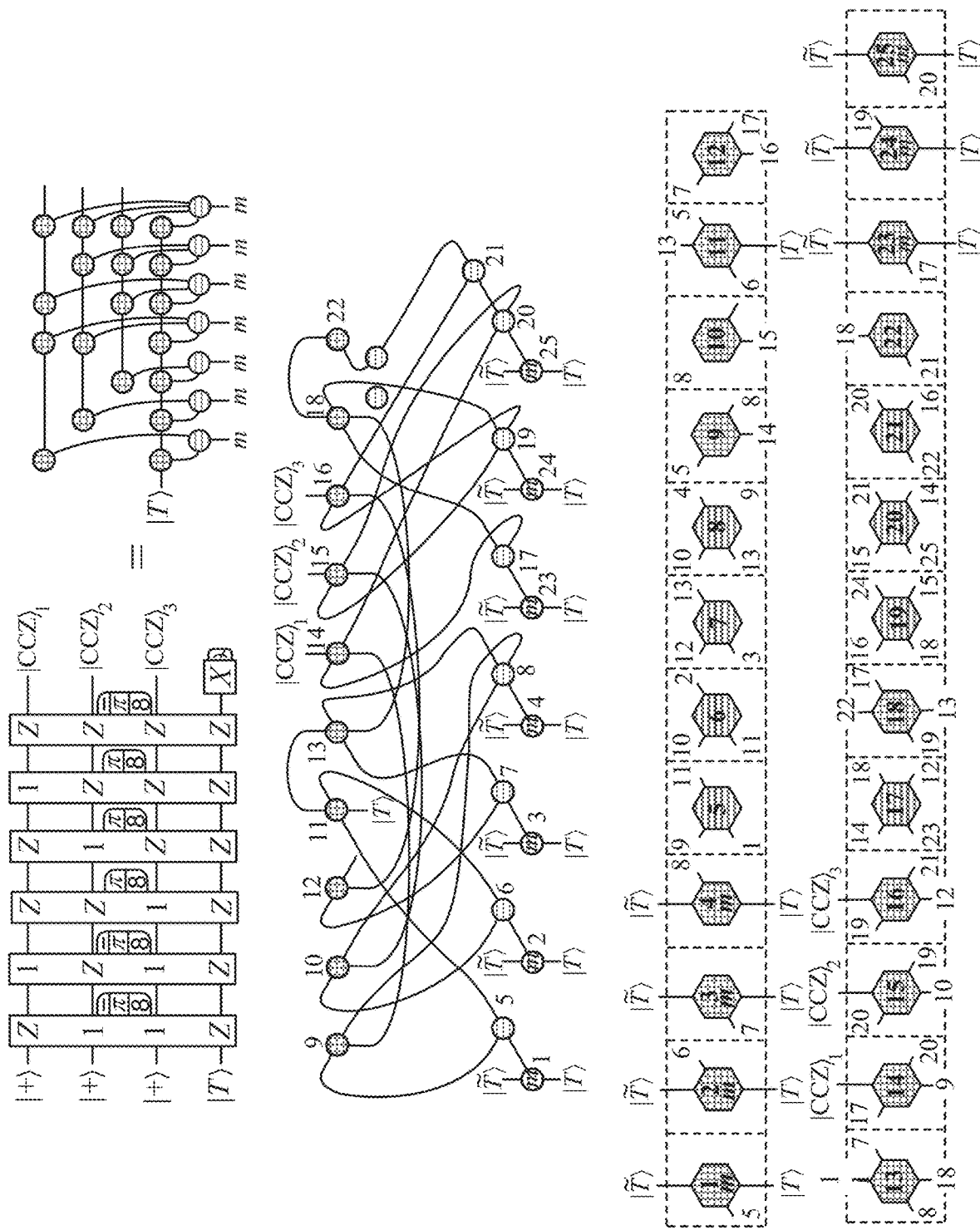

As shown in FIG. 43A, the 8-to-CCZ $(8\text{-to-CCZ})_{d,d,d/2}$ protocol can be implemented by generating 25 half-distance blocks, i.e., with an active volume of 25/2. Note that, if necessary, the error resilience of the protocol can be increased by increasing the measurement distance $d_m$. Distilled CCZ states can also be converted to distilled T states via a catalyzed CCZ-to-2T conversion (e.g., as described in C. Gidney and A. G. Fowler, *Efficient magic-state factories with a catalyzed |CCZ⟩ to |2T⟩ transformation*, Quantum 3, 135 (2019)), a modified version of which is shown in FIG. 43D. The circuit corresponds to a 4-qubit X-type and qubit Z-type measurement, consuming a Y state and a T state with a reactive Y measurement. Therefore, the CCZ-to-2T conversion has an active volume of 16.5 blocks.

Figure 44A:
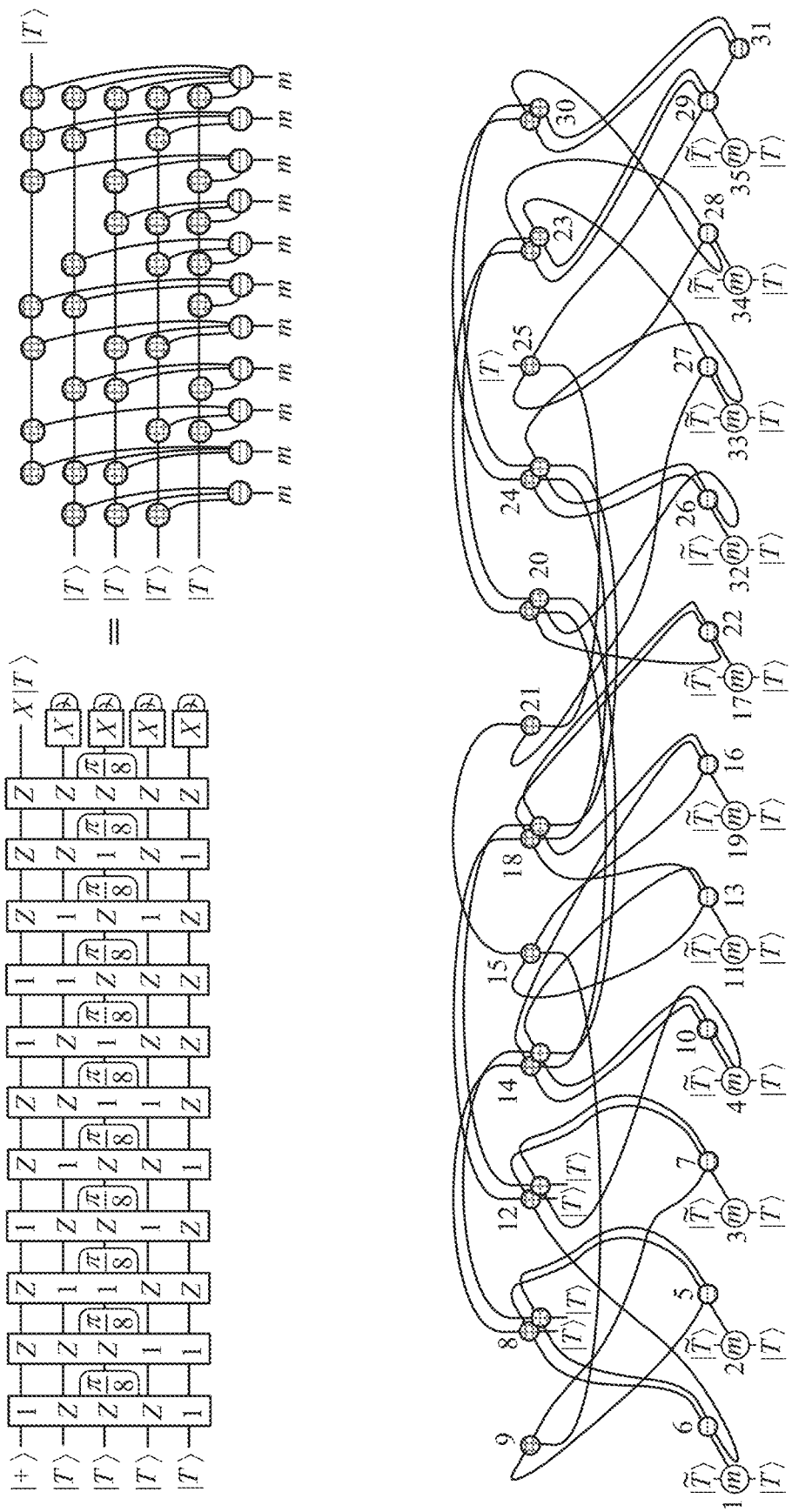
Figure 44A:
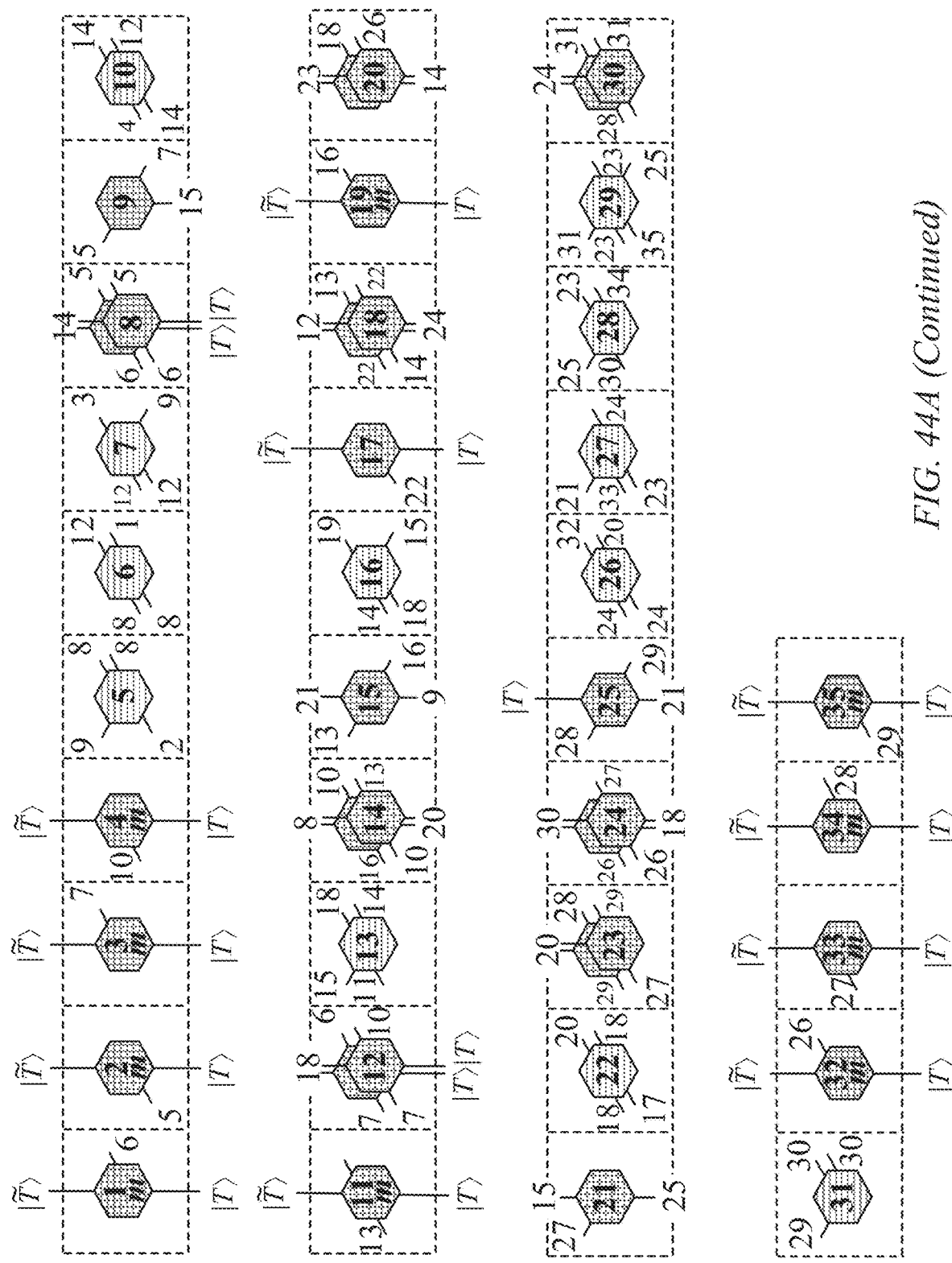

15-to-1 distillation. In a similar manner, we can construct a $(15\text{-to-}1)_{d, d/2, d/2}$ protocol shown in FIG. 44A. Here, we also reduce the Z distance to $d_Z = d/2$, which means that some qubits will be encoded in rectangular $d \times d/2$ surface-code patches. A workspace qubit can generate two such qubits using multi-port half-distance blocks as shown in FIG. 44B. Multi-port blocks have pairs of ports on the east and west side of the block. Note that ports on the same side can be connected to different blocks, but they must be connected to blocks on the same side, e.g., the top east port of one block can only be connected to the top east port of another block, but not the bottom east port.

The resulting network of logical blocks in FIG. 44A is complicated, but the compressed ZX diagrams of this network and of the original circuit can be used to verify that the operations are identical, as shown in FIGS. 44C and 44D. Note that these compressed ZX diagrams correspond to the Tanner graph of a [15,1,3] Reed-Muller code, as the 15-to-1 distillation protocol is based on this code. The $(15\text{-to-}1)_{d,d/2,d/2}$ protocol can be implemented with 35 half-distance blocks, i.e., an active volume of 35/2. Remarkably, this protocol can be implemented with a range of r=12, as connected blocks are at most 6 workspace modules apart.

Multiple stages of distillation. Typically, one stage of distillation will not be enough to produce sufficiently high-quality magic states. For example, if we need to produce Toffoli states with an error rate below $10^{-10}$, the input T states in the 8-to-CCZ protocol need to have an error rate below $10^{-6}$. However, if noisy T states produced by state injection have an error rate of $10^{-3}$, the input states to the 8-to-CCZ protocol need to be generated by an initial stage of distillation, e.g., via a 15-to-1 protocol using injected T states as inputs.

The code distances used in the first stage of distillation can be reduced even further (as described in Litinski (2019)), e.g., by using a $(15\text{-to-}1)_{d/2,d/4,d/4}$ distillation protocol. Here, all distances are halved compared to the protocol in FIG. 44A. In an active-volume architecture, we can use 35 workspace qubits to execute four instances of such a protocol simultaneously, i.e., one instance per quadrant of the workspace qubits. Because the measurement distance is now d/4, the 35 workspace qubits produce 8 distilled T states every d/2 code cycles. These can then be used by an additional 25 workspace qubits to produce a CCZ state in the second stage of distillation. Therefore, the active volume of a $(15\text{-to-}1)_{d/2,d/4,d/4} \times (8\text{-to-CCZ})_{d,d,d/2}$ protocol is 30 blocks.

Whether or not this protocol is suitable to distill sufficiently high-quality CCZ states depends on the physical error rate, target logical error rate and scaling behavior of the logical error rate. While detailed numerical simulations are required to determine the precise logical error rate of these distillation protocols, we can perform a rough estimate using the method described in Litinski (2019). We can then estimate the output error rate of the 8-to-CCZ protocol as $$p_{(8\text{-to-}CCZ)_{d,d,d/2}} \approx 28 \cdot \left(4p\left(\frac{d}{2}\right) + p_{in}\right)^2 + 2p(d), \quad (23)$$

and of the 15-to-1 protocol as $$p_{(15\text{-to-}1)_{d/2,d/4,d/4}} \approx 35 \cdot \left(4p\left(\frac{d}{2}\right) + p_{in}\right)^3 + 2p\left(\frac{d}{2}\right). \quad (24)$$

Here, $p_{in}$ is the error rate of the input magic states, and p(d) is the logical error rate of a surface-code spacetime block of size d×d×d. This rough estimate is obtained by observing that the logical operator of each PPM that is used to consume an input magic state is supported in eight spacetime blocks of size $(d/2)^3$. In other words, the logical membraine (or correlation surface) encoding the PPM outcome has an error rate of approximately 8p(d/2). A flipped PPM outcome implies that we perform a $P_{-\pi/8}$ rotation instead of a $P_{+\pi/8}$ rotation. Such an S-gate error generates a Z flip with a 50% probability in the distillation protocol, hence the 4p(d/2) contribution in addition to the input error of the magic states. The 15-to-1 protocol suppresses such Z flips with $p \to 35p^3$ and the 8-to-CCZ protocol with $p \to 28p^2$. In addition, each output qubit accumulates an idling error of 2p(d) that scales with the large code distance.

As an example, we can assume that $p(d)=10^{-d/2}$, as can be expected when operating at 10% of the surface-code error threshold. Suppose that we need to execute a quantum computation with $10^9$ Toffoli gates. If the computation primarily consists of adders, the active volume of the computation will be $\approx 10^{11}$ blocks. If we want to keep the probability of an error at the end of the computation below 1%, we need to execute our computation with a full distance such that $p(d)<10^{-13}$, e.g., we may use a quantum computer with d=28. We also need to generate CCZ states with an error rate of $\approx 10^{-11}$. With an injection error rate of $p_{in}=10^{-3}$, the first-stage 15-to-1 protocol produces T states with an error rate of $6 \times 10^{-7}$ according to our rough estimate. The second-stage 8-to-CCZ protocol then produces CCZ states of $2.8 \times 10^{-11}$, which is close to the target error rate.

We emphasize again that this is a rough estimate, and a detailed numerical study would provide more precise estimates. We also note that distillation protocols can be optimized by tuning the distances and by considering different combinations of distillation protocols in addition to 15-to-1 and 8-to-CCZ protocols. For present purposes, we can roughly estimate the cost of a CCZ state. The active volume of the two-stage protocol described above is 30 blocks. Some extra volume will be required for state injection, and possibly to increase the measurement distance above d/2. We then estimate that it is reasonable to assume that a CCZ state can be distilled with a cost of $C_{|CCZ\rangle} \approx 35$. Furthermore, distilled CCZ states can be converted to two T states with an extra cost of 16.5. Therefore, we also estimate that the cost of a T state can be assumed to be $C_{|T\rangle} \leq 25$.

2.3.4. Computational Cost and Performance

The foregoing sections illustrate examples of how specific quantum subroutines can be implemented in an active volume architecture and how to estimate computational costs of various quantum subroutine. These examples are provided to illustrate the manner in which quantum subroutines can be specified as networks of logical blocks. Other implementations of the quantum subroutines described above may also be developed using principles described herein, and the computational cost of a particular quantum subroutine depends on implementation. Quantum subroutines not illustrated herein can also be specified as networks of logical blocks; one prescription for doing so is provided in the next section.

FIG. 45 is a table 4500 summarizing estimated computational costs for the various quantum subroutines presented above. Computational cost in this context includes three considerations. The primary consideration is the active volume. While arbitrary quantum circuits consisting of $n_r$ single-qubit rotations on n qubits and an arbitrary number of Clifford gates have an active volume of at most $\mathcal{O}(n^2 + n \cdot n_r)$ blocks, it is usually possible to significantly reduce the active volume of specific logical operations, as in the examples given above. If a quantum computation consists exclusively of such optimized subroutines, its active volume can be computed by summing over the active volumes of each constituent operation. If a quantum computation contains custom subroutines in addition to optimized ones, logical block networks for the custom subroutines can either be optimized using the techniques described above, or the custom subroutine an be converted to an unoptimized logical block network using a generic prescription described below.

In some embodiments, the total spacetime cost of a computation is approximately twice the active volume, as N qubit modules are used to execute N/2 logical blocks (in the workspace modules) and store up to N/2 qubits (in the memory modules) in every logical cycle. In embodiments where memory modules and workspace modules are identical, it is possible to use more memory (by repurposing some of the workspace modules to store qubits) in exchange for a slower quantum computer and vice versa.

A second consideration in determining cost of a quantum computation is the reaction depth. Each logical operation has an associated reaction depth, which is the number of "reaction layers" (i.e., consecutive layers of reactive measurements) that are part of the operation. Since reactive measurements are inherently sequential, as the choice of measurement bases of a layer of reactive measurements depends on the measurement outcomes of the previous layer, the reaction depth may determine the minimum runtime of the quantum computation. However, computing the reaction depth of a full quantum computation is not as simple as adding the reaction depths of the constituent subroutines, as logical operations on disjoint groups of qubits typically can be performed in parallel, leading to a lower reaction depth.

Memory is a third consideration. In the examples above, memory modules are used to store idle qubits that are not currently being operated on. Memory modules are also used to store various auxiliary states that facilitate computations, such as distilled magic states, stale magic states awaiting reactive measurements, and bridge qubits that connect concurrent or successive operations accessing the same qubits. In some embodiments, quantum computations with memory requirements close to the maximum capacity of N/2 qubits may run more slowly than quantum computations using less memory.

In some embodiments, the output of a resource estimate of a quantum computation can consist of three numbers: the memory requirement in number of qubits, the active volume in units of blocks, and the reaction depth in number of layers of reactive measurements.

In order to determine how well (e.g., how quickly) a particular active volume quantum computer can execute a quantum computation, it is helpful to characterize the computer's performance. In some embodiments, the performance of an active-volume quantum computer is quantified by four key performance metrics. First is memory capacity, which in some embodiments corresponds to half the number of qubit modules. Memory capacity determines which quantum computations can be executed in the first place, as the memory needs to equal or exceed the memory requirement of the computation algorithm. Second is speed. Speed can be quantified in blocks per second, a number that can be obtained by dividing the number of workspace modules (which can be half the number of qubit modules) by the duration of a logical cycle. The duration of a quantum computation can be estimated by dividing the active volume of the quantum computation by the speed of the device. Third is error rate, which can be quantified as the logical error rate per block. In some embodiments, error rate is governed by the code distance d of the logical qubits (which may be fixed for a given hardware implementation of the qubit modules) and the physical error rate of the device (or devices) that implement the qubit modules. Error rate may limit the maximum size of a computation that can be executed using a particular device. The total error probability of a computation with an active volume of $n_b$ blocks with a per-block error rate of $P_b$ is $1-(1-P_b)^{n_b}$; thus, computations with more blocks have higher error rate. (Whether a particular error rate is acceptable for a given use-case is a matter of judgment, and there is no hard limit on acceptable error rate.) Fourth is reaction time, which determines the maximum speed of the computation. Due to the inherently sequential character of reactive measurements, a computation cannot be executed in less time than the computation's reaction depth multiplied by the computer's reaction time, even if the speed in blocks per second would otherwise allow it.

2.4. Compiling and Execution of Quantum Computations

According to some embodiments, any quantum computation can be executed in an active volume quantum computer with a sufficient number of qubit modules. The quantum computation can be specified using logical block networks, which can be determined from standard quantum circuit diagrams (e.g., using techniques described above). In some embodiments, a "compiler" can be provided as a set of classical algorithms to translate quantum computations into logical block networks that can be executed by workspace modules.

Figure 46:
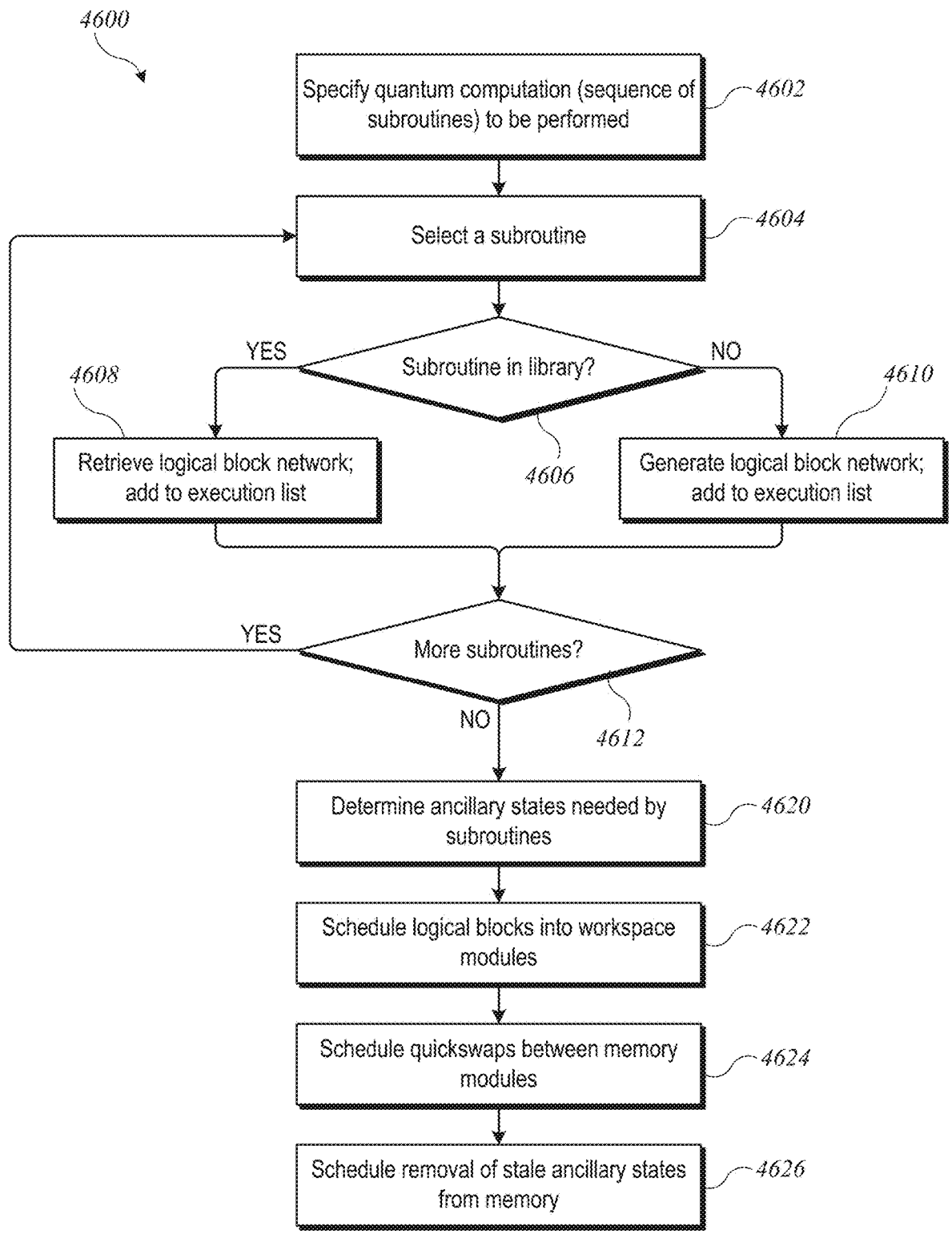
FIG. 46 shows a flow diagram of a compiler process for an active volume quantum computer according to some embodiments.

FIG. 46 shows a flow diagram of a compiler process 4600 for an active volume architecture according to some embodiments. Process 4600 can be executed using a classical computer system; for instance, process 4600 can be implemented as program code that can be executed by a processor in a classical computer system. At block 4602, a quantum computation to be performed can be specified. In some embodiments, the quantum computation can be specified as a sequence of (quantum) subroutines, which can include any of the standard subroutines described above and/or other subroutines. Each subroutine can be specified using a quantum circuit. In some instances, a high-level specification of a quantum computation can identify a sequence of subroutines to be executed and the (logical) qubits on which each subroutine is to be executed.

Each subroutine can be translated into a logical block network. For instance, at block 4604, a subroutine is selected. At block 4606, a determination can be made as to whether the subroutine is in a "library" of subroutines for which logical block networks have already been defined. In some embodiments, any or all of the subroutines referenced above can be included in a library, which can be implemented using classical data structures and classical data storage devices such as memory circuits (e.g., DRAM, SRAM), solid state drives, optical or magnetic disk, or the like. Other subroutines can be included if desired. In some embodiments, a library of subroutines can expand over time as new subroutines are translated into logical block networks and added to the library. Likewise, a library of subroutines can be updated over time as new (e.g., more efficient) implementations of subroutines already present in the library are developed. If the subroutine is in the library, then at block 4608, the corresponding logical block network can be retrieved from the library. If the subroutine is not in the library, then at block 4610, a logical block network for the subroutine can be generated.

Figure 47A:
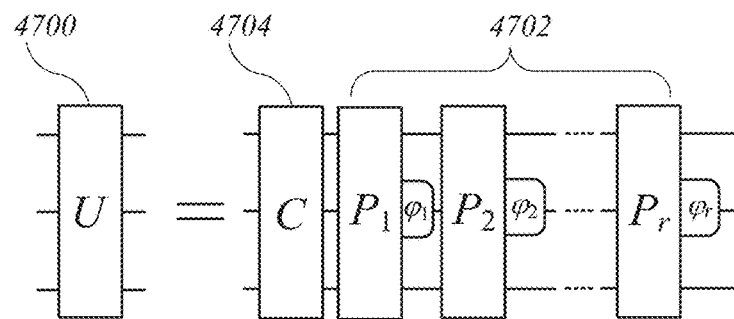
FIGS. 47A and 47B illustrate a general protocol for converting a unitary transformation to a logical block network according to some embodiments.
Figure 47B:
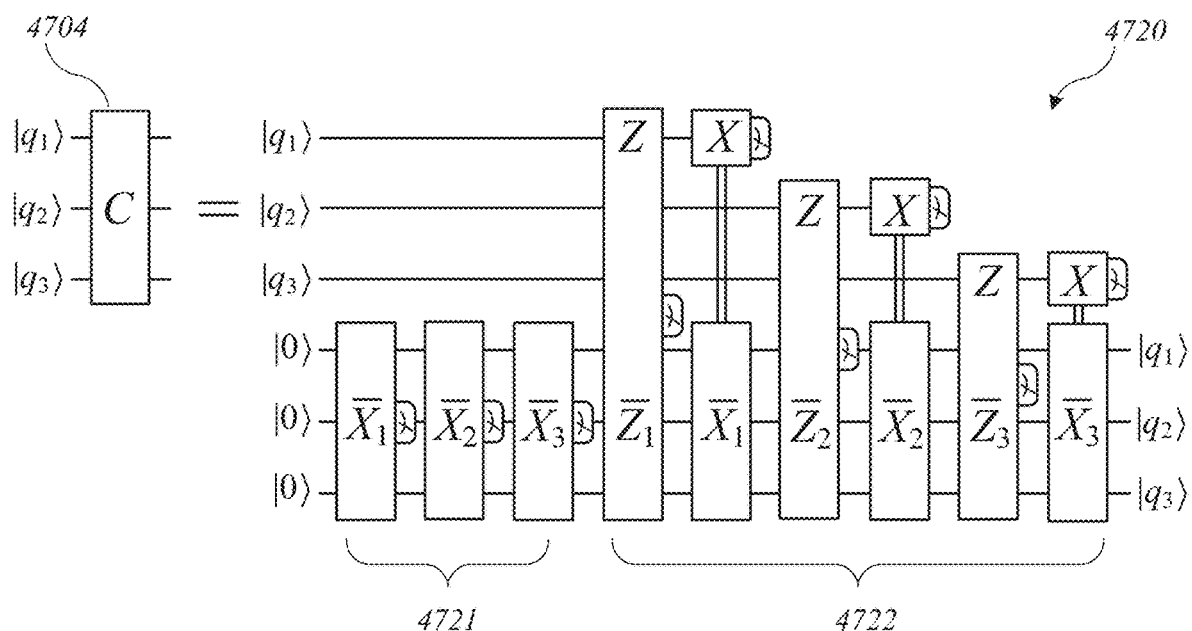

In some embodiments, for any subroutine that has been specified as a unitary transformation, a corresponding logical block network can be generated. For instance as shown in FIG. 47A, any n-qubit quantum circuit (or unitary transform) 4700 consisting of Clifford gates and a number of n, single-qubit rotations can be converted into a sequence of $n_r$ Pauli product rotations (PPRs) 4702 and one n-qubit Clifford gate 4704. An n-qubit Clifford gate is an operation that maps $X_j \rightarrow X_j'$ and $Z_j \rightarrow Z_j'$, where $1 \leq j \leq n$, and $X_j$ and $Z_j$ are n-qubit Pauli operators. Such a Clifford gate can be implemented using 2n Pauli product measurements (PPMs); a corresponding circuit 4720 is shown in FIG. 47B. Gate operations 4721 prepare an eigenstate of all $X_j$, and gates 4722 teleport the data qubits into that state via $Z_j \otimes Z_j$ measurements, which applies the desired Clifford gate operation. Random n-qubit PPMs have an active volume of ≈1.5n blocks. Therefore, a random n-qubit Clifford gate has an active volume of ≈$3n^2$ blocks. The arbitrary unitary transform in FIG. 47A has an active volume of ≈$3n^2 + n_r \cdot (1.5n + C_{rot})$, where $C_{rot}$ is the cost of an arbitrary-angle Z rotation. Circuit 4720 FIG. 47B can be translated to a logical block network similarly to examples described above. The resulting logical block network might not be optimal, in the sense of not minimizing active volume for a specific subroutine (or unitary transformation), but it can be executed. If reduction of active volume is desired, any specific quantum circuit can be translated to a ZX diagram and from a ZX diagram to an optimized logical block network, using techniques described above.

Referring again to FIG. 46, at block 4612, if more subroutines remain, process 4600 can return to block 4604 to select the next subroutine until a list of the logical block networks for all subroutines has been produced.

The next phase is a scheduling phase, in which logical blocks are assigned to specific workspace modules and specific logical cycles. At block 4620, process 4600 can determine which subroutines require ancillary states, such as magic states, Y states, or catalyst states (e.g., phase-gradient states that are used to facilitate various logical operations) that should be prepared in advance of executing logical blocks that use them as inputs. Logical block networks for preparation of these ancillary states can be inserted into the list of logical block networks and scheduled such that the ancillary states are ready when needed. In some embodiments, logical block networks for generating some or all of these states (e.g., catalyst states) can be scheduled for the very beginning of the computation. Preparation of other ancillary states can occur in parallel with execution of the computation, provided that ancillary states are ready in appropriate memory modules when needed so that the computation does not have to pause to await preparation of ancillary states.

At block 4622, process 4600 can schedule the logical blocks into workspace modules. Scheduling can include assigning each logical block to a specific workspace module in a specific logical cycle as well as introducing bridge qubits where appropriate to parallelize different operations and/or to teleport qubits between workspace modules and memory modules as described above. It should be noted that reactive measurement can change the selection of logical blocks, and scheduling can be a dynamic process that is performed in part as the computation executes.

At block 4624, process 4600 can schedule quickswap operations between memory modules. As described above, quickswaps can be used to rearrange qubits in memory to facilitate quickswaps between memory and workspace qubits at the transition between logical cycles, and multiple layers of quickswaps can occur during one logical cycle. For each qubit i in memory, a target memory module j (i.e., the memory module that should hold the qubit i at the end of the logical cycle) can be determined, and quickswaps can be scheduled to achieve the result that each memory qubit is in its target memory module by the end of the logical cycle.

Figure 48:
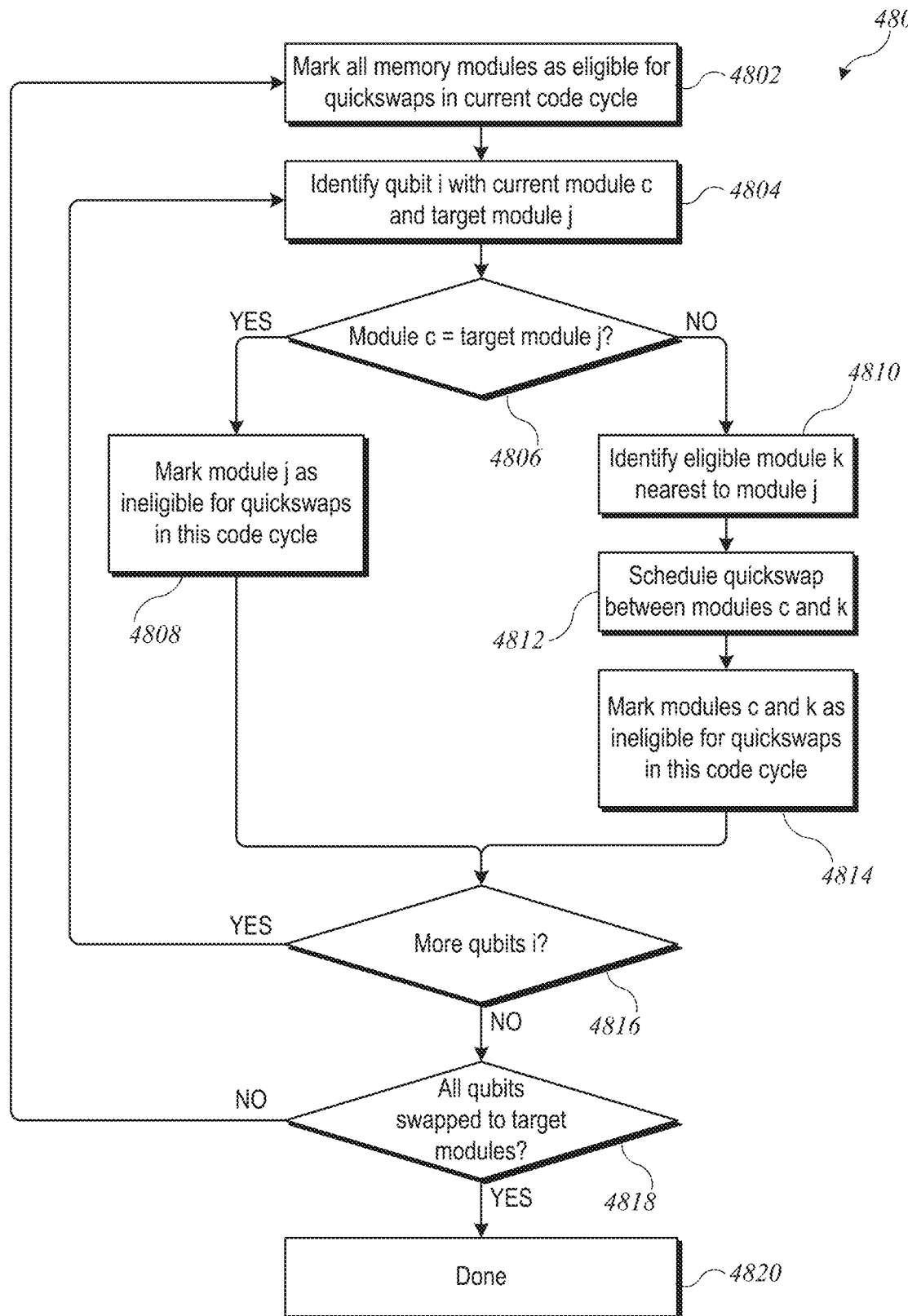
FIG. 48 shows a flow diagram of a process for scheduling quickswaps in an active volume quantum computer according to some embodiments.

In some embodiments, scheduling of quickswaps can use a simple greedy algorithm. FIG. 48 shows a flow diagram of a process 4800 for scheduling quickswaps according to some embodiments. Process 4800 can be executed using a classical computer system with a classical data structure to track the assignment of qubits to qubit modules for sched-uling purposes. At the beginning of process 4800, all memory modules are marked as eligible for quickswaps in the current code cycle (e.g., by updating a field in the classical data structure indicating eligibility). At block 4804, a qubit i having a current module c and a target module j is identified. For instance, a list of qubits in memory can be made, in any convenient order, and block 4804 can traverse the list. At block 4806, process 4800 can determine whether qubit i is already in target module j (or, more precisely, whether quickswaps already scheduled will, upon execution, result in qubit i being in target module j). If so, then at block 4808, module j is marked as unavailable for a quickswap in the current code cycle. If not, then at block 4810, the available module k that is nearest to target module j is identified, e.g., by finding the available module k for which |k−j| is minimized. (In some cases, the target module is available and k=j.) At block 4812, a quickswap is scheduled between the current module c and module k. This quickswap moves qubit i to module k and any qubit that is in module k to module c. At block 4814, modules c and k are marked as ineligible for quickswaps in the current code cycle. At block 4816, if more qubits remain in the list, process 4800 can return to block 4804 to process another qubit. Once all qubits have been processed, at block 4818, process 4800 can determine whether all qubits are in their target modules (or, more precisely, whether quickswaps already scheduled will, upon execution, result in all qubits being in their target modules). If not, then another layer of quickswaps should be scheduled, and process 4800 can return to block 4802 to schedule the next layer. Once all qubits are in their target locations at block 4818, scheduling of quickswaps for the logical cycle is complete (block 4820).

Figure 49:
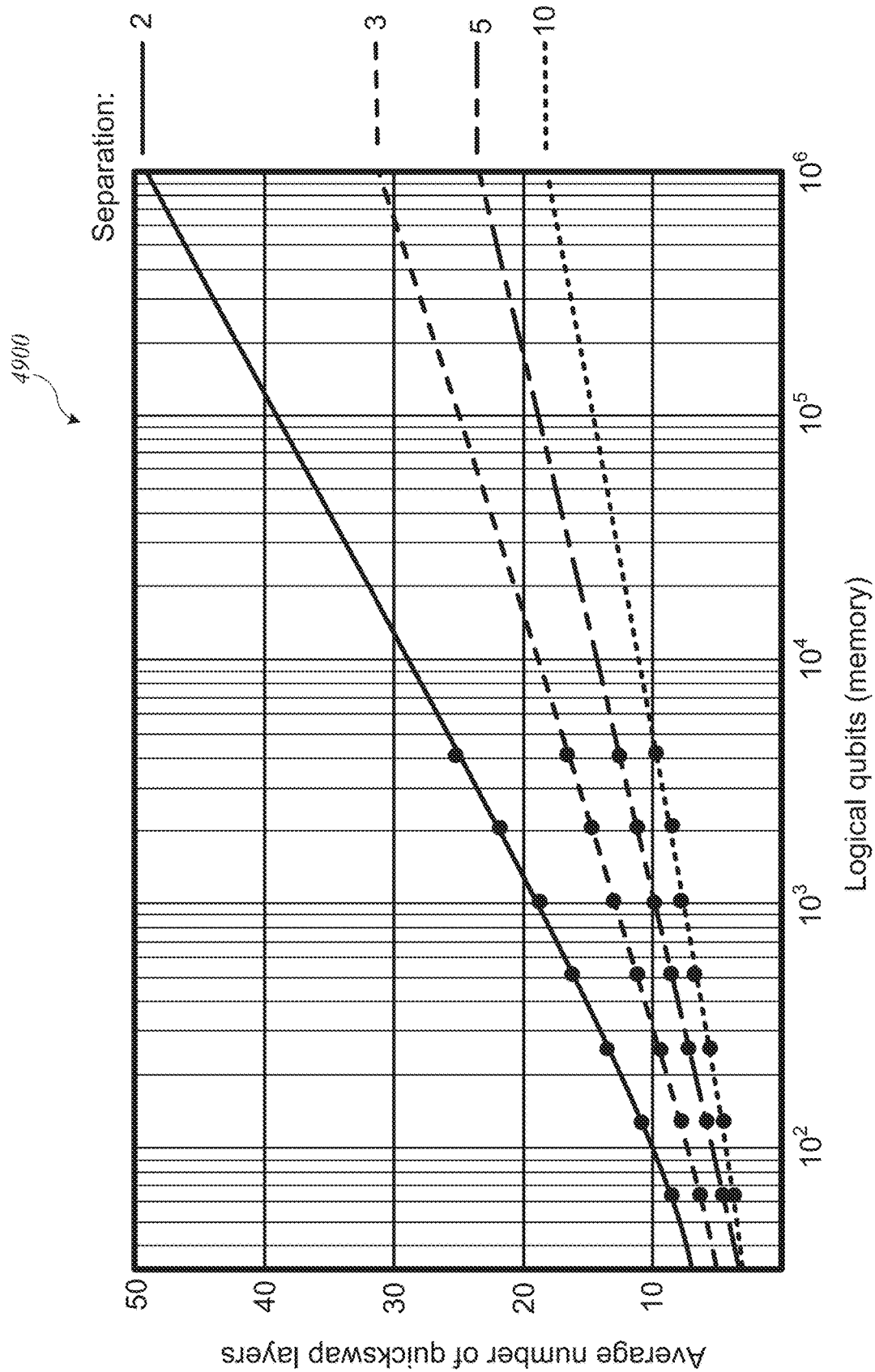
FIG. 49 shows a graph of the performance of the process of FIG. 48 according to some embodiments.

Depending in part on the code distance d, process 4800 can rearrange even a very large memory within a logical cycle. To illustrate, consider a situation in which an n-qubit memory is initially in a random arrangement and every s-th memory module (where s is a separation distance) is randomly assigned a specific qubit that needs to be moved to that module by the end of the logical cycle. For example, in a computation consisting of adders, each adder segment has an active volume of ≈60 blocks and has 6 input and 9 output qubits, in addition to the input and output qubits of the distillation protocol. In this situation, the separation is s≈3. Simulating process 4800 for various sizes of n-qubit memories shows that all relevant qubits can be moved into target locations within $\mathcal{O}$ (log n) quickswap layers. FIG. 49 shows a graph 4900 of the performance of process 4800 according to some embodiments. The average number of quickswap layers to achieve a desired arrangement of qubits is plotted as a function of memory size (n) for separation distances s of 2, 3, 5, and 10. The number of required quickswap layers increases with decreasing separation distance. For a separation of s=3, a 2048-qubit memory can be rearranged in approximately 15 code cycles, implying that process 4800 provides sufficiently fast rearrangement for d>15. Extrapolating to extremely large memories, a million logical qubits can be rearranged in approximately 30 quickswap layers for s=3.

In embodiments where memories need to be rearranged even faster, a more refined algorithm that that of process 4800 can be used. For instance, it may be the case that many target locations are required to store an ancillary state or to be empty, in which case there is a freedom of choice that can be exploited when deciding which specific qubit to move into that location. (All "empty" modules are indistinguishable, and if multiple instances of an ancillary state exist in memory, any instance of that state will do.) Moreover, to the extent that the assignment of logical blocks to workspace modules is known more than one logical cycle in advance, this knowledge can be exploited by moving certain qubits close to target locations during logical cycles before they will be needed. Fast rearrangement can also be enhanced by increasing the number of connections in the quickswap network. For instance, in addition to quickswap connections between qubit modules i and j with $|i-j|=2^k$, additional quickswap connections can be provided between qubits that are 3, 5 and 7 memory locations apart.

Referring again to FIG. 46, another aspect of scheduling can occur at block 4626, where removal of stale ancillary states (e.g., stale T states and CZ states) from memory is scheduled. Stale states are removed by reactive measurement. Logical operations add stale states to the memory, and removing them as quickly as possible advantageously frees up memory modules for other uses. However, since the measurements are reactive, stale states need to remain in memory until after the reaction time $\tau_r$ as described above. Scheduling of stale state removal can take the reaction time into account. For instance, the stale state can remain in memory until it is ready for removal (i.e., after the reaction time). At that point, depending on the type of measurement to be made, the stale state can be measured in place in memory or quickswapped into a workspace module to perform a measurement operation involving a logical block network.

It should be apparent in view of the foregoing that qubits in memory can include data qubits, distilled magic states, stale magic states, catalysts, and bridge qubits. For some quantum computations, a significant fraction of qubits stored in memory may not be data qubits. For instance, in a quantum computation using adders, each 60-block adder segment is associated with approximately 3 qubits of a distilled CCZ state, 6 qubits of stale CZ states, a bridge qubit for the carry and 2 qubits for the 8 half-distance T states in the distillation, so there are approximately 12 non-data qubits in memory. For some computations, around 20% of qubits stored in memory may be non-data qubits. Therefore, an active-volume quantum computer with n qubits of memory may run out of memory, if a quantum computation has a number of data qubits that is close to the maximum capacity.

In some embodiments where workspace modules and memory modules are implemented identically, workspace modules can be used to store qubits when all memory modules are full. Doing so reduces the number of workspace modules available for the execution of logical blocks and therefore reduces the throughput (or speed in blocks per logical cycle) of the quantum computer. For example, if 20% of workspace modules are temporarily repurposed as memory modules, the speed of the quantum computer will be reduced by 20%. Conversely, where a quantum computations has very low memory requirements, unoccupied memory modules can be used as workspace modules in order to speed up the quantum computation. Therefore, the estimate that an n-qubit active-volume quantum computer can execute a quantum computation with an active volume of b blocks in 2b/n logical cycles is only approximate; the precise number will depend on the state of the memory during the computation.

3. Implementation of Active Volume Core Using Photonic Circuits

Active volume architectures of the kind described above can be implemented in a variety of physical systems. Physically, an active volume core for a quantum computer can include a set of interconnected qubit modules, where each qubit module includes appropriate hardware to generate a surface code patch. The particular hardware depends on the particular quantum systems used to implement the physical qubits. The qubit modules can be interconnected as described above to provide both quickswap and port connections. In some embodiments, a quickswap can be implemented by moving or teleporting the physical qubits that instantiate the surface code patch from one qubit module to another. Port couplings can be implemented by selectably coupling physical qubits corresponding to the boundaries of different surface code patches to inputs of a joint measurement circuit. As described above with reference to FIGS. 16-19, quickswaps and port connections operate differently, and separate hardware may be provided for the two types of connections.

Photonic physical qubits are well-suited to active volume architectures because photonic qubits are inherently in motion, and optical switches and waveguides can be used to implement networks of port connections and quickswap connections with selectable connectivity.

In some embodiments, active volume architectures can be implemented using fusion-based quantum computing (FBQC) techniques implemented with photonic qubits. As described above, logical blocks correspond to segments of a spacetime diagram; accordingly, any logical block network diagram can be converted to a fusion graph using techniques described above. Fusion graphs can be executed using a network of "interleaving modules," which can provide the workspace and memory qubit modules described above. In some embodiments, the same interleaving module structure can be used for both memory and workspace modules. This section provides an introduction to the structure and components of interleaving modules that use photonic qubits to execute fusion graphs, followed by examples of interleaving modules that support an active volume architecture.

3.1. Introduction to Interleaving Modules

According to some embodiments, a general-purpose "interleaving" hardware module (or circuit) can include a resource state interconnect (RSI) that receives resource states from an external source and provides the qubits of the resource states at regular time intervals to a set of reconfigurable fusion circuits that can selectably perform joint measurements and/or single-qubit measurements on a pair of received qubits. The interleaving hardware module can also include a combination of switches and delay lines to deliver qubits from the resource state interconnect to the appropriate reconfigurable fusion circuits or to other interleaving hardware modules within a system. By using classical control logic to control the switch settings for each qubit of each resource state that is received at the RSI and the configuration of each reconfigurable fusion circuit that receives qubits, an interleaving module or a network of interleaving modules can be operated to provide a programmable quantum computer that executes programs, where the programs can be defined using fusion graphs, logical block networks, or other techniques that specify the set of operations to be performed on each resource state. Given appropriate connectivity among the interleaving modules, logical blocks (represented, e.g., as fusion graphs) corresponding to operations in an active-volume architecture can be executed.

In a baseline architecture for a photonic quantum computer, networks of identically configured interleaving modules can be connected to implement FBQC by performing fusion operations as specified in fusion graphs of the kind described above. To facilitate understanding of interleaving in this context, an introduction to interleaving modules suitable for baseline architectures is provided in this section. In these examples, interleaving modules have only local couplings (i.e., couplings to adjacent interleaving modules in a network) and might not support an active volume architecture. Section 3.2 describes how interleaving modules can be enhanced with additional switching and connection paths to support selectable non-local port and quick-swap couplings.

3.1.1. Circuit Components for Interleaving Modules

This section introduces circuit components and corresponding symbols used in sections below to describe interleaving modules that operate on physical qubits, in particular photonic qubits that propagate along defined optical paths connected to the various circuit components. In some embodiments, photonic qubits can be implemented a dual-rail encoding (e.g., as described in Section 1 above) and each path can be implemented using a pair of waveguides. More generally, the number of waveguides corresponding to each path can be selected according to a particular photonic encoding of qubits.

Figure 50A:
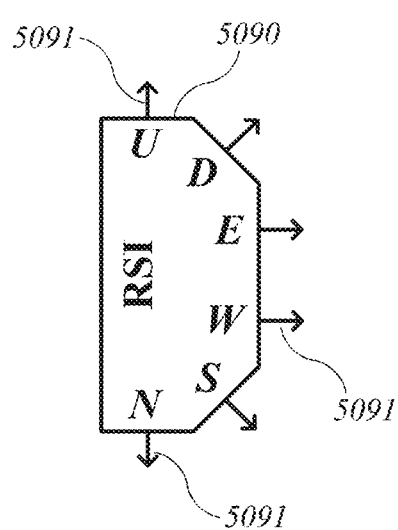
FIGS. 50A-50D show simplified schematic diagram of circuit components for qubit modules implementing an active volume quantum computer according to some embodiments.

The quantum input to an interleaving module can be a resource state, which is a physical system having a (generally small) number of entangled qubits. An example is the 6-ring resource state described above. In some embodiments, an interleaving module includes a resource state interconnect, also referred to herein as an "RSI" or "RSI circuit," to receive resource states. FIG. 50A shows a circuit symbol denoting an RSI circuit 5090 in drawings herein. RSI circuit 5090 can be implemented using any circuit or components whose outputs are qubits of a resource state (which, as described above, is a quantum system of entangled qubits), with different output paths 5091 used to output different qubits of the resource state. RSI circuit 5090 can be implemented as an input port that receives and distributes resource states that were generated in other hardware devices. For example, RSI circuit 5090 can include a set of waveguides coupled at one end to an external circuit or component (not shown) that generates resource states and at the other end to output paths 5091 of RSI circuit 5090. Any combination of photonic waveguides formed in integrated circuits, optical fibers, other waveguides, and/or other optical interconnects can be used. RSI circuit 5090 can receive resource states from an external circuit and route the qubits to respective output paths 5091. In this manner, RSI circuit 5090 can act as an input port for an interleaving module. In some embodiments, one or more circuits that produce resource states of photonic qubits can be implemented at a separate location from the interleaving modules, and the number of such circuits can be equal to or large than the number of interleaving modules. Switching circuits can be provided to selectably route a given resource state from the circuit where it is generated to a particular RSI circuit 5090 in a particular interleaving module. A variety of circuits and couplings can be used, provided that each output path 5091 of RSI circuit 5090 can provide a different qubit of the same resource state at regular intervals. The term "RSI cycle" is used herein to denote one operation of RSI circuit 5091 providing a resource state. The duration of an RSI cycle can be chosen as desired, provided that the duration is long enough that the circuit(s) that produce the resource states can complete the physical process of producing a resource state. In various embodiments, the RSI cycle time can be ~1 ns or ~10 ns, although longer or shorter RSI cycle times are not precluded.

The particular size and entanglement geometry of the resource states can be chosen as a design parameter. In some cases, the optimal size may depend on the particular physical implementation of the qubits. Examples described herein refer to resource states having six qubits associated with different directions in entanglement space (e.g., the 6-ring resource state described above), and output paths 5091 of RSI circuit 5090 are sometimes labeled with directions (U, D, E, W, S, N) as an aid to visualization of entanglement patterns. Such labels are not intended to specify a physical arrangement. It should be understood that other resource states can be used, and that resource states can have more or fewer than six qubits and any desired entanglement structure. Each resource state provided to RSI circuit 5090 can be a distinct quantum system that is not entangled with other quantum systems. Entanglement between qubits from different resource states may be created through operation of interleaving modules, as in examples described below.

For purposes of understanding the present disclosure, it suffices to understand that generation of resource states can take place in a separate circuit or system whose output qubits are provided to RSI circuit 5090, as long as RSI circuit 5090 can output resource states at a rate of one resource state per RSI clock cycle. However, to provide additional context, examples of techniques for generating resource states will now be described.

In some embodiments, a resource state can be generated using photonic and electronic circuits and components (e.g., of the type described in Section 1 above) to produce and manipulate individual photons. In some implementations, a resource state generator can include one or more integrated circuits fabricated, e.g., using conventional silicon-based technologies. The resource state generator can include photon sources or can receive photons from an external source. The resource state generator can also include photonic circuits implementing Bell state generators and fusion operations as described above. To provide robustness, a resource state generator can include multiple parallel instances of various photonic circuits with detectors and electronic control logic to select a successful instance of the resource state to provide to RSI circuit 5090. One skilled in the art will know various ways to construct a photonic resource state generator capable of generating resource states having a desired entanglement geometry.

In some embodiments, resource states can be generated using techniques other than linear optical systems. For instance, various devices are known for generating and creating entanglement between systems of "matter-based" qubits, such as qubits implemented in ion traps, other qubits encoded in energy levels of an atom or ion, spin-encoded qubits, superconducting qubits, or other physical systems. It is also understood in the art that quantum information is fungible, in the sense that many different physical systems can be used to encode the same information (in this case, a quantum state). Thus, it is possible in principle to swap the quantum state of one system onto another system by inducing interactions between the systems. For example, the state of a qubit (or ensemble of entangled qubits) encoded in energy levels of an atom or ion can be swapped onto the electromagnetic field (i.e., photons). It is also possible to use transducer technologies to swap the state of a superconducting qubit onto a photonic state. In some instances, the initial swap may be onto photons having microwave frequencies; after the swap, the frequencies of the photons can be increased into the operation frequencies of optical fiber or other optical waveguides. As another example, quantum teleportation can be applied between matter-based qubits and Bell pairs in which one qubit of the Bell pair is a photon having frequency suitable for optical fiber (or other optical waveguides), thereby transferring the quantum state of the matter-based qubits to a system of photonic qubits. Accordingly, in some embodiments matter-based qubits can be used to generate a resource state that consists of photonic qubits.

Figure 50B:
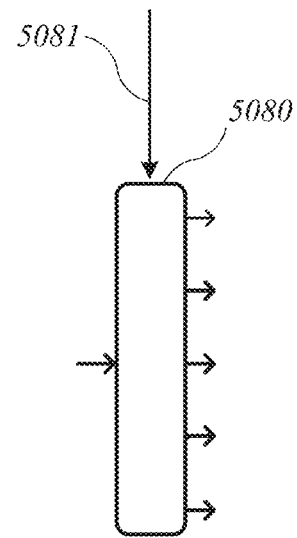

FIG. 50B shows a symbol denoting a switching circuit (or "switch") 5080. Inputs and outputs to switching circuit 5080 can include any number of qubits, and the number of inputs need not equal the number of outputs. Switching circuit 5000 can incorporate any combination of one or more active optical switches, mode couplers, phase shifters, or the like. A switching circuit 5080 can be configured to perform an active operation that reconfigures input modes (e.g., to effect a basis change for a qubit by coupling the modes of the qubit) and/or applies a phase to one or more of the input modes (which can affect subsequent coupling between modes). In some instances, a switching circuit 5080 implements a routing switch that can selectably couple an input qubit to one of two or more alternative output paths. In other instances, a switching circuit 5080 implements a selection switch that can selectably couple one of two or more alternative input qubits to an output path. In some embodiments, operation of switching circuit 5080 (e.g., selection of a routing path) can be controlled dynamically in response to a classical control signal 5081, the state of which can be determined based on results of previous operations, a particular computation to be performed, a configuration setting, timing counters (e.g., for periodic switching), or any other parameter or information.

Figure 50C:
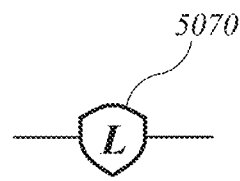

FIG. 50C shows a symbol denoting a delay circuit (also referred to as a "delay line") 5070. A delay circuit delays a qubit for a fixed length of time and can serve as memory for the quantum information stored in the qubit. The length of time (in RSI cycles) is indicated by a number, in this example L, meaning a delay of L RSI cycles. In the case of photonic qubits, a delay circuit can be implemented, e.g., by providing one or more suitable lengths of optical fiber or other waveguide material, so that the photon of the delayed qubit travels a longer path than the photon of a non-delayed qubit. In some embodiments, the delay line can be replaced with a quantum memory that can store and then read out the qubit stated after a appropriate time delay.

Figure 50D:
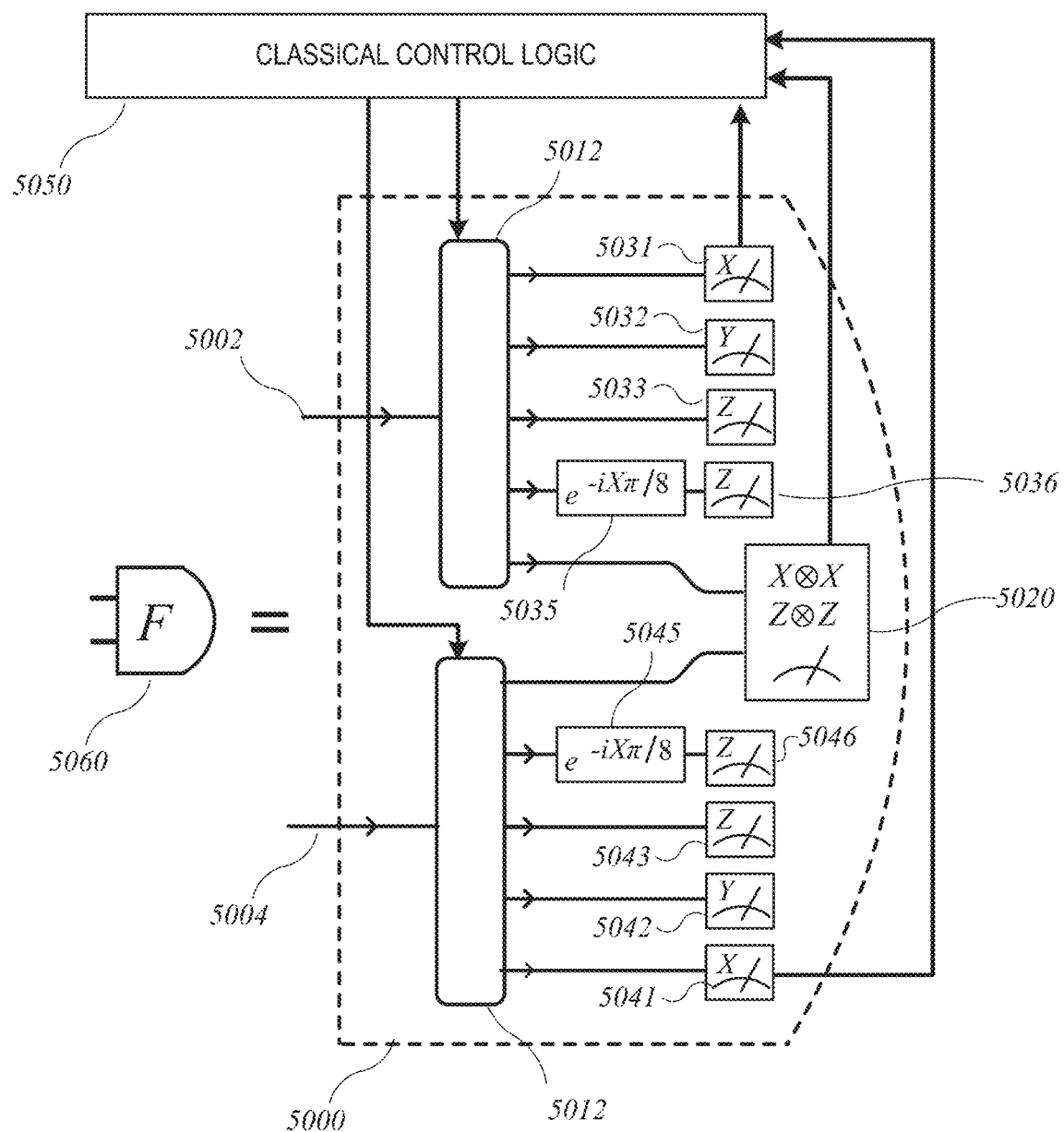

FIG. 50D shows a simplified schematic diagram of a reconfigurable fusion circuit 5000 according to some embodiments. Reconfigurable fusion circuit 5000 receives two qubits on input paths 5002, 5004. Each qubit enters an active optical switch: input path 5002 enters switch 5012, and input path 5004 enters switch 5014. Each of switches 5012, 5014 can be a 1×5 routing switch that selectably routes the input to one of five possible output paths. Switch 5012 has output paths coupled to each of five "destinations": fusion circuit 5020, Pauli X measurement circuit 5031, Pauli Y measurement circuit 5032, Pauli Z measurement circuit 5033, and phase rotation circuit 5035, which provides its output to Pauli Z measurement circuit 5036. Similarly, switch 5012 also has output paths coupled to each of five "destinations": fusion circuit 5020, Pauli X measurement circuit 5041, Pauli Y measurement circuit 5042, Pauli Z measurement circuit 5043, and phase rotation circuit 5045, which provides its output to Pauli Z measurement circuit 5046. The Pauli X, Y, and Z measurements are defined for qubits, and each Pauli measurement circuit 5031-5033, 5036, 5041-5043, 5046 can include a basis rotation (for the X, Y, or Z basis as appropriate), which can be implemented using mode couplers and phase shifters as described above, followed by a detector coupled to each mode. For instance, where qubits are represented in a dual-rail encoding, a detector can be coupled to the end of each of the two waveguides representing a qubit. The measurement result can include a number of photons detected by each detector, or a binary-valued signal from each detector indicating whether a photon was detected or not.

Fusion circuit 5020 can be, e.g., a type II fusion circuit as described above with reference to FIGS. 9A and 9B. Fusion circuit 5020 can provide Pauli XX and ZZ joint measurements (also referred to as a Bell basis measurement) on a pair of input qubits, e.g., using detectors 957 as shown in FIG. 9A. As described above, each detector 957 can provide a classical output signal, which can be, e.g., a binary logic signal indicating whether a photon was detected or a count of the number of photons detected.

Phase shift circuits 5035, 5045 each apply a phase shift of $e^{i\pi/8}$ prior to a Pauli Z measurement circuits 5036, 5046. In some embodiments, this phase rotation path can be used in generating magic states.

Switches 5012, 5014 are controlled by classical control logic 5050. Classical control logic 5050 can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, switches 5012, 5014 are coupled to an off-chip classical computer having a processor and a memory, and the off-chip classical computer is programmed to perform some or all of the operations of classical control logic 5050. In some embodiments, classical control logic 5050 (which can include an off-chip classical computer) can be provided with program code indicating the type of measurement desired for each pair of qubits input to reconfigurable fusion circuit 5000 (which can be determined from a fusion graph as described above), and classical control logic 5050 can send control signals to switches 5012, 5014 to configure reconfigurable fusion circuit 5000 to perform the desired measurements at the desired time.

Classical control logic 5050 can also receive the classical output signals (measurement outcome data) from all of measurement circuits 5031-5033, 5041-5043, 5036, 5046, and fusion circuit 5020. In some embodiments, classical control logic 5050 can execute decoding logic to interpret the results of quantum computations based on the measurement outcome data, and in some instances, results of the decoding logic can be used as inputs to determine subsequent settings for switches 5012, 5014. In addition or instead, classical control logic 5050 can provide measurement outcome data to other systems or devices, which can decode the measurement outcome data and/or perform other operations using the measurement outcome data.

Shown at the left side of FIG. 50D is a circuit symbol 5060 that is used in subsequent figures to represent an instance of reconfigurable fusion circuit 5000.

3.1.2. Networks of Interleaving Modules Implementing FBQC

Figure 51:
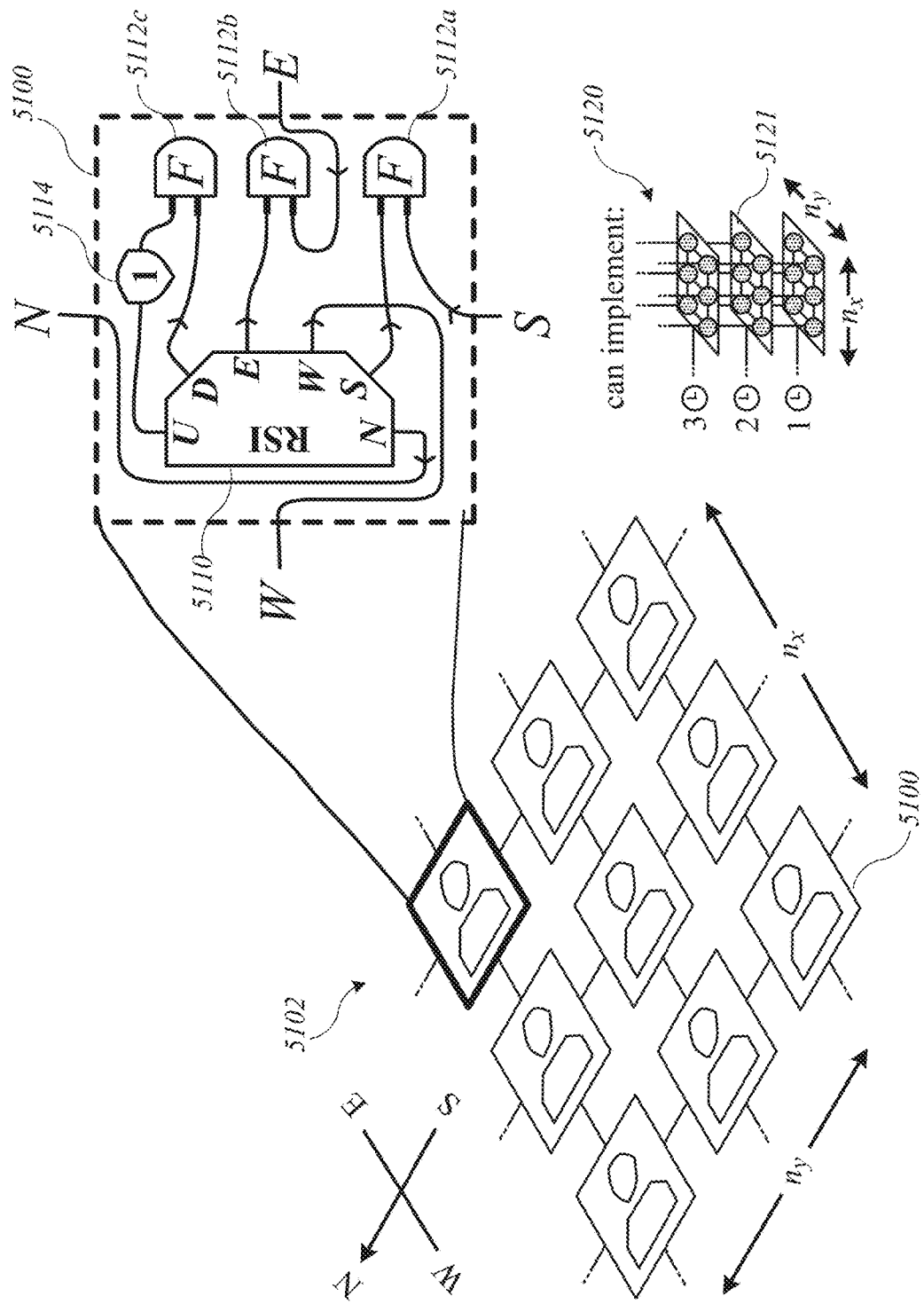
FIG. 51 shows a simplified schematic diagram of a "fully networked" implementation of unit cells that can be used as qubit modules according to some embodiments.

FIG. 51 shows a simplified schematic diagram of a "fully networked" implementation of unit cells to execute fusion graphs according to some embodiments. A number $(n_x \times n_y)$ of unit cells 5100 are connected to form a network array (or network) 5102, with connections between adjacent unit cells 5100 as indicated in the drawing. The number $n_x \times n_y$ can correspond to the dimensions of a layer in a fusion graph. It should be understood that, as with all schematic diagrams herein, the arrangement of components in the schematic diagram need not imply any particular physical arrangement of hardware components.

Each unit cell 5100 can include an RSI circuit 5110, which can be an instance of RSI circuit 5090 of FIG. 50A, and three reconfigurable fusion circuits 5112a, 5112b, 5112c, each of which can be an instance of reconfigurable fusion circuit 5000 of FIG. 50D. Each unit cell 5100 can also include a delay line 5114 that introduces 1 RSI cycle of delay. Delay line 5114 can be implemented using a suitable length of waveguide (e.g., optical fiber), as described above.

As shown by fusion graph 5120, network array 5102 can implement a fusion graph in which one layer 5121 having dimension $n_x \times n_y$ is generated for each RSI cycle. In each unit cell 5100, a resource state having six qubits (labeled N, S, E, W, U, and D as in diagrams above) is provided by each RSI 5110 during each RSI cycle. Each qubit is provided on a separate output path, either to one of reconfigurable fusion circuits 5112a-5112c or to a neighboring unit cell 5100. In the example shown, the N qubit is provided to the neighboring unit cell 5100 in the N direction. The S qubit is provided to reconfigurable fusion circuit 5112a, which also receives an N qubit from the neighboring unit cell 5100 in the S direction. Similarly, the W qubit is provided to the neighboring instance of unit cell 5100 in the W direction. The E qubit is provided to reconfigurable fusion circuit 5112b, which also receives a W qubit from the neighboring unit cell 5100 in the E direction. The U qubit is delayed by one RSI cycle using delay line 5114, then provided to reconfigurable fusion circuit 5112c synchronously with the D qubit of the resource state generated by the same RSI 5110 during the next RSI cycle. In some embodiments, computations can be implemented by controlling the switches in each reconfigurable fusion circuit 5112a-5112c in each unit cell 5100.

Although not shown in FIG. 51, in some embodiments, single-photon measurement circuits (similar to Pauli measurement circuits 5031-5033 shown in FIG. 50D) can be coupled to routing paths of unit cells 5100 at the boundaries of network array 5102 to perform single qubit measurements for qubits at the outer boundaries of the fusion graph. Other options for managing qubits at the outer boundaries of a fusion graph can also be provided.

The fully networked configuration shown in FIG. 51 uses network array 5102 of $n_x \cdot n_y$ unit cells 5100 to generate a layer of dimension $n_x \times n_y$ at each RSI clock cycle. As noted above, the layer dimension may be quite large, and implementing a network array 5102 can require a considerable amount of hardware. To reduce the amount of hardware required, network array 5102 can be modified to generate a layer by producing a set of k "patches" of dimension $P = n_x \times n_y$ for some integer k>1. The total layer size can be $n_x \times n_y \times k$. In some embodiments, the size of network array 5102 can be selected such that $n_x = n_y = d$, where d is the code distance for a fault-tolerant logical qubit encoded using surface codes as described above. Where this is the case, network array 5102 can generate a patch for one logical qubit in one RSI cycle and can generate patches for a set of k logical qubits in k RSI cycles.

FIG. 52 shows a simplified fusion graph 5220 illustrating patch-based generation of a layer using a network array of unit cells 5200 according to some embodiments. Fusion graph 5220 shows that each layer is generated across a set of k RSI cycles. The unit cells 5200 used to implement fusion graph 5220 can be connected in a network similarly to network array 5102 of FIG. 51. Unit cells 5200 differ from unit cells 5100 of FIG. 51 in that the 1-cycle delay line 5114 is replaced with a k-cycle delay line 5214, so that the U qubit is delayed until the RSI cycle in which RSI 5210 provides the resource state for the corresponding position in the next layer.

Fusion graph 5220 shows a set of k disjoint cuboids. In some embodiments, adjacent patches in each layer can be "stitched" together using additional reconfigurable fusion circuits, switching circuits, and delay lines (not shown in FIG. 52). Suitable circuits for implementing stitching between patches will become apparent in view of the following examples.

In another configuration, each unit cell can be configured to process a contiguous patch of size $L^2$ in $L^2$ RSI cycles. Unit cells of this kind are referred to herein as "interleaving modules." In a baseline architecture, patches produced by adjacent interleaving modules can be stitched together at the boundaries. Parameter L, sometimes referred to herein as the "interleaving length," can be chosen as desired. Considerations relevant to the selection of an interleaving length are described below. In some embodiments, L=d is selected, where d is the code distance for a fault-tolerant logical qubit encoded using surface codes as described above. Where this is the case, an interleaving module can generate a patch for one logical qubit in $d^2$ RSI cycles.

Figure 53:
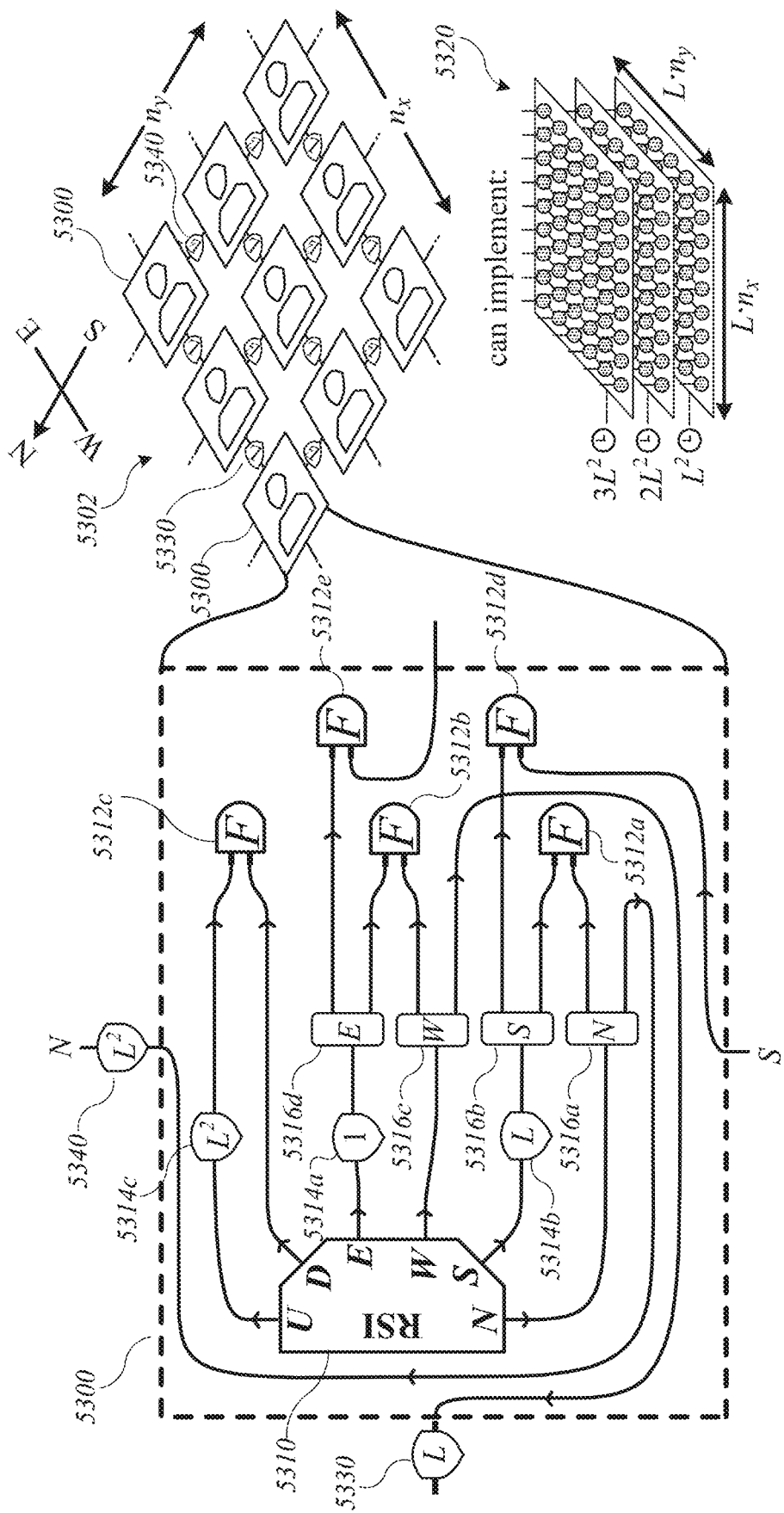
FIG. 53 shows a simplified schematic diagram of a network of interleaving modules that can be used as qubit modules according to some embodiments.

FIG. 53 shows a simplified schematic diagram of a network of interleaving modules according to some embodiments. A number $(n_x \times n_y)$ of interleaving modules 5300 are connected to form a network array 5302, with adjacent interleaving modules 5300 connected by delay lines 5330, 5340 as indicated in the drawing. Delay line 5330 connects one instance of interleaving module 5300 to its neighbor in the W direction and introduces a delay of L RSI cycles. Delay line 5340 connects one instance of interleaving module 5300 to its neighbor in the N direction and introduces a delay of $L^2$ RSI cycles. Network array 5302 can be used to generate a fusion graph 5320 with layers having dimensions $(L \cdot n_x) \times (L \cdot n_y)$.

Each interleaving module 5300 includes an RSI circuit 5310 that outputs, or provides, a resource state having six qubits (labeled N, S, W, E, D, U) during each RSI cycle. Reconfigurable fusion circuits 5312a, 5312b, 5312c, also referred to as "local" fusion circuits, can be instances of reconfigurable fusion circuit 5000 of FIG. 50 and can be used to selectably perform fusion operations or single-qubit measurement operations on qubits of different resource states provided by the RSI circuit 5310 in the same interleaving module 5300 during different RSI cycles. In addition, to allow entanglement between resource states provided by RSI circuits 5310 in neighboring instances of interleaving module 5300, additional "network" fusion circuits 5312d, 5312e can be provided. Network fusion circuits 5312d and 5312e can be additional instances of reconfigurable fusion circuit 5000 of FIG. 50D that selectably perform fusion operations or single-qubit measurement operations on a qubit of a locally generated resource state and a "networked" qubit received from a neighboring instance of interleaving module 5300. Routing switches 5316a-5316d can be switching circuits (e.g., as described above) that are configured to selectably route the N, S, W, and E qubits of a particular resource state to one of local fusion circuits 5312a, 5312b (which receives qubits of different resource states provided by the same RSI circuit 5310 in different RSI cycles) or to one of network fusion circuits 5312d, 5312e (which receives qubits of different resource states provided by different RSI circuits 5310 in neighboring instances of interleaving module 5300).

In this example, each interleaving module 5300 constructs a patch in a rasterized fashion. More specifically, each interleaving module 5300 constructs a "row" of a patch by proceeding from W to E during L successive RSI cycles, then constructs the next row in the S direction (again proceeding from W to E) during the next L RSI cycles, and so on. Accordingly, delay line 5314a provides one RSI cycle of delay for the E qubit. If switch 5316d is set to select the local path (i.e., the path coupled to local fusion circuit 5312b) when the E qubit arrives, the E qubit of a first resource state output by RSI 5310 can arrive at local fusion circuit 5312b synchronously with the W qubit of the next resource state output by RSI 5310. Likewise, delay line 5314b provides L RSI cycles of delay for the S qubit. If switch 5316b is set to select the local path (i.e., the path coupled to local fusion circuit 5312a) when the S qubit arrives, the S qubit of the first resource state output by RSI 5310 can arrive at local fusion circuit 5312a synchronously with the N qubit of another resource state output by RSI 5310 L RSI cycles later, which enables fusion operations between qubits of resource states corresponding to adjacent lattice positions in different rows. As noted above, interleaving module 5300 constructs a patch for a layer in $L^2$ RSI cycles. Accordingly, delay line 5314c provides $L^2$ RSI cycles of delay for the U qubit, so that the U qubit of resource state output by RSI 5310 arrives at fusion circuit 5312c synchronously with the D qubit of a different resource state output by RSI 5310 for the corresponding position in the next layer.

Network fusion circuits 5312d, 5312e can each receive a "local" qubit output by the local RSI 5310 (i.e., the RSI 5310 in the same interleaving module with network fusion circuits 5312d, 5312e) and a "networked" qubit from a neighboring interleaving module 5300, enabling patches generated by different interleaving modules 5300 to be "stitched" together via fusion operations. The networked qubits can pass through delay lines 5330, 5340. Thus, for instance, a networked qubit from a neighboring interleaving module 5300 in the E direction can arrive at network fusion circuit 5312d synchronously with the "local" E qubit of the resource state that is adjacent in the fusion graph.

Figure 54:
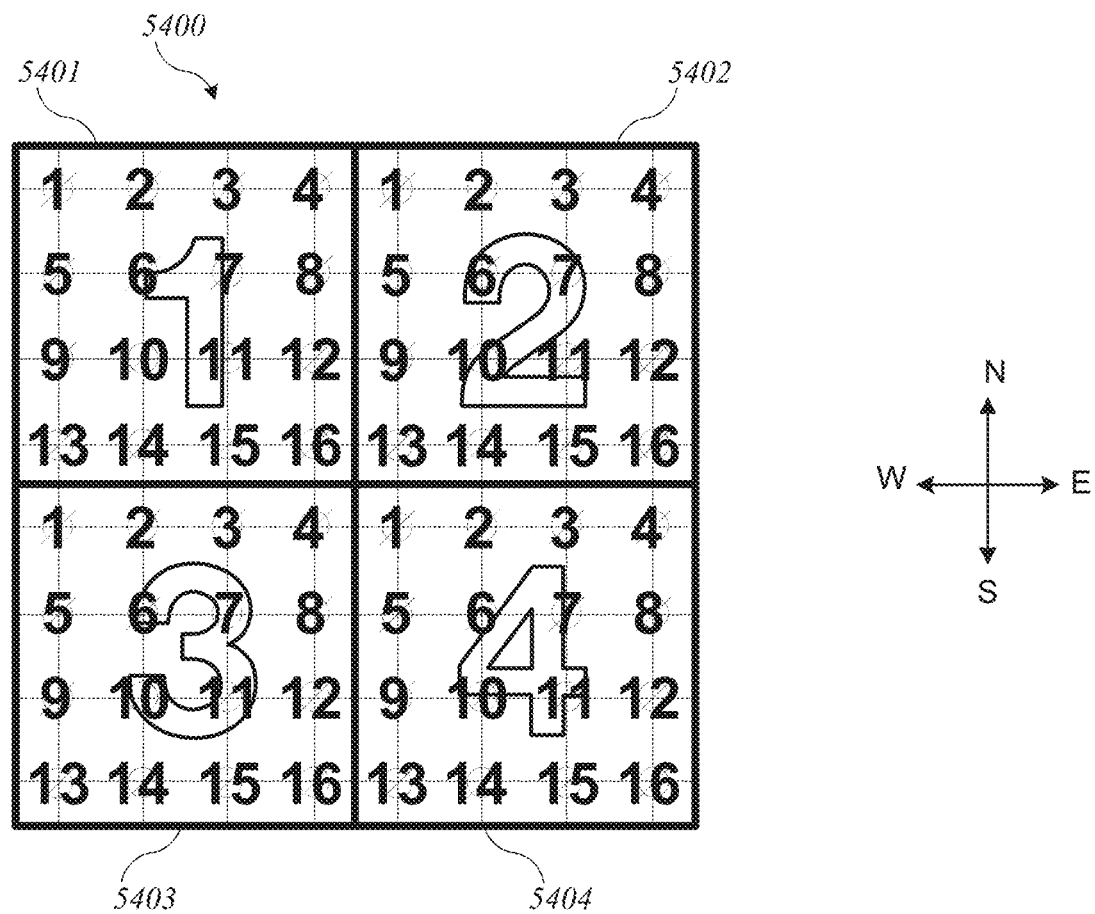
FIG. 54 shows a raster diagram of assignments of interleaving coordinates to vertices within a single layer of a fusion graph according to some embodiments.

In this manner, each interleaving module 5300 can execute a contiguous patch within each layer of a fusion graph, and patches executed by different interleaving modules 5300 can be stitched together at the boundaries. In some embodiments, the order of operations for each interleaving module 5300 can be specified using "interleaving coordinates" assigned to vertices in a fusion graph. An interleaving coordinate can specify a layer number, a patch number within a layer (which identifies which interleaving module executes the patch), and a cycle number within the patch (which identifies the order of processing vertices, or resource states, within the patch). FIG. 54 shows a raster diagram of assignments of interleaving coordinates to vertices within a single layer 5400 of a fusion graph according to some embodiments. In this example, the interleaving length L is 4, and there are assumed to be four interleaving modules 5300 connected in a 2×2 network array; the layer dimensions are thus 8×8. As indicated by the large number in each patch, NW patch 5401 is assigned to a first interleaving module 5300, NE patch 5402 to a second interleaving module 5300, SW patch 5403 to a third interleaving module 5300, and SE patch 5404 to a fourth interleaving module 5300. Within each patch 5401-5404, vertices are numbered 1-16 to identify the RSI cycle during which the resource state corresponding to that vertex is provided, or output, by the RSI circuit. Thus, during RSI cycle 1, the NW-most vertex in each patch 5401-5404 is provided; during RSI cycle 2, the adjacent vertex in the E direction is provided, and so on through RSI cycle 4. During RSI cycle 5, the vertex adjacent in the S direction to the NW-most vertex in each patch is provided, and so on. For convenience, the W-E direction is sometimes referred to as a "row," while the N-S direction is sometimes referred to as a "column."

Delay lines 5330, 5340 connected between instances of interleaving module 5300 can provide appropriate delays so that qubits of resource states provided to neighboring instances of interleaving module 5300 arrive synchronously at network fusion circuits 5312d, 5312e. For example, during RSI cycle 1, the RSI circuit 5310 in the second interleaving module 5300 (assigned to NE patch 5402) outputs a resource state having a W qubit that is routed by switch 5316c onto the network path and into delay line 5330. In this example, delay line 5330 adds L=4 RSI cycles of delay, so that the W qubit arrives at network fusion circuit 5312e of the first interleaving module 5300 (assigned to NW patch 5401) during RSI cycle 5. In the meantime, during RSI cycle 4, the RSI circuit 5310 in the first interleaving module 5300 outputs a resource state having an E qubit that is delayed for one RSI cycle by delay line 5314a. During the next RSI cycle (cycle 5), the delayed E qubit is routed by switch 5316d to network fusion circuit 5312e. Thus, qubits from resource states output by RSI circuits 5310 in different interleaving modules can be correctly synchronized across patch boundaries. Similar considerations apply for patch boundaries in the N-S direction.

In some embodiments, a network array 5302 of interleaving modules 5300 can be used to implement FBQC. For example, a network array of interleaving modules can be used to implement the computation represented by a fusion graph.

By way of example, FIG. 55A shows a view of a representative layer 5504 of a fusion graph, with interleaving coordinates overlaid thereon, according to some embodiments. In this example, network array 5300 is assumed to have dimensions 6×3 and an interleaving length L=6. Interleaving coordinates are assigned similarly to FIG. 54, proceeding within each patch from W to E, and from N to S.

Figure 55B:
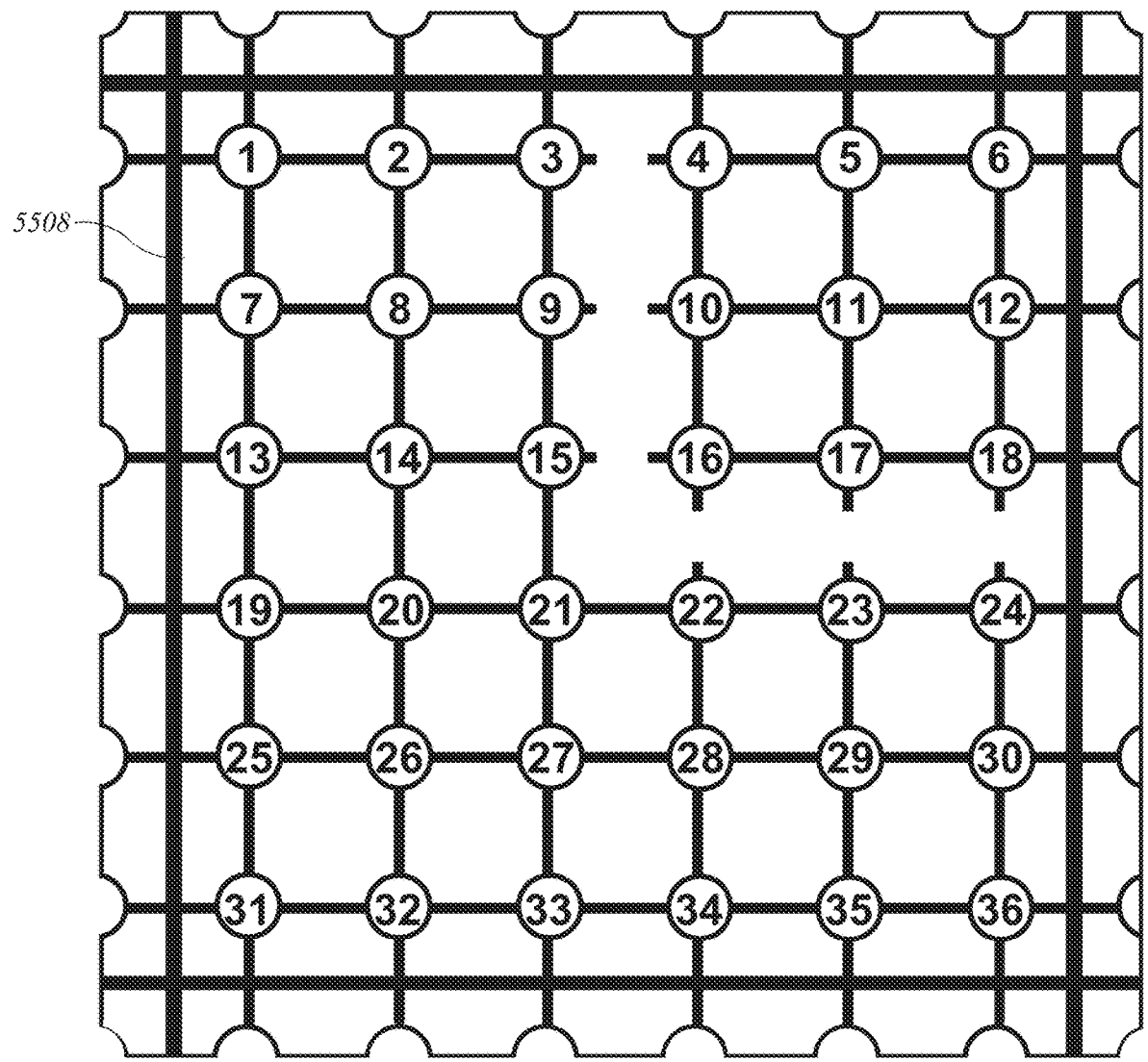
FIG. 55B shows a detailed view of patch of FIG. 55A according to some embodiments.

FIG. 55B shows a detailed view of patch 5508 of FIG. 55A. As can be seen, the patch boundaries need not align with logical qubits or any other boundary in the fusion graph. (Stated differently, code distance and interleaving length need not have any particular relationship.) In some embodiments, patch 5508 can be interpreted as a sequence of instructions for setting the states of switches 5316a-5316d and reconfigurable fusion circuits 5312a-5312e of interleaving module 5300 during each RSI cycle. For instance, in each RSI cycle, the state of switches 5316a-5316d, which control whether qubits are routed to local fusion circuits 5312a-5312b, to network fusion circuits 5312d-5312e, or to network delay lines 5330, 5340, can be determined from the interleaving coordinate associated with the current RSI cycle. The state of each reconfigurable fusion circuit 5312a-5312e (each of which can be an instance of reconfigurable fusion circuit 5000 of FIG. 50) can be determined based on the connectivity between vertices for the resource state at that interleaving coordinate.

FIG. 56 shows a table 5600 illustrating settings of switches 5316a-5316d and reconfigurable fusion circuits 5312a, 5312b, 5312d, 5312e of interleaving module 5300 that can be determined from patch 5508 according to some embodiments. Qubits propagating through switches 5316a-5316d and reconfigurable fusion circuits 5312a, 5312b, 5312d, 5312e during a given RSI cycle are identified by an alphanumeric code such as N1 or W34; the letter is a directional label for the qubit (as used throughout this description), and the number indicates the RSI cycle during which the resource state including that qubit was output by RSI 5310. Qubits marked with prime (e.g., W' or N") are networked qubits received via network paths from neighboring interleaving modules 5300. Table cells shaded in gray indicate operations associated with resource states provided during processing of a previous layer. It should be noted that there does not need to be any "dead" time between layers; after providing all 36 (or, more generally, all $L^2$) resource states associated with one layer of a fusion graph, RSI 5310 in interleaving module 5300 can immediately begin providing resource states associated with the next layer of the fusion graph.

For each RSI cycle, the state of each switch is indicated by a qubit identifier of the qubit propagating through the switch and either "net" or "local" to indicate whether the switch is set to select the "network" or "local" output path (as labeled in FIG. 53) for that qubit. The state of each reconfigurable fusion circuit is indicated by an operation—either "F( )" for fusion or "m( )" for single-qubit measurement; the operands are qubit identifiers. In this example, the type of single-qubit measurement (Pauli X, Y, or Z) is not specified. In some embodiments, the type of single-qubit measurement can be specified or inferred from the fusion graph. As shown in FIG. 50D, the selection of operations for a reconfigurable fusion circuit can be controlled by selecting the corresponding state for switches 5012, 5014.

As shown, for resource states output by RSI circuit 5310 during cycles 1 and 2, all qubits are routed to fusion operations with appropriate qubits of other resource states. (In the case of qubit Wi, a network fusion operation is selected.) For the resource states generated during cycles 3 and 4, qubit E3 and qubit W4 are routed to single-qubit measurements, in accordance with the half-lines in patch 5508. Switch settings for other RSI cycles can likewise be determined based on the fusion graph.

The state of U/D reconfigurable fusion circuit 5312c is not shown in FIG. 56. In this example, U/D fusion circuit 5312c can perform fusion operations for each layer except for D qubits in the first layer and U qubits in the last layer, for which single-qubit measurements can be selected. Delay line 5314c provides an $L^2$ delay (in this case, 36 RSI cycles), so that U/D fusion circuit 5312 fuses the U1 qubit of one layer with the D1 qubit of the next layer. In some embodiments, other behaviors can be implemented, and operations for each U qubit and D qubit can be determined from the fusion graph.

As this example shows, switch settings for an interleaving module with reconfigurable fusion circuits can be determined based on a fusion graph. Accordingly, a data structure representing a fusion graph can be provided as input to classical control logic, and the classical control logic can determine a corresponding sequence of switch settings and control operation of a networked array of interleaving modules to execute the computation specified by the fusion graph. Other inputs can also be provided, including a set of instructions that lists the settings for each RSI cycle.

It should be appreciated that a network of interleaving modules as shown in FIG. 53 can be used to generate layers of any size. (In some embodiments, the size may be fixed in the hardware design.) The number of interleaving modules (N) and the interleaving length L can be varied as desired; in an extreme case, N can be reduced to 1. For a given layer size, different choices of N and L will result in different computation times, and choices can be made to achieve a desired balance between hardware size and computational speed.

3.1.3. Interleaving Modules with Twists and Dislocations

In examples described above, it is assumed that a fusion graph can be based on a regular bulk lattice in entanglement space. For instance, fusion graphs shown above have a structure that can be represented as layers, with each layer having an associated regular array (or 2D lattice) of resource states. For some logical operations, it may be desirable to introduce irregularities at selected locations in the lattice. ("Irregularity," or "defect," is used in this context to refer to a variation from the bulk lattice that changes the number of resource states (or vertices) in a layer.) By way of example, FIGS. 57A and 57B show examples of fusion graphs for operations that change the lattice structure. In these examples, only the portion of the fusion graph corresponding to a particular operation is shown. It should be understood that these operations can be incorporated into a larger fusion graph in which the operations shown create irregularities in a bulk lattice, e.g., twist and dislocation operations as described above.

FIG. 57A shows a fusion graph 5700 for a "twist" operation. Ten resource states (vertices 5702, shown as circles) are involved in the twist operation, with five vertices 5702 in each of two different layers along the U-D axis. As in previous fusion graphs, lines 5704 connecting two vertices indicate type II fusion operations; half-lines 5706 connected to a single vertex indicate single qubit Pauli measurement. (The shading pattern is the same as used in fusion graphs above.) In this case, the single qubit measurements (half-lines 5706) are Pauli Y measurements. The two "X" marks 5710 correspond to lattice locations that are "skipped" by the twist operation. That is, qubits from any resource state that may be associated with the skipped location 5710 are not subject to any fusion or other measurement operations.

FIG. 57B shows a fusion graph 5750 for a "dislocation" operation, using the same notation as FIG. 57A. Eight resource states (vertices 5752) are involved in E-W fusion operations associated with the dislocation operation. However, the dislocation operation couples resource states that are not at adjacent lattice locations in the E-W direction. As indicated by "X" marks 5760, four lattice locations are skipped by the dislocation operation.

Whether a resource state is generated for a skipped lattice location 5710 or 5760 is a matter of design choice, as long as any qubits associated with the skipped lattice location do not interact with other qubits. In some embodiments, generation of a resource state for a skipped location 5710 can be prevented or avoided (e.g., by not providing a resource state to the RSI circuit during the corresponding RSI cycle or by not triggering the RSI circuit to generate a resource state during the corresponding RSI cycle). In other embodiments a resource state for a skipped location 5710 may be generated and its qubits thereafter absorbed. For example, an RSI circuit can include "terminal" routing paths that terminate in an opaque material and routing switches to selectably route qubits into either the terminal routing paths or the appropriate output paths.

Figure 58:
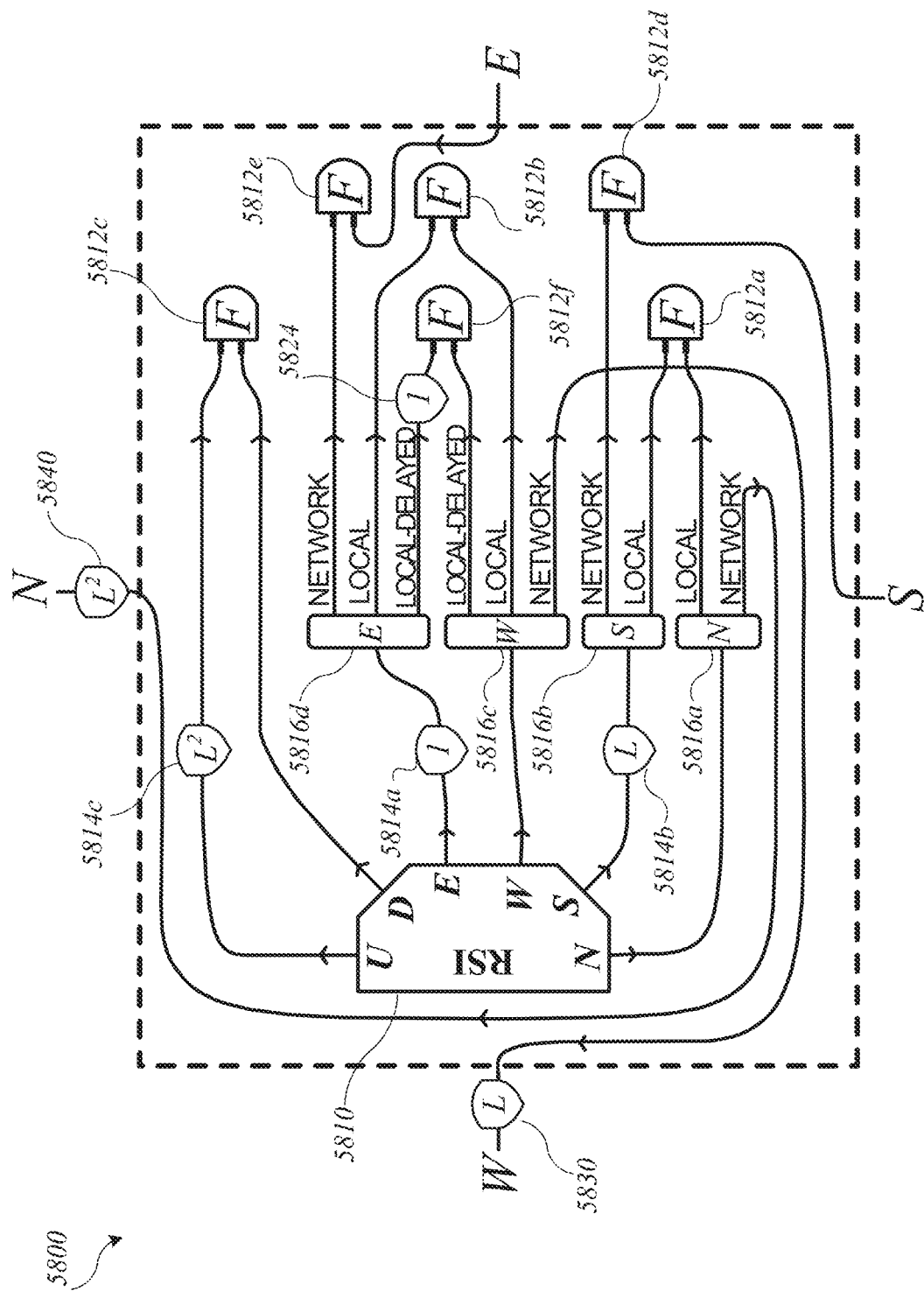
FIG. 58 shows a simplified schematic diagram of an interleaving module that can be used as a qubit module according to some embodiments.

According to some embodiments, an interleaving module can include additional circuitry to support operations such as twists and dislocations. FIG. 58 shows a simplified schematic diagram of an interleaving module 5800 according to some embodiments. Interleaving module 5800 can be similar in structure and operation to interleaving module 5300, with an additional routing option for the E and W qubits. Reconfigurable fusion circuits 5812a, 5812b, 5812c, also referred to as "local" fusion circuits, can be instances of reconfigurable fusion circuit 5000 of FIG. 50D and can be used to selectably perform fusion measurements or single-qubit measurements on qubits of resource states output by RSI circuit 5810 within interleaving module 5800 in different RSI cycles. In addition, to allow entanglement between resource states provided by RSI circuits in neighboring instances of interleaving module 5800, additional "network" fusion circuits 5812*d*, 5812*e* can be provided. Network fusion circuits 5812*d* and 5812*e* can be additional instances of reconfigurable fusion circuit 5000 of FIG. 50D that selectably perform fusion operations or single-qubit measurements on a qubit of a locally generated resource state and a networked qubit received from a different instance of interleaving module 5800. Reconfigurable fusion circuit 5812*f*, also referred to as a "local-delayed" fusion circuit, can be another instance of reconfigurable fusion circuit 5000 of FIG. 50D and can be used to create lattice dislocations and twist defects of the kind shown in FIGS. 57A and 57B. Routing switches 5816*a* and 5816*b* can be reconfigurable optical switching circuits that are operated to selectably route the N and S qubits of a particular resource state to one of local fusion circuit 5812*a* or network fusion circuit 5812*d*, similarly to routing switches 5316*a* and 5316*b* of interleaving module 5300 of FIG. 53. Routing switches 5816*c* and 5816*d* can be reconfigurable optical switching circuits that are operated to select one of three output paths for the W and E qubits. Where a regular lattice is being processed, routing switches 5816*c* and 5816*d* can route the W and E qubits to one of local fusion circuits 5812*b* or network fusion circuit 5812*e*, similarly to routing switches 5316*a* and 5316*b* of interleaving module 5300 of FIG. 53. When a lattice defect (e.g., dislocation or twist) is to be processed, routing switches 5816*c* and 5816*d* can instead select the "local-delayed" paths. On the local-delayed paths, the E qubit (which was already delayed for one RSI cycle by delay line 5814*a*) can be delayed for an extra RSI cycle by delay line 5824, then delivered to reconfigurable fusion circuit 5812*f*. The W qubit is delivered to reconfigurable fusion circuit 5812*f* without additional delay, so that reconfigurable fusion circuit 5812*f* operates on a W qubit from the current resource state and an E qubit from the resource state output two cycles previously, thereby effecting the "skip" as shown in FIGS. 57A and 57B.

Operation of interleaving module 5800 can be similar or identical to that of interleaving module 5300 described above, except that interleaving module 5800 can support operations that introduce lattice defects.

In the example shown, interleaving module 5800 can introduce irregularities in the E-W direction. If the ability to introduce lattice irregularities in more than one direction is desired, similar routing paths, delay lines, and reconfigurable fusion circuits can be provided for multiple directions, including N-S and/or U-D directions.

3.2. Interleaving Modules for Active-Volume Core

According to some embodiments, interleaving modules can be modified to support active volume architectures. For instance, using interleaving modules 5800, if the interleaving length L is chosen to be equal to the code distance d, then within a period of $d^2$ RSI cycles, a set of N interleaving modules 5800 can generate surface code patches for N different logical qubits. Accordingly, appropriately connected interleaving modules can be used as the qubit modules in an active volume architectures of the kind described in Section 2.

More specifically, according to some embodiments, interleaving modules can be modified by adding additional routing paths and reconfigurable fusion circuits to support a network of port connections and/or quickswap connections suitable for an active volume architecture, such as the connection networks shown in FIGS. 16 and 18.

Figure 59A:
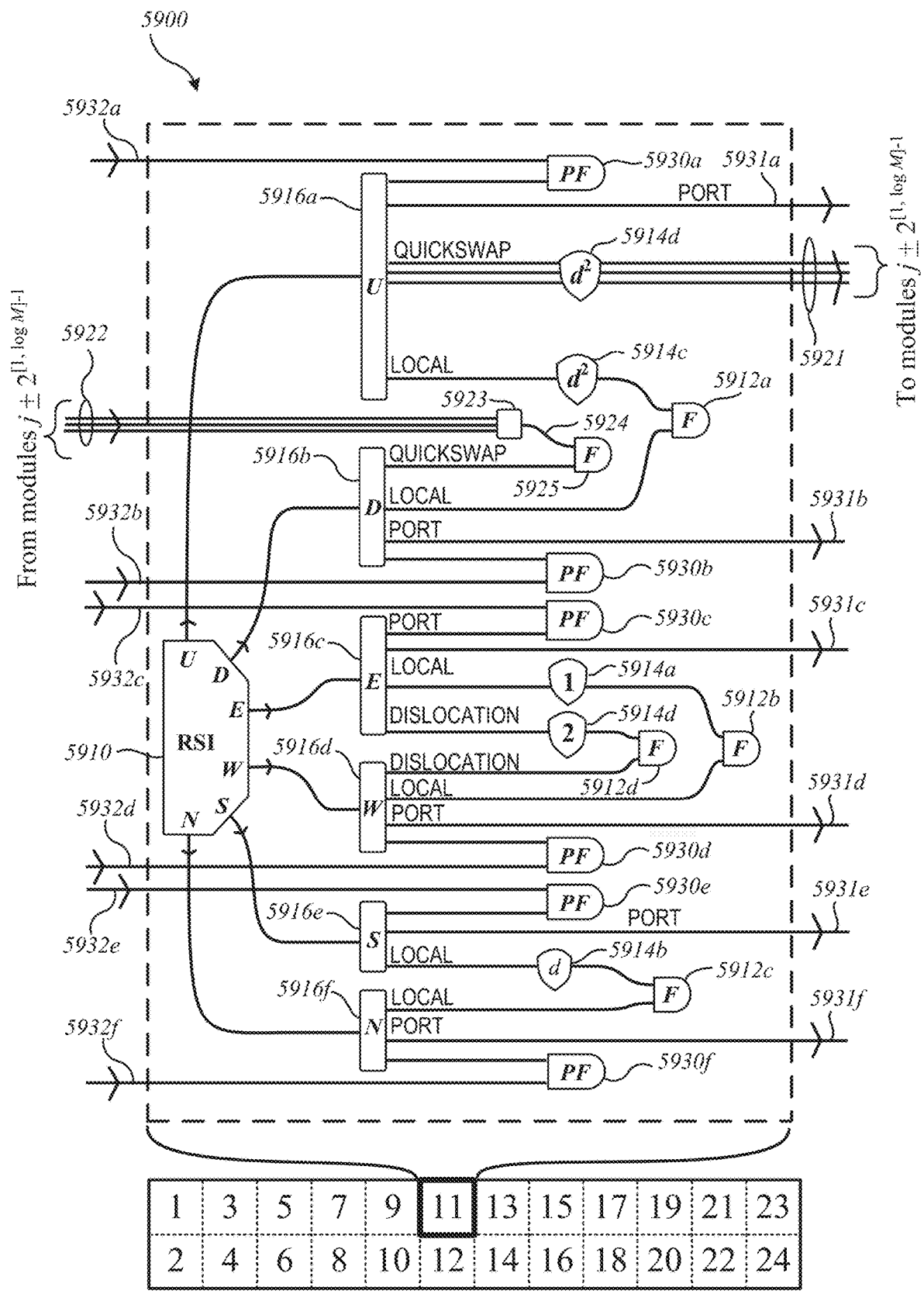
FIG. 59A shows an example of an active volume interleaving module according to some embodiments.

FIG. 59A shows an example of an "active-volume" interleaving module 5900 according to some embodiments. Interleaving module 5900 can be constructed using the same components and techniques described above. For instance, interleaving module 5900 can include an RSI circuit 5910 that receives a resource state having six qubits (labeled N, S, W, E, D, U) during each RSI cycle and routes the six qubits along different output paths. Output paths of RSI circuit 5910 can deliver a U qubit to routing switch 5916*a* (also referred to as a "U switch"), a D qubit to routing switch 5916*b* (also referred to as a "D switch"), an E qubit to routing switch 5916*c* (also referred to as an "E switch"), a W qubit to routing switch 5916*d* (also referred to as a "W switch"), an S qubit to routing switch 5916*e* (also referred to as an "S switch"), and an N qubit to routing switch 5916*f* (also referred to as an "N switch"). Reconfigurable fusion circuits 5912*a*, 5912*b*, 5912*c*, 5912*d*, also referred to as "local" fusion circuits, can be instances of reconfigurable fusion circuit 5000 of FIG. 50 and can be used to selectably perform fusion operations or single-qubit measurement operations on qubits of different resource states provided by the RSI circuit 5910 in the same interleaving module 5900 during different RSI cycles. Operation of local fusion circuits 5912*a*, 5912*b*, 5912*c* can be similar to the local fusion circuits described above for interleaving module 5300. In particular, one-cycle delay line 5914*a* delays the E qubit input to W-E local fusion circuit 5912*b* by one RSI cycle relative to the W qubit; d-cycle delay line 5914*b* delays the S qubit input to S-N local fusion circuit 5912*c* by d RSI cycles relative to the N qubit; and $d^2$-cycle delay line 5914*c* delays the U qubit input to U-D local fusion circuit 5912*a* by $d^2$ RSI cycles. Local fusion circuit 5912*d* can support twist and dislocation operations in the E-W direction, similar to local fusion circuit 5812*f* described above, with two-cycle delay line 5914*d* delaying the E qubit input to W-E delayed local fusion circuit 5912*d* by two RSI cycles relative to the W qubit.

Interleaving module 5900 thus includes the optical circuit elements for a qubit module in an active volume core. In particular, interleaving module 5900 can generate a surface-code patch for one logical qubit with code distance d in a code cycle that is equal to $d^2$ RSI cycles.

Interleaving module 5900 also includes additional routing paths and circuit elements to provide port connections and quickswap connections with other instances of interleaving module 5900.

3.2.1. Quickswap Networks

According to some embodiments, quickswap connections can be implemented by providing a set of quickswap transfer paths 5921 that exit interleaving module 5900 and a set of external quickswap routing paths 5922 that provide paths for physical qubits to enter interleaving module 5900. Each quickswap transfer path 5921 can be a separate optical path that includes a delay line 5914*d* that introduces a delay of $d^2$ RSI cycles. The external quickswap routing paths 5922 that enter interleaving module 5900 can be input to a quickswap selection switch 5923. Quickswap selection switch 5923 can selectably create an optical path between any one of external quickswap routing paths 5922 and a U-quickswap routing path 5924. A reconfigurable fusion circuit 5925 (also referred to as a "quickswap" fusion circuit because it is used for quickswaps) has one input coupled to the U-quickswap routing path 5924 and the other input coupled to a D-quickswap routing path (labeled "QUICKSWAP" in FIG. 59A) from D switch 5916*b*.

To form a quickswap network (such as the quickswap network of FIG. 18) among multiple instances of interleaving module 5900, the output end of each quickswap transfer path 5921 in a first instance of interleaving module 5900 can be coupled to the input end of one of the external quickswap routing paths 5922 in a different instance of interleaving module 5900, and the input end of each external quickswap routing path 5922 in the first instance of interleaving module 5900 can be coupled to the output end of one of the quickswap transfer paths from a different instance of interleaving module 5900. The number of quickswap connections is a matter of design choice, and any desired network of quickswap connections can be implemented by coupling quickswap transfer paths 5921 and external quickswap routing paths 5922 in different instances of interleaving module 5900. For example, as described above, quickswap connections in an active volume architecture can follow a log-tree rule; that is, the quickswap connections couple each pair of qubit modules with index values i and j for which $|i-j|=2^k$, where k is an integer between 0 and $\lfloor \log N \rfloor$. Accordingly, in some embodiments, the set of quickswap transfer paths 5921 exiting an instance of interleaving module 5900 that has index j can include a quickswap transfer path 5921 that couples to the input end of an external quickswap routing path 5922 in each instance of interleaving module 5900 that has index i satisfying $i=j\pm 2^k$ for $0 \le k \le \lfloor \log N \rfloor$. Similarly, the set of external quickswap routing paths 5922 entering an instance of interleaving module 5900 that has index j can include an external quickswap routing path 5922 that couples to the output end of a quickswap transfer path from each instance of interleaving module 5900 that has index i satisfying $i=j\pm 2^k$ for $0 \le k \le \lfloor \log N \rfloor$. The quickswap connections can be implemented as fixed optical paths. For instance, a length of optical fiber can be optically coupled at one end to the output of one of quickswap transfer paths 5921 in a first instance of interleaving module 5900 and at the other end to the input of one of external quickswap routing paths 5922 in a second instance of interleaving module 5900. In some embodiments, the optical fiber can provide the $d^2$ RSI cycles of delay represented by delay line 5914d.

Figure 59B:
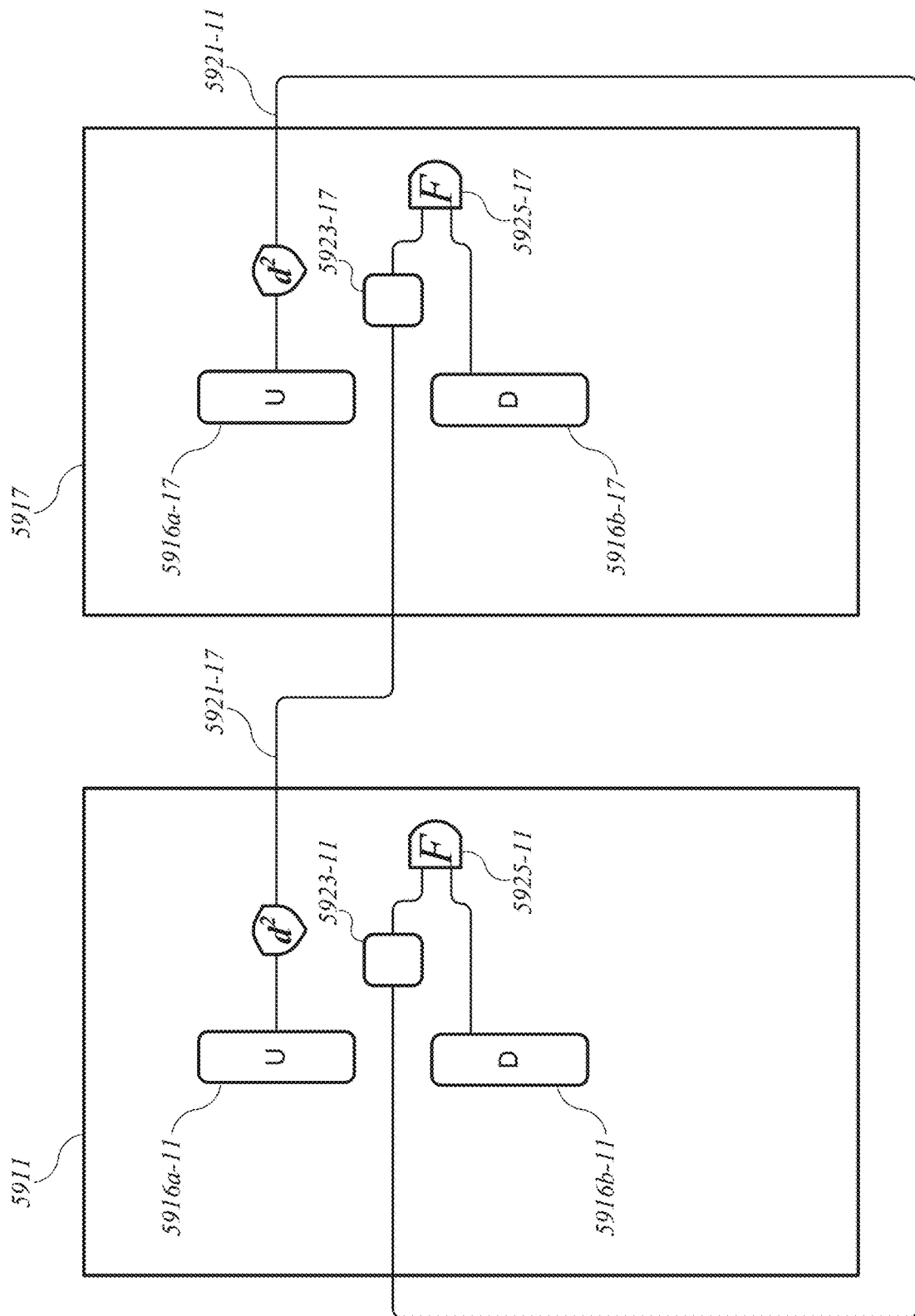
FIG. 59B shows an example of a quickswap network configuration to enable a quickswap operation between interleaving modules according to some embodiments.

FIG. 59B shows an example of a quickswap network configuration to enable a quickswap operation between logical qubits located at the memory modules 11 and 17 shown in FIG. 59A. Interleaving modules 5911 and interleaving module 5917 are two instances of interleaving module 5900 of FIG. 59A interleaving module 5911 is associated with memory module 11, and interleaving module 5917 is associated with memory module 17. For clarity of illustration, only the subcomponents responsible for the quickswap operation are shown in FIG. 59B. A quickswap between interleaving module 5911 and interleaving module 5917 can be performed by operating the U switch 5916a-11 in interleaving module 5911 to select the quickswap transfer path 5921-17 that couples to interleaving module 5917 as the active output routing path during a first RSI cycle and concurrently operating the U switch 5916a-17 in interleaving module 5917 to select the quickswap transfer path 5921-11 that couples to interleaving module 5911 as the active output routing path during the first RSI cycle. The appropriate switch settings can be maintained for the duration of a code cycle consisting of $d^2$ RSI cycles to perform a transversal SWAP operation between interleaving module 5911 and interleaving module 5917. After a delay of $d^2$ RSI cycles, the D switch 5916b-17 and the quickswap selection switch 5923-17 in interleaving module 5917 can be operated to deliver the U qubit received from interleaving module 5911 and a local D qubit received at D switch 5916b-17 to quickswap fusion circuit 5925-17 in interleaving module 5900-17; concurrently, the D switch 5916b-11 and the quickswap selection switch 5923-11 in interleaving module 5911 can be operated to deliver the U qubit received from interleaving module 5917 and a local D qubit received at D switch 5916b-11 to quickswap fusion circuit 5925-11 in interleaving module 5911. Again, the appropriate switch settings can be maintained for the duration of a code cycle consisting of $d^2$ RSI cycles to perform a transversal SWAP operation for a pair of logical qubits between interleaving module 5911 and interleaving module 5917. In some embodiments, an n-way quickswap involving a number n of instances of interleaving module 5900 can be implemented by using appropriate switch settings, provided that each interleaving module i involved has quickswap connections with the interleaving module j that receives qubits from interleaving module i and the interleaving module k to which module i sends qubits.

3.2.2. Port Connection Networks

Figure 60:
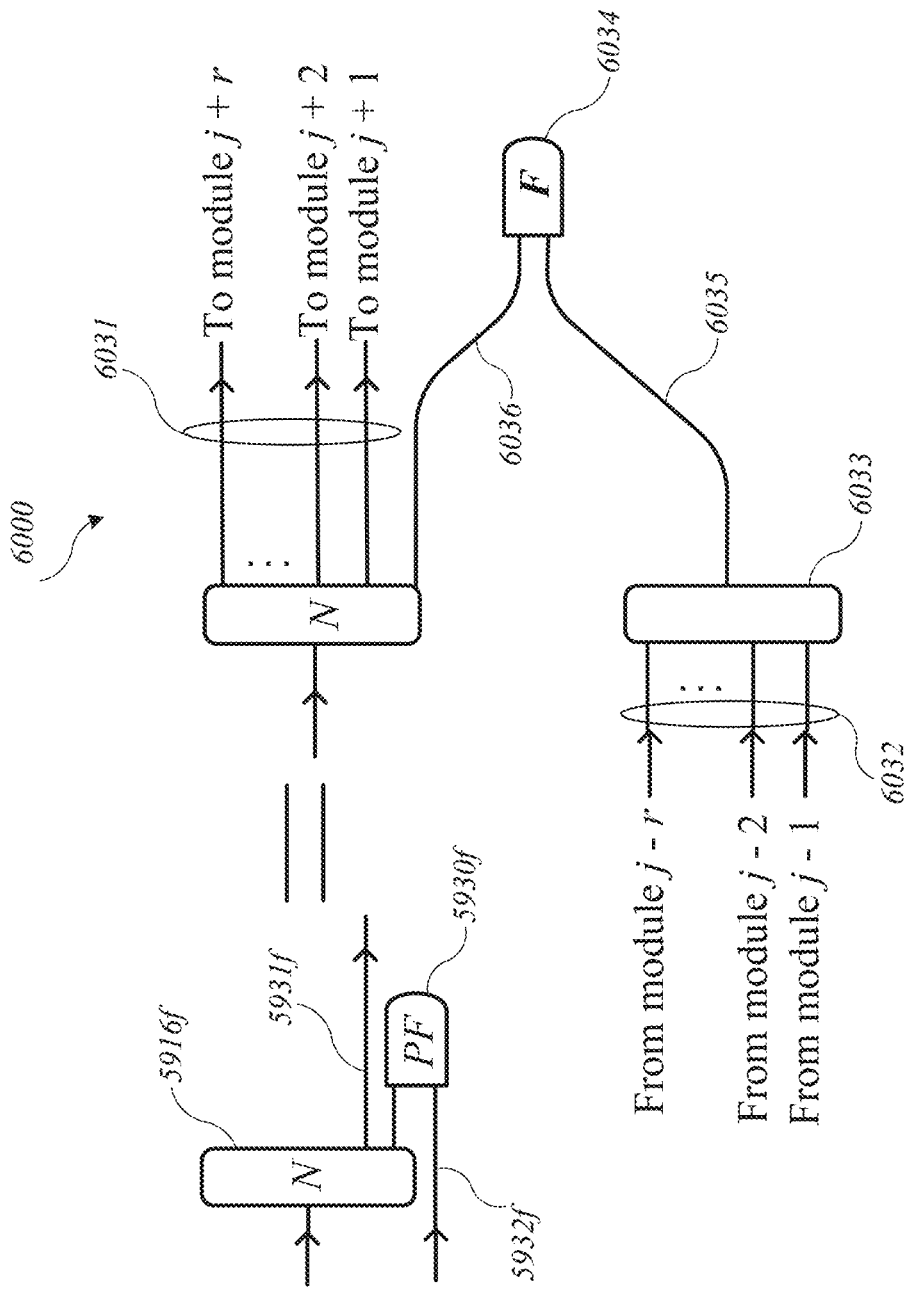
FIG. 60 shows a more detailed schematic of a circuit corresponding to a portion of an interleaving module according to some embodiments.

According to some embodiments, port connections between different instances of interleaving module 5900 can be provided using port transfer paths 5931a-5931f, external port routing paths 5932a-5932f, and port coupler ("PF") circuits 5930a, 5930b, 5930c, 5930d, 5930e, 5930f. These connections are shown in simplified form in FIG. 59A. To further illustrate the nature of the port connections, FIG. 60 shows a more detailed schematic of a circuit 6000 corresponding to a portion of interleaving module 5900 according to some embodiments. Circuit 6000 includes N switch 5916f and port coupler circuit 5930f. While circuit 6000 shows details of port connections for N switch 5916f, the same principles can be applied to port connections for all other switches 5916 in circuit 5900.

As shown in FIG. 60, the output routing paths of N switch 5916f can include a set of r port transfer paths 6031 (represented collectively by port transfer path 5931f in FIG. 59A), where r can be the range parameter for an active volume core as defined above. (Other output routing paths of N switch 5916f are not shown in FIG. 60 but should be understood to be present.) A set of r external port routing paths 6032 (represented collectively by external port routing path 5932f in FIG. 59A) is also provided. The external port routing paths 6032 can be input to a port selection switch 6033. Port selection switch 6033 can selectably create an optical path between any one of external port routing paths 6032 and a port fusion routing path 6035. A reconfigurable fusion circuit 6034 (also referred to as a "port" fusion circuit because it is used for port couplings) has one input coupled to the port fusion routing path 6035 and the other input coupled to a local routing path 6036 from N switch 5916f.

To form a network of instances of interleaving module 5900, the output end of each port transfer path 6031 from a first instance of interleaving module 5900 can be coupled to the input end of one of the external port routing paths 6032 in a different instance of interleaving module 5900, and the input end of each external port routing path 6032 in the first instance of interleaving module 5900 can be coupled the output end of one of the port transfer paths 6031 in a different instance of interleaving module 5900. The number of port connections is a matter of design choice (e.g., based on the range parameter r), and any desired network of port connections can be implemented by coupling port transfer paths 6031 and external port routing paths 6032 in different instances of interleaving module 5900. In some embodiments, the number of connections can be selected to match the range parameter r of an active volume architecture as described above.

In operation, an N-to-N port coupling between a first interleaving module (instance j) and a second interleaving module (instance i, where i>j) that is in range (i.e., |i−j|≤r) can be performed by operating the N switch 5916*f* in instance j of interleaving module 5900 to select the port transfer path 6031 that couples to instance i of interleaving module 5900 as the active output routing path in an appropriate RSI cycle. In the same RSI cycle, the N switch 5916*f* and port selection switch 6033 in instance i of interleaving module 5900 can be operated to deliver the N qubit received from instance j of interleaving module 5900 and a local N qubit received at N switch 5916*f* to port fusion circuit 6012. The appropriate switch settings can be selected at each RSI cycle to complete the coupling for the surface code patches. For instance, in the case of N-to-N coupling, N switch 5916*f* in instance j of interleaving module 5900 can be operated to route N qubits of resource states having interleaving coordinates that correspond to the N boundary of the surface code patch to the port transfer path 6031 that couples to instance i of interleaving module 5900 and to route N qubits of resource states having interleaving coordinates that do not correspond to the N boundary to local fusion circuit 5912*c* (shown in FIG. 59A). In instance i of interleaving module 5900, N switch 5916*f* can be operated to route qubits having interleaving coordinates that correspond to the N boundary of the surface code patch to port fusion circuit 6034, and port selection switch 6033 can be operated to deliver qubits from the instance of external port routing path 6032 that receives qubits from instance j of interleaving module 5900 to port fusion circuit 6034 and to route N qubits of resource states having interleaving coordinates that do not correspond to the N boundary to local fusion circuit 5912*c*. It should be noted that for FBQC, providing port transfer paths from module j to each module i such that 1≤i−j≤r is sufficient to implement a range of r; additional port transfer paths from module j to any module i having i<j are not needed.

While FIG. 60 shows details for port transfer paths 5931*f*, external port routing paths 5932*f*, and port coupler circuit 5930*f*, it should be understood that port transfer paths 5931*a*-5931*e*, external port routing paths 5932*a*-5932*e*, and port coupler circuits 5930*a*-F130*e* can be implemented in the same manner. The timing of the switch operations can be selected to provide coupling at the appropriate boundary (e.g., the port connection can be opened for any RSI cycle in which resource states for the relevant boundary are provided and closed for other RSI cycles). For instance, in the case of U-to-U (or D-to-D) port couplings, all U (or D) qubits of resource states generated during the first (or the dth) code cycle of a logical cycle can be routed to the appropriate U (or D) port fusion circuit. Accordingly, where instances of interleaving module 5900 are used to implement qubit modules in an active volume architecture, for any pair of modules having indexes i and j that are in range, port connections are provided for each pair of corresponding resource-state qubits (U to U, N to N, etc.).

Figure 61:
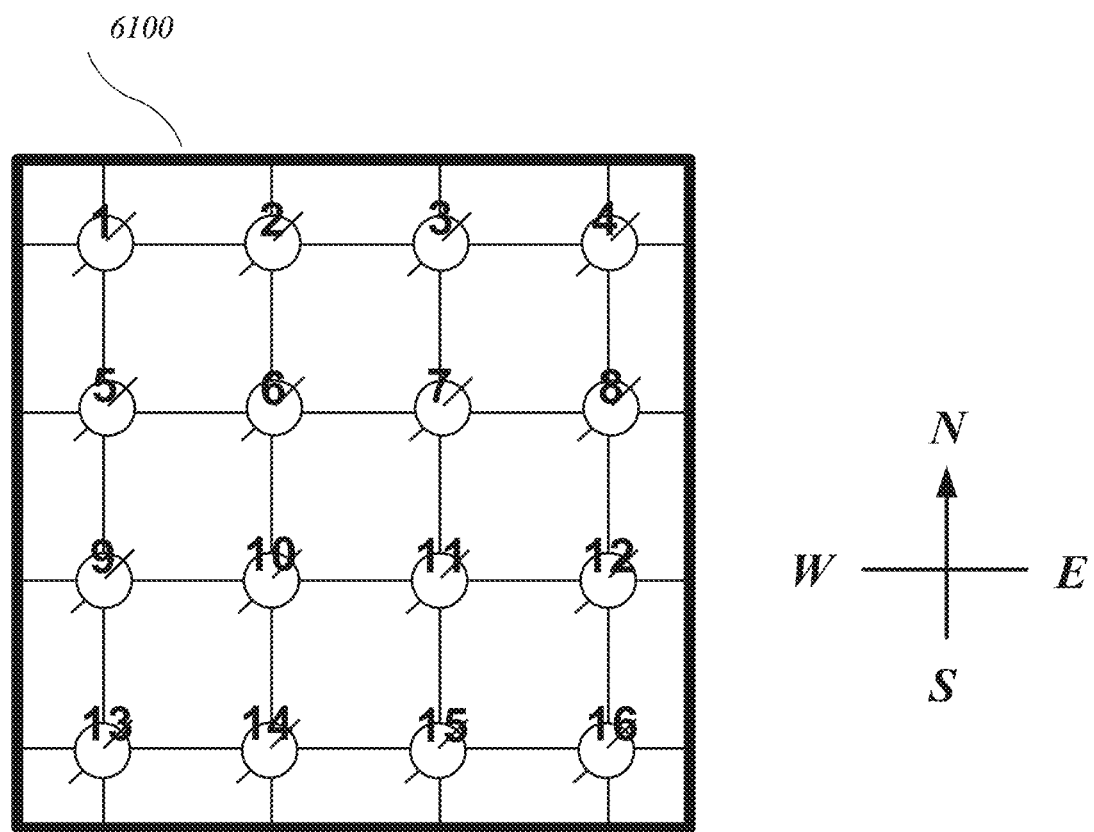
FIG. 61 shows a raster diagram of the rastering order for an interleaving module according to some embodiments.

In some embodiments, none of the port connections between instances of interleaving module 5900 require additional RSI cycles of delay. Instead, as a consequence of the rastering order implied by the lengths and positions in the schematic of delay lines 5914*a* and 5914*b*, physical qubits at corresponding positions in different surface code patches (and therefore eligible to participate in a port coupling) can be produced in the same RSI cycle. FIG. 61 shows a raster diagram of the rastering order for interleaving module 5900 according to some embodiments. FIG. 61 is similar to FIG. 54 described above. In this example, the interleaving length is d=4, and interleaving module 5900 generates a 4×4 patch 6100 in 16 RSI cycles. Vertices within a representative patch 6100 are numbered 1-16 to identify the RSI cycle during which the resource state corresponding to that vertex is generated. Thus, during RSI cycle 1, the NW-most vertex in patch 6100 is generated; during RSI cycle 2, the adjacent vertex in the E direction is generated, and so on through RSI cycle 4. During RSI cycle 5, the vertex adjacent in the S direction to the NW-most vertex is generated, and so on.

In embodiments where all instances of interleaving module 5900 implement the same rastering order and where port connections couple corresponding boundaries of surface code patches (E to E, N to N, and so on), then the resource states having qubits (e.g., N qubits) that are to be coupled by a port connection are generated (in two different instances of interleaving module 5900) in the same RSI cycle, and both can arrive at the same port fusion circuit (e.g., port fusion circuit 6012 of FIG. 60) in the same RSI cycle without introducing additional cycles of delay. As can be seen from FIG. 61, this rule holds regardless of which boundary is being coupled and regardless of which connected pair of interleaving modules provides the resource states. Thus, defining port connections as coupling corresponding boundaries of surface code patches can therefore have advantages in terms of simplifying the construction of interleaving modules. However, if desired, other port connections can be implemented (e.g., coupling complementary boundaries such as E-to-W and N-to-S as an alternative to coupling corresponding boundaries) if appropriate delays are added to the port transfer paths. Those skilled in the art with access to this disclosure will be able to determine appropriate delays.

3.2.3. Interleaving Module with Uniform Switching

Referring again to FIGS. 59 and 60, using circuit 6000 to implement port connections can result in qubits subject to port couplings encountering an extra optical switch (switch 6033) as compared to locally-routed qubits. For various reasons, this might not be desirable. As an alternative to extra switches, some embodiments provide additional copies of port fusion circuits and/or quickswap fusion circuits.

Figure 62:
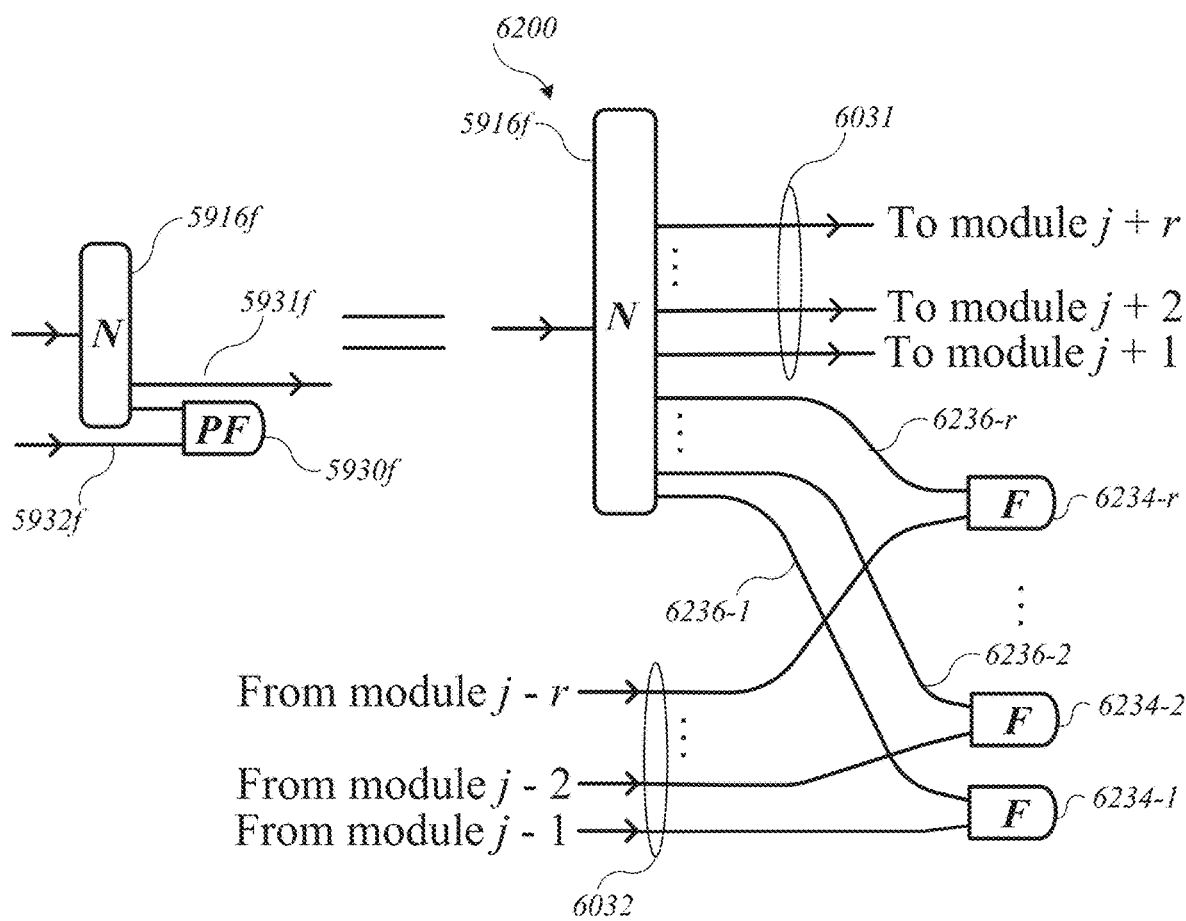
FIG. 62 shows a schematic diagram of a circuit corresponding to a portion of an interleaving module according to some embodiments.

By way of example, FIG. 62 shows a schematic diagram of a circuit 6200 corresponding to a portion of interleaving module 5900 according to some embodiments. Circuit 6200 is an alternative implementation of circuit 6000 with reduced switching. Like circuit 6000, circuit 6200 is shown for a portion of interleaving module 5900, including N switch 5916*f* and port coupler circuit 5930*f* according to some embodiments. While circuit 6200 shows details of port connections for N switch 5916*f*, the same principles can be applied to port connections for all other switches 5916 in circuit 5900.

As in circuit 6000, the output routing paths of N switch 5916*f* in circuit 6200 can include a set of r port transfer paths 6031 (represented collectively by port transfer path 5931*f* in FIG. 59A), where r can be the range parameter for an active volume core as defined above. (Other output routing paths of N switch 5916*f* are not shown in FIG. 62 but should be understood to be present.) A set of r external port routing paths 6032 (represented collectively by external port routing path 5932*f* in FIG. 59A) is also provided, again as in circuit 6000. The differences between circuits 6000 and 6200 are: (1) instead of port selection switch 6033, a set of r instances of a reconfigurable fusion circuit 6234-1 through 6234-*r* are provided; and (2) the single internal port routing path 6036 from N switch 5916f is replaced by a set of r internal port routing paths 6236-1 through 6236-r. Each reconfigurable fusion circuit 6234-1 through 6234-r has one input coupled to one of internal port routing paths 6236 and the other input coupled to one of the external port routing paths 6032. Networks can be formed by connecting port transfer paths 6031 and external port routing paths 6032 between different instances of interleaving module 5900 in the manner described above.

Operation of circuit 6200 is generally similar to operation of circuit 6000, except that instead of selecting a setting for port selection switch 6033, the appropriate one of port fusion circuits 6234-1 through 6234-r is activated to perform the Bell measurement that achieves the port coupling. Depending on implementation, port fusion circuits 6234 other than the selected instance can be disabled, or any output signals (e.g., photon counts) from non-selected instances of port fusion circuit 6234 can be ignored. The appropriate switch settings can be selected for each RSI cycle to complete the coupling for the surface code patches.

Circuit 6200 provides that a qubit propagating through interleaving module 5900 encounters the same number of switches between RSI circuit 5910 and the reconfigurable fusion circuit that consumes the qubit, regardless of whether the consuming circuit is a local fusion circuit (e.g., local fusion circuit 5912c) or a port fusion circuit (e.g., any one of port fusion circuits 6234). Since optical switches are generally not lossless, reducing the number of switches and/or providing that photons on different paths encounter the same number of switches can have advantages that offset the additional cost of providing multiple copies of downstream circuits (in this case, the port fusion circuits 6234).

In some embodiments, the same design principle can be applied to the quickswap connections. For instance, quickswap selector switch 5923 in FIG. 59A can be omitted and multiple instances of quickswap fusion circuit 5925 can be provided instead, with one instance coupled to each external quickswap routing path 5922. D switch 5916b can provide multiple internal quickswap routing paths, one coupled to each instance of quickswap fusion circuit 5925.

Figure 63:
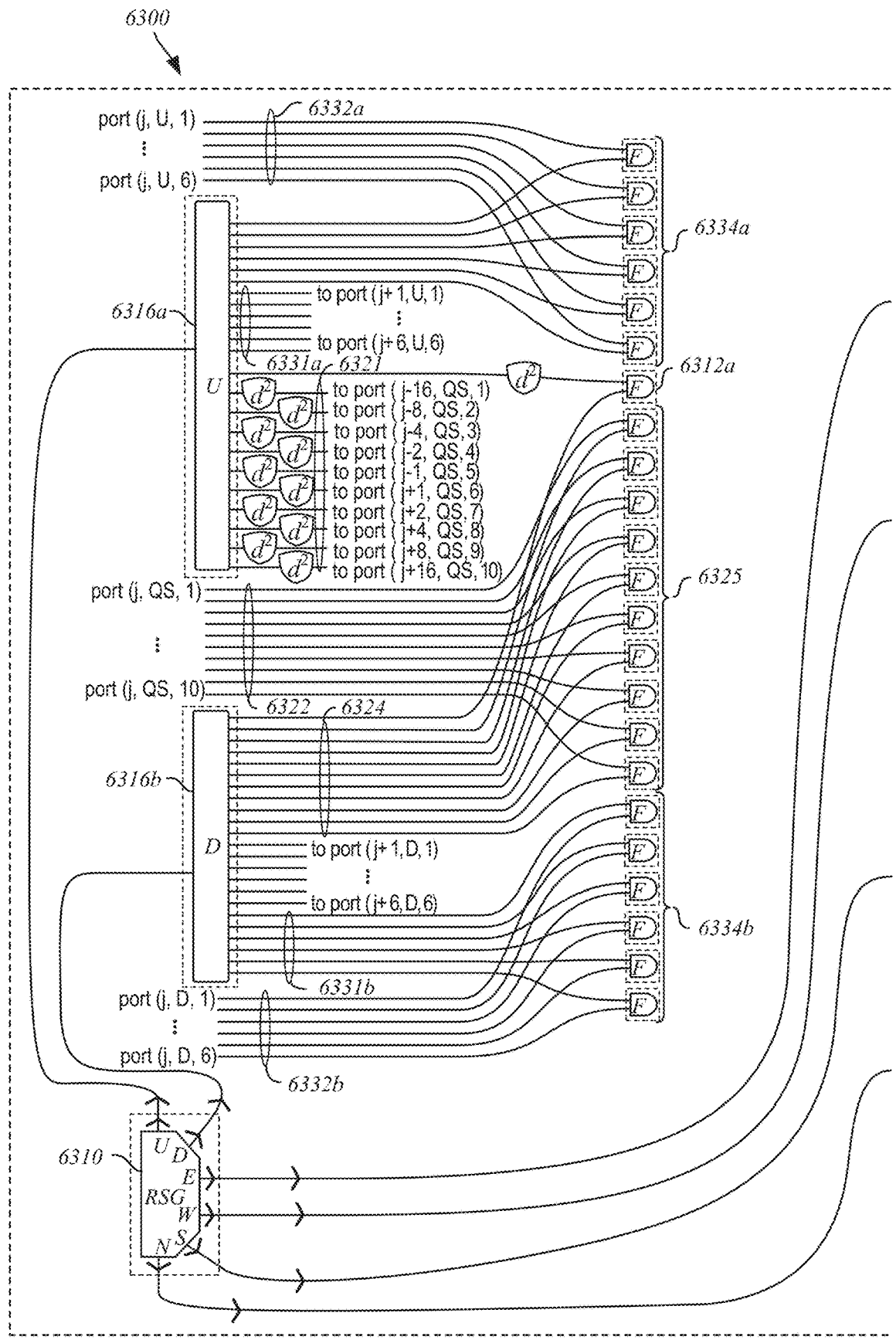
FIG. 63 shows a schematic diagram of an active volume interleaving module according to some embodiments.
Figure 63:
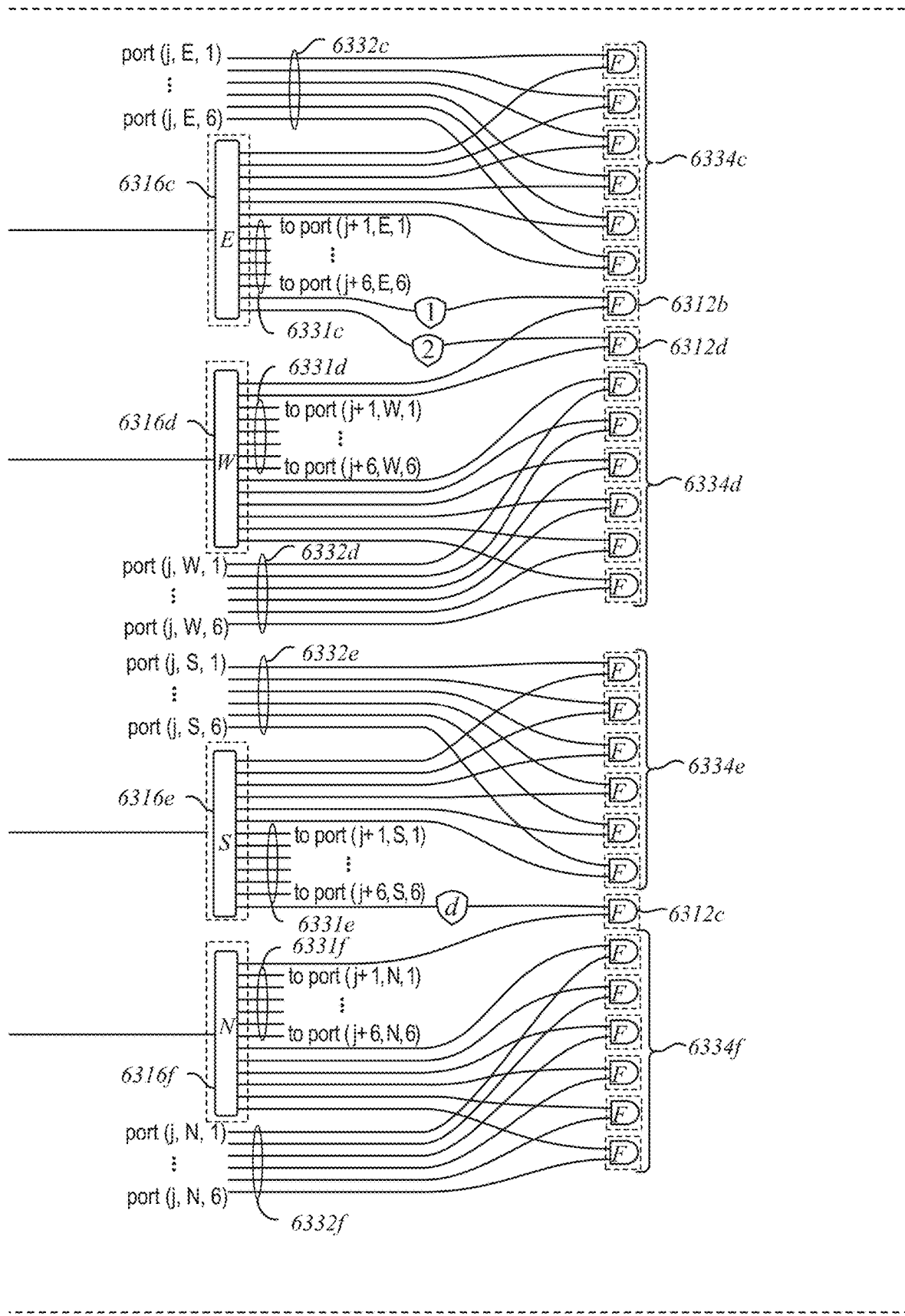

FIG. 63 shows a schematic diagram of an interleaving module 6300 according to some embodiments. Interleaving module 6300 is similar to interleaving module 5900 with reduced switching; the tradeoff is more instances of a reconfigurable fusion circuit. Interleaving module 6300 can include an RSI circuit 6310 that outputs, or provides, a resource state having six qubits (labeled N, S, W, E, D, U) during each RSI cycle. Output paths of RSI circuit 6310 can deliver a U qubit to routing switch 6316a (also referred to as a "U switch"), a D qubit to routing switch 6316b (also referred to as a "D switch"), an E qubit to routing switch 6316c (also referred to as an "E switch"), a W qubit to routing switch 6316d (also referred to as a "W switch"), an S qubit to routing switch 6316e (also referred to as an "S switch"), and an N qubit to routing switch 6316f (also referred to as an "N switch"). Reconfigurable fusion circuits 6312a, 6312b, 6312c, 6312d, also referred to as "local" fusion circuits, can be instances of reconfigurable fusion circuit 5000 of FIG. 50 and can be used to selectably perform fusion operations or single-qubit measurement operations on qubits of different resource states provided by the RSI circuit 6310 in the same interleaving module 6300 during different RSI cycles. Delay lines and operation of local fusion circuits 6312 can be the same as in interleaving module 5900.

Quickswap connections between instances of interleaving module 6300 can be implemented using a set of quickswap transfer paths 6321 that exit interleaving module 6300 and a set of external quickswap routing paths 6322 that provide paths for physical qubits to enter interleaving module 6300. Each quickswap transfer path 5921 can be a separate optical path that introduces a delay of $d^2$ RSI cycles. A set of quickswap fusion circuits 6325 is provided, where (as in examples above) each quickswap fusion circuit can be a reconfigurable fusion circuit having one input coupled to one of external quickswap routing paths 6322 and the other input coupled to one of a set of internal quickswap routing paths 6324 from D switch 6316b. As described above, quickswap transfer paths 6321 and external quickswap routing paths 6322 can be interconnected between different instances of interleaving module 6300 to form a quickswap network of the kind shown in FIG. 18.

Port connections between different instances of interleaving module 6300 can be implemented using six sets of port transfer paths (the sets are labeled as 6331a-6331f) that exit interleaving module 6300 and six sets of external port routing paths (the sets are labeled as 6332a-6332f) that provide paths for physical qubits to enter interleaving module 6300. Six sets of port fusion circuits (the sets are labeled as 6334a-6334f) are also provided. As in examples above, each port fusion circuit in set 6334a can be a reconfigurable fusion circuit having one input coupled to one of external port routing paths 6332a and the other input coupled to one of a set of internal port routing paths 6336a from N switch 6316a. (Similar couplings obtain for the other entanglement directions.) The number of paths in each set of port transfer paths, each set of external port routing paths, each set of internal port routing paths, and each set of port fusion circuits corresponds to the range parameter r. In the example shown, r=6, but other values can be used.

Interleaving modules 5900 and 6300 are illustrative, and variations and modifications are possible. For example, all of the quickswap fusion circuits, port fusion circuits, and local fusion circuits can be identically configured copies of a reconfigurable fusion circuit such as reconfigurable fusion circuit 5000 of FIG. 50 described above. However, it is noted that in FBQC, port fusion and quickswap fusion involve a Bell basis measurement on the input physical qubits (which can be implemented as Type II fusion). Accordingly, in some embodiments, the reconfigurable fusion circuits used for port fusion circuits and quickswap fusion circuits need not provide all of the measurement options shown in FIG. 50 (e.g., single-qubit measurement circuits could be omitted). However, as noted above, there may be advantages in having every qubit encounter the same number and type of switches, regardless of the path selected, and implementing all of the reconfigurable fusion circuits identically may be desirable, even if some components are not used.

In some embodiments, an instance of interleaving module 5900 or interleaving module 6300 can be implemented using one or more silicon photonic integrated circuits. Multiple interleaving modules (or components thereof) can be implemented on the same chip or separate chips desired. Delay lines and couplings between interleaving modules can be implemented using appropriate lengths of waveguide. In some instances, the waveguide can be integrated into the circuit. Alternatively, some or all of the waveguides (including delay lines and/or inter-module couplings) can be implemented using optical fiber, free-space cavities, or other non-integrated waveguides, with appropriate low-loss couplings to allow transfer of photons between external waveguides and integrated circuits.

3.2.4. Interleaving Module Implementing Multiple Qubit Modules

As described above, one instance of interleaving module 5900 (or interleaving module 6300) can be used as one qubit module in an active volume core such as core 1510 described above. In some embodiments, hardware requirements can be further reduced by providing an interleaving module that can implement multiple qubit modules.

Figure 64:
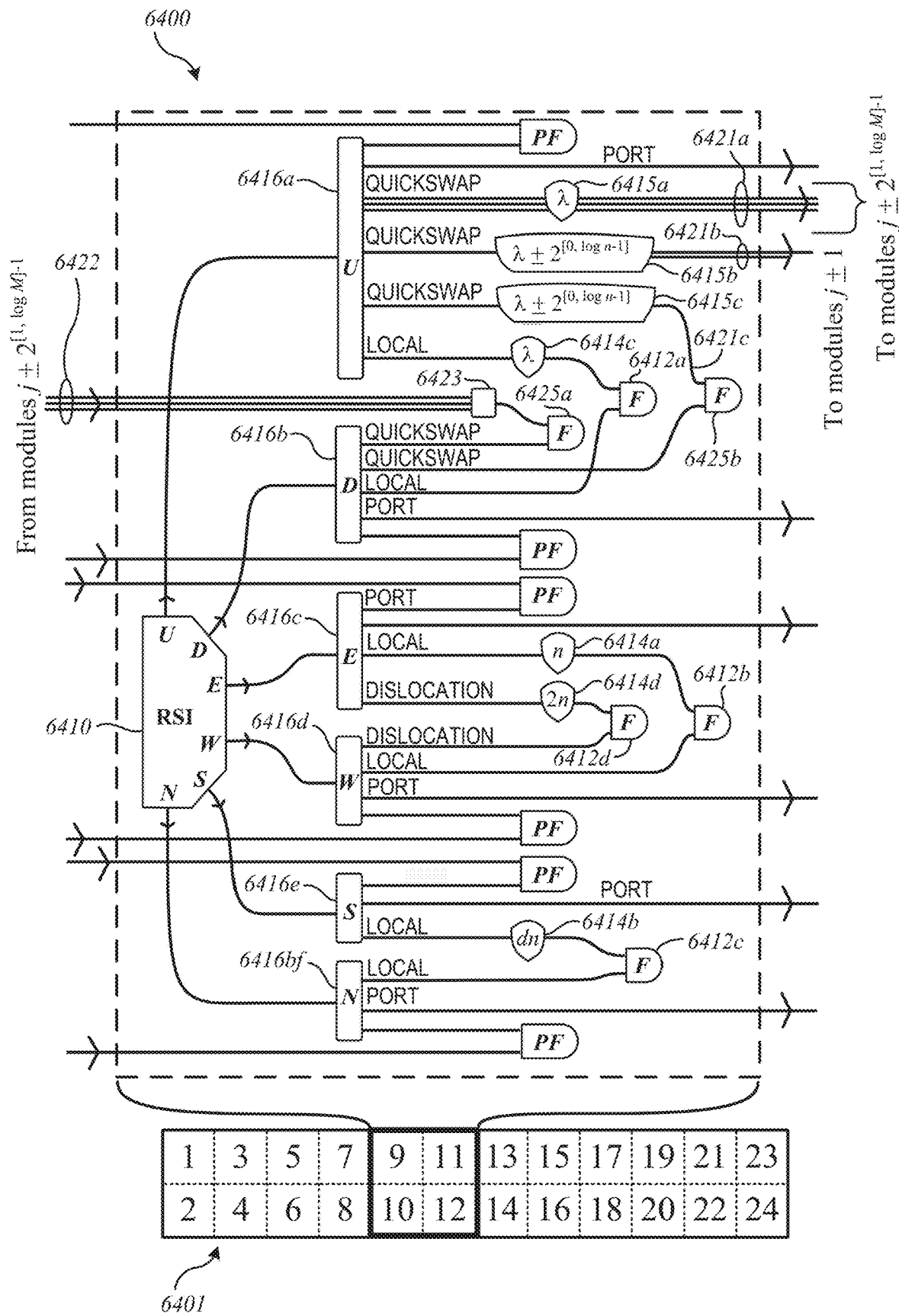
FIG. 64 shows an example of an active volume interleaving module that implements multiple qubit modules according to some embodiments.

FIG. 64 shows an example of an "active-volume" interleaving module 6400 that implements a number n of qubit modules (where n>1) according to some embodiments. Interleaving module 6400 can be constructed using the same components and techniques described above. In many respects, interleaving module 6400 is similar to interleaving module 5900 described above. For instance, interleaving module 6400 can include an RSI circuit 6410 that can receive and route to various outputs a resource state having six qubits (labeled N, S, W, E, D, U) during each RSI cycle. Output paths of RSI circuit 6410 can deliver a U qubit to routing switch 6416a (also referred to as a "U switch"), a D qubit to routing switch 6416b (also referred to as a "D switch"), an E qubit to routing switch 6416c (also referred to as an "E switch"), a W qubit to routing switch 6416d (also referred to as a "W switch"), an S qubit to routing switch 6416e (also referred to as an "S switch"), and an N qubit to routing switch 6416f (also referred to as an "N switch"). Reconfigurable fusion circuits 6412a, 6412b, 6412c, 6412d, also referred to as "local" fusion circuits, can be instances of reconfigurable fusion circuit 5000 of FIG. 50 and can be used to selectably perform fusion operations or single-qubit measurement operations on qubits of different resource states provided by the RSI circuit 6410 in the same interleaving module 6400 during different RSI cycles. Operation of local fusion circuits 6412a, 6412b, 6412c, 6412d can be similar to the local fusion circuits described above for interleaving module 5900.

Figure 65:
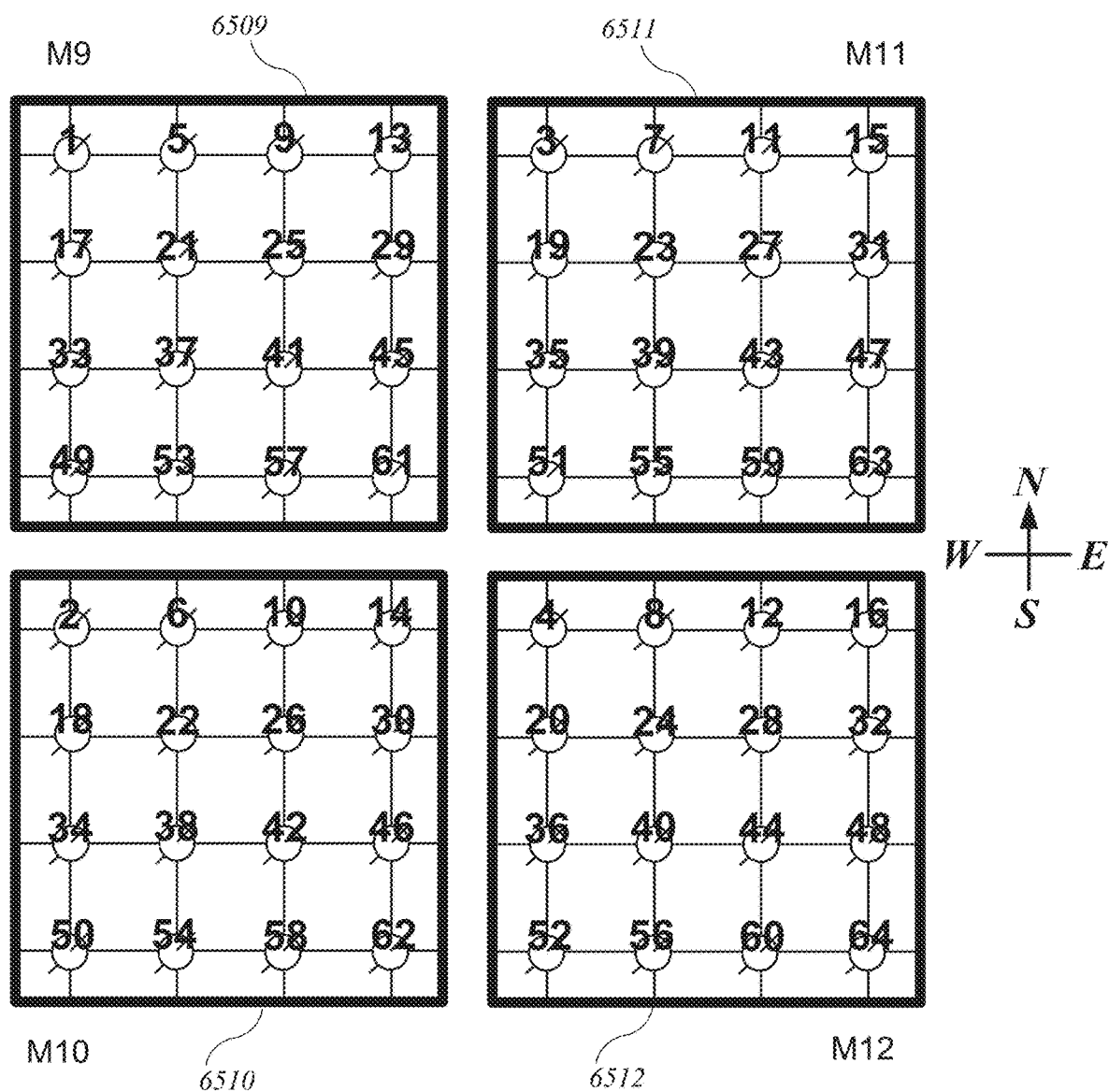
FIG. 65 shows a raster diagram of the rastering order for the interleaving module of FIG. 64 according to some embodiments.

One difference between interleaving module 6400 and interleaving module 5900 is in the delay lines. Interleaving module 6400 implements n qubit modules by generating n surface code patches (where each surface code patch can correspond to a logical qubit or ancilla) in a rasterized manner that rotates among the surface code patches. FIG. 65 shows a raster diagram of the rastering order for interleaving module 6400 according to some embodiments, similar to FIG. 54 described above. In this example, interleaving module 6400 generates surface code patches for n=4 qubit modules (two memory modules and two workspace modules, as shown in FIG. 64), and the interleaving length is d=4. As shown in FIG. 65, interleaving module F600 generates four 4×4 patches 6509, 6510, 6511, 6512 in 64 RSI cycles. Vertices are numbered to identify the RSI cycle during which the resource state corresponding to that vertex is generated. Thus, during RSI cycle 1, the NW-most vertex in patch 6509 is generated; during RSI cycle 2, the NW-most vertex in patch 6510 is generated; during RSI cycle 3, the NW-most vertex in patch 6511 is generated; and during RSI cycle 4, the NW-most vertex in patch 6512 is generated. This pattern repeats to generate the adjacent vertices in the E direction in RSI cycles 5-8, and so on through RSI cycle 16. At RSI cycle 17, the pattern moves to the next row in the S direction, and so on. At the end of RSI cycle 64, all four patches have been generated.

The delay lengths in interleaving module 6400 can support this rastering order. For example, the rastering order of FIG. 65 (one resource state per patch for each of n patches) indicates that the delay between a given resource state and the neighboring resource state in the E direction is n RSI cycles. Accordingly, as shown in FIG. 64, the local routing path for the E qubit includes an n-cycle delay line 6414a. For dislocation operations in the E-W direction, 2n-cycle delay line 6414d provides the appropriate delay. Similarly, for a given resource state, the delay for the neighboring resource state in the S direction is dn RSI cycles, and a dn-cycle delay line 6414b provides the appropriate delay. In the U-D direction, the relative delay is $\lambda = nd^2$, introduced using delay line 6414c.

Interleaving module 6400 thus includes the optical circuit elements for a qubit module in an active volume core. In particular, interleaving module 6400 can generate a surface-code patch for each of n logical qubits with code distance d in a code cycle that is equal to $\lambda = nd^2$ RSI cycles. Interleaving module 6400 also includes additional routing paths and circuit elements to provide port connections and quickswap connections with other instances of interleaving module 6400. These routing paths and circuit elements take into account the variable delay between resource states that are involved in port or quickswap couplings, as well as the possibility of port or quickswap couplings between surface code patches produced in the same instance of interleaving module 6400.

Figure 66:
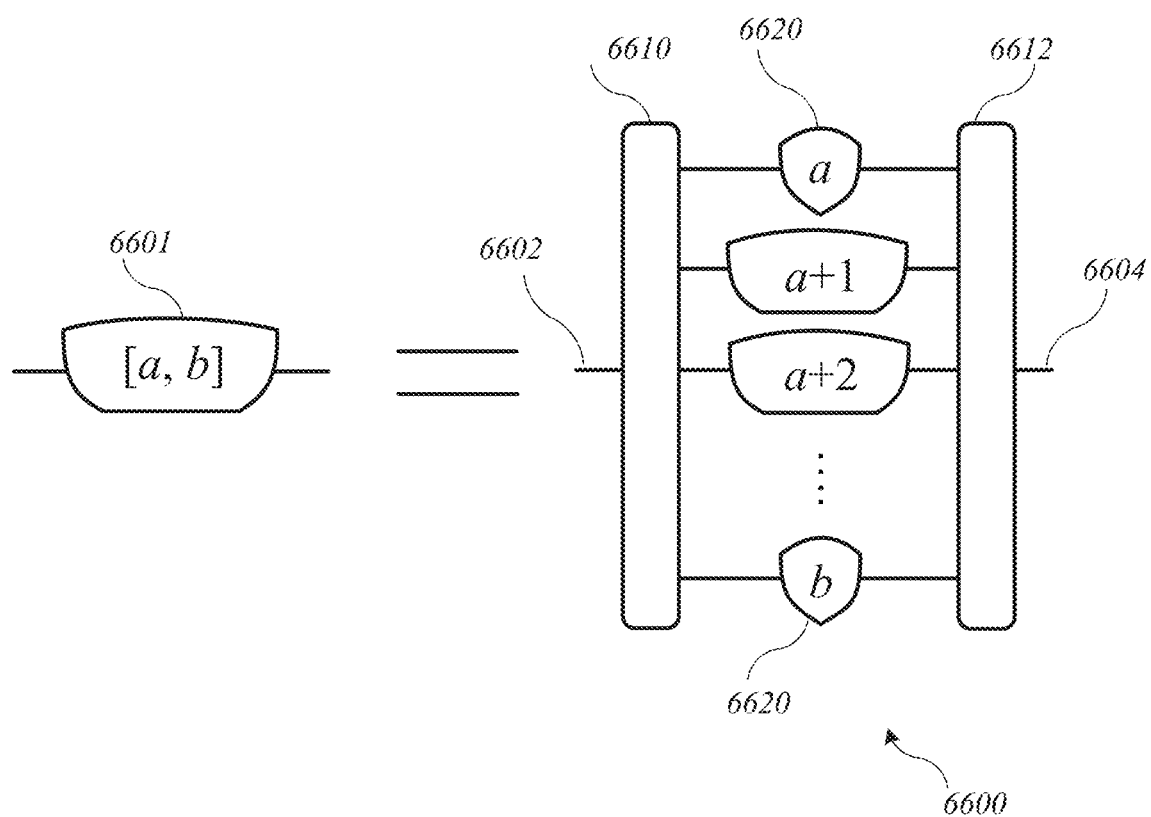
FIG. 66 shows a simplified schematic diagram of a variable delay circuit according to some embodiments.

FIG. 66 shows a simplified schematic diagram of a variable delay circuit 6600 according to some embodiments and a corresponding circuit symbol 6601. Variable delay circuit 6600 introduces a delay of a selectable number of RSI cycles within in a specified range [a, b] (the particular range is noted in circuit symbol 6601 as shown). Variable delay circuit 6600 can be implemented as shown. A 1×N input switch 6610 is operated to selectably deliver an input qubit from an input path 6602 to one of a set of fixed-length delay lines 6620 having different lengths as indicated. N can be (b−a)+1 to support any length of delay in the range [a, b]. (In instances where certain delay lengths are not used, the number of delay lines can be reduced accordingly.) After a delay of the selected length, N×1 output switch 6612 is operated to provide the qubit on output path 6604.

Referring again to FIG. 64, quickswaps can be implemented by providing two sets of quickswap transfer paths 6421a, 6421b that exit interleaving module 6400 and a third quickswap transfer path 6421c that is local to interleaving module 6400. Quickswap transfer path 6421c implements quickswaps between two patches generated in the same instance of interleaving module 6400. For instance, if interleaving module 6400 implements qubit modules M9-M12 as shown at 6401, some of the module pairs are quickswap-pable, e.g., (M9,10) and (M9,M11). Variable delay circuit 6416c provides the appropriate delay, depending on which pair of qubits is being quickswapped, and quickswap fusion circuit 6425b receives both qubits. Quickswap transfer paths 6421b provide quickswap couplings to neighboring instances (j+1 and j−1) of interleaving module 6400. Where quickswaps are implemented in a log-tree network, and assuming that n is also a power of 2, the neighboring instances of interleaving module 6400 are the only instance in which a variable delay circuit 6415b is advantageous. Quickswap transfer paths 6421a provide the non-local quickswap connections with a constant delay of λ RSI cycles, as shown by delay line 6415a. All quickswap inputs from other instances of interleaving module 6400 can be received via external quickswap routing paths 6422; switch 6423 and quickswap fusion circuit 6425a are analogous to switch 5923 and quickswap fusion circuit 5925 described above. Quickswap networks can be formed by appropriate connection of quickswap transfer paths 6421a, 6421b and external quickswap routing paths 6422.

Figure 67A:
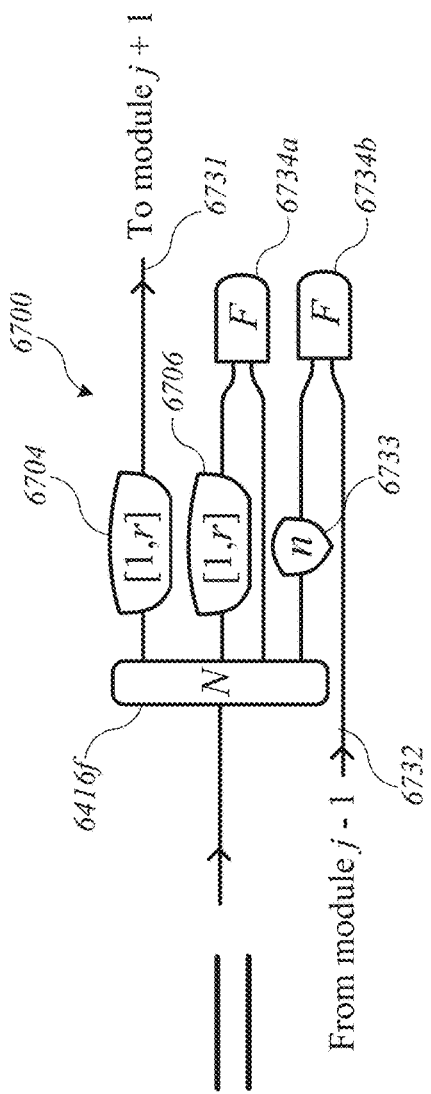
FIGS. 67A and 67B shows more detailed schematics of circuits that can be used to implement a portion of an interleaving module according to some embodiments.

Port connections for interleaving module 6400 can also include variable delays. FIG. 67A shows a more detailed schematic of a circuit 6700 corresponding to a portion of interleaving module 6400, including N switch 6416f and port coupler circuit 6430f according to some embodiments. Circuit 6700 can be used in the case where r<n, in which case port couplings only occur within one instance of interleaving module 6400 or between adjacent instances of interleaving module 6400. (It should be noted that this does not imply that port couplings occur only between adjacent qubit modules in the active volume architecture, since each instance of interleaving module 6400 implements multiple qubit modules as shown at 6401 in FIG. 64) A variable delay circuit 6704 with range [1, r] is applied to port transfer path 6731 (corresponding to port transfer path 6431f), which exits interleaving module 6400. Local port couplings are provided using another variable delay circuit 6706 with range [1, r] and a port fusion circuit 6734a. An external port routing path 6732 (corresponding to external port routing path 6432f) enters the instance of interleaving module 6400 and is coupled to a port fusion circuit 6734b. The other input of port fusion circuit 6734b is coupled to a routing path of N switch 6416f via an n-cycle delay line 6733.

Figure 67B:
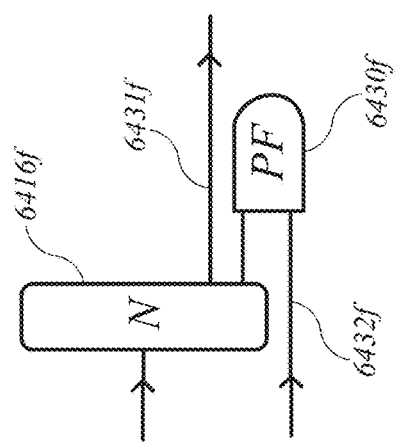

In the case where r>n, port couplings can occur between non-adjacent instances of interleaving module 6400. FIG. 67B shows a more detailed schematic of a circuit 6700', which is a variation of circuit 6700 that can be used to support r>n according to some embodiments. Circuit 6700' differs from circuit 6700 in that multiple port transfer paths 6731 are provided, each with its own instance of variable delay circuit 6704. Similarly, multiple external port routing paths 6732 are provided, and each port transfer path 6731 couples to an external port routing path 6732 in a different instance of interleaving module 6400. Similarly to circuit 6000 described above, a port selection switch 6733 can selectably create an optical path between any one of external port routing paths 6732 and a port fusion routing path 6735.

While FIGS. 67A and 67B show details for port transfer paths 6431f, external port routing paths 6432f, and port coupler circuit 6430f, it should be understood that port transfer paths 6431a-6431e, external port routing paths 6432a-6432e, and port coupler circuits 6430a-F630e can be implemented in the same manner. The timing of the switch operations can be selected to provide coupling at the appropriate boundary (e.g., the port connection can be opened for any RSI cycle in which resource states for the relevant boundary are provided and closed for other RSI cycles). Accordingly, where instances of interleaving module 6400 are used to implement qubit modules in an active volume architecture, for any pair of modules having indexes i and j that are in range, port connections are provided for each pair of corresponding resource-state qubits (U to U, N to N, etc.). Further, as in circuits 6000 and 6200 described above, port selection switch 6733 can be eliminated by providing multiple instances of port fusion circuit 6734b and multiple instances of routing path 6736.

It should be understood a single instance of interleaving module 6400 can be used to implement any number n of qubit modules in an active volume architecture. In an extreme case, n=N (where N is the total number of qubit modules in core 1510 described above) and only one interleaving module is used. Implementation is simpler where n is a power of two and where each interleaving module implements n/2 workspace modules and n/2 memory modules; however, other arrangements are not precluded.

In some embodiments, for an active volume core having a fixed number N of qubit modules, increasing the number of qubit modules implemented in a single interleaving module need not reduce throughput of the quantum core (as measured in logical blocks per unit time). Assuming an RSI cycle time (or time bin) of $\tau_{RSI}$ and a maximum delay length of $\lambda=nd^2$, each additional instance of interleaving module 6400 adds n qubit modules to the quantum computer, i.e., n/2 memory modules and n/2 workspace modules. Each workspace module executes a logical block in time equal to $d \cdot \lambda \cdot \tau_{RSI} = nd^3 \cdot T_{RSI}$. Since each module can execute n/2 logical blocks in that time, each module increases the speed of the quantum computer by $\tau_{RSI}/(2d^3)$ blocks per unit time. For the example of d=32, $\tau_{RSI}=1$ ns and a 1.6-km fiber delay with $\lambda=8192$, each instance of interleaving module 6400 increases the memory by 4 qubits and the speed by 15,000 blocks per second. Other examples of the performance metrics and example device implementations for different choices of these parameters are summarized in FIG. 68. For purposes of illustration, a per-block error rate of $p(d)=10^{-d/2}$ and a reaction time of $\tau_r=5$ ms+$\lambda$ ns is assumed.

In addition, in some embodiments where each RSI receives resource states from a different resource state generator, the speed of providing resource states is independent of $\lambda$, whereas the memory provided by each resource state generator scales linearly with $\lambda$. Therefore, the use of long delay lines can be strictly advantageous and does not entail a linear space-time trade-off in the overall performance of the quantum computer. However, because it takes $\lambda \cdot \tau_{RSI}$ to perform a layer of reactive single-qubit or two-qubit measurements, the reaction time scales with $\lambda$ in this implementation, although the reaction time may still be dominated by the time required for classical processing and feed-forward (assumed to be 5 ms in FIG. 68). Should delay lengths be long enough that the reaction time is a concern, an alternative architecture may be considered in which stale magic states are rerouted into interleaving modules with a shorter delay length in order to enable faster reactive measurements.

FIG. 68 contemplates implementations where each interleaving module implements at least one qubit module in the active volume architecture. Other embodiments can use more than one interleaving module to implement a qubit module. For example, a d×d array of unit cells similar to the unit cells described above with reference to FIGS. 51 and 52 can be used to generate a patch for one qubit module in one RSI cycle, and one such array of unit cells can successively generate all of the patches for all of the qubit modules. Port and quickswap couplings between patches generated in different RSI cycles can be implemented using switches and variable-length delay circuits similar to implementations described above. With additional hardware, multiple d×d arrays of unit cells can be used to generate patches for multiple qubit modules in parallel. However, additional hardware increases the implementation cost and does not necessarily result in faster throughput of the quantum computer.

4. Computing System Implementing Active-Volume Architecture

Figure 69:
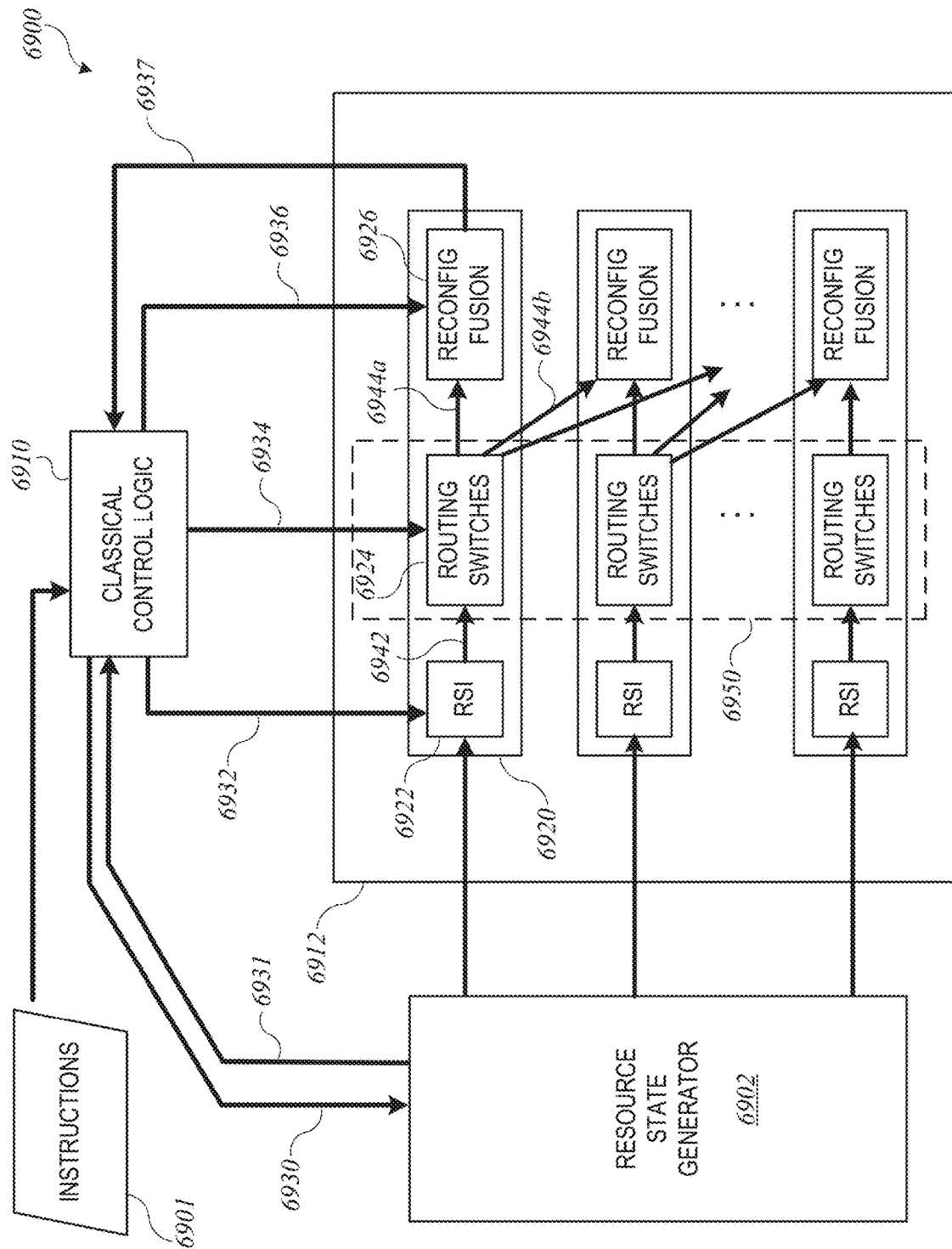
FIG. 69 shows an example system architecture for a quantum computer system that can implement an active volume architecture using interleaving modules according to some embodiments.

FIG. 69 shows an example system architecture for a quantum computer system 6900 that can implement an active volume architecture using interleaving modules according to some embodiments. Using photonic physical qubits, some embodiments of quantum computer system 6900 can generate measurement data reflecting entanglement structures (e.g. fusion graphs) for fault-tolerant FBQC. System 6900 includes classical control logic 6910, a resource state generator 6902, and a network 6912 of interleaving modules 6920. For clarity of illustration, classical signal paths 6932-6937 are shown connected to only one instance of interleaving module 6920. It should be understood that classical control logic 6910 can communicate with components in each instance of interleaving module 6920 in the manner described herein.

Classical control logic 6910 can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, classical control logic 6910 (or portions thereof) can be implemented in an off-chip classical computer having a processor and a memory, and the off-chip classical computer can be programmed to perform some or all of the operations of classical control logic 6910.

In operation, classical control logic 6910 (which can include a classical computer) can receive instructions 6901 specifying a quantum computation to be executed. For example, the instructions can specify logical block networks and quickswap operations, which can be converted to fusion graphs or other instructions defining switch settings for a network of interleaving modules. Alternatively, the instructions can include a machine-readable data file defining a fusion graph. Classical control logic 6910 can read the program code and generate control signals for resource state generator 6902 and interleaving modules 6920 to perform the computation.

Resource state generator 6902 can include any circuit(s) or other components capable of generating resource states (as described above). In various embodiments, resource state generator 6902 can generate 6-ring resource states or other resource states having an appropriate number of qubits and entanglement pattern. In some embodiments, classical control unit 6910 can send classical control signals via signal path 6930 to resource state generator 6902, e.g., to start and stop resource state generation. In some embodiments, resource state generator 6902 may succeed in generating the desired number of resource states for a given RSI cycle with probability less than 1, and resource state generator 6902 can provide classical heralding signals to classical control logic 6910 via signal path 6931. The classical heralding signals can include, e.g., signals from detectors associated with heralded photon sources and/or entanglement-generating circuits such as the Bell state generator and/or fusion circuits described above. Classical control logic 6910 can use heralding signals received via signal path 6931 to determine whether each instance of resource state generation succeeded or failed. For instance, particular patterns of presence or absence of photons in detectors can be indicative of success or failure. In some embodiments, resource state generator 6902 can be maintained at cryogenic temperature (e.g., 4 K) while interleaving modules 6920 can operate at higher temperatures (e.g., 300 K). Resource state generator 6902 can be coupled to interleaving module network 6912 using optical fiber or other waveguides and can provide one resource state per RSI cycle to each interleaving module 6920.

Each interleaving module 6920 can be an instance of interleaving module 5900 or 6400 described above or other similar circuits. As shown in FIG. 69, each interleaving module 6920 can include an RSI circuit 6922, a set of routing switches 6924, and a set of reconfigurable fusion circuits 6926. Details of couplings between components within each interleaving module 6920 and between interleaving modules 6920 are not shown in FIG. 69.

Each RSI 6922 can receive resource states as described above. In some embodiments, the RSIs 6922 can operate autonomously, with no data input required, and each RSI 6922 circuit can receive one resource state per RSI cycle. Any of the RSI circuit configurations described above or other configurations can be used.

Optical fibers (or other waveguides) 6942 can be used to couple each RSI 6922 to its associated routing switches 6924, e.g., the U, D, N, S, W, and E switches of interleaving module 5900 or 6400 described above.

Classical control logic 6910 can generate control signals for routing switches 6924 in each instance of interleaving module 6920 and send the control signals to routing switches 6924 via classical signal path 6934. In this manner qubits can be routed appropriately to local routing paths 6944*a* (within interleaving module 6920) or to network routing paths 6944*b* such as port transfer paths or quickswap transfer paths as described above. (FIG. 69 does not show the routing paths in detail.) The routing paths for different qubits of a given resource state can be selected independently of each other. In some embodiments, classical control logic 6910 can select routing paths and corresponding control signals for routing switches 6924 based on a fusion graph representation of a quantum computation, which can be derived from a logical block network diagram as described above. An example of cycle-by-cycle setting of routing switches to execute a fusion graph is described above with reference to FIGS. 55A, 55B and 56. Other selection logic can also be implemented. In some embodiments, the set of all routing switches 6924 across all instances of interleaving module 6912 can provide a fusion network router 6950 that supports all of the local fusions, port connections, and quickswap connections for an active volume architecture as described above.

Classical control logic 6910 can also generate control signals for reconfigurable fusion circuits 6926 in each instance of interleaving module 6920 and send the control signals to reconfigurable fusion circuits 6926 via classical signal path 6936. As described above, in some embodiments each reconfigurable fusion circuit 6926 can be an implementation of circuit 5000 of FIG. 50D that operates on two input qubits. Circuit 5000 can be controlled by providing classical control signals to select the state of switches 5010 and 5012, which has the effect of routing the two input qubits to the desired measurement operation(s), which can include either a two-qubit joint measurement operation (e.g., a type II fusion operation) or individual qubit measurements (e.g., in a particular Pauli basis) on each of the two input qubits. In some embodiments, classical control logic can select the desired measurement operations based on a fusion graph representation (or other representation) of a quantum computation. An example of cycle-by-cycle selection of measurement operations to execute a fusion graph is described above with reference to FIGS. 55A, 55B and 56. Other selection logic can also be implemented.

Measurement outcome data (also referred to as "measurement results") generated by reconfigurable fusion circuit 6926 can be provided to classical control logic 6910 via classical signal path 6937. As described above, in some embodiments, the measurement outcome data can include photon counts (or a binary-valued signal indicating presence or absence of a photon) for each detector in the reconfigurable fusion circuit or for the detector(s) on the active path(s) in a given cycle.

Classical control logic 6910 can decode the measurement outcome data received via classical control path 6937 to determine a result of the quantum computation. In some embodiments, classical control logic 6910 can also incorporate the heralding signals received via signal paths 6933 into the decoding. Decoding operations can be implemented in classical control logic 6910 in the manner described above.

Figure 70:
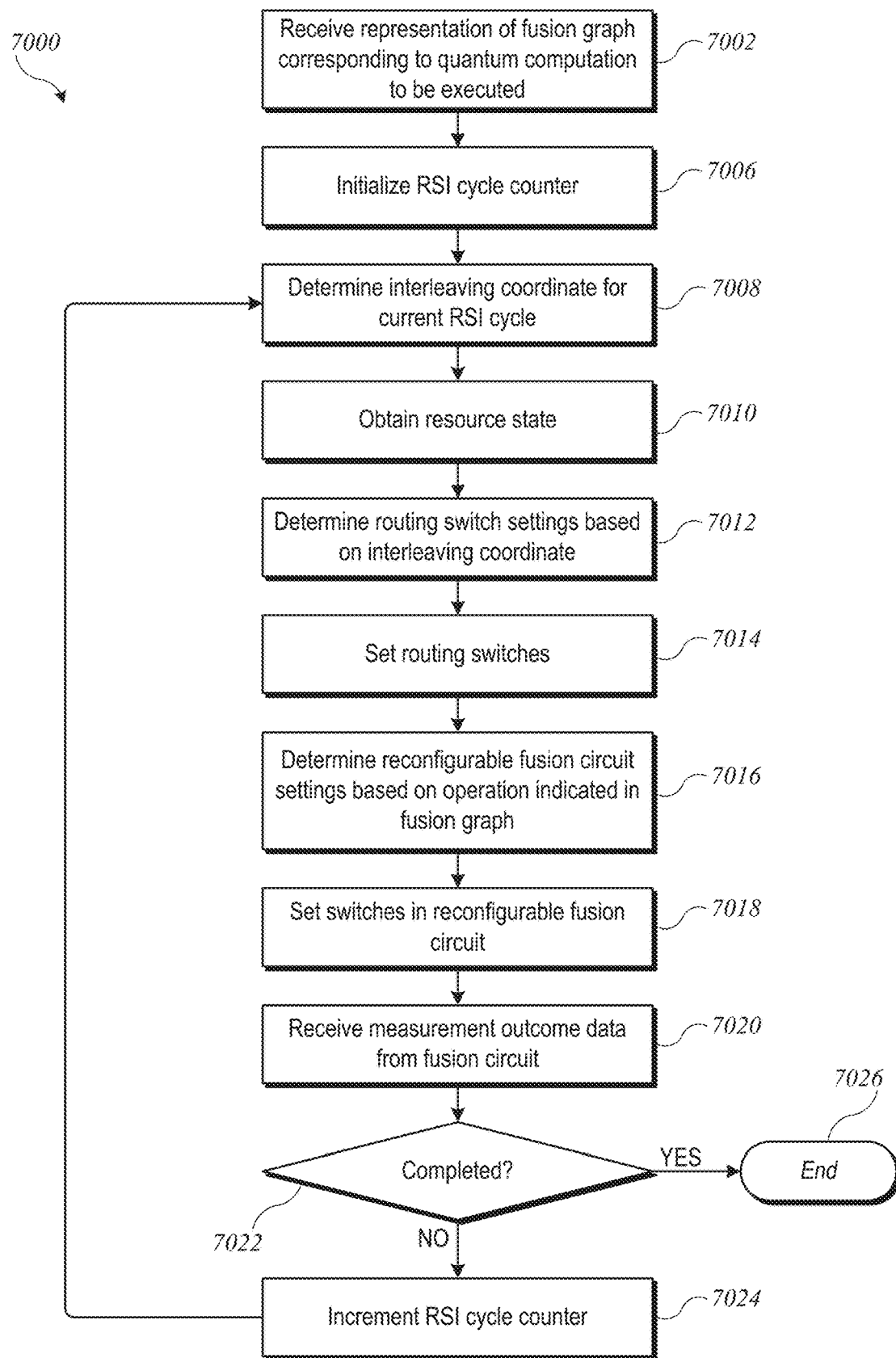
FIG. 70 is a flow diagram of a process for operating an array of interleaving modules according to some embodiments.

FIG. 70 is a flow diagram of a process 7000 for operating an array of interleaving modules (e.g., interleaving modules 6920) according to some embodiments. Process 7000 can be implemented, e.g., in classical control logic 6910.

At block 7002, classical control logic 6910 can obtain a machine-readable representation of a fusion graph corresponding to a quantum computation (or other operation on logical qubits) to be executed. At block 7004, classical control logic 6910 can define patches of the fusion graph to be generated by each interleaving module 6910. For example, as described above, a quantum computation can be expressed using logical block networks, and execution of each logical block can be assigned to a particular workspace qubit module (which is implemented in a particular one of interleaving modules 6910). Each logical block corresponds to a segment of a spacetime diagram, as described above with reference to FIG. 20A-20E, and a spacetime diagram can be translated to a fusion diagram, as described above. Accordingly, a surface code patch can be assigned to each interleaving module 6910. At block 7006, classical control logic 6910 can initialize an RSI cycle counter. The RSI cycle counter can be, for example, a conventional clock circuit that operates at a rate corresponding to the rate at which resource states are provided to RSIs 6922. At block 7008, classical control logic 6910 can determine an interleaving coordinate for the current RSI cycle. One example of determining interleaving coordinates is described above with reference to FIG. 55A.

At block 7010, each RSI 6922 can obtain a resource state. For example, a signal generated by classical control logic 6910 in response to the RSI cycle counter can trigger generation of resource states in resource state generator 6902, and resource state generator 6902 can provide a resource state to each RSI 6922. At block 7012, classical control logic 6910 can determine setting for routing switches 6924 based on the interleaving coordinate. For example, as described above, classical control logic 6910 can determine whether each qubit should be directed to a local fusion circuit or a network fusion circuit (e.g., a port fusion circuit or a quickswap fusion circuit) based on the interleaving coordinate (or position of the resource state within a patch). At block 7014, classical control logic 6910 can generate control signals to routing switches 6924 to route the qubits into local or network paths based on the determinations at block 7012. At block 7016, classical control logic 6910 can determine switch settings for reconfigurable fusion circuits 6926 based on the measurement operation indicated in the fusion graph. For example, as described above, classical control logic 6910 can determine from the fusion graph whether to perform a fusion operation or single-qubit measurements (and, if applicable, which single-qubit measurements to perform). At block 7018, classical control logic 6910 can generate control signals to reconfigurable fusion circuits 6926 to implement the settings determined at block 7016. At block 7020, classical control logic 6910 can receive measurement outcome data from reconfigurable fusion circuits 6926. Measurement outcome data can be used as described above. In some embodiments, the measurement outcome data can be used to determine subsequent operations, thereby supporting reactive measurement.

At block 7022, classical control logic 6910 can determine whether the quantum computation has been completed. If not, then at block 7024, the RSI cycle counter can be incremented, and process 7000 can return to block 7008 to determine the next interleaving coordinate and process the next set of resource states. Process 7000 can continue to iterate until the computation is completed, ending at block 7026. It should be understood that all instances of interleaving module 6920 can be operated in parallel, with photons propagating between different interleaving modules 6920 based on the settings of routing switches 6924. Delay lines within or between interleaving modules can be provided so that qubits from different resource states arrive at reconfigurable fusion circuits 6926 with the correct relative timing to execute the fusion graph.

System 6900 of FIG. 69 and process 7000 of FIG. 70 are illustrative, and variations and modifications are possible. Blocks shown separately can be combined, or a single block can be implemented using multiple distinct components or operators. Order of operations can be varied to the extent that logic permits, and operations described as sequential can be performed concurrently. Interleaving modules 6900 can be implemented according any of the interleaving module arrays described above or variations or modifications thereof.

System 6900 is just one example of a quantum computer system that can implement an active volume architecture using interleaving modules. Those skilled in the art with access to this disclosure will appreciate that many different systems can be implemented.

5. Additional Embodiments

All embodiments described herein are illustrative, and many modifications are possible. Photonic qubits can be implemented using dual-rail encodings as described above, other spatio-temporal encodings, polarization encodings, GKP qubit encoding, or any other encoding that provides the state behavior of a physical qubit. Further, while photonic qubits are particularly well suited for active volume architectures (due to the relative ease of implementing port and quickswap connection networks), active volume architectures are not limited to photonic qubits; any physical system that can be used as a qubit can be used to implement an active volume architecture, provided that an appropriate connection network implementing port and/or quickswap connections as described herein is constructed.

As described above, port connections are selectably operable to couple surface code patches generated in different qubit modules in a quantum computer, and quickswap connections are selectably operable to move logical qubits between qubit modules in a quantum computer. In some embodiments, port connections can be implemented without also implementing quickswap connections, and vice versa, while still providing at least some of the benefits described herein. For instance, in a quantum computer that implements port connections but not quickswap connections, the amount of surface code generated to perform a gate operation between logical qubits encoded in non-adjacent surface code patches can be reduced in the manner described above. Conversely, in a quantum computer that implements quickswap connections but not port connections, surface code patches encoding different logical qubits can be quickly rearranged in memory to position logical qubits involved in a gate operation closer together prior to executing the gate operation. Closer positioning reduces the amount of surface code generated during the operation (e.g., as shown in FIGS. 21B and 21C), which can reduce computational cost.

The convention that the sub-connections of a port connection couple corresponding boundaries of surface code patches in different modules (E to E, N to N, W to W, S to S, U to U, D to D) is chosen for convenience of implementation in certain photonic systems. Along the U-D axis, the U to U and D to D port couplings enable generation and measurement of Bell states, as used for bridge qubits. In the networks of interleaving modules described above, a rule that all sub-connections couple corresponding boundaries can simplify design of the modules and connection paths. However, it is also possible to implement port connections such that sub-connections in directions transverse to the U-D axis are made between complementary boundaries (i.e., E to W, W to E, N to S, and S to N). Depending on the particular hardware used to generate surface code patches and establish port connections, providing complementary-boundary connections in the N-S and E-W directions may be more convenient than providing corresponding-boundary connections.

In examples above, quickswap connections are implemented using transversal physical SWAP gates. Depending on implementation, a quickswap operation is not limited to just two participating modules, and multi-way quickswaps may be supported, provided that the appropriate direct connections exist between the participating modules (e.g., in a three-way quickswap, module Mi can send its logical qubit to module Mj while module Mj sends its logical qubit to module Mk and module Mk sends its logical qubit to module Mi).

The use of directional labels (e.g., N, E, W, S, U, D) is for convenience of description and should be understood as referring to entanglement space, not as requiring or implying a particular physical arrangement of components or physical qubits. All numerical examples are for purposes of illustration and can be modified. In addition, while layers and patches are described with reference to square numbers, it should be understood that non-square layers and/or non-square patches can also be used. For example, patches or layers can be rectangular. Triangular patches or layers (or patches or layers having other shapes) can also be generated, e.g., by varying the number of resource states per row. Further, while examples described above assume that all instances of a resource state have the same entanglement pattern, such uniformity is not required. For instance, in some embodiments, resource states having different entanglement patterns can be provided to a particular RSIs at various times. In addition, there may be stochastic variation among resource states, e.g., due to the non-deterministic nature of resource state generation. To increase the probability of delivering a desired resource state to each RSI in a given RSI cycle, some embodiments can provide a number (R) of resource state generator circuits. If M is the total number of interleaving modules in a particular core, then R can be greater than M, and R can be chosen to provide a sufficiently high probability that at least M resource states will be generated during a given RSI cycle. ("Sufficiently high probability" in a given implementation can be determined based on the particular implementation of fault tolerance.) Active multiplexing techniques, examples of which are known in the art, can be used to select M of the R resource state generators on each clock cycle to deliver resource states to the resource state interconnects of the M interleaving modules.

Some embodiments described above provide examples of implementing active volume architectures using FBQC to implement the surface-code patches by providing resource states and performing appropriate measurements on qubits of different resource states. The particular size (number of qubits) and entanglement pattern of the resource states can be varied as appropriate for a particular use case. In addition or instead, the number of resource states and entanglement geometry between resource states can be varied according to the particular use-case. In addition, embodiments are not limited to FBQC, and active volume architectures may be implemented using other techniques for generating and operating on logical qubits, including other surface-code-based techniques.

Further, while examples herein refer to surface codes, those skilled in the art with the benefit of this disclosure will appreciate that surface codes are one category of topological codes that can be used to provide quantum error correction by defining and operating on logical qubits and that systems and methods described herein can be applied to any topological code, including surface codes, color codes, and so on. The particular stabilizers implemented are a matter of design choice.

Further, embodiments described above include references to specific materials and structures (e.g., optical fibers), but other materials and structures capable of producing, propagating, and operating on photons can be substituted. As noted above, resource states can be generated using photonic circuits, or a resource state can be created using matter-based qubits, after which an appropriate transducer technology can be applied to swap the state of the matter-based qubits onto a photonic state. Interleaving as described herein exploits the propagation of photonic qubits, and similar techniques may be applicable to systems of physical qubits that are realized using entities that propagate along well-defined hardware paths.

Classical control logic can be implemented on-chip with the waveguides, beam splitters, detectors and/or and other photonic circuit components or off-chip as desired.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:
1. A circuit comprising:
a resource state interconnect having a plurality of output paths to output a resource state during each of a plurality of operating cycles, wherein each resource state is a quantum system of multiple entangled physical qubits, wherein the physical qubits are photonic qubits, and wherein different physical qubits of the resource state are output on a different ones of the output paths;
a plurality of reconfigurable fusion circuits, each of the plurality of reconfigurable fusion circuits being configured to receive two input physical qubits and to selectably perform either a projective entangling measurement between the two input physical qubits or one of a plurality of single-qubit measurements on each of the two input physical qubits, thereby producing measurement outcome data;
a plurality of routing switches, each routing switch having an input path coupled to a respective one of the output paths of the resource state interconnect and a plurality of output routing paths selectably coupled to the input path, wherein, for each routing switch, the plurality of output routing paths includes:
a first local path, wherein the first local paths of different ones of the routing switches introduce different delays;
a plurality of internal port routing paths; and
a plurality of port transfer paths that exit the circuit; and
a plurality of external port routing paths to receive physical qubits from a plurality of external circuits, wherein the plurality of reconfigurable fusion circuits includes:
a plurality of local fusion circuits, wherein each local fusion circuit is coupled to respective first local routing paths of two of the routing switches; and
a plurality of port fusion circuits, wherein each port fusion circuit has a first input coupled to one of the internal port routing paths of one of the routing switches and a second input coupled to one of the of the external port routing paths.

2. The circuit of claim 1 wherein the circuit is one of a plurality of instances of the circuit and wherein, for each routing switch, the port transfer paths are coupled to the external port routing paths of other instances of the circuit.

3. The circuit of claim 2 wherein each of the routing switches is associated with a different surface of a topological code patch for a fault-tolerant logical qubit, and wherein the port fusion circuits operate on physical qubits from like surfaces of different topological code patches.

4. The circuit of claim 1 wherein the plurality of local fusion circuits includes a first local fusion circuit, a second local fusion circuit, and a third local fusion circuit and wherein:
one of the first local routing paths coupled to the first local fusion circuit introduces a delay of one operating cycle relative to the other of the first local routing paths coupled to the first local fusion circuit;
one of the first local routing paths coupled to the second local fusion circuit introduces a delay of a number d of operating cycles relative to the other of the first local routing paths coupled to the second local fusion circuit, wherein the number d is a code distance greater than 1; and
one of the first local routing paths coupled to the third local fusion circuit introduces a delay of a number $d^2$ of operating cycles relative to the other of the first local routing paths coupled to the third local fusion circuit.

5. The circuit of claim 4 wherein:
the first local fusion circuit is coupled to the respective first local routing paths of a first routing switch and a second routing switch;
the first local routing path of the first routing switch introduces the delay of one operating cycle;
the plurality of output routing paths of each of the first routing switch and the second routing switch further includes a third local routing path, wherein the third local routing path of the first routing switch introduces a delay of two operating cycles relative to the third local routing path of the second routing switch; and
the plurality of local fusion circuits further includes a fourth local fusion circuit coupled to the third local routing paths of the first routing switch and the second routing switch.

6. The circuit of claim 4 wherein:
the third local fusion circuit is coupled to the respective first local routing paths of a first routing switch and a second routing switch;
the first local routing path of the first routing switch introduces the delay of $d^2$ operating cycles;
the plurality of output routing paths of the first routing switch further includes a plurality of quickswap transfer paths that exit the circuit after a delay of $d^2$ operating cycles;
the plurality of output routing paths of the second routing switch further includes a plurality of internal quickswap routing paths;
the circuit further includes a plurality of external quickswap routing paths that receive physical qubits from a plurality of external circuits; and
the plurality of reconfigurable fusion circuits further includes a plurality of quickswap fusion circuits, each quickswap fusion circuit having a first input coupled to one of the internal quickswap routing paths and a second input coupled to one of the external quickswap routing paths.

7. The circuit of claim 1 wherein each of the plurality of reconfigurable fusion circuits is configured such that the projective entangling measurement operation includes a destructive measurement on both of the input qubits.

8. The circuit of claim 1 wherein each of the reconfigurable fusion circuits is configured such that the projective entangling measurement is a type II fusion operation that provides a joint XX measurement outcome and a joint ZZ measurement outcome.

9. The circuit of claim 1 wherein each of the reconfigurable fusion circuits is configured such that the plurality of single-qubit measurements includes one or more of:
a Pauli X measurement;
a Pauli Y measurement; a Pauli Z measurement; and
a phase rotation of $e^{-i\pi/8}$ followed by a Pauli Z measurement.

10. The circuit of claim 1 further comprising:
classical control logic coupled to the plurality of reconfigurable fusion circuits and to the plurality of routing switches, the classical control logic being configured to select an output routing path for the each of the plurality of routing switches and an operation for each of the plurality of reconfigurable fusion circuits.

11. The circuit of claim 1 wherein the resource state interconnect includes a plurality of waveguides coupled between an external source of resource states and the output paths of the resource state interconnect.

12. A system comprising:
a network of interleaving modules, each interleaving module including:
a resource state interconnect having a plurality of output paths to output a resource state during each of a plurality of operating cycles, wherein each resource state is a quantum system of multiple entangled physical qubits, wherein the physical qubits of the resource state are photonic qubits, and wherein different physical qubits of the resource state are output on a different ones of the output paths;

a plurality of reconfigurable fusion circuits, each of the plurality of reconfigurable fusion circuits being configured to receive two input physical qubits and to selectably perform either a projective entangling measurement between the two input physical qubits or one of a plurality of single-qubit measurements on each of the two input physical qubits, thereby producing measurement outcome data;

a plurality of routing switches, each routing switch having an input path coupled to a respective one of the output paths of the resource state interconnect and a plurality of output routing paths selectably coupled to the input path, wherein, for each routing switch, the plurality of output routing paths includes:
  a first local path, wherein the first local paths of different ones of the routing switches introduce different delays;
  a plurality of internal port routing paths; and
  a plurality of port transfer paths that exit the interleaving module; and
  a plurality of external port routing paths to receive physical qubits from a plurality of other interleaving modules in the network, wherein the plurality of reconfigurable fusion circuits includes:
  a plurality of local fusion circuits, wherein each local fusion circuit is coupled to respective first local routing paths of two of the routing switches; and
  a plurality of port fusion circuits, wherein each port fusion circuit has a first input coupled to one of the internal port routing paths of one of the routing switches and a second input coupled to one of the of the external port routing paths.

13. The system of claim 12 wherein, in each interleaving module, each of the routing switches is associated with a different surface of a topological code patch for a fault-tolerant logical qubit, and wherein the port fusion circuits operate on physical qubits from like surfaces of different topological code patches.

14. The system of claim 12 wherein, in each interleaving module, the plurality of local fusion circuits includes a first local fusion circuit, a second local fusion circuit, and a third local fusion circuit and wherein:
  one of the first local routing paths coupled to the first local fusion circuit introduces a delay of one operating cycle relative to the other of the first local routing paths coupled to the first local fusion circuit;
  one of the first local routing paths coupled to the second local fusion circuit introduces a delay of a number d of operating cycles relative to the other of the first local routing paths coupled to the second local fusion circuit, wherein the number d is a code distance greater than 1; and
  one of the first local routing paths coupled to the third local fusion circuit introduces a delay of a number $d^2$ of operating cycles relative to the other of the first local routing paths coupled to the third local fusion circuit.

15. The system of claim 14 wherein, in each interleaving module:
  the first local fusion circuit is coupled to the respective first local routing paths of a first routing switch and a second routing switch;
  the first local routing path of the first routing switch introduces the delay of one operating cycle;
  the plurality of output routing paths of each of the first routing switch and the second routing switch further includes a third local routing path, wherein the third local routing path of the first routing switch introduces a delay of two operating cycles relative to the third local routing path of the second routing switch; and
  the plurality of local fusion circuits further includes a fourth local fusion circuit coupled to the third local routing paths of the first routing switch and the second routing switch.

16. The system of claim 14 wherein, in each interleaving module, the plurality of local fusion circuits includes a first local fusion circuit, a second local fusion circuit, and a third local fusion circuit and wherein:
  one of the first local routing paths coupled to the first local fusion circuit introduces a delay of one operating cycle relative to the other of the first local routing paths coupled to the first local fusion circuit;
  one of the first local routing paths coupled to the second local fusion circuit introduces a delay of a number d of operating cycles relative to the other of the first local routing paths coupled to the second local fusion circuit, wherein the number d is a code distance greater than 1; and
  one of the first local routing paths coupled to the third local fusion circuit introduces a delay of a number $d^2$ of operating cycles relative to the other of the first local routing paths coupled to the third local fusion circuit.

17. The system of claim 16 wherein, in each interleaving module:
  the first local fusion circuit is coupled to the respective first local routing paths of a first routing switch and a second routing switch;
  the first local routing path of the first routing switch introduces the delay of one operating cycle;
  the plurality of output routing paths of each of the first routing switch and the second routing switch further includes a third local routing path, wherein the third local routing path of the first routing switch introduces a delay of two operating cycles relative to the third local routing path of the second routing switch; and
  the plurality of local fusion circuits further includes a fourth local fusion circuit coupled to the third local routing paths of the first routing switch and the second routing switch.

18. The system of claim 16 wherein, in each interleaving module:
  the third local fusion circuit is coupled to the respective first local routing paths of a first routing switch and a second routing switch;
  the first local routing path of the first routing switch introduces the delay of $d^2$ operating cycles;
  the plurality of output routing paths of the first routing switch further includes a plurality of quickswap transfer paths that exit the circuit after a delay of $d^2$ operating cycles;
  the plurality of output routing paths of the second routing switch further includes a plurality of internal quickswap routing paths;
  the circuit further includes a plurality of external quickswap routing paths that receive physical qubits from a plurality of external circuits; and the plurality of reconfigurable fusion circuits further includes a plurality of quickswap fusion circuits, each quickswap fusion circuit having a first input coupled to one of the internal quickswap routing paths and a second input coupled to one of the external quickswap routing paths.

19. The system of claim 12 wherein, in each interleaving module, each of the plurality of reconfigurable fusion circuits is configured such that the projective entangling measurement operation includes a destructive measurement on both of the input qubits.

20. The system of claim 12 wherein, in each interleaving module, each of the reconfigurable fusion circuits is configured such that:
the projective entangling measurement is a type II fusion operation that provides a joint XX measurement outcome and a joint ZZ measurement outcome; and the plurality of single-qubit measurements includes a Pauli X measurement, a Pauli Y measurement, and a Pauli Z measurement, and a phase rotation of $e^{-i\pi/8}$ followed by a Pauli Z measurement.

21. The system of claim 12 further comprising:
classical control logic coupled to the plurality of reconfigurable fusion circuits and to the plurality of routing switches in the interleaving modules, the classical control logic being configured to select an output routing path for the each of the plurality of routing switches and an operation for each of the plurality of reconfigurable fusion circuits.

22. The system of claim 21 wherein the classical control logic is further configured to select the output routing path for the each of the plurality of routing switches and the operation for each of the plurality of reconfigurable fusion circuits based at least in part on a logical block network representing a quantum computation to be executed.

23. The system of claim 12 wherein the resource state interconnect includes a plurality of waveguides coupled between an external source of resource states and the output paths of the resource state interconnect.

\* \* \* \* \*